US011963927B2

(12) United States Patent
Chang et al.

(10) Patent No.: US 11,963,927 B2
(45) Date of Patent: Apr. 23, 2024

(54) GLASS CONTAINERS WITH DELAMINATION RESISTANCE AND IMPROVED DAMAGE TOLERANCE

(71) Applicant: CORNING INCORPORATED, Corning, NY (US)

(72) Inventors: Theresa Chang, Painted Post, NY (US); Paul Stephen Danielson, Dundee, NY (US); Steven Edward DeMartino, Painted Post, NY (US); Andrei Gennadyevich Fadeev, Elmira, NY (US); Robert Michael Morena, Lindley, NY (US); Santona Pal, Painted Post, NY (US); John Stephen Peanasky, Big Flats, NY (US); Robert Anthony Schaut, Painted Post, NY (US); Christopher Lee Timmons, Big Flats, NY (US); Natesan Venkataraman, Painted Post, NY (US); Ronald Luce Verkleeren, Horseheads, NY (US); Dana Craig Bookbinder, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/996,758

(22) Filed: Aug. 18, 2020

(65) Prior Publication Data

US 2020/0375846 A1 Dec. 3, 2020

Related U.S. Application Data

(63) Continuation of application No. 16/185,828, filed on Nov. 9, 2018, now Pat. No. 10,786,431, which is a
(Continued)

(51) Int. Cl.
*C03B 23/04* (2006.01)
*A61J 1/06* (2006.01)
(Continued)

(52) U.S. Cl.
CPC ............. *A61J 1/1468* (2015.05); *A61J 1/065* (2013.01); *B32B 17/06* (2013.01); *B65D 1/0207* (2013.01);
(Continued)

(58) Field of Classification Search
CPC ....... C03B 23/09; C03B 23/092; C03B 23/04; C03B 23/207
See application file for complete search history.

(56) References Cited

U.S. PATENT DOCUMENTS 2,106,744 A 2/1938 Hood et al.
2,323,643 A 7/1943 Barton
(Continued)

FOREIGN PATENT DOCUMENTS

CA 853121 A 10/1970
CA 1333785 C 1/1995
(Continued)

OTHER PUBLICATIONS

Non-Final Office Action dated Oct. 28, 2016, for U.S. Appl. No. 14/949,320, filed Nov. 23, 2015. pp. 1-16.
(Continued)

*Primary Examiner* — Cynthia Szewczyk
(74) *Attorney, Agent, or Firm* — Dinsmore & Shohl LLP

(57) ABSTRACT

A glass container for storing pharmaceutical formulations may include a glass body formed from a Type IA or Type IB glass composition according to ASTM Standard E438-92 (2011). The glass body may include a wall portion with an inner surface and an outer surface, a heel portion and a floor portion, wherein the inner surface of the glass container is
(Continued)

formed by the inner surface of the glass body. The glass body may include at least a class A2 base resistance or better according to ISO 695, at least a type HGB2 hydrolytic resistance or better according to ISO 719 and Type 1 chemical durability according to USP <660>. The glass container does not comprise a boron-rich layer on the inner surface of the glass body in as formed condition.

28 Claims, 53 Drawing Sheets

Related U.S. Application Data continuation of application No. 15/656,634, filed on Jul. 21, 2017, now Pat. No. 10,307,334, which is a continuation of application No. 14/075,620, filed on Nov. 8, 2013, now Pat. No. 10,307,333.

(60) Provisional application No. 61/731,767, filed on Nov. 30, 2012.

(51) Int. Cl.
| | |
|---|---|
| *A61J 1/14* | (2023.01) |
| *B32B 17/06* | (2006.01) |
| *B65D 1/02* | (2006.01) |
| *B65D 1/40* | (2006.01) |
| *B65D 23/02* | (2006.01) |
| *B65D 23/08* | (2006.01) |
| *B65D 25/14* | (2006.01) |
| *B65D 25/34* | (2006.01) |
| *B65D 65/42* | (2006.01) |
| *C03C 15/02* | (2006.01) |
| *C03C 17/00* | (2006.01) |
| *C03C 17/22* | (2006.01) |
| *C03C 17/30* | (2006.01) |
| *C03C 17/32* | (2006.01) |
| *C03C 17/34* | (2006.01) |
| *C03C 17/42* | (2006.01) |
| *C03C 21/00* | (2006.01) |
| *C09D 179/08* | (2006.01) |

(52) U.S. Cl.
CPC ............ *B65D 1/0215* (2013.01); *B65D 1/40* (2013.01); *B65D 23/02* (2013.01); *B65D 23/0814* (2013.01); *B65D 23/0821* (2013.01); *B65D 25/14* (2013.01); *B65D 25/34* (2013.01); *B65D 65/42* (2013.01); *C03B 23/04* (2013.01); *C03C 15/02* (2013.01); *C03C 17/005* (2013.01); *C03C 17/22* (2013.01); *C03C 17/30* (2013.01); *C03C 17/32* (2013.01); *C03C 17/3405* (2013.01); *C03C 17/42* (2013.01); *C03C 21/002* (2013.01); *C09D 179/08* (2013.01); *C03C 2217/78* (2013.01); *C03C 2218/111* (2013.01); *Y10T 428/13* (2015.01); *Y10T 428/131* (2015.01); *Y10T 428/1317* (2015.01); *Y10T 428/24802* (2015.01); *Y10T 428/315* (2015.01)

(56) References Cited

U.S. PATENT DOCUMENTS

| | | |
|---|---|---|
| 2,691,548 A | 10/1954 | Feucht et al. |
| 2,753,304 A | 7/1956 | Orozco |
| 2,947,615 A | 8/1960 | Greene et al. |
| 3,023,139 A | 2/1962 | Tetterode |
| 3,058,177 A * | 10/1962 | Taylor ............ B08B 9/20 422/1 |
| 3,287,311 A | 11/1966 | Edwards |
| 3,323,889 A | 6/1967 | Carl et al. |
| 3,395,069 A | 7/1968 | Plueddemann |
| 3,441,432 A | 4/1969 | Levene |
| 3,445,267 A | 5/1969 | Layne |
| 3,473,906 A | 10/1969 | Graham et al. |
| 3,481,726 A | 12/1969 | Fischer et al. |
| 3,577,256 A | 5/1971 | Benford, Jr. et al. |
| 3,607,186 A | 9/1971 | Bognar |
| 3,674,690 A | 7/1972 | Clow et al. |
| 3,772,061 A | 11/1973 | McCoy et al. |
| 3,772,135 A | 11/1973 | Hara et al. |
| 3,779,732 A | 12/1973 | Spanoudis |
| 3,790,430 A | 2/1974 | Mochel |
| 3,791,809 A | 2/1974 | Lau |
| 3,801,361 A | 4/1974 | Kitaj |
| 3,811,921 A | 5/1974 | Crawford et al. |
| 3,819,346 A | 6/1974 | Southwick et al. |
| 3,844,754 A | 10/1974 | Grubb et al. |
| 3,876,410 A | 4/1975 | Scholes |
| 3,878,960 A | 4/1975 | Jonsson |
| 3,900,329 A | 8/1975 | Grubb et al. |
| 3,926,604 A | 12/1975 | Smay et al. |
| 3,958,073 A | 5/1976 | Trevisan et al. |
| 3,967,995 A | 7/1976 | Fabianic |
| 3,975,175 A | 8/1976 | Foster et al. |
| 3,989,864 A | 11/1976 | Hey et al. |
| 4,021,218 A | 5/1977 | Watanabe |
| 4,023,953 A | 5/1977 | Megles et al. |
| 4,030,904 A | 6/1977 | Battye et al. |
| 4,056,208 A | 11/1977 | Prejean |
| 4,056,651 A | 11/1977 | Scola |
| 4,065,317 A | 12/1977 | Baak et al. |
| 4,065,589 A | 12/1977 | Enard et al. |
| 4,086,373 A | 4/1978 | Tobias et al. |
| 4,093,759 A | 6/1978 | Otsuki et al. |
| 4,130,677 A | 12/1978 | Huntsberger |
| 4,161,556 A | 7/1979 | Lenard et al. |
| 4,164,402 A | 8/1979 | Watanabe |
| 4,214,886 A | 7/1980 | Shay et al. |
| 4,215,165 A | 7/1980 | Gras et al. |
| 4,238,041 A | 12/1980 | Jönsson et al. |
| 4,264,658 A | 4/1981 | Tobias et al. |
| 4,280,944 A | 7/1981 | Saito et al. |
| 4,315,573 A | 2/1982 | Bradley et al. |
| 4,385,086 A | 5/1983 | Nakayama et al. |
| 4,386,164 A | 5/1983 | Moser |
| 4,395,527 A | 7/1983 | Berger |
| 4,431,692 A | 2/1984 | Hofmann et al. |
| 4,558,110 A | 12/1985 | Lee |
| 4,595,548 A | 6/1986 | St. Clair et al. |
| 4,603,061 A | 7/1986 | St. Clair et al. |
| 4,620,985 A | 11/1986 | Goodburn et al. |
| 4,636,411 A | 1/1987 | Dubois et al. |
| 4,654,235 A | 3/1987 | Effenberger et al. |
| 4,668,268 A | 5/1987 | Lindner et al. |
| 4,680,373 A | 7/1987 | Gallagher et al. |
| 4,689,085 A | 8/1987 | Plueddemann |
| 4,696,994 A | 9/1987 | Nakajima et al. |
| 4,748,228 A | 5/1988 | Shoji et al. |
| 4,749,614 A | 6/1988 | Andrews et al. |
| 4,767,414 A | 8/1988 | Williams et al. |
| 4,778,727 A | 10/1988 | Tesoro et al. |
| 4,842,889 A | 6/1989 | Hu et al. |
| 4,860,906 A | 8/1989 | Pellegrini et al. |
| 4,870,034 A | 9/1989 | Kiefer |
| 4,880,895 A | 11/1989 | Higashi et al. |
| 4,882,210 A | 11/1989 | Romberg et al. |
| 4,902,106 A | 2/1990 | Dijon et al. |
| 4,923,960 A | 5/1990 | Chen, Sr. et al. |
| 4,931,539 A | 6/1990 | Hayes |
| 4,961,976 A | 10/1990 | Hashimoto et al. |
| 4,961,996 A | 10/1990 | Carre et al. |
| 4,983,255 A | 1/1991 | Gruenwald et al. |
| 4,988,288 A | 1/1991 | Melgaard |
| 5,002,359 A | 3/1991 | Sayegh |
| 5,036,145 A | 7/1991 | Echterling et al. |
| 5,037,701 A | 8/1991 | Carre et al. |
| 5,049,421 A | 9/1991 | Kosh |

(56) References Cited

U.S. PATENT DOCUMENTS

| | | |
|---|---|---|
| 5,112,658 A | 5/1992 | Skutnik et al. |
| 5,114,757 A | 5/1992 | Linde et al. |
| 5,120,341 A | 6/1992 | Nozawa et al. |
| 5,124,618 A | 6/1992 | Ohtaka et al. |
| 5,137,751 A | 8/1992 | Burgess et al. |
| 5,206,337 A | 4/1993 | Takeda et al. |
| 5,230,429 A | 7/1993 | Etheredge, III |
| 5,232,783 A | 8/1993 | Pawar et al. |
| 5,246,782 A | 9/1993 | Kennedy et al. |
| 5,251,071 A | 10/1993 | Kusukawa et al. |
| 5,252,703 A | 10/1993 | Nakajima et al. |
| 5,258,487 A | 11/1993 | Okinoshima et al. |
| 5,281,690 A | 1/1994 | Flaim et al. |
| 5,286,527 A | 2/1994 | Blum et al. |
| 5,306,537 A | 4/1994 | Gustafson et al. |
| 5,310,862 A | 5/1994 | Nomura et al. |
| 5,326,601 A | 7/1994 | Kawano et al. |
| 5,336,925 A | 8/1994 | Moss et al. |
| 5,337,537 A | 8/1994 | Soughan |
| 5,403,700 A | 4/1995 | Heller et al. |
| 5,476,692 A | 12/1995 | Ellis et al. |
| 5,482,768 A | 1/1996 | Kawasato et al. |
| 5,488,092 A | 1/1996 | Kausch et al. |
| 5,489,558 A | 2/1996 | Moffatt et al. |
| 5,498,758 A | 3/1996 | Scholes et al. |
| 5,504,830 A | 4/1996 | Ngo et al. |
| 5,594,231 A | 1/1997 | Pellicori et al. |
| 5,601,905 A | 2/1997 | Watanabe et al. |
| 5,633,079 A | 5/1997 | Shoshi et al. |
| 5,721,181 A | 2/1998 | Sehgal et al. |
| 5,736,251 A | 4/1998 | Pinchuk |
| 5,736,476 A | 4/1998 | Watzke et al. |
| 5,756,144 A | 5/1998 | Wolff et al. |
| 5,849,369 A | 12/1998 | Ogawa |
| 5,851,200 A | 12/1998 | Higashikawa et al. |
| 5,853,833 A | 12/1998 | Sudo et al. |
| 5,908,542 A | 6/1999 | Lee et al. |
| 5,916,632 A | 6/1999 | Mishina et al. |
| 5,938,919 A | 8/1999 | Najafabadi |
| 5,979,714 A | 11/1999 | Bleile et al. |
| 6,013,333 A | 1/2000 | Carson et al. |
| 6,046,758 A | 4/2000 | Brown et al. |
| 6,048,911 A | 4/2000 | Shustack et al. |
| 6,084,034 A | 7/2000 | Miyama et al. |
| 6,096,432 A | 8/2000 | Sakaguchi et al. |
| 6,156,399 A | 12/2000 | Spallek et al. |
| 6,156,435 A | 12/2000 | Gleason et al. |
| 6,200,658 B1 | 3/2001 | Walther et al. |
| 6,204,212 B1 | 3/2001 | Kunert et al. |
| 6,214,429 B1 | 4/2001 | Zou et al. |
| 6,232,428 B1 | 5/2001 | Deets et al. |
| 6,277,950 B1 | 8/2001 | Yang et al. |
| 6,346,315 B1 | 2/2002 | Sawatsky |
| 6,358,519 B1 | 3/2002 | Waterman |
| 6,444,783 B1 | 9/2002 | Dodd et al. |
| 6,472,068 B1 | 10/2002 | Glass et al. |
| 6,482,509 B2 | 11/2002 | Buch-Rasmussen et al. |
| 6,518,211 B1 | 2/2003 | Bradshaw et al. |
| 6,537,626 B1 | 3/2003 | Spallek et al. |
| 6,561,275 B2 | 5/2003 | Glass et al. |
| 6,586,039 B2 | 7/2003 | Heinz et al. |
| 6,599,594 B1 | 7/2003 | Walther et al. |
| 6,627,377 B1 | 9/2003 | Itatani et al. |
| 6,627,569 B1 | 9/2003 | Naumann et al. |
| 6,737,105 B2 | 5/2004 | Richard |
| 6,797,396 B1 | 9/2004 | Liu et al. |
| 6,818,576 B2 | 11/2004 | Ikenishi et al. |
| 6,852,393 B2 | 2/2005 | Gandon |
| 6,866,158 B1 | 3/2005 | Sommer et al. |
| 6,921,788 B1 | 7/2005 | Izawa et al. |
| 6,939,819 B2 | 9/2005 | Usui et al. |
| 6,989,181 B2 | 1/2006 | Brandt |
| 7,087,307 B2 | 8/2006 | Nagashima et al. |
| 7,215,473 B2 | 5/2007 | Fleming |
| 7,236,296 B2 | 6/2007 | Liu et al. |
| 7,315,125 B2 | 1/2008 | Kass |
| 7,470,999 B2 | 12/2008 | Saito et al. |
| 7,569,653 B2 | 8/2009 | Landon |
| 7,619,042 B2 | 11/2009 | Poe et al. |
| 7,845,346 B2 | 12/2010 | Langford et al. |
| 7,871,554 B2 | 1/2011 | Oishi et al. |
| 7,980,096 B2 | 7/2011 | Bartsch |
| 7,985,188 B2 | 7/2011 | Felts et al. |
| 8,048,938 B2 | 11/2011 | Poe et al. |
| 8,053,492 B2 | 11/2011 | Poe et al. |
| 8,110,652 B2 | 2/2012 | Bito et al. |
| 8,234,883 B2 | 8/2012 | Krall, Jr. et al. |
| 8,273,801 B2 | 9/2012 | Baikerikar et al. |
| 8,277,945 B2 | 10/2012 | Anderson et al. |
| 8,302,428 B2 | 11/2012 | Borrelli et al. |
| 8,309,627 B2 | 11/2012 | Poe et al. |
| 8,324,304 B2 | 12/2012 | Burch et al. |
| 8,415,337 B1 | 4/2013 | Krishna |
| 8,518,545 B2 | 8/2013 | Akiba et al. |
| 8,522,575 B2 | 9/2013 | Wada |
| 8,784,371 B2 | 7/2014 | Alexandre |
| 8,820,119 B2 | 9/2014 | Kuwabara et al. |
| 9,010,150 B2 | 4/2015 | Kuwabara et al. |
| 9,034,442 B2 | 5/2015 | Chang et al. |
| 9,096,461 B2 | 8/2015 | Brix |
| 9,107,805 B2 | 8/2015 | Langsdorf et al. |
| 9,272,946 B2 | 3/2016 | Chang et al. |
| 9,346,707 B2 | 5/2016 | Danielson et al. |
| 9,428,302 B2 | 8/2016 | Fadeev et al. |
| 2002/0016438 A1 | 2/2002 | Sugo et al. |
| 2002/0037943 A1 | 3/2002 | Madsen |
| 2002/0069616 A1* | 6/2002 | Odell ............... A61M 5/3129 53/425 |
| 2002/0081401 A1 | 6/2002 | Hessok et al. |
| 2002/0155216 A1 | 10/2002 | Reitz et al. |
| 2002/0182410 A1 | 12/2002 | Szum et al. |
| 2003/0031799 A1 | 2/2003 | Haque |
| 2003/0072932 A1 | 4/2003 | Gandon |
| 2004/0048997 A1 | 3/2004 | Sugo |
| 2004/0096588 A1 | 5/2004 | Brandt |
| 2004/0105985 A1 | 6/2004 | Henze et al. |
| 2004/0199138 A1 | 10/2004 | McBay et al. |
| 2005/0048297 A1 | 3/2005 | Fukuda et al. |
| 2005/0061033 A1 | 3/2005 | Petrany et al. |
| 2005/0170722 A1 | 8/2005 | Keese |
| 2005/0199571 A1 | 9/2005 | Geisler et al. |
| 2006/0099360 A1 | 5/2006 | Farha |
| 2006/0233675 A1 | 10/2006 | Stein |
| 2006/0260360 A1* | 11/2006 | Dick ............... C03C 17/22 65/60.53 |
| 2006/0267250 A1* | 11/2006 | Gerretz ............ C03B 23/092 264/328.1 |
| 2007/0010700 A1 | 1/2007 | Bensmann et al. |
| 2007/0060465 A1 | 3/2007 | Varshneya et al. |
| 2007/0065366 A1 | 3/2007 | Soliani Raschini et al. |
| 2007/0082135 A1 | 4/2007 | Lee |
| 2007/0116907 A1 | 5/2007 | Landon et al. |
| 2007/0157919 A1 | 7/2007 | Marandon |
| 2007/0178256 A1 | 8/2007 | Landon |
| 2007/0187280 A1 | 8/2007 | Haines et al. |
| 2007/0224427 A1 | 9/2007 | Kunita et al. |
| 2007/0225823 A1 | 9/2007 | Hawkins et al. |
| 2007/0289492 A1 | 12/2007 | Wynne et al. |
| 2007/0293388 A1 | 12/2007 | Zuyev et al. |
| 2008/0008838 A1 | 1/2008 | Arpac et al. |
| 2008/0069970 A1 | 3/2008 | Wu |
| 2008/0071228 A1 | 3/2008 | Wu et al. |
| 2008/0114096 A1 | 5/2008 | Qu et al. |
| 2008/0121621 A1 | 5/2008 | Stockum et al. |
| 2008/0199618 A1 | 8/2008 | Wen et al. |
| 2008/0214777 A1 | 9/2008 | Poe |
| 2008/0281260 A1 | 11/2008 | William et al. |
| 2008/0292496 A1 | 11/2008 | Madsen |
| 2008/0308444 A1 | 12/2008 | McClain et al. |
| 2009/0048537 A1 | 2/2009 | Lydon et al. |
| 2009/0092759 A1 | 4/2009 | Chen et al. |
| 2009/0104387 A1 | 4/2009 | Postupack et al. |
| 2009/0126404 A1 | 5/2009 | Sakhrani et al. |
| 2009/0155490 A1 | 6/2009 | Bicker et al. |

(56) References Cited

U.S. PATENT DOCUMENTS

| | | |
|---|---|---|
| 2009/0155506 A1 | 6/2009 | Martin et al. |
| 2009/0155570 A1 | 6/2009 | Bonnet et al. |
| 2009/0162530 A1 | 6/2009 | Nesbitt |
| 2009/0162664 A1 | 6/2009 | Ou |
| 2009/0176108 A1 | 7/2009 | Toyama et al. |
| 2009/0197048 A1 | 8/2009 | Amin et al. |
| 2009/0197088 A1 | 8/2009 | Murata |
| 2009/0197390 A1 | 8/2009 | Rothwell et al. |
| 2009/0203929 A1 | 8/2009 | Hergenrother et al. |
| 2009/0208175 A1 | 8/2009 | Hongo et al. |
| 2009/0208657 A1 | 8/2009 | Siebenlist et al. |
| 2009/0215607 A1 | 8/2009 | Dejneka et al. |
| 2009/0220761 A1 | 9/2009 | Dejneka et al. |
| 2009/0239759 A1 | 9/2009 | Balch |
| 2009/0247699 A1 | 10/2009 | Buehler et al. |
| 2009/0269597 A1 | 10/2009 | Bito et al. |
| 2009/0275462 A1 | 11/2009 | Murata |
| 2009/0286058 A1 | 11/2009 | Shibata et al. |
| 2009/0297857 A1 | 12/2009 | Pascal et al. |
| 2009/0325776 A1 | 12/2009 | Murata |
| 2010/0009154 A1 | 1/2010 | Allan et al. |
| 2010/0044268 A1 | 2/2010 | Haines et al. |
| 2010/0047521 A1 | 2/2010 | Amin et al. |
| 2010/0056666 A1 | 3/2010 | Poe et al. |
| 2010/0062188 A1 | 3/2010 | Miyamoto et al. |
| 2010/0063244 A1 | 3/2010 | Poe et al. |
| 2010/0087307 A1 | 4/2010 | Murata et al. |
| 2010/0089097 A1 | 4/2010 | Brack et al. |
| 2010/0101628 A1 | 4/2010 | Poe et al. |
| 2010/0203270 A1* | 8/2010 | Langsdorf ............ C03B 9/1932 428/34.4 |
| 2010/0246016 A1 | 9/2010 | Carlson et al. |
| 2010/0249309 A1 | 9/2010 | Lewin et al. |
| 2010/0264645 A1 | 10/2010 | Jones et al. |
| 2010/0273019 A1 | 10/2010 | Kitaike et al. |
| 2010/0297393 A1 | 11/2010 | Wu |
| 2010/0317506 A1 | 12/2010 | Fechner et al. |
| 2011/0014475 A1 | 1/2011 | Murata |
| 2011/0045219 A1 | 2/2011 | Stewart et al. |
| 2011/0062619 A1 | 3/2011 | Laine et al. |
| 2011/0065576 A1 | 3/2011 | Campbell et al. |
| 2011/0091732 A1 | 4/2011 | Lu et al. |
| 2011/0098172 A1 | 4/2011 | Brix |
| 2011/0159318 A1 | 6/2011 | Endo et al. |
| 2011/0165393 A1 | 7/2011 | Bayne et al. |
| 2011/0177252 A1 | 7/2011 | Kanagasabapathy et al. |
| 2011/0177987 A1 | 7/2011 | Lenting et al. |
| 2011/0186464 A1 | 8/2011 | Carta et al. |
| 2011/0189486 A1 | 8/2011 | Wendell, Jr. |
| 2011/0200804 A1 | 8/2011 | Tomamoto et al. |
| 2011/0200805 A1 | 8/2011 | Tomamoto et al. |
| 2011/0226658 A1 | 9/2011 | Tata-Venkata et al. |
| 2011/0272322 A1 | 11/2011 | Yamagata et al. |
| 2011/0274916 A1 | 11/2011 | Murata |
| 2011/0313363 A1 | 12/2011 | D'Souza et al. |
| 2012/0016076 A1 | 1/2012 | Kim et al. |
| 2012/0034435 A1 | 2/2012 | Borrelli et al. |
| 2012/0052293 A1 | 3/2012 | Poe et al. |
| 2012/0052302 A1 | 3/2012 | Matusick et al. |
| 2012/0060558 A1 | 3/2012 | Haselhorst et al. |
| 2012/0061342 A1 | 3/2012 | Perrot |
| 2012/0097159 A1 | 4/2012 | Yer et al. |
| 2012/0107174 A1 | 5/2012 | Zambaux |
| 2012/0142829 A1 | 6/2012 | Ichinose |
| 2012/0148770 A1 | 6/2012 | Rong et al. |
| 2012/0172519 A1 | 7/2012 | Dörr et al. |
| 2012/0199203 A1 | 8/2012 | Nishizawa et al. |
| 2012/0251748 A1 | 10/2012 | Ashmead et al. |
| 2012/0282449 A1 | 11/2012 | Gross |
| 2012/0297829 A1 | 11/2012 | Endo et al. |
| 2013/0011650 A1 | 1/2013 | Akiba et al. |
| 2013/0071078 A1 | 3/2013 | Bennett et al. |
| 2013/0095261 A1 | 4/2013 | Ahn et al. |
| 2013/0101596 A1* | 4/2013 | DeMartino ............ A61J 1/1468 424/142.1 |
| 2013/0101792 A1 | 4/2013 | Pranov |
| 2013/0101853 A1* | 4/2013 | Drake .................. C03C 4/20 428/410 |
| 2013/0109116 A1 | 5/2013 | Cavuoti et al. |
| 2013/0122306 A1 | 5/2013 | Bookbinder et al. |
| 2013/0171456 A1 | 7/2013 | Fadeev et al. |
| 2013/0211344 A1 | 8/2013 | Rodriguez et al. |
| 2013/0216742 A1 | 8/2013 | DeMartino et al. |
| 2013/0224407 A1 | 8/2013 | Fadeev et al. |
| 2013/0299380 A1 | 11/2013 | Zambaux et al. |
| 2013/0327740 A1 | 12/2013 | Adib et al. |
| 2014/0031499 A1 | 1/2014 | Cho et al. |
| 2014/0001143 A1 | 2/2014 | Adib et al. |
| 2014/0034544 A1 | 2/2014 | Chang et al. |
| 2014/0069202 A1 | 3/2014 | Fisk |
| 2014/0150499 A1 | 6/2014 | Danielson et al. |
| 2014/0151370 A1 | 6/2014 | Chang et al. |
| 2014/0220327 A1 | 8/2014 | Adib et al. |
| 2014/0339194 A1 | 11/2014 | Gu et al. |
| 2015/0107303 A1 | 4/2015 | Bookbinder et al. |
| 2015/0203631 A1 | 7/2015 | Miyazaki et al. |
| 2015/0274583 A1 | 10/2015 | An et al. |
| 2016/0145150 A1 | 5/2016 | Bookbinder et al. |
| 2019/0210768 A1 | 7/2019 | Adib et al. |

FOREIGN PATENT DOCUMENTS

| | | | |
|---|---|---|---|
| CN | 1060861 A | 5/1992 | |
| CN | 2483332 Y | 3/2002 | |
| CN | 1648009 A | 8/2005 | |
| CN | 1222478 C | 10/2005 | |
| CN | 1963650 A | 5/2007 | |
| CN | 101190969 A | 6/2008 | |
| CN | 101479355 A | 7/2009 | |
| CN | 101585666 A | 11/2009 | |
| CN | 201390409 Y | 1/2010 | |
| CN | 201404453 Y | 2/2010 | |
| CN | 101717189 A | 6/2010 | |
| CN | 101831175 A | 9/2010 | |
| CN | 201694531 U | 1/2011 | |
| CN | 102066462 A | 5/2011 | |
| CN | 202006114 U | 10/2011 | |
| CN | 102317168 A | 1/2012 | |
| CN | 102452797 A | 5/2012 | |
| CN | 103562324 A | 2/2014 | |
| CN | 104194618 A | 12/2014 | |
| CN | 104508008 A | 4/2015 | |
| DE | 2138159 A1 | 2/1973 | |
| DE | 4128634 A1 | 3/1993 | |
| DE | 4130414 A1 | 4/1993 | |
| DE | 29702816 U1 | 4/1997 | |
| DE | 10332176 A1 * | 2/2004 | ............... A61J 1/06 |
| DE | 102004011009 A | 9/2005 | |
| DE | 102011085267 A1 | 5/2013 | |
| EP | 0176062 A2 | 4/1986 | |
| EP | 0330456 A1 | 8/1989 | |
| EP | 0515801 A1 | 12/1992 | |
| EP | 1464631 A2 | 6/2004 | |
| EP | 2031124 A1 | 3/2009 | |
| EP | 0524802 B2 | 10/2009 | |
| EP | 2540682 A1 | 1/2013 | |
| FR | 93015 E | 1/1969 | |
| FR | 2033431 A5 | 12/1970 | |
| FR | 2515633 A1 | 5/1983 | |
| FR | 2973804 A1 | 10/2012 | |
| GB | 702292 A | 1/1954 | |
| GB | 720778 A | 12/1954 | |
| GB | 966731 A | 8/1964 | |
| GB | 1267855 A | 3/1972 | |
| GB | 1529386 A | 10/1978 | |
| IN | 231117 B | 3/2009 | |
| JP | S49104910 A | 10/1974 | |
| JP | S49115088 A | 11/1974 | |
| JP | S5156819 A | 5/1976 | |
| JP | S54054124 A | 4/1979 | |
| JP | S5532722 A | 3/1980 | |
| JP | S5590439 A | 7/1980 | |
| JP | S55104949 A | 8/1980 | |
| JP | S5663845 A | 5/1981 | |

(56) References Cited

FOREIGN PATENT DOCUMENTS

| | | |
|---|---|---|
| JP | 56155044 A | 12/1981 |
| JP | S5738346 A | 3/1982 |
| JP | S5767035 A | 4/1982 |
| JP | S57123223 A | 7/1982 |
| JP | S58156553 A | 9/1983 |
| JP | 60254022 A | 12/1985 |
| JP | 62047623 A | 3/1987 |
| JP | 62140257 A | 6/1987 |
| JP | S62172081 A | 7/1987 |
| JP | S6373333 U | 5/1988 |
| JP | 63236731 A | 10/1988 |
| JP | S63270330 A | 11/1988 |
| JP | H01201047 A | 8/1989 |
| JP | H01201048 A | 8/1989 |
| JP | 1279058 A | 11/1989 |
| JP | H02153846 A | 6/1990 |
| JP | H02225344 A | 9/1990 |
| JP | H0437632 A | 2/1992 |
| JP | H05213631 A | 8/1993 |
| JP | 10645481 B2 | 6/1994 |
| JP | 7223845 A | 8/1995 |
| JP | H083510 A | 1/1996 |
| JP | H0826754 A | 1/1996 |
| JP | H08151564 A | 6/1996 |
| JP | H08245242 A | 9/1996 |
| JP | H09241033 A | 9/1997 |
| JP | 11171593 A | 6/1999 |
| JP | 11314931 A | 11/1999 |
| JP | 2000007372 A | 1/2000 |
| JP | 2000211644 A | 8/2000 |
| JP | 2000219621 A | 8/2000 |
| JP | 2001033348 A | 2/2001 |
| JP | 2001072441 A | 3/2001 |
| JP | 2001180969 A | 7/2001 |
| JP | 2001192239 A | 7/2001 |
| JP | 2001229526 A | 8/2001 |
| JP | 2001236634 A | 8/2001 |
| JP | 2001294447 A | 10/2001 |
| JP | 2001302284 A | 10/2001 |
| JP | 2002003241 A | 1/2002 |
| JP | 2002249340 A | 9/2002 |
| JP | 2003053259 A | 2/2003 |
| JP | 2003128439 A | 5/2003 |
| JP | 2003146699 A | 5/2003 |
| JP | 2004161993 A | 6/2004 |
| JP | 2004315285 A | 11/2004 |
| JP | 2005343742 A | 12/2005 |
| JP | 2006291049 A | 10/2006 |
| JP | 2007204728 A | 8/2007 |
| JP | 2008195602 A | 8/2008 |
| JP | 2009108181 A | 5/2009 |
| JP | 2009523105 A | 6/2009 |
| JP | 2009175600 A | 8/2009 |
| JP | 2009204780 A | 9/2009 |
| JP | 2009207618 A | 9/2009 |
| JP | 2010059038 A | 3/2010 |
| JP | 4483331 B2 | 6/2010 |
| JP | 2010202413 A | 9/2010 |
| JP | 2010274091 A | 12/2010 |
| JP | 2011001253 A | 1/2011 |
| JP | 2011057547 A | 3/2011 |
| JP | 2011236100 A | 11/2011 |
| JP | 2012180276 A | 9/2012 |
| JP | 2012224824 A | 11/2012 |
| JP | 2013003310 A | 1/2013 |
| JP | 2013516387 A | 5/2013 |
| KR | 1006303090000 | 9/2006 |
| RO | 83460 A2 | 3/1984 |
| RU | 2071492 C1 | 1/1997 |
| RU | 2220219 C1 | 12/2003 |
| SU | 722865 A1 | 3/1980 |
| SU | 990700 A | 1/1983 |
| SU | 1025680 A1 | 6/1983 |
| SU | 1293134 A1 | 2/1987 |
| TW | 201034993 A | 10/2010 |
| TW | 201113233 A | 4/2011 |
| TW | 201213260 A | 4/2012 |
| TW | 201223895 A | 6/2012 |
| WO | 90/05031 A1 | 5/1990 |
| WO | 95/10487 A1 | 4/1995 |
| WO | 97/25932 A1 | 7/1997 |
| WO | 2001017569 A2 | 3/2001 |
| WO | 2007016516 A2 | 2/2007 |
| WO | 2007097376 A1 | 8/2007 |
| WO | 2008050500 A1 | 5/2008 |
| WO | 2008134315 A2 | 11/2008 |
| WO | 2008134315 A3 | 12/2008 |
| WO | 2009002660 A2 | 12/2008 |
| WO | 2009028862 A1 | 3/2009 |
| WO | 2009095569 A1 | 8/2009 |
| WO | 2009108285 A2 | 9/2009 |
| WO | 2010115728 A2 | 10/2010 |
| WO | 2010129758 A1 | 11/2010 |
| WO | 2011001501 A1 | 1/2011 |
| WO | 2011047840 A2 | 4/2011 |
| WO | 2011069338 A1 | 6/2011 |
| WO | 2011073106 A1 | 6/2011 |
| WO | 2011080543 A1 | 7/2011 |
| WO | 2011103798 A1 | 9/2011 |
| WO | 2011121811 A1 | 10/2011 |
| WO | 2011145661 A1 | 11/2011 |
| WO | 2012026290 A1 | 3/2012 |
| WO | 2012047950 A1 | 4/2012 |
| WO | 2013063290 A1 | 5/2013 |
| WO | 2013130721 A1 | 9/2013 |
| WO | 2013130724 A2 | 9/2013 |
| WO | 2014005030 A1 | 1/2014 |
| ZA | 9706079 A | 3/1998 |

OTHER PUBLICATIONS

Wagner, Steven Robert, "High temperature-high humidity for polyimide coatings for aluminosilicate glass surfaces"; The Libraries at Alfred University; Scholes Library Catalog; (2001), pp. 1-81; OCLC: 671453753.

Non-Final Office Action dated Jan. 12, 2017, for U.S. Appl. No. 14/812,898, filed Jul. 29, 2015. pp. 1-44.

English Machine Translation of detailed description of DE 102004011009 published Sep. 29, 2005; Machine Translation acquired on Jan. 8, 2016. pp. 1-11.

Hasegawa et al., "Photophysics, photochemistry, and optical properties of polyimides", Elsevier Science Ltd; Prog. Poly. Sci. 26 (2001), pp. 259-335.

Non-Final Office Action dated Feb. 15, 2017, for U.S. Appl. No. 13/780,740, filed Feb. 28, 2013. pp. 1-39.

Non-Final Office Action dated Jan. 24, 2017, for U.S. Appl. No. 15/331,113, filed Oct. 21, 2016. pp. 1-50.

"Parylene Conformal Coating Specification and Properties", acquired from http://www.nbtc.cornell.edu/sites/default/files/Parylene%20Information%20Sheets.pdf on Dec. 20, 2016.

Rx-360 Consortium; "Highlights from Jun. 2011 Glass Container Delamination Scientific Symposium"; Report published Jul. 9, 2011; pp. 1-13.

Non-Final Office Action dated Feb. 22, 2017, for U.S. Appl. No. 13/827,732, filed Mar. 14, 2013. pp. 1-34.

Jannotti et al. "Photoelastic Measurement of High Stress Profiles in Ion-exchanged Glass", Int. J. Appl. Glass Sci., 2011, vol. 2, p. 275-281.

Canadian Official Action dated Mar. 6, 2017 for CA Patent Application No. 2,864,919. pp. 1-4.

English Translation of Japanese 1st Office Action dated Feb. 21, 2017, for JP Patent Application No. 2014-558980; pp. 1-6.

English Translation of Chinese 1st Office Action & Search Report dated Feb. 20, 2017 for CN Patent Application No. 201380062549.7; pp. 1-11.

Non-Final Office Action dated Mar. 9, 2017 for U.S. Appl. No. 15/331,120, filed Oct. 21, 2016; pp. 1-43.

"Schott Technical Glasses: Physical and Technical Properties" acquired from http://www.us.schott.com/tubing/english/download/schott-brochure-technical-glasses_us.pdf on Jan. 17, 2017. pp. 1-76.

(56) References Cited

OTHER PUBLICATIONS

Non-Final Office Action dated Mar. 8, 2017 for U.S. Appl. No. 13/912,457, filed Jun. 7, 2013. pp. 1-34.
Non-Final Office Action dated Mar. 21, 2017 for U.S. Appl. No. 14/075,630, filed Nov. 8, 2013. pp. 1-35.
Non-Final Office Action dated Apr. 6, 2017 for U.S. Appl. No. 14/812,902, filed Jul. 29, 2015. pp. 1-43.
Non-Final Office Action dated Apr. 18, 2017, for U.S. Appl. No. 15/374,338, filed Dec. 9, 2016. pp. 1-45.
Non-Final Office Action dated Mar. 29, 2017 for U.S. Appl. No. 13/780,754, filed Feb. 28, 2013. pp. 1-41.
Non-Final Office Action dated May 30, 2017 for U.S. Appl. No. 14/075,620, filed Nov. 8, 2013. pp. 1-61.
Non-Final Office Action dated May 31, 2017 for U.S. Appl. No. 14/075,593, filed Nov. 8, 2013. pp. 1-51.
English Translation of Taiwan Official Communication dated Apr. 17, 2017 & Search Report dated Feb. 20, 2017, for TW Patent Application No. 102143473. pp. 1-3.
English Translation of Japanese Office Action dated May 30, 2017 for JP Patent Application No. 2015-520574. pp. 1-9.
English Translation of Russian Official Communication and Search Report dated Jun. 5, 2017 for RU Patent Application No. 2014154053. pp. 1-9.
Borba s rasslaivaniem stekla v farmatsevticheskoy upakovke (Glass delamination control in a pharmaceutical package). Henning Katte. Glass International, May 2012. pp. 25-30.
English Translation of Taiwan Search Report dated May 20, 2017 for TW Patent Application No. 102143475. pp. 1-2.
Non-Final Office Action dated Jul. 7, 2017 for U.S. Appl. No. 14/949,320, filed Nov. 23, 2015. pp. 1-15.
English Translation of Japanese 2nd Office Action dated Aug. 20, 2019, for JP Patent Application No. 2018-019178. pp. 1-5.
English Translation of Korean 2nd Office Action dated Sep. 10, 2019, for KR Patent Application No. 2019-7008449. pp. 1-2.
English Translation of Chinese 1st Office Action & Search Report dated Sep. 9, 2019, for CN Patent Application No. 201710851535.3. pp. 1-10.
English Translation of Russian Decision on Grant dated Oct. 4, 2019, for RU Patent Application No. 2018136739. pp. 1-22.
Notice of Allowance dated Jan. 7, 2015 relating to U.S. Appl. No. 14/052,048, filed Oct. 11, 2013. pp. 1-10.
Notice of Allowance dated Jun. 26, 2015 relating to U.S. Appl. No. 14/057,697, filed Oct. 18, 2013.
Non-Final Office Action dated Jul. 14, 2015 relating to U.S. Appl. No. 14/088,556, filed Nov. 25, 2013; pp. 1-17.
Schwarzenbach, et al., "Interferon a-2a interactions on Glass Vial Surfaces Measured by Atomic Force Microscopy", PDS J. Pharmaceutical Science and Technology, vol. 56, No. 2, Mar.-Apr. 2002, pp. 78-89.
Shelby, "Introduction to Glass Science and Technology", Royal Chemistry, Jan. 1, 2005—Technology & Engineering, p. 193.
Non-Final Office Action dated Mar. 23, 2016 for U.S. Appl. No. 13/827,732, filed Mar. 14, 2013. pp. 1-28.
Yashchishin, et al., "Homogeneity and lamination of sheet glass," L'vov Mechanized Glass Works, Translated from Steklo i Keramika, No. 4, Apr. 1978, p. 192-194.
Cerdan-Diaz, et al., "Improving chemical durability and resistance to corrosion/delamination through chemistry enhancement in glass manufacturing," Glass Delamination Scientific Symposium, May 25, 2011, Arlington, VA, p. 1-29.
Non-Final Office Action dated Mar. 9, 2016 for U.S. Appl. No. 13/912,457, filed Jun. 7, 2013. pp. 1-34.
Non-Final Office Action dated May 19, 2016 for U.S. Appl. No. 14/812,902, filed Jul. 29, 2015. pp. 1-15.
Flaim, et al., "High Refractive Index Polymer Coatings for Optoelectronics Applications," Society of Photo-Optical Instrumentation for Engineers (2003), SPIE Proceedings of Optical Systems Design 2003. pp. 1-12.
Non-Final Office Action dated Jun. 15, 2016 for U.S. Appl. No. 13/780,754, filed Feb. 28, 2013. pp. 1-25.

Non-Final Office Action dated Jun. 15, 2016 for U.S. Appl. No. 14/812,898, filed Jul. 29, 2015. pp. 1-24.
Non-Final Office Action dated Sep. 1, 2020 for U.S. Appl. No. 15/337,695, filed Oct. 28, 2016. pp. 1-25.
Chinese 1st Office Action & Search Report dated Aug. 25, 2020, for CN Patent Application No. 201680057620.6. pp. 1-27.
Iacocca, et al., "Corrosive attack of glass by a pharmaceutical compound," Journal of Materials Science, 42:801-811, Springer Science+Business Media, LLC (2007), DOI: 10.1007/s10853-006-0156-y.
Iacocca, et al., "Factors Affecting the Chemical Durability of Glass Used in the Pharmaceutical Industry", AAPS PharmSciTech, vol. 11, No. 3, pp. 1340-1349, Sep. 2010.
Schwarzenbach, et al., "Topological Structure and Chemical Composition of Inner Surfaces of Borosilicate Vials," PDA Journal of Pharmaceutical Science and Technology, May / Jun. 2004, vol. 58, No. 3, 169-175.
International Search Report and Written Opinion mailed Nov. 20, 2015 for PCT/US2015/048592 filed Sep. 4, 2015. pp. 1-11.
Chao-Ching Chang et al., Synthesis and Optical Properties of Soluble Polyimide/Titania Hybrid Thin Films, Macromol. Mater. Eng., (2006), Issue 12, vol. 291, pp. 1521-1528.
Yang-Yen Yu, et al., High transparent polyimide/titania multi-layer anti-reflective hybrid films, Thin Solid Films 519 (2011) 4731-4736.
Qiu, et al., "Morphology and size control of inorganic particles in polyimide hybrids by using SiO2—TiO2 mixed oxide", Polymer 44 (2003) 5821-5826.
Extended European Search Report dated Jan. 8, 2016 for EP Patent Application No. 15290254.0. pp. 1-6.
Singapore Written Opinion and Search Report dated Jan. 20, 2021, for SG Patent Application No. 10201704148S. pp. 1-10.
Singapore Written Opinion and Search Report dated Jan. 25, 2021, for SG Patent Application No. 10201705439Y. pp. 1-10.
English Translation of Chinese 1st Office Action & Search Report dated Jan. 12, 2021, for CN Patent Application No. 201811406323. 5. pp. 1-11.
International Search Report & Written Opinion dated Oct. 28, 2013, relating to PCT/US2013/028187 filed Feb. 28, 2013. pp. 1-13.
International Search Report & Written Opinion dated Oct. 28, 2013 relating to PCT/US2013/048589 filed Jun. 28, 2013. pp. 1-15.
International Search Report & Written Opinion dated Jan. 16, 2014 relating to PCT/US2013/066370 filed Oct. 23, 2013. pp. 1-12.
Huang, et al., "Cubic silsesquioxane-polyimide nanocomposites with improved thermomechanical and dielectric properties". Acta Materialia, Elsevier, vol. 53, No. 8, pp. 2395-2404, May 1, 2005; ISSN: 1359-6454.
Final Office Action dated Jan. 28, 2014 relating to U.S. Appl. No. 13/780,740, filed Feb. 28, 2013. pp. 1-37.
Non-Final Office Action dated Mar. 10, 2014 relating to U.S. Appl. No. 14/052,048, filed Oct. 11, 2013. pp. 1-11.
ASTM, "Standard Specification for Glasses in Laboratory Apparatus," Designation E438-92 (Reapproved 2006). Retrieved from the Internet: <URL: http://enterprise2.astm.org/DOWNLOAD/E438-92R06.1656713-1.pdf>. p. 1.
International Search Report & Written Opinion dated Feb. 26, 2014 for International Patent Application No. PCT/US2013/071437 filed Nov. 22, 2013. pp. 1-12.
International Search Report and Written Opinion dated Oct. 2, 2013, relating to International Patent Application No. PCT/US2013/044686 filed Jun. 7, 2013. pp. 1-17.
Pantano, Carlo G.,"The Role of Coatings and Other Surface Treatments in the Strength of Glass", [online], Department of Materials Science and Engineering Materials Research Institute, The Pennsylvania State University, University Park, PA. 2009. Retrieved from the Internet: <URL: http://www.gmic.org/Strength%20In%20Glass/Pantano%20Pac%20Rim.pdf>. pp. 1-55.
U.S. Department of Health & Human Services, "Advisory to Drug Manufactures: Formation of Glass Lamellae in Certain Injectable Drugs" [online] U.S. Food & Drug Administration, Mar. 25, 2011, retrieved from the internet: <URL: http://www.fda.gov/Drugs/DrugSafety/ucm248490.htm>.
Non-Final Office Action dated Jul. 30, 2013 relating to U.S. Appl. No. 13/780,740, filed Feb. 28, 2013. pp. 1-34.

(56) References Cited

OTHER PUBLICATIONS

De Rosa, et al., "Scratch Resistant Polyimide Coatings for Aluminosilicate Glass Surfaces", The Journal of Adhesion, 78: 113-127, Taylor & Francis (2002), ISSN: 0021-8464.

Wahab, et al., "Silica- and Silsesquioxane-Containing Polymer Nanohybrids", Macromolecules Containing Metal and Metal-Like Elements, vol. 4: Group IVA Polymers, Chapter 6, 2005 John Wiley & Sons, Inc.

Walther, et al., "Pharmaceutical Vials with Extremely High Chemical Inertness" [online], PDA Journal of Pharmaceutical Science and Technology, May / Jun. 2002, vol. 56, No. 3, 124-129 (abstract); retrieved from the Internet: <URL: http://journal.pda.org/content/56/3/124.abstract>.

Wagner, C., "PDA/FDA Glass Quality Conference: an alternative glass packing solution to reduce delamination risks," [PowerPoint Presentation] PDA/FDA Glass Quality Conference, Washington, D.C., Jun. 4-5, 2012.

Non-Final Office Action dated Dec. 12, 2019, for U.S. Appl. No. 15/508,815, filed Mar. 3, 2017. pp. 1-9.

"Lyophilization: Growing with Biotechnology", Genetic Engineering & Biotechnology News, Sep. 15, 2005, vol. 25, No. 16, acquired from https://www.genengnews.com/magazine/35/lyophilization-growing-with-biotechnology/ (Year: 2005). pp. 1-7.

International Search Report & Written Opinion dated Feb. 26, 2014 for International Patent Application No. PCT/US2013/071447 filed Nov. 22, 2013. pp. 1-13.

International Search Report & Written Opinion dated Feb. 26, 2014 for International Patent Application No. PCT/US2013/071460 filed Nov. 22, 2013. pp. 1-12.

International Search Report & Written Opinion dated Feb. 26, 2014 for International Patent Application No. PCT/US2013/071473 filed Nov. 22, 2013. pp. 1-13.

Non-Final Office Action dated Mar. 20, 2014 relating to U.S. Appl. No. 14/057,697, filed Oct. 18, 2013. pp. 1-14.

International Search Report & Written Opinion dated May 6, 2014 for International Patent Application No. PCT/US2013/071776 filed Nov. 26, 2013. pp. 1-12.

U. Watjen, et al. "The Certification of a Reference Material for the Determination of the Alkali Leaching From Pharmaceutical Glass Containers IRMM-435", 2006, XP055114934, Retrieved from the Internet: URL: http://www.irmm.jrc.be/html/reference_materials_catalogue/catalogue/attachments/IRMM-435_report.pdf.

Non-Final Office Action dated Aug. 13, 2014 relating to U.S. Appl. No. 13/780,740, filed Feb. 28, 2013. pp. 1-43.

Non-Final Office Action dated Sep. 9, 2014 relating to U.S. Appl. No. 14/057,697, filed Oct. 18, 2013. pp. 1-15.

U.S. Pharmacopeial Convention Medicines Compendium, "<660> Containers-Glass" [online], (2014). Retrieved from the Internet: <URL: https://mc.usp.org/general-chapters>. pp. 1-5.

European Pharmacopeia, 5th edition, 3.2 Containers, [online]. Retrieved from the Internet: <URL: http://pharmacyebooks.com/2009/09/european-pharmacopoeia-5-0-online.html> 4 Pages, (2005).

Ciullo, P.A., Industrial Minerals and Their Uses—A Handbook and Formulary. William Andrew Publishing/Noyes, (1996). ISBN: 0-8155-1408-5. Online version available at: <URL: http://app.knovel.com/hotlink/toc/id:kpIMTUAHFB/industrial-minerals-their/industrial-minerals-their>. pp. 1-7.

Final Office Action dated Jul. 16, 2014 relating to U.S. Appl. No. 14/052,048, filed Oct. 11, 2013. pp. 1-9.

Plueddemann, Edwin, "Silane Coupling Agents," Springer Science+Business Media, LLC (1982). ISBN: 978-1-4899-0344-0. pp. 1-18.

Non-Final Office Action dated Nov. 14, 2014 relating to U.S. Appl. No. 14/075,605, filed Nov. 8, 2013. pp. 1-9.

Non-Final Office Action dated Jan. 29, 2015 relating to U.S. Appl. No. 13/780,740, filed Feb. 28, 2013. pp. 1-79.

Hawley's Condensed Chemical Dictionary Melting Points, 2007. pp. 1-5.

Non-Final Office Action dated Mar. 4, 2015 relating to U.S. Appl. No. 14/057,697, filed Oct. 18, 2013. pp. 1-12.

Final Office Action dated May 6, 2015 relating to U.S. Appl. No. 13/780,740, filed Feb. 28, 2013. pp. 1-36.

English Machine Translation of CN 101831175 A, published Sep. 15, 2010, University of Science and Technology Liaoning, pp. 1-13.

Pappalardo, L. T., "DSC Evaluation of Epoxy and Polyimide-Impregnated Laminates (Prepregs)"; Journal of Applied Polymer Science, vol. 21, 809-820, John Wiley & Sons, Inc. (1977).

Keramid and Kerimide 601, Scifinder American Chemical Society (ACS) (2015); pp. 1-5.

Polyimide—Hawley's Condensed Chemical Dictionary—Wiley Online (2007); 1 Page.

Tyzor (Du Pont)—Hawley's Condensed Chemical Dictionary—Wiley Online (2007). 1 Page.

McKeen, L., "Fatigue and Tribological Properties of Plastics and Elastomers," 2d Ed 7 Polyimides, (2010); 25 Pages.

Final Office Action dated Jun. 3, 2015 relating to U.S. Appl. No. 14/075,605, filed Nov. 8, 2013. pp. 1-12.

Non-Final Office Action dated Oct. 6, 2015 relating to U.S. Appl. No. 13/780,754, filed Feb. 28, 2013; pp. 1-24.

Non-Final Office Action dated Oct. 6, 2015 relating to U.S. Appl. No. 14/812,898, filed Jul. 29, 2015; pp. 1-22.

Non-Final Office Action dated Oct. 7, 2015 relating to U.S. Appl. No. 13/827,732, filed Mar. 14, 2013; pp. 1-22.

Singapore Search Report & Written Opinion dated Jan. 12, 2016 for SG Patent Application No. 11201408732U. pp. 1-9.

Non-Final Office Action dated Feb. 10, 2016 for U.S. Appl. No. 14/812,898, filed Jul. 29, 2015. pp. 1-11.

Non-Final Office Action dated Feb. 10, 2016 for U.S. Appl. No. 13/780,754, filed Feb. 28, 2013. pp. 1-11.

Australian first Examination Report dated Mar. 4, 2016 for AU Patent Application No. 2013271436. pp. 1-4.

Singapore Written Opinion dated Feb. 23, 2016 for SG Patent Application No. 11201504070P. pp. 1-9.

Chinese 2nd Office Action & Search Report dated May 19, 2016 for CN Patent Application No. 201380022462.7. pp. 1-11.

Singapore Written Opinion dated May 4, 2016 for SG Patent Application No. 11201503964W. pp. 1-10.

Karlsson, S. et al., The technology of chemical glass strengthening—a review. Glass Technology: European Journal of Glass Science and Technology A, Apr. 30, 2010, vol. 51, No. 2, pp. 41-54.

Singapore Written Opinion dated May 4, 2016 for SG Patent Application No. 11201504033T. pp. 1-9.

Liu, Y.H. et al., Tunable water-based lubrication behavior of alkyl- and fluoroalkyl-silanes, Chinese Science Bulletin, May 31, 2012, vol. 57, No. 15, pp. 1879-1885. doi: 10.1007/s11434-012-5106-2.

Cichomski, M. et al., Investigation of the structure of fluoroalkylsilanes deposited on alumina surface, Applied Surface Science, Jun. 18, 2012, vol. 258, No. 24, pp. 9849-9855.

Kimble Chase, 2008-2009 Catalog (International Edition), p.p. 26-60.

Non-Final Office Action dated Aug. 23, 2016 for U.S. Appl. No. 14/075,630, filed Nov. 8, 2013. pp. 1-11.

Non-Final Office Action dated Sep. 28, 2016 for U.S. Appl. No. 14/075,620, filed Nov. 8, 2013. pp. 1-28.

Non-Final Office Action dated Sep. 27, 2016 for U.S. Appl. No. 14/812,902, filed Jul. 29, 2015. pp. 1-37.

Choi, et al., "Organic/Inorganic Imide Nanocomposites from Aminophenylsilsesquioxanes", American Chemical Society, (2003), Chem. Mater. 15, 3365-3375.

Non-Final Office Action dated Oct. 5, 2016, for U.S. Appl. No. 13/930,647, filed Jun. 28, 2013. pp. 1-30.

Chinese 3rd Office Action dated Oct. 13, 2017, for CN Patent Application No. 201380062422.5. pp. 1-16.

DuPont Teflon PFA TE-7224 Aqueous Fluoropolymers made with Echelon Dispersion Technology [online]. Dupont, 2006. Retrieved from the Internet: <URL: http://www2.dupont.com/Teflon_Industrial/en_US/assets/downloads/k15758.pdf>.

"Spectroscopic Ellipsometry Methods for Thin Absorbing Coatings", by Hilfiker et al. from Society of Vacuum Coaters 505/856-7188, pp. 511-516, 51st Annual Technical Conference Proceedings, Chicago, IL, Apr. 19-24, 2008.

(56) References Cited

OTHER PUBLICATIONS

"Thermal Stability of the Silica-Aminopropylsilane-Polyimide Interface", Linde, et al. Journal of Polymer Science, Polymer Chemistry Edition, vol. 22, 3043-3062, John Wiley & Sons, Inc. (1984).
Anderson, et al., "Polyimide-Substrate Bonding Studies Using γ-APS Coupling Agent", IEEE Transactions on Components, Hybrids, and Manufacturing Technology, vol. CHMT-9, No. 4, p. 364-369, Dec. 1986.
Benitez, et al., "SiOx-SiNx functional coatings by PECVD of organosilicon monomers other than silane", Annual Technical Conference Proceedings—Society of Vacuum Coaters (2002), 45th, 280-285; ISSN: 0731-1699.
Cho, et al. "Adhesion behavior of PDMS-containing polyimide to glass", Journal of Adhesion Science and Technology 12:3, pp. 253-269, Taylor & Francis (1998), DOI: 10.1163/156856198X00867.
Dow Corning, "A Guide to Silane Solutions: Fiberglass and Composites", Silicones Simplified [online]. Dow Corning Corporation, 2009. Retrieved from the Internet: <URL: https://www.xiameter.com/en/ExploreSilicones/Documents/95-728-01%20Fiberglass%20and%20Composites.pdf>.
Dow Corning, Resins and Intermediates Selection Guide; Paints & Inks Solutions, p. 1-8, 2010.
Ennis, et al., "Glass Vials for Small Volume Parenterals: Influence of drug and manufacturing process on glass delamination," Pharmaceutical Development and Technology, 6(3): p. 393-405, (2001).
Francen, et al., "Fluorochemical glass treatments", The Glass Industry (1965), 46(10), 594-7; 628-9; ISSN: 0017-1026.
G. L. Witucki, "A Silane Primer: Chemistry and Applications of Alkoxy Silanes", Journal of Coatings Technology, (vol. 65) pp. 57-60, Federation of Societies for Coatings Technology, Blue Bell, Pennsylvania (Jul. 1993).
Gelest, Inc., MSDS, Material Safety Data Sheet, Aminopropylsilsesquioxane Oligomer, 22-25%—WSA-9911 [online]. Gelest, Inc. Morrisville, PA, 2008. Retrieved from the Internet: <URL: http://shop.gelest.com/Product.aspx?catnum=WSA-9911&Index=0&TotalCount=1>.
Guadagnino, et al., "Delamination Propensity of Pharmaceutical Glass Containers by Accelerated Testing with Different Extraction Media," PDA Journal of Pharmaceutical Science and Technology, Mar. / Apr. 2012, vol. 66, No. 2,116-125. DOI: 10.5731/pdajpst.2012.00853.
Jiang, et al., "Novel Mechanism of Glass Delamination in Type 1A Borosilicate Vials Containing Frozen Protein Formulations", PDA Journal of Pharmaceutical Science and Technology, Jul. / Aug. 2013, vol. 67, No. 4, 323-335.
Jin, et al., "Preparation and characterization of poly(phthalazinone ether ketone)/SiO2 hybrid composite thin films with low friction coefficient", Journal of Sol-Gel Science and Technology, Springer Science+Business Media, LLC (2008), 46(2), 208-216; ISSN: 0928-0707.
Jin, et al., "Preparation and investigation of the tribological behavior of poly(phthalazinone ether ketone)/silica thin films", Chinese Journal of Materials Research. vol. 22, No. 1, pp. 26-30. Feb. 25, 2008. ISSN: 1005-3093. Published by: Chinese Academy of Sciences, No. 1, Beijing, China.
Metwalli et al., Journal of Colloid and Interface Science 298 (2006) 825-831.
Poe, et al., "Zero CTE polyimides for athermal optical membranes", Proceedings of SPIE, vol. 7061, Issue: Novel Optical Systems Design and Optimization XI, pp. 706114/1-706114/9, Journal, 2008, Publisher: Society of Photo-Optical Instrumentation Engineers, ISSN: 0277-786X.
Rupertus, V., "PDA Europe Thanks Universe of Pre-Filled Syringes: Two ways to minimize the delamination risk of glass containers," P&M-EU; PDA Letter, p. 42-23, Jan. 2012.
Schmid, et al., "Recommendations on Delamination Risk Mitigation & Prediction for Type I Pharmaceutical Containers Made of Tubing Glass", Nuova Ompi: Glass Division, p. 40-42, Frederick Furness Publishing (2012).
Schmid, et al., "Glass Delamination: Facts—Prevention—Recommendations", Stevanato Group Market Update, News Issue 5, May 2011, p. 1-4.
Schott North America, Inc., "Schott Type 1 plus: SiO2 coating resists delamination" [online], Schott North America, Inc., retrieved from the internet: <URL: http://www.us.schott.com/pharmaceutical_packaging/english/download/flyer_type_i_plus_us.pdf>.
Sloey, et al., "Determining the Delamination Propensity of Pharmaceutical Glass Vials Using a Direct Stress Method," PDA Journal of Pharmaceutical Science and Technology, Jan. / Feb. 2013, vol. 67, No. 1, 35-42. DOI: 10.5731/pdajpst.2013.00900.
Smay, G. L., "The characteristics of high-temperature resistant organic polymers and the feasibility of their use as glass coating materials", Journal of Materials Science, 20 (4), pp. 1494-1500, Chapman & Hall Ind. (1985), ISSN: 0022-2461.
Japanese 1st Office Action dated Sep. 26, 2017, for JP Patent Application No. 2015-545127. pp. 1-18.
Russian 1st Office Action and Search Report dated Oct. 25, 2017, for RU Patent Application No. 2015125706. pp. 1-12.
Kitaygorodsky I.I. et al., "Technology of Glass", The state publishing house of literature on construction, architecture and building materials, third edition, revised, Moscow, Russia, 1961.
Notice of Allowance dated Nov. 7, 2017, for U.S. Appl. No. 13/780,754. pp. 1-14.
Liu et al., "Influences of heating temperature on mechanical properties of polydimethylsiloxane", Sensors and Actuators A: Physical, 2009, vol. 151, p. 42-45.
Japanese 1st Office Action dated Oct. 24, 2017, for Japanese Patent Application No. 2015-545160. pp. 1-8.
Russian 1st Office Action and Search Report and English Translation dated Nov. 10, 2017 for RU Patent Application No. 2015125912. pp. 1-16.
Non-Final Office Action dated Nov. 13, 2017 for U.S. Appl. No. 15/656,634, filed Jul. 21, 2017. pp. 1-31.
Russian Decision of Grant dated Nov. 8, 2017, for RU Patent Application No. 2014138998. pp. 1-20.
Russian 1st Office Action and Search Report and English Translation dated Oct. 27, 2017, for RU Patent Application No. 2015125783. pp. 1-13.
English Translation of Taiwan 2nd Office Action & Search Report dated Dec. 4, 2017, for TW Patent Application No. 102143473. pp. 1-2.
Korean 1st Office Action and English Translation dated Dec. 14, 2017, for KR Patent Application No. 2015-7017413. pp. 1-10.
Final Office Action dated Jan. 24, 2018, for U.S. Appl. No. 14/075,620, filed Nov. 8, 2013. pp. 1-41.
Dean et al., "Pharmaceutical Packaging Technology", CRC Press. Nov. 2000. p. 149.
Russian 1st Office Action & Search Report and English Translation dated Oct. 27, 2017, for RU Patent Application No. 2015125913. pp. 1-13.
Japanese 1st Office Action dated Nov. 14, 2017, for JP Patent Application No. 2015-545129. pp. 1-8.
Non-Final Office Action dated Feb. 9, 2018, for U.S. Appl. No. 15/331,120, filed Oct. 21, 2016. pp. 1-26.
FIOLAX clear technical data sheet acquired from http://www.us.schott.com/d/tubing/7c1860b0-5313-4d48-a12f-fa1ac06bc4a9/schott-tubing-datasheet-fiolax-clear-english.pdf. Originally published online Feb. 2010. pp. 1-3.
Chinese 3rd Office Action and English Translation dated Apr. 25, 2018, for CN Patent Application No. 201380061171.9. pp. 1-21.
Japanese Final Office Action dated Jul. 24, 2018 for JP Patent Application No. 2015-545124. pp. 1-6.
Non-Final Office Action dated May 30, 2019, for U.S. Appl. No. 15/337,695, filed Oct. 28, 2016. pp. 1-13.
English Translation of Japanese 1st Office Action dated Mar. 6, 2019 for JP Patent Application No. 2018-006413. pp. 1-11.
English Translation of Japanese Decision on Rejection dated Nov. 14, 2018, for JP Patent Application No. 2015-545049. pp. 1-5.
English Translation of Japanese 2nd Office Action dated Jul. 24, 2018, for JP Patent Application No. 2015-545120. pp. 1-15.
Non-Final Office Action dated Feb. 6, 2019 for U.S. Appl. No. 15/280,101, filed Sep. 29, 2016. pp. 1-14.

(56) References Cited

OTHER PUBLICATIONS

English Translation of Japanese 1st Office Action dated Feb. 13, 2019 for JP Patent Application No. 2018-019178. pp. 1-5.
Final Office Action dated Mar. 12, 2021, for U.S. Appl. No. 15/337,695, filed Oct. 28, 2016. pp. 1-23.
Non-Final Office Action dated Jun. 8, 2021, for U.S. Appl. No. 15/280,101, filed Sep. 29, 2016. pp. 1-22.
Japanese 1st Office Action dated Jun. 30, 2021, for JP Patent Application No. 2020-82562. pp. 1-12.
Final Office Action, pertaining to U.S. Appl. No. 17/213,859, filed Mar. 26, 2021, 32 pgs.
Final Office Action, pertaining to U.S. Appl. No. 15/857,557, filed Dec. 28, 2017, 16 pgs.
Japanese Office Action dated Mar. 7, 2022, pertaining to JP Patent Application No. 2021-039178.
Extended European Search Report, pertaining to European Appl. No. 21191737.2, 12 pgs.
Canadian Exam Report, pertaining to Canadian Appl. No. 3061514, 3 pgs.
Taiwan Office Action dated Apr. 18, 2022, pertaining to TW Patent Application No. 110124379, 5 pgs.
European Extended Search Report dated May 10, 2022, pertaining to EP Patent Application No. 22153571.9, 6 pgs.
Japanese Office Action dated Jun. 15, 2022, pertaining to JP Patent Application No. 2017-512381, 9 pgs.
Mexican Office Action dated May 26, 2022, pertaining to MX Patent Application No. MX/a/2017/002898, 8 pgs.
Japanese Office Action dated Jun. 15, 2022, pertaining to JP Patent Application No. 2021-111266, 10 pgs.

\* cited by examiner

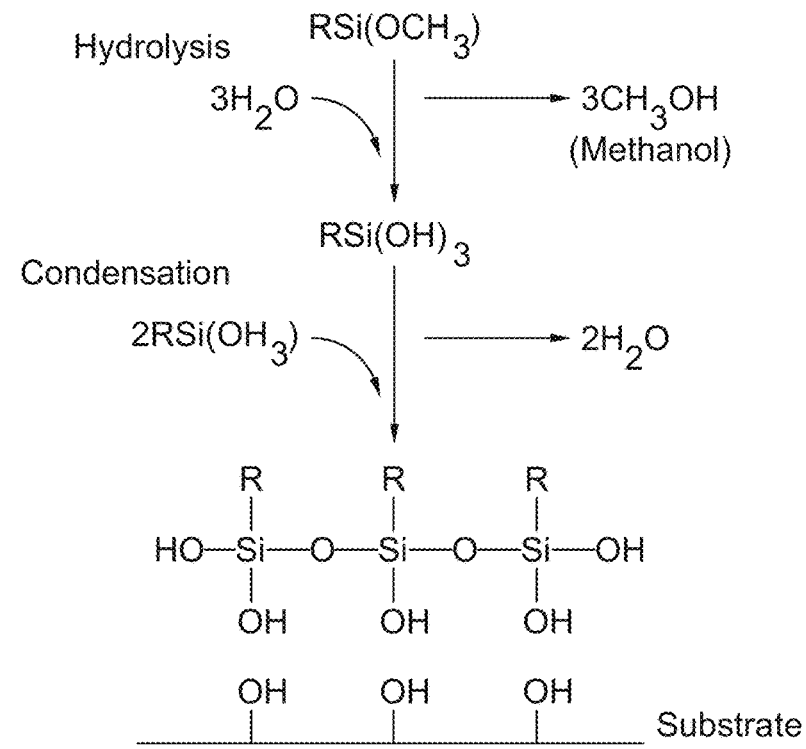
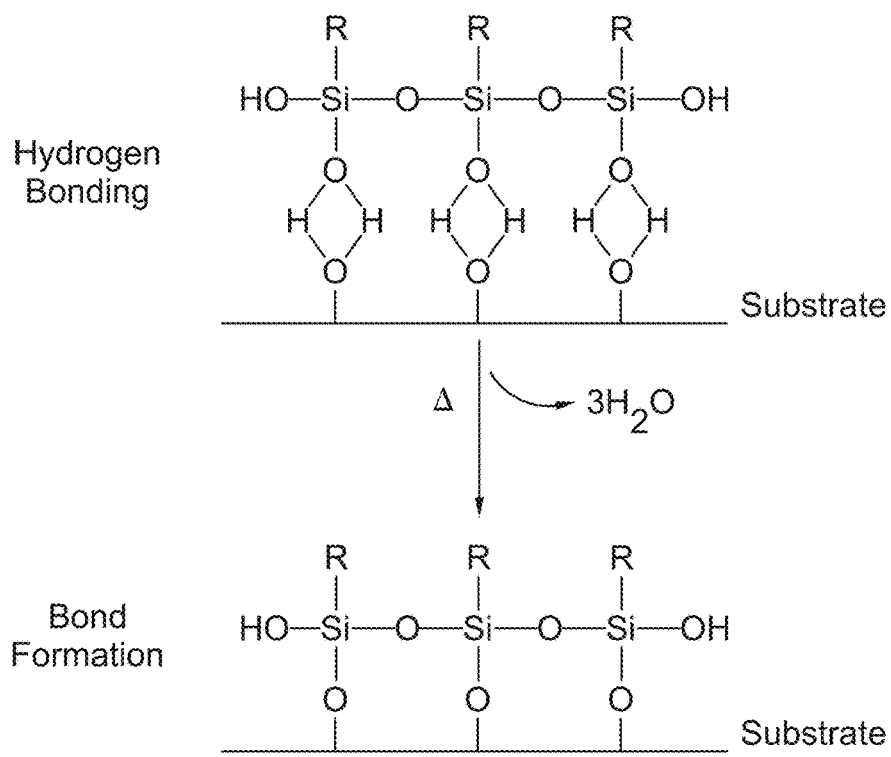
FIG. 17

3ON SCRATCH ON TWO VIAL TYPES

| SAMPLE TYPE | VIAL #'S | NORMAL LOAD (N) | | | COF | | |
|---|---|---|---|---|---|---|---|
| | | AVG | MIN | MAX | AVG | ST. DEV. | MAX |
| UNCOATED TYPE IB | 1&2 | 31 | 28 | 34 | 0.42 | 0.18 | 0.66 |
| | 3&4 | 31 | 29 | 36 | 0.45 | 0.18 | 0.7 |
| | 5&6 | 30 | 29 | 34 | 0.45 | 0.11 | 0.64 |
| | 7&8 | 29 | 26 | 32 | 0.33 | 0.14 | 0.54 |
| | 9&10 | 30 | 28 | 33 | 0.16 | 0.15 | 0.59 |
| | 11&12 | 28 | 25 | 33 | 0.16 | 0.09 | 0.6 |
| | 12&14 | 30 | 29 | 33 | 0.22 | 0.16 | 0.61 |
| | 15&16 | 31 | 28 | 35 | 0.53 | 0.11 | 0.71 |
| | AVERAGE | 30 | 28 | 34 | 0.38 | 0.14 | 0.63 |
| REF. COMP. IX@450 COATED 0.1/0.1 APS/NOV.800 | 1&2 | 30 | 28 | 31 | 0.12 | 0.04 | 0.34 |
| | 3&4 | 28 | 24 | 31 | 0.16 | 0.08 | 0.34 |
| | 5&6 | 40 | 30 | 44 | 0.08 | 0.02 | 0.19 |
| | 7&8 | 30 | 27 | 31 | 0.08 | 0.05 | 0.38 |
| | 9&10 | 30 | 28 | 30 | 0.08 | 0.03 | 0.22 |
| | 11&12 | 31 | 30 | 33 | 0.12 | 0.04 | 0.23 |
| | 12&14 | 30 | 29 | 32 | 0.15 | 0.07 | 0.41 |
| | 15&16 | 30 | 28 | 32 | 0.09 | 0.02 | 0.19 |
| | AVERAGE | 31 | 28 | 33 | 0.11 | 0.04 | 0.29 |

FIG. 20

| FORMULATION | RELATIVE THICKNESS | CONDITION |
|---|---|---|
| 0.1% APS/1.0% PMDA-ODA | 10 | AS IS |
| 0.1% APS/0.1% PMDA-ODA | 1 | AS IS |
| | | |
| 0.1 APS 0.5 DC806A | 5 | 1 H TUMBLE |
| 0.1 APS 0.1 DC806A | 1 | 1 H TUMBLE |
| 0.1 APS 0.1 PMDA-ODA | 1 | 1 H TUMBLE |
| 0.1 APS 0.5 PMDA-ODA | 5 | 1 H TUMBLE |
| 1.0% DC255 | 10 | 0.5 H TUMBLE |
| 1.0% DC255 | 10 | 1 H TUMBLE |
| 1.0% DC255 | 10 | 2 H TUMBLE |
| 1.0% DC255 | 10 | AS IS |
| 1.0% PMDA-ODA | 10 | DURHAM FILING LINE |
| 0.1 APS 0.1 NOVA800 | 1 | 6 MIN TUMBLE |
| 0.1 APS 0.1 NOVA800 | 1 | 15 MIN TUMBLE |
| 1.0 GAPS/1.0 DC806A | 10 | 6 MIN TUMBLE |
| 1.0 GAPS/1.0 DC806A | 10 | 15 MIN TUMBLE |
| 1.0 GAPS/1.0 DC806A | 10 | AS IS |
| 0.1 APS 0.1 NOVA800 | 1 | AS IS |
| TYPE 1B BARE | 0 | 30N (3), 50N (1) |
| 1.0 GAPS/1.0 DC806A | 10 | 30N SCRATCH 3 |
| 1.0 GAPS/1.0 DC806A | 10 | 50N_SCRATCH 1 |
| 0.1 APS 0.1 NOVA800 | 1 | 30N SCRATCH 3 |
| 0.1 APS 0.1 NOVA800 | 1 | 50N_SCRATCH 1 |

FIG. 24

BEFORE

| VIALS | Z-LOAD AVG | Z-LOAD MAX | COF AVG | COF ST. DEV. | COF MAX | FX MAX |
|---|---|---|---|---|---|---|
| 1&2 | 34 | 36 | 0.11 | 0.03 | 0.23 | 8 |
| 3&4 | 30 | 32 | 0.14 | 0.02 | 0.18 | 5 |
| 5&6 | 34 | 36 | 0.09 | 0.02 | 0.19 | 6 |
| 7&8 | 31 | 33 | 0.07 | 0.01 | 0.02 | 4 |
| 9&10 | 31 | 33 | 0.08 | 0.01 | 0.14 | 4 |

AFTER

3) APS/NOVA LYOPHILLIZED

| VIALS | Z-LOAD AVG | Z-LOAD MAX | COF AVG | COF ST. DEV. | COF MAX | FX MAX |
|---|---|---|---|---|---|---|
| 1&2 | 37 | 39 | 0.06 | 0.01 | 0.09 | 3 |
| 3&4 | 40 | 43 | 0.06 | 0.01 | 0.14 | 6 |
| 5&6 | 30 | 31 | 0.05 | 0.01 | 0.09 | 3 |
| 7&8 | 30 | 31 | 0.05 | 0.01 | 0.07 | 2 |
| 9&10 | 30 | 32 | 0.05 | 0.01 | 0.16 | 5 |

FIG. 31

| VIALS | Z-LOAD AVG | Z-LOAD MAX | COF AVG | COF ST. DEV. | COF MAX | FX MAX |
|---|---|---|---|---|---|---|
| 1&2 | 34 | 36 | 0.11 | 0.03 | 0.23 | 8 |
| 3&4 | 30 | 32 | 0.14 | 0.02 | 0.18 | 5 |
| 5&6 | 34 | 36 | 0.09 | 0.02 | 0.19 | 6 |
| 7&8 | 31 | 33 | 0.07 | 0.01 | 0.02 | 4 |
| 9&10 | 31 | 33 | 0.08 | 0.01 | 0.14 | 4 |

2) APS/NOVA AUTOCLAVED

| VIALS | Z-LOAD AVG | Z-LOAD MAX | COF AVG | COF ST. DEV. | COF MAX | FX MAX |
|---|---|---|---|---|---|---|
| 1&2 | 36 | 39 | 0.08 | 0.02 | 0.18 | 6 |
| 3&4 | 37 | 40 | 0.09 | 0.01 | 0.16 | 5 |
| 5&6 | 30 | 31 | 0.06 | 0.01 | 0.1 | 3 |
| 7&8 | 30 | 31 | 0.07 | 0.01 | 0.1 | 3 |
| 9&10 | 30 | 31 | 0.07 | 0.01 | 0.14 | 4 |

FIG. 32

| 12h DP Sample | Silanes ratio | Coating composition |
|---|---|---|
| 540 #1 | 1:1 | 0.5 GAP/0.5 Aminophenyltrimethoxysilane + 1.0% Nova |
| 540 #2 | 1:0.5 | 0.5 GAP/0.25 Aminophenyltrimethoxysilane + 1.0% Nova |
| 540 #3 | 1:0.2 | 0.5 GAP/0.1 Aminophenyltrimethoxysilane + 1.0% Nova |

| 540 Target Load | Vial Set | Fz (N) Avg | Fz (N) Max | COF Avg | COF Std. Dev. | COF Max | Fx (N) Max |
|---|---|---|---|---|---|---|---|
| 30 | 1 | 30 | 32 | 0.21 | 0.02 | 0.26 | 8 |
|  | 2 | 30 | 32 | 0.21 | 0.04 | 0.41 | 13 |
|  | 3 | 30 | 33 | 0.32 | 0.1 | 0.68 | 19 |
| 20 | 1 | 20 | 22 | 0.21 | 0.02 | 0.24 | 5 |
|  | 2 | 20 | 21 | 0.22 | 0.02 | 0.31 | 6 |
|  | 3 | 21 | 23 | 0.29 | 0.1 | 0.61 | 13 |

FIG. 35

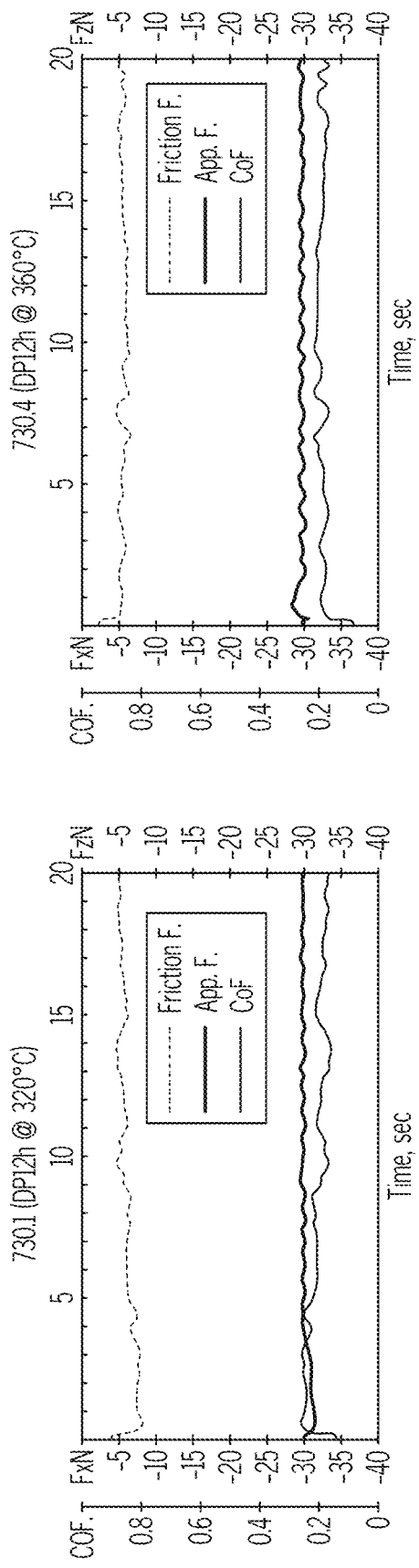
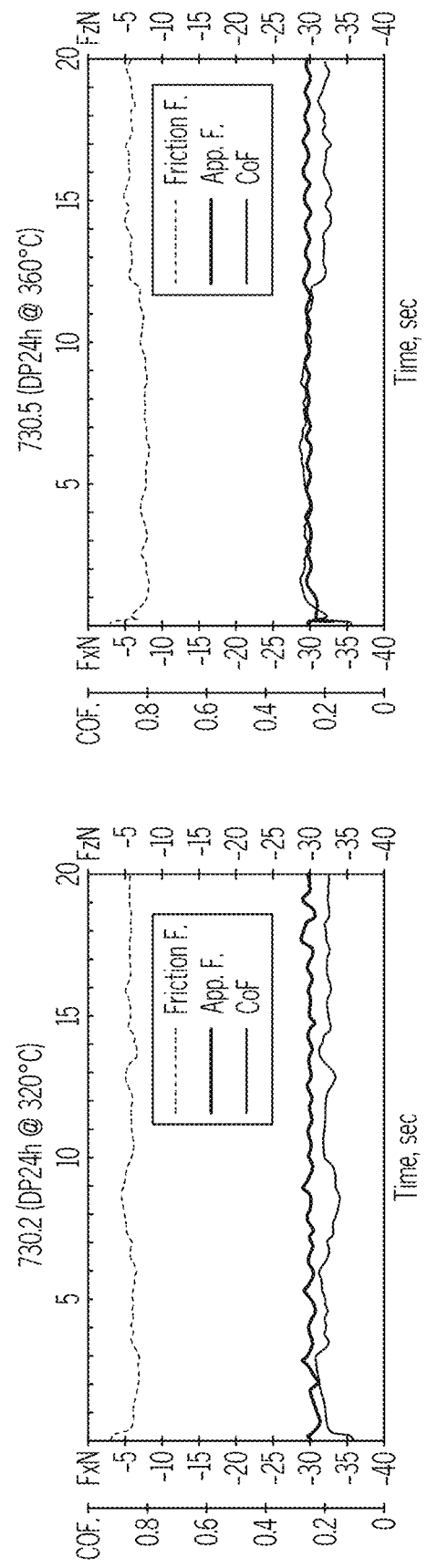
FIG. 40

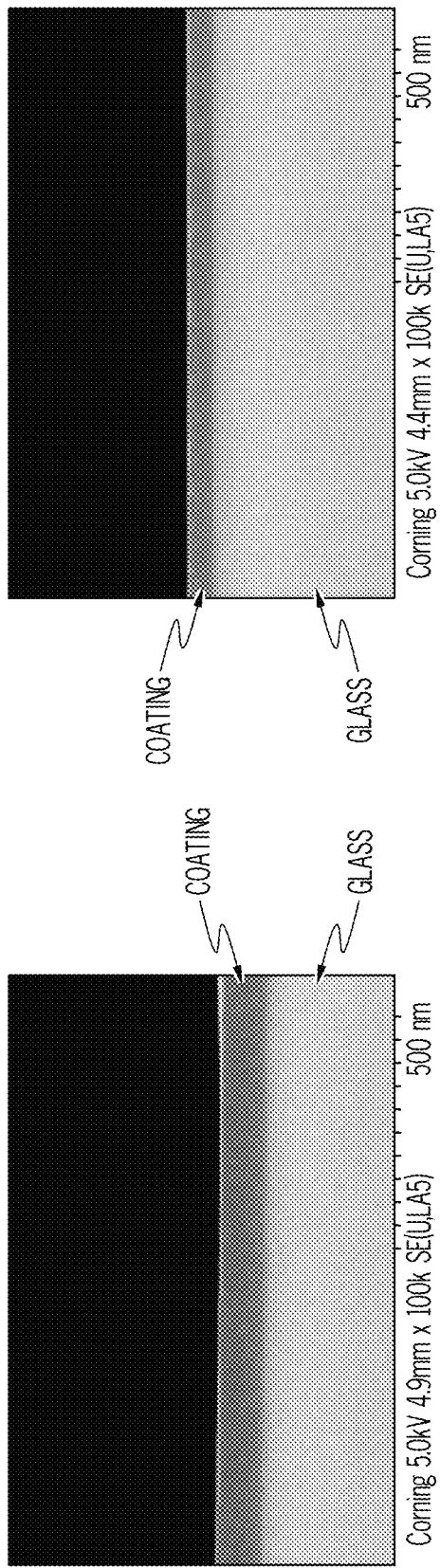
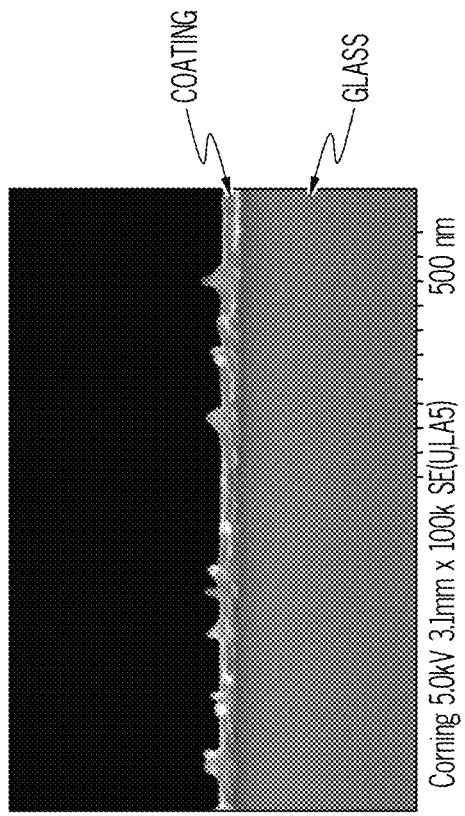
FIG. 46
FIG. 47
FIG. 45

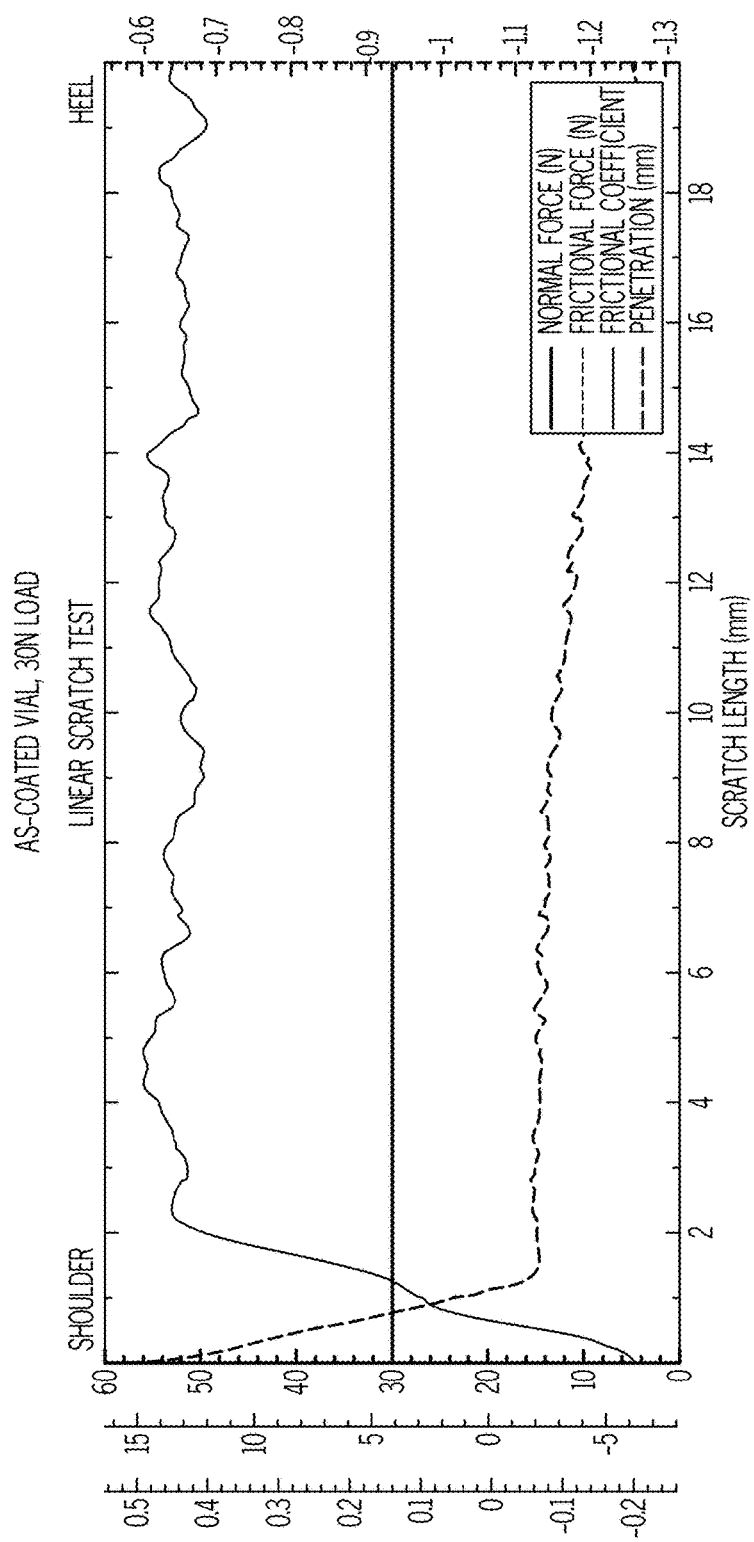
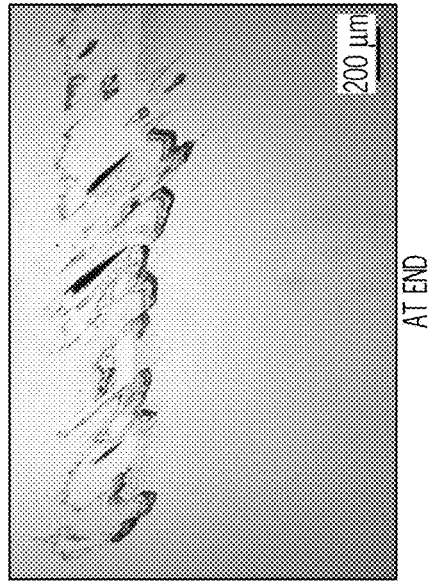
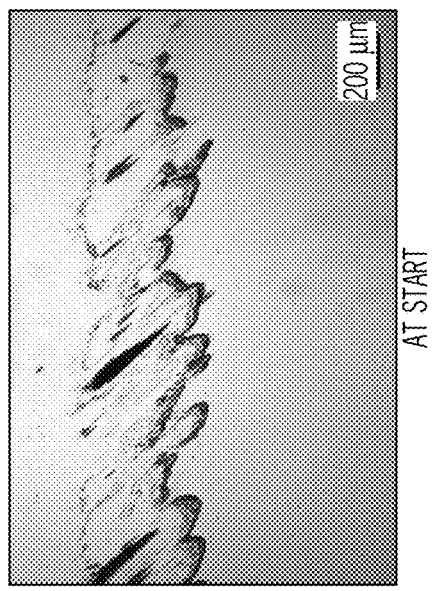
FIG. 53

GLASS CONTAINERS WITH DELAMINATION RESISTANCE AND IMPROVED DAMAGE TOLERANCE

CROSS REFERENCE TO RELATED APPLICATIONS

The present specification is a continuation of U.S. patent application Ser. No. 16/185,828 filed Nov. 9, 2018, entitled "Glass Containers with Delamination Resistance and Improved Damage Tolerance" which is a continuation of U.S. patent application Ser. No. 15/656,634 filed Jul. 21, 2017, (now U.S. Pat. No. 10,307,334) and entitled "Glass Containers with Delamination Resistance and Improved Damage Tolerance" which is itself a continuation of U.S. patent application Ser. No. 14/075,620 filed Nov. 8, 2013, (now U.S. Pat. No. 10,307,333) and entitled "Glass Containers with Delamination Resistance and Improved Damage Tolerance," and which claims priority to U.S. Provisional Patent Application Ser. No. 61/731,767 filed Nov. 30, 2012 and entitled "Glass Containers With Improved Attributes," each of which is incorporated by reference herein.

BACKGROUND

Field

The present specification generally relates to glass containers and, more specifically, to glass containers for use in storing pharmaceutical formulations.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as to not affect the stability of the pharmaceutical formulations contained therein. Glasses having suitable chemical durability include those glass compositions within the ASTM standard 'Type IA' and 'Type IB' glass compositions which have a proven history of chemical durability.

Although Type IA and Type IB glass compositions are commonly used in pharmaceutical packages, they do suffer from several deficiencies, including a tendency for the inner surfaces of the pharmaceutical package to shed glass particulates or "delaminate" following exposure to pharmaceutical solutions.

In addition, use of glass in pharmaceutical packaging may also be limited by the mechanical performance of the glass. Specifically, the high processing speeds utilized in the manufacture and filling of glass pharmaceutical packages may result in mechanical damage on the surface of the package, such as abrasions, as the packages come into contact with processing equipment, handling equipment, and/or other packages. This mechanical damage significantly decreases the strength of the glass pharmaceutical package resulting in an increased likelihood that cracks will develop in the glass, potentially compromising the sterility of the pharmaceutical contained in the package or causing the complete failure of the package.

Accordingly, a need exists for alternative glass containers for use as pharmaceutical packages which exhibit a combination of at least two of improved resistance to delamination, increased strength, and/or damage tolerance.

SUMMARY

According to a first embodiment, a glass container may include a body having an inner surface, an outer surface and a wall thickness extending between the outer surface and the inner surface. At least the inner surface of the body may have a delamination factor less than or equal to 10. A tenacious inorganic coating may be positioned around at least a portion of the outer surface of the body. The outer surface of the body with the tenacious inorganic coating may have a coefficient of friction less than or equal to 0.7.

In another embodiment, a glass container may include a body having an inner surface, an outer surface and a wall thickness extending between the outer surface and the inner surface. At least the inner surface of the body may have a delamination factor less than or equal to 10. A transient coating may be positioned around at least a portion of the outer surface of the body. The outer surface of the body with the transient coating may have a coefficient of friction less than or equal to 0.7.

In another embodiment, a glass container may include a body having an inner surface, an outer surface and a wall thickness extending between the outer surface and the inner surface. At least the inner surface of the body has a delamination factor less than or equal to 10. A tenacious organic coating may be positioned around at least a portion of the outer surface of the body. The outer surface of the body with the tenacious organic coating may have a coefficient of friction less than or equal to 0.7.

In another embodiment, a glass container may include a body having an inner surface, an outer surface and a wall thickness extending between the outer surface and the inner surface. The body may be formed from a Type I, Class B glass according to ASTM Standard E438-92. A barrier coating may be positioned on the inner surface of the body such that a composition contained in the glass container does not contact the inner surface of the body. A lubricous coating may be positioned around at least a portion of the outer surface of the body. The outer surface of the body with the lubricous coating may have a coefficient of friction less than or equal to 0.7.

In another embodiment, a glass container may include a body having an inner surface, an outer surface and a wall thickness extending from the outer surface to the inner surface. The body may have a hydrolytic resistance of at least HGB2 or better according to the ISO 719 standard. The body may be formed from a glass composition which is free from constituent components which form species that volatilize significantly at temperatures corresponding to a viscosity in a range from about 200 poise to about 100 kilopoise. A lubricous coating may be positioned around at least a portion of the outer surface of the body. The outer surface of the body with the lubricous coating may have a coefficient of friction less than or equal to 0.7.

In another embodiment, a glass container may include a body having an inner surface, an outer surface and a wall thickness extending between the outer surface and the inner surface. The body may be formed from a Type I, Class B glass according to ASTM Standard E438-92. The body may be formed under processing conditions which mitigate the vaporization of volatile species in the glass composition. A lubricous coating may be positioned around at least a portion of the outer surface of the body. The outer surface of the body with the lubricous coating may have a coefficient of friction less than or equal to 0.7.

Additional features and advantages of the embodiments of the glass containers described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 17 schematically depicts the reaction steps of a silane bonding to a substrate, according to one or more embodiments shown and described herein;

FIG. 20 contains a Table reporting the load and measured coefficient of friction for Type IB glass vials and vials formed from a Reference Glass Composition that were ion exchanged and coated, according to one or more embodiments shown and described herein;

FIG. 24 is a Table reporting different lubricous coating compositions which were tested under lyophilization conditions, according to one or more embodiments shown and described herein;

FIG. 31 graphically depicts the coefficient of friction for APS/Novastrat® 800 coated vials before and after lyophilization, according to one or more embodiments shown and described herein;

FIG. 32 graphically depicts the coefficient of friction for APS/Novastrat® 800 coated vials before and after autoclaving, according to one or more embodiments shown and described herein;

FIG. 35 is a Table illustrating the change in the coefficient of friction with variations in the composition of the coupling agent of a lubricous coating applied to a glass container as described herein;

FIG. 40 graphically depicts the coefficient of friction, applied force and frictive force for coated glass containers for different depyrogenation conditions;

FIG. 45 is a micrograph of a coating, according to one or more embodiments shown and described herein;

FIG. 46 is a micrograph of a coating, according to one or more embodiments shown and described herein;

FIG. 47 is a micrograph of a coating, according to one or more embodiments shown and described herein;

FIG. 53 graphically depicts the coefficient of friction, scratch penetration, applied normal force, and frictional force (y-ordinates) as a function of the length of the applied scratch (x-ordinate) for vials with an adhesion promoter layer in as-coated condition;

DETAILED DESCRIPTION

Figure 1:
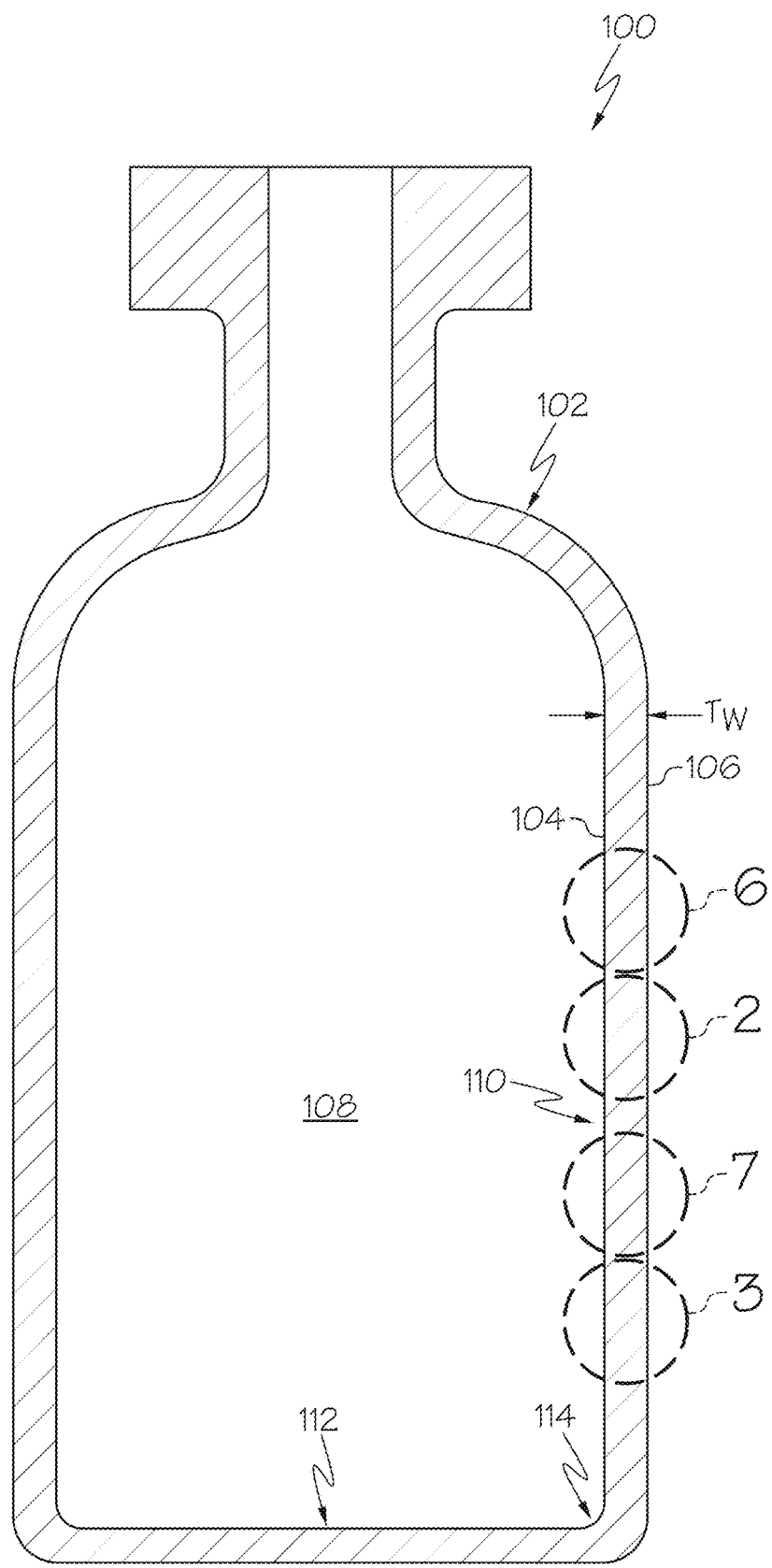
FIG. 1 schematically depicts a cross section of a glass container according to one or more embodiments described herein.

Reference will now be made in detail to embodiments of glass containers, examples of which are illustrated in the accompanying drawings. Whenever possible, the same reference numerals will be used throughout the drawings to refer to the same or like parts. The glass containers described herein have at least two performance attributes selected from resistance to delamination, improved strength, and increased damage resistance. For example, the glass containers may have a combination of resistance to delamination and improved strength; improved strength and increased damage resistance; or resistance to delamination and increased damage resistance. In one particular embodiment, a glass container may include a body having an inner surface, an outer surface and a wall thickness extending between the outer surface and the inner surface. At least the inner surface of the body may have a delamination factor less than or equal to 10. A tenacious inorganic coating may be positioned around at least a portion of the outer surface of the body. The outer surface of the body with the tenacious inorganic coating may have a coefficient of friction less than or equal to 0.7. Glass containers with various combinations of resistance to delamination, improved strength, and increased damage resistance will be described in more detail herein with specific reference to the appended drawings.

In the embodiments of the glass compositions described herein, the concentration of constituent components (e.g., $SiO_2$, $Al_2O_3$, $B_2O_3$ and the like) are specified in mole percent (mol. %) on an oxide basis, unless otherwise specified.

The term "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.1 mol. %.

The term "chemical durability," as used herein, refers to the ability of the glass composition to resist degradation upon exposure to specified chemical conditions. Specifically, the chemical durability of the glass compositions described herein may be assessed according to three established material testing standards: DIN 12116 dated March 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; ISO 720:1985 entitled "Glass—Hydrolytic resistance of glass grains at 121 degrees C. —Method of test and classification"; and ISO 719:1985 "Glass—Hydrolytic resistance of glass grains at 98 degrees C. —Method of test and classification." Each standard and the classifications within each standard are described in further detail herein. Alternatively, the chemical durability of a glass composition may be assessed according to USP <660> entitled "Surface Glass Test," and or European Pharmacopeia 3.2.1 entitled "Glass Containers For Pharmaceutical Use" which assess the durability of the surface of the glass.

The term "strain point" and "$T_{strain}$" as used herein, refer to the temperature at which the viscosity of the glass is $3 \times 10^{14}$ poise.

The term "softening point," as used herein, refers to the temperature at which the viscosity of the glass composition is $1 \times 10^{7.6}$ poise.

Conventional glass containers used for storing pharmaceuticals and/or other consumable products may experience damage during filling, packaging, and/or shipping. Such damage may be in the form of surface scuffs, abrasions and/or scratches which, when sufficiently deep, may result in a through crack or even complete failure of the glass container, thereby compromising the contents of the glass package.

In addition, some conventional glass containers may be susceptible to delamination, particularly when the glass container is formed from alkali borosilicate glasses. Delamination refers to a phenomenon in which glass particles are released from the surface of the glass following a series of leaching, corrosion, and/or weathering reactions. In general, the glass particles are silica-rich flakes of glass which originate from the inner surface of the package as a result of the leaching of modifier ions into a solution contained within the package. These flakes may generally be from about 1 nm to about 2 microns (µm) thick with a width greater than about 50 µm. As these flakes are primarily composed of silica, the flakes generally do not further degrade after being released from the surface of the glass.

It has heretofore been hypothesized that delamination is due to phase separation which occurs in alkali borosilicate glasses when the glass is exposed to the elevated temperatures used for reforming the glass into a container shape.

However, it is now believed that the delamination of the silica-rich glass flakes from the inner surfaces of the glass containers is due to the compositional characteristics of the glass container immediately following formation. Specifically, the high silica content of alkali borosilicate glasses causes the glass to have relatively high melting and forming temperatures. However, the alkali and borate components in the glass composition melt and/or vaporize at much lower temperatures. In particular, the borate species in the glass are highly volatile and evaporate from the surface of the glass at the high temperatures necessary to form and reform the glass.

Specifically, glass stock is reformed into glass containers at high temperatures and in direct flames. The high temperatures needed at higher equipment speeds cause the more volatile borate species to evaporate from portions of the surface of the glass. When this evaporation occurs within the interior volume of the glass container, the volatilized borate species are re-deposited in other areas of the glass container surface causing compositional heterogeneities in the glass container surface, particularly with respect to the near-surface regions of the interior of the glass container (i.e., those regions at or directly adjacent to the inner surfaces of the glass container). For example, as one end of a glass tube is closed to form the bottom or floor of the container, borate species may evaporate from the bottom portion of the tube and be re-deposited elsewhere in the tube. The evaporation of material from the heel and floor portions of the container is particularly pronounced as these areas of the container undergo the most extensive re-formation and, as such, are exposed to the highest temperatures. As a result, the areas of the container exposed to higher temperatures may have silica-rich surfaces. Other areas of the container which are amenable to boron deposition may have a boron-rich layer at the surface. Areas amenable to boron deposition which are at a temperature greater than the anneal point of the glass composition but less than the hottest temperature the glass is subjected to during reformation can lead to boron incorporation on the surface of the glass. Solutions contained in the container may leach the boron from the boron-rich layer. As the boron-rich layer is leached from the glass, a high silica glass network (gel) remains which swells and strains during hydration and eventually spalls from the surface.

The glass containers described herein mitigate at least two of the aforementioned problems. Specifically, the glass containers have at least two performance attributes selected from resistance to delamination, improved strength, and increased damage resistance. For example, the glass containers may have a combination of resistance to delamination and improved strength; improved strength and increased damage resistance; or resistance to delamination and increased damage resistance. Each performance attribute and methods for achieving the performance attribute will be described in further detail herein.

Figure 2:
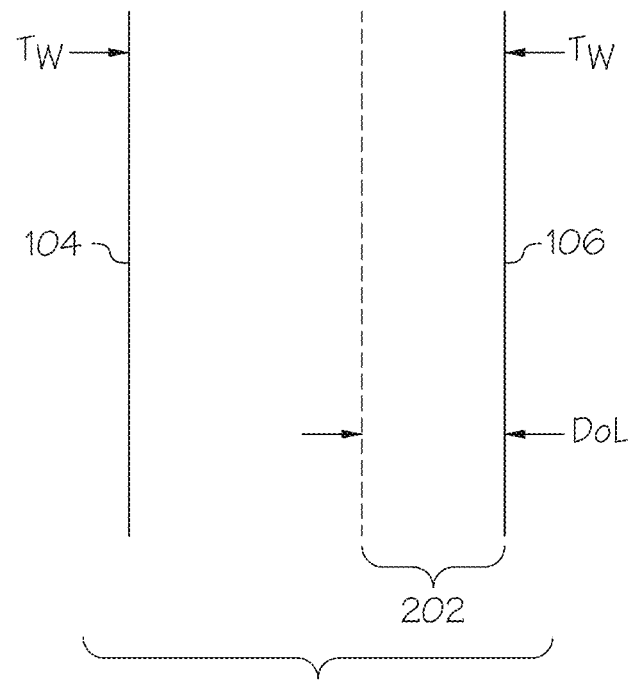
FIG. 2 schematically depicts a compressively stressed layer in a portion of the sidewall of the glass container of FIG. 1.

Referring now to FIGS. 1 and 2, one embodiment of a glass container 100 for storing a pharmaceutical formulation is schematically depicted in cross section. The glass container 100 generally comprises a body 102. The body 102 extends between an inner surface 104 and an outer surface 106 and generally encloses an interior volume 108. In the embodiment of the glass container 100 shown in FIG. 1, the body 102 generally comprises a wall portion 110 and a floor portion 112. The wall portion 110 transitions into the floor portion 112 through a heel portion 114. The body 102 has a wall thickness $T_W$ which extends between the inner surface 104 to the outer surface 106, as depicted in FIG. 1.

While the glass container 100 is depicted in FIG. 1 as having a specific shape form (i.e., a vial), it should be understood that the glass container 100 may have other shape forms, including, without limitation, Vacutainers®, cartridges, syringes, ampoules, bottles, flasks, phials, tubes, beakers, or the like. Further, it should be understood that the glass containers described herein may be used for a variety of applications including, without limitation, as pharmaceutical packages, beverage containers, or the like.

Strength

Still referring to FIGS. 1 and 2, in some embodiments described herein, the body 102 includes a compressively stressed layer 202 extending from at least the outer surface 106 of the body 102 into the wall thickness $T_W$ to a depth of layer DOL from the outer surface 106 of the body 102. The compressively stressed layer 202 generally increases the strength of the glass container 100 and also improves the damage tolerance of the glass container. Specifically, a glass container having a compressively stressed layer 202 is generally able to withstand a greater degree of surface damage, such as scratches, chips, or the like, without failure compared to a non-strengthened glass container as the compressively stressed layer 202 mitigates the propagation of cracks from surface damage in the compressively stressed layer 202.

In the embodiments described herein the depth of layer of the compressively stressed layer may be greater than or equal to about 3 μm. In some embodiments, the depth of layer may be greater than 10 μm or even greater than 20 μm. In some embodiments, the depth of layer may be greater than or equal to about 25 μm or even greater than or equal to about 30 μm. For example, in some embodiments, the depth of layer may be greater than or equal to about 25 μm and up to about 150 μm. In some other embodiments, the depth of layer may be greater than or equal to about 30 μm and less than or equal to about 150 μm. In yet other embodiments, the depth of layer may be greater than or equal to about 30 μm and less than or equal to about 80 μm. In some other embodiments, the depth of layer may be greater than or equal to about 35 μm and less than or equal to about 50 μm.

The compressively stressed layer 202 generally has a surface compressive stress (i.e., a compressive stress as measured at the outer surface 106) of greater than or equal to 150 MPa. In some embodiments, the surface compressive stress may be greater than or equal to 200 MPa, or even greater than or equal to 250 MPa. In some embodiments, the surface compressive stress may be greater than or equal to 300 MPa, or even greater than or equal to 350 MPa. For example, in some embodiments, the surface compressive stress may be greater than or equal to about 300 MPa and less than or equal to about 750 MPa. In some other embodiments, the surface compressive stress may be greater than or equal to about 400 MPa and less than or equal to about 700 MPa. In still other embodiments, the surface compressive stress may be greater than or equal to about 500 MPa and less than or equal to about 650 MPa. The stress in ion-exchanged glass articles can be measured with an FSM (Fundamental Stress Meter) instrument. This instrument couples light into and out of the birefringent glass surface. The measured birefringence is then related to stress through a material constant, the stress-optic or photoelastic coefficient (SOC or PEC). Two parameters are obtained: the maximum surface compressive stress (CS) and the exchange depth of layer (DOL). Alternatively, the compressive stress and depth of layer may be measured using refractive near field stress measurement techniques.

While the compressively stressed layer 202 has been shown and described herein as extending from the outer surface 106 into the thickness $T_W$ of the body 102, it should be understood that, in some embodiments, the body 102 may further comprise a second compressively stressed layer which extends from the inner surface 104 into the thickness $T_W$ of the body 102. In this embodiment, the depth of layer and surface compressive stress of the second compressively stressed layer may mirror those of the compressively stressed layer 202 about the centerline of the thickness $T_W$ of the body 102.

Several different techniques may be utilized to form the compressively stressed layer 202 in the body 102 of the glass container 100. For example, in embodiments where the body 102 is formed from ion exchangeable glass, the compressively stressed layer 202 may be formed in the body 102 by ion exchange. In these embodiments, the compressively stressed layer 202 is formed by placing the glass container in a bath of molten salt to facilitate the exchange of relatively large ions in the molten salt for relatively smaller ions in the glass. Several different exchange reactions may be utilized to achieve the compressively stressed layer 202. In one embodiment, the bath may contain molten $KNO_3$ salt while the glass from which the glass container 100 is formed contains lithium and/or sodium ions. In this embodiment, the potassium ions in the bath are exchanged for the relatively smaller lithium and/or sodium ions in the glass, thereby forming the compressively stressed layer 202. In another embodiment, the bath may contain $NaNO_3$ salt and the glass from which the glass container 100 is formed contains lithium ions. In this embodiment, the sodium ions in the bath are exchanged for the relatively smaller lithium ions in the glass, thereby forming the compressively stressed layer 202.

In one specific embodiment, the compressively stressed layer 202 may be formed by submerging the glass container in a molten salt bath of 100% $KNO_3$ or, in the alternative, a mixture of $KNO_3$ and $NaNO_3$. For example, in one embodiment the molten salt bath may include $KNO_3$ with up to about 10% $NaNO_3$. In this embodiment, the glass from which the container is formed may include sodium ions and/or lithium ions. The temperature of the molten salt bath may be greater than or equal to 350° C. and less than or equal to 500° C. In some embodiments, the temperature of the molten salt bath may be greater than or equal to 400° C. and less than or equal to 500° C. In still other embodiments, the temperature of the molten salt bath may be greater than or equal to 450° C. and less than or equal to 475° C. The glass container may be held in the molten salt bath for a time period sufficient to facilitate the exchange of the relatively large ions in the salt bath with relatively smaller ions in the glass and thereby achieve the desired surface compressive stress and depth of layer. For example, the glass may be held in the molten salt bath for a period of time which is greater than or equal to 0.05 hours to less than or equal to about 20 hours in order to achieve the desired depth of layer and surface compressive stress. In some embodiments the glass container may be held in the molten salt bath for greater than or equal to 4 hours and less than or equal to about 12 hours. In other embodiments, the glass container may be held in the molten salt bath for greater than or equal to about 5 hours and less than or equal to about 8 hours. In one exemplary embodiment, the glass container may be ion exchanged in a molten salt bath which comprises 100% $KNO_3$ at a temperature greater than or equal to about 400° C. and less than or equal to about 500° C. for a time period greater than or equal to about 5 hours and less than or equal to about 8 hours.

Typically, the ion exchange process is performed at temperatures more than 150° C. below the strain point ($T_{strain}$) of the glass in order to minimize stress relaxation due to elevated temperatures. However, in some embodiments, the compressively stressed layer 202 is formed in a molten salt bath which is at temperature greater than the strain point of the glass. This type of ion exchange strengthening is referred to herein as "high temperature ion-exchange strengthening." In high temperature ion-exchange strengthening, relatively smaller ions in the glass are exchanged with relatively larger ions from the molten salt bath, as described above. As the relatively smaller ions are exchanged for relatively larger ions at temperatures above the strain point, the resultant stress is released or "relaxed". However, the replacement of smaller ions in the glass with larger ions creates a surface layer in the glass which has a lower coefficient of thermal expansion (CTE) than the remainder of the glass. As the glass cools, the CTE differential between the surface of the glass and the remainder of the glass creates the compressively stressed layer 202. This high temperature ion-exchange technique is particularly well suited to strengthening glass articles, such as glass containers, which have complex geometries and typically reduces the strengthening process time relative to typical ion exchange processes and also enables a greater depth of layer.

Still referring to FIGS. 1 and 2, in an alternative embodiment, the compressively stressed layer 202 may be introduced into the body 102 of the glass container 100 by thermal tempering. Compressively stressed layers are formed through thermal tempering by heating the glass container and differentially cooling the surface of the glass relative to the bulk of the glass. Specifically, a glass which is rapidly cooled has a greater molar volume (or lower density) than a more slowly cooled glass. Accordingly, if the surface of the glass is intentionally rapidly cooled, the surface of the glass will have a larger volume and the interior of the glass (i.e., the remainder of the glass below the outer surface) will necessarily cool at a slower rate as the heat must escape from the bulk through the surface. By creating a continuous gradient in molar volume (or thermal history/density) from the outer surface 106 into the wall thickness $T_W$ of the body 102, a compressively stressed layer 202 is produced which has a parabolic stress profile (i.e., the compressive stress decreases parabolically with increasing distance from the outer surface 106 of the body 102). Thermal tempering processes are generally faster and less expensive than ion-exchange processes. However, the surface compressive stresses due to thermal tempering processes are generally lower than the surface compressive stresses due to ion-exchange processes. In embodiments where the glass container is thermally tempered, the resultant compressively stressed layer extends from the outer surface 106 to a depth of layer DOL which is up to 22% of the wall thickness $T_W$ of the glass containers. For example, in some embodiments, the DOL may be from about 5% to about 22% of the wall thickness $T_W$ or even from about 10% to about 22% of the wall thickness $T_W$.

In a typical thermal tempering process, the glass container 100 is first heated to its softening point and, thereafter, the outer surface 106 of the body 102 is rapidly cooled to below the softening point with a fluid, such as with a gas jet or the like, to create a temperature differential between the outer surface 106 of the body 102 and the remainder of the body 102, as described above. The temperature differential between the outer surface 106 and the remainder of the body produces a compressively stressed layer 202 extending into the wall thickness $T_W$ of the body 102 from the outer surface 106. For example, the glass may be initially heated to 50-150° C. above its softening point and thereafter rapidly cooled to room temperature by directing a fluid onto the glass. The fluid may include, without limitation, air, oil, or oil-based fluids.

Figure 3:
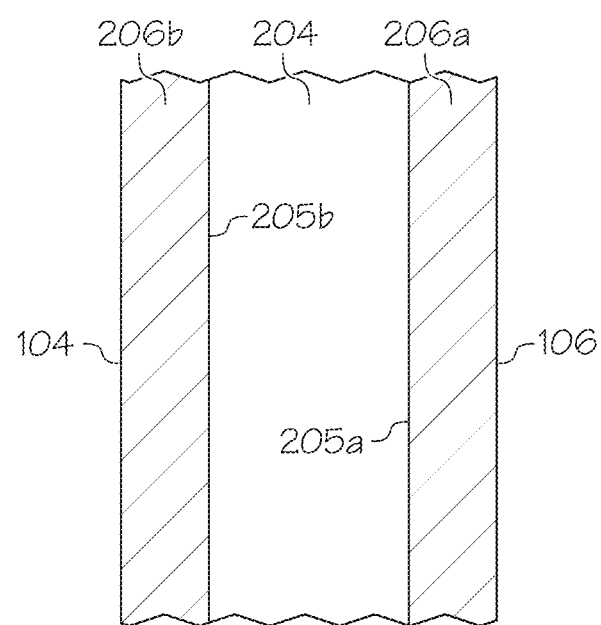
FIG. 3 schematically depicts a portion of the sidewall of the glass container formed from laminated glass.

Referring now to FIGS. 1-3, in another embodiment, the glass container 100 may be formed from laminated glass tubing which facilitates the formation of a compressively stressed layer 202 in at least the outer surface 106 of the body 102. The laminated glass generally comprises a glass core layer 204 and at least one glass cladding layer 206a. In the embodiment of the glass container 100 depicted in FIG. 3, the laminated glass includes a pair of glass cladding layers 206a, 206b. In this embodiment, the glass core layer 204 generally comprises a first surface 205a and a second surface 205b which is opposed to the first surface 205a. A first glass cladding layer 206a is fused to the first surface 205a of the glass core layer 204 and a second glass cladding layer 206b is fused to the second surface 205b of the glass core layer 204. The glass cladding layers 206a, 206b are fused to the glass core layer 204 without any additional materials, such as adhesives, coating layers or the like, disposed between the glass core layer 204 and the glass cladding layers 206a, 206b.

In the embodiment shown in FIG. 3, the glass core layer 204 is formed from a first glass composition having an average core coefficient of thermal expansion $CTE_{core}$ and the glass cladding layers 206a, 206b are formed from a second, different glass composition which has an average coefficient of thermal expansion $CTE_{clad}$. In the embodiments described herein, $CTE_{core}$ is not equal to $CTE_{clad}$ such that a compressive stress layer is present in at least one of the core layer or the cladding layer. In some embodiments, $CTE_{core}$ is greater than $CTE_{clad}$ which results in the glass cladding layers 206a, 206b being compressively stressed without being ion exchanged or thermally tempered. In some other embodiments, such as when the laminate glass comprises a single core layer and a single cladding layer, $CTE_{clad}$ may be greater than $CTE_{core}$ which results in the glass core layer being compressively stressed without being ion exchanged or thermally tempered.

The laminated glass tubing from which the glass container is formed may be formed as described in U.S. Pat. No. 4,023,953, which is incorporated herein by reference. In embodiments, the glass forming the glass core layer 204 is formed from a glass composition which has an average coefficient of thermal expansion $CTE_{core}$ that is greater than the average coefficient of thermal expansion $CTE_{clad}$ of either of the glass cladding layers 206a, 206b. As the glass core layer 204 and the glass cladding layers 206a, 206b cool, the difference in the average coefficients of thermal expansion of the glass core layer 204 and the glass cladding layers 206a, 206b cause a compressively stressed layer to develop in the glass cladding layers 206a, 206b. When the laminated glass is used to form a container, these compressively stressed layers extend from the outer surface 106 of the glass container 100 into the wall thickness $T_W$ and form the inner surface 104 of the glass container into the wall thickness $T_W$. In some embodiments, the compressively stressed layer may extend from the outer surface of the body of the glass container into the wall thickness $T_W$ to a depth of layer which is from about 1 µm to about 90% of the wall thickness $T_W$. In some other embodiments, the compressively stressed layer may extend from the outer surface of the body of the glass container into the wall thickness $T_W$ to a depth of layer which is from about 1 μm to about 33% of the wall thickness $T_W$. In still other embodiments, the compressively stressed layer may extend from the outer surface of the body of the glass container into the wall thickness $T_W$ to a depth of layer which is from about 1 μm to about 10% of the wall thickness $T_W$.

After the laminated tube is formed, the tube may be formed into a container shape using conventional tube conversion techniques.

In some embodiments where the glass container is formed from laminated glass, the at least one cladding layer forms the inner surface of the body of the glass container such that the at least one glass cladding layer is in direct contact with product stored in the glass container. In these embodiments, the at least one cladding layer may be formed from a glass composition which is resistant to delamination, as described in further detail herein. Accordingly, it should be understood that the at least one cladding layer may have a delamination factor of less than or equal to 10, as described in further detail herein.

In another alternative embodiment, the glass container may be strengthened by applying a coating to the glass body. For example, a coating of an inorganic material, such as titania, may be applied to at least a portion of the outer surface of the glass body either by soot deposition or by vapor deposition processes. The titania coating has a lower coefficient of thermal expansion than the glass it is being deposited on. As the coating and the glass cool, the titania shrinks less than the glass and, as a result, the surface of the glass body is in tension. In these embodiments, it should be understood that the surface compressive stress and depth of layer are measured from the surface of the coating rather than the surface of the coated glass body. While the inorganic coating material has been described herein as comprising titania, it should be understood that other inorganic coating materials with suitably low coefficients of thermal expansion are also contemplated. In embodiments, the inorganic coating may have a coefficient of friction of less than 0.7 relative to a like coated container. The inorganic coating may also be thermally stable at temperatures greater than or equal to 250° C., as described further herein.

In another alternative embodiment, the glass body can be strengthened by the glass body with a high modulus coating having a coefficient of thermal expansion equal to or greater than the underlying glass body. Strengthening is achieved by the difference in elastic modulus imparting damage resistance while the difference in thermal expansion imparts a compressive stress in the glass surface (balancing tension in the high modulus coating). In these embodiments, it should be understood that the surface compressive stress and depth of layer are measured from the surface of the glass body rather than the surface of the coated glass body. The high modulus makes it difficult for scratches and damage to be introduced and the underlying compressive layer prevents scratches and flaws from propagating. An exemplary material pairing to demonstrate this effect is a sapphire coating on 33 expansion borosilicate glass or a zirconium oxide coating deposited on 51 expansion borosilicate glass.

Based on the foregoing, it should be understood that, in some embodiments, the glass containers may include a compressively stressed layer which extends from at least the outer surface of the body into the wall thickness of the glass container. The compressively stressed layer improves the mechanical strength of the glass container relative to a glass container which does not include a compressively stressed layer. The compressively stressed layer also improves the damage tolerance of the glass container such that the glass container is able to withstand greater surface damage (i.e., scratches, chips, etc., which extend deeper into the wall thickness of the glass container) without failure relative to a glass container which does not include a compressively stressed layer. Further, it should also be understood that, in these embodiments, the compressively stressed layer may be formed in the glass container by ion exchange, by thermal tempering, by forming the glass container from laminated glass, or by applying a coating to the glass body. In some embodiments, the compressively stressed layer may be formed by a combination of these techniques.

Delamination Resistance

In some embodiments, the glass containers 100 may also resist delamination following long term exposure to certain chemical compositions stored in the container. As noted above, delamination may result in the release of silica-rich glass flakes into a solution contained within the glass container after extended exposure to the solution. Accordingly, the resistance to delamination may be characterized by the number of glass particulates present in a solution contained within the glass container after exposure to the solution under specific conditions. In order to assess the long-term resistance of the glass container to delamination, an accelerated delamination test is utilized. The test may be performed on both ion-exchanged and non-ion-exchanged glass containers. The test consists of washing the glass container at room temperature for 1 minute and depyrogenating the container at about 320° C. for 1 hour. Thereafter a solution of 20 mM glycine with a pH of 10 in water is placed in the glass container to 80-90% fill, the glass container is closed, and the glass container is rapidly heated to 100° C. and then heated from 100° C. to 121° C. at a ramp rate of 1 deg/min at a pressure of 2 atmospheres. The glass container and solution are held at this temperature for 60 minutes, cooled to room temperature at a rate of 0.5 deg./min and the heating cycle and hold are repeated. The glass container is then heated to 50° C. and held for ten or more days for elevated temperature conditioning. After heating, the glass container is dropped from a distance of at least 18" onto a firm surface, such as a laminated tile floor, to dislodge any flakes or particles that are weakly adhered to the inner surface of the glass container. The distance of the drop may be scaled appropriately to prevent larger sized vials from fracturing on impact.

Thereafter, the solution contained in the glass container is analyzed to determine the number of glass particles present per liter of solution. Specifically, the solution from the glass container is directly poured onto the center of a Millipore Isopore Membrane filter (Millipore #ATTP02500 held in an assembly with parts #AP1002500 and #M000025A0) attached to vacuum suction to draw the solution through the filter within 10-15 seconds for 5 mL. Thereafter, another 5 mL of water is used as a rinse to remove buffer residue from the filter media. Particulate flakes are then counted by differential interference contrast microscopy (DIC) in the reflection mode as described in "Differential interference contrast (DIC) microscopy and modulation contrast microscopy" from Fundamentals of light microscopy and digital imaging. New York: Wiley-Liss, pp 153-168. The field of view is set to approximately 1.5 mm×1.5 mm and particles larger than 50 μm are counted manually. There are 9 such measurements made in the center of each filter membrane in a 3×3 pattern with no overlap between images. If larger areas of the filter media are analyzed, results can be normalized to equivalent area (i.e., 20.25 mm$^2$). The images collected from the optical microscope are examined with an image analysis program (Media Cybernetic's ImagePro Plus version 6.1) to measure and count the number of glass flakes present. This is accomplished as follows: all of the features within the image that appeared darker than the background by simple grayscale segmentation are highlighted; the length, width, area, and perimeter of all of the highlighted features that have a length greater than 25 micrometers are then measured; any obviously non-glass particles are then removed from the data; the measurement data is then exported into a spreadsheet. Then, all of the features greater than 25 micrometers in length and brighter than the background are extracted and measured; the length, width, area, perimeter, and X-Y aspect ratio of all of the highlighted features that have a length greater than 25 micrometers are measured; any obviously non-glass particles are removed from the data; and the measurement data is appended to the previously exported data in the spreadsheet. The data within the spreadsheet is then sorted by feature length and broken into bins according to size. The reported results are for features greater than 50 micrometers in length. Each of these groups is then counted and the counts reported for each of the samples.

A minimum of 100 mL of solution is tested. As such, the solution from a plurality of small containers may be pooled to bring the total amount of solution to 100 mL. For containers having a volume greater than 10 mL, the test is repeated for a trial of 10 containers formed from the same glass composition under the same processing conditions and the result of the particle count is averaged for the 10 containers to determine an average particle count. Alternatively, in the case of small containers, the test is repeated for a trial of 10 vials, each of which is analyzed and the particle count averaged over the multiple trials to determine an average particle count per trial. Averaging the particle count over multiple containers accounts for potential variations in the delamination behavior of individual containers. Table 1 summarizes some non-limiting examples of sample volumes and numbers of containers for testing:

TABLE 1

Table of Exemplary Test Specimens

| Nominal Vial Capacity (mL) | Vial Max Volume (mL) | Minimum Solution per Vial (mL) | Number of Vials in a Trial | Number of Trials | Total Solution Tested (mL) |
| --- | --- | --- | --- | --- | --- |
| 2.0 | 4.0 | 3.2 | 10 | 4 | 128 |
| 3.5 | 7.0 | 5.6 | 10 | 2 | 112 |
| 4.0 | 6.0 | 4.8 | 10 | 3 | 144 |
| 5.0 | 10.0 | 8.0 | 10 | 2 | 160 |
| 6.0 | 10.0 | 8.0 | 10 | 2 | 160 |
| 8.0 | 11.5 | 9.2 | 10 | 2 | 184 |
| 10.0 | 13.5 | 10.8 | 10 | 1 | 108 |
| 20.0 | 26.0 | 20.8 | 10 | 1 | 208 |
| 30.0 | 37.5 | 30.0 | 10 | 1 | 300 |
| 50.0 | 63.0 | 50.4 | 10 | 1 | 504 |

It should be understood that the aforementioned test is used to identify particles which are shed from the interior wall(s) of the glass container due to delamination and not tramp particles present in the container from forming processes or particles which precipitate from the solution enclosed in the glass container as a result of reactions between the solution and the glass. Specifically, delamination particles may be differentiated from tramp particles based on the aspect ratio of the particle (i.e., the ratio of the maximum length of the particle to the thickness of the particle, or a ratio of the maximum and minimum dimensions). Delamination produces particulate flakes or lamellae which are irregularly shaped and typically have a maximum length greater than about 50 µm but often greater than about 200 µm. The thickness of the flakes is usually greater than about 100 nm and may be as large as about 1 µm. Thus, the minimum aspect ratio of the flakes is typically greater than about 50. The aspect ratio may be greater than about 100 and sometimes greater than about 1000. In contrast, tramp glass particles will generally have a low aspect ratio which is less than about 3. Accordingly, particles resulting from delamination may be differentiated from tramp particles based on aspect ratio during observation with the microscope. Other common non-glass particles include hairs, fibers, metal particles, plastic particles, and other contaminants and are thus excluded during inspection. Validation of the results can be accomplished by evaluating interior regions of the tested containers. Upon observation, evidence of skin corrosion/ pitting/flake removal, as described in "Nondestructive Detection of Glass Vial Inner Surface Morphology with Differential Interference Contrast Microscopy" from Journal of Pharmaceutical Sciences 101(4), 2012, pages 1378-1384, is noted.

The number of particles present following accelerated delamination testing may be utilized to establish a delamination factor for the set of vials tested. Trials of glass containers which average less than 10 glass particles with a minimum length of about 50 µm and an aspect ratio of greater than about 50 per trial following accelerated delamination testing are considered to have a delamination factor of 10. Trials of glass containers which average less than 9 glass particles with a minimum length of about 50 µm and an aspect ratio of greater than about 50 per trial following accelerated delamination testing are considered to have a delamination factor of 9. Trials of glass containers which average less than 8 glass particles with a minimum length of about 50 µm and an aspect ratio of greater than about 50 per trial following accelerated delamination testing are considered to have a delamination factor of 8. Trials of glass containers which average less than 7 glass particles with a minimum length of about 50 µm and an aspect ratio of greater than about 50 per trial following accelerated delamination testing are considered to have a delamination factor of 7. Trials of glass containers which average less than 6 glass particles with a minimum length of about 50 µm and an aspect ratio of greater than about 50 per trial following accelerated delamination testing are considered to have a delamination factor of 6. Trials of glass containers which average less than 5 glass particles with a minimum length of about 50 µm and an aspect ratio of greater than about 50 per trial following accelerated delamination testing are considered to have a delamination factor of 5. Trials of glass containers which average less than 4 glass particles with a minimum length of about 50 µm and an aspect ratio of greater than about 50 per trial following accelerated delamination testing are considered to have a delamination factor of 4. Trials of glass containers which average less than 3 glass particles with a minimum length of about 50 µm and an aspect ratio of greater than about 50 per trial following accelerated delamination testing are considered to have a delamination factor of 3. Trials of glass containers which average less than 2 glass particles with a minimum length of about 50 µm and an aspect ratio of greater than about 50 per trial following accelerated delamination testing are considered to have a delamination factor of 2. Trials of glass containers which average less than 1 glass particle with a minimum length of about 50 µm and an aspect ratio of greater than about 50 per trial following accelerated delamination testing are considered to have a delamination factor of 1. Trials of glass containers which have 0 glass particles with a minimum length of about 50 μm and an aspect ratio of greater than about 50 per trial following accelerated delamination testing are considered to have a delamination factor of 0. Accordingly, it should be understood that the lower the delamination factor, the better the resistance of the glass container to delamination. In some embodiments described herein, at least the inner surface of the body of the glass container has a delamination factor of 10 or lower (e.g., a delamination factor of 3, 2, 1 or 0). In some other embodiments, the entire body of the glass container, including both the inner surface and the outer surface, has a delamination factor of 10 or lower (e.g., a delamination factor of 3, 2, 1, or 0).

Figure 5:
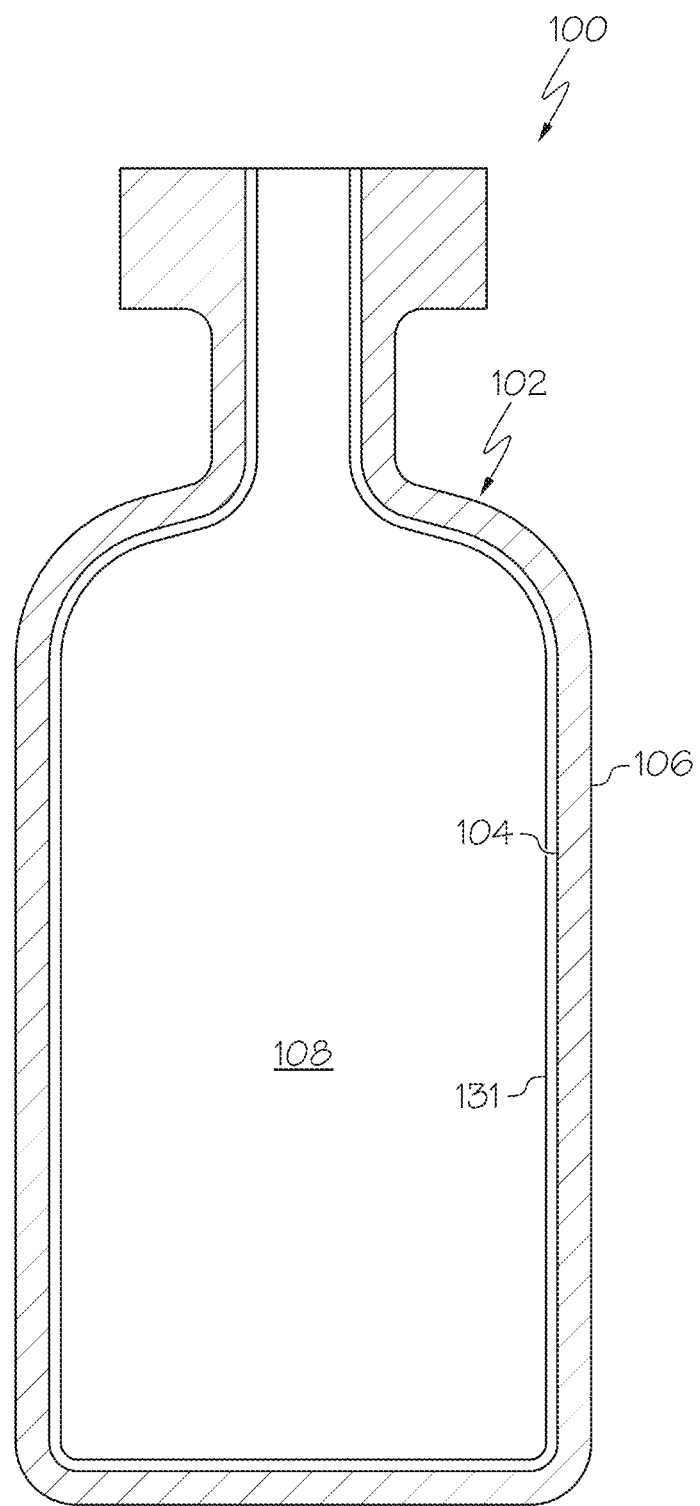
FIG. 5 schematically depicts a glass container having a barrier coating positioned on at least a portion of the inner surface of the glass container, according to one or more embodiments shown and described herein.

In some embodiments, a glass container having a delamination factor of 10 or lower may be obtained by forming the glass container with a barrier coating on the inner surface of the body such that the barrier coating is the inner surface of the body. Referring to FIG. 5 by way of example, a glass container 100 with a barrier coating 131 deposited on at least a portion of the inner surface 104 of the body 102 is schematically depicted. The barrier coating 131 does not delaminate or otherwise degrade and prevents product stored in the interior volume 108 of the glass container 100, such as pharmaceutical compositions or the like, from contacting the inner surface 104 of the body 102 thereby mitigating delamination of the glass container. The barrier coating is generally non-permeable to aqueous solutions, is insoluble in water, and hydrolytically stable.

In some embodiments described herein, the barrier coating 131 is a tenacious inorganic coating that is permanently adhered to the inner surface 104 of the glass container 100. The barrier coating 131 may be a metal nitride coating, a metal oxide coating, a metal sulfide coating, $SiO_2$, diamond-like carbide, graphenes or a carbide coating. For example, in some embodiments, the tenacious inorganic coating may be formed from at least one metal oxide such as $Al_2O_3$, $TiO_2$, $ZrO_2$, SnO, $SiO_2$, $Ta_2O_5$, $Nb_2O_5$, $Cr_2O_3$, $V_2O_5$, ZnO, or $HfO_2$. In some other embodiments, the tenacious inorganic coating may be formed from a combination of two or more of metal oxides such as $Al_2O_3$, $TiO_2$, $ZrO_2$, SnO, $SiO_2$, $Ta_2O_5$, $Nb_2O_5$, $Cr_2O_3$, $V_2O_5$, ZnO, or $HfO_2$. In some other embodiments, the barrier coating 131 may comprise a first layer of a first metal oxide deposited on the inner surface of the glass container and a second layer of a second metal oxide deposited over the first layer. In these embodiments, the barrier coating 131 may be deposited using a variety of deposition techniques including, without limitation, atomic layer deposition, chemical vapor deposition, physical vapor deposition, and the like. Alternatively, the barrier coating may be applied with one or more liquid application techniques such as dip coating, spray coating or plasma coating. Spray coating techniques may include high volume low pressure (HVLP) and low volume low pressure (LVLP) spray coating, electrostatic spray coating, airless spray coating, ultrasonic atomization with airless spray coating, aerosol jet coating, and ink jet coating. Plasma coating techniques may include standard primary and secondary plasma coating, microwave assisted plasma coating, and atmospheric plasma coating and the like.

While embodiments of the barrier coating 131 have been described herein as comprising inorganic materials, it should be understood that, in some embodiments, the barrier coating 131 may be an organic coating. For example, in embodiments where the barrier coating 131 is an organic coating, the organic coating may comprise polybenzimidazoles, polybisoxazoles, polybisthiazoles, polyetherimides, polyquinolines, polythiophenes, phenylene sulfides, polysulfones, polycyanurates, parylenes, fluorinated polyolefins including polytetrafluorethylenes and other fluoro-substituted polyolefins, perfluoroalkoxy polymers, polyether ether ketones (PEEK), polyamides, epoxies, polyphenolics, polyurethane acrylates, cyclic olefin copolymer and cyclic olefin polymers, polyolefins including polyethylenes, oxidized polyethylenes, polypropylenes, polyethylene/propylene copolymers, polyethylene/vinyl acetate copolymers, polyvinylchloride, polyacrylates, polymethacrylates, polystyrenes, polyterpenes, polyanhydrides, polymaleicanhydrides, polyformaldehydes, polyacetals and copolymers of polyacetals, polysiloxanes of dimethyl or diphenyl or methyl/phenyl mixtures, perfluorinated siloxanes and other substituted siloxanes, polyimides, polycarbonates, polyesters, parafins and waxes, or various combinations thereof. In some embodiments, the organic coating used as a barrier coating 131 may include polysiloxanes of dimethyl, diphenyl, or methyl/phenyl mixtures. Alternatively, the organic coating may be a polycarbonate or polyethylene terephthalate. In some embodiments, the barrier coating 131 may be formed from a layered structure comprising one or more of the aforementioned polymers and/or copolymers.

Barrier coatings may be utilized in conjunction with glass containers formed from any glass composition. However, barrier coatings are particularly well suited for use with glass containers formed from glass compositions which do not exhibit a resistance to delamination upon formation into a glass container. Such glass compositions may include, without limitation, those glass compositions designated as Type I Class A, Type I Class B, and Type II glass compositions according to ASTM Standard E438-92 (2011) entitled "Standard Specification for Glasses in Laboratory Apparatus." Such glass compositions may have the requisite chemical durability under the ASTM Standard, but do not exhibit resistance to delamination. For example, Table 2 below lists several non-limiting examples of Type I Class B glass compositions which do not exhibit a resistance to delamination. As such, barrier coatings as described herein may be used on at least the inner surfaces of containers formed from these compositions such that the container has a delamination factor of 10 or lower.

TABLE 2

Exemplary Type I, Class B Glass Compositions

|  | Example 1 (wt. %) | Example 2 (wt. %) | Example 3 (wt. %) |
| --- | --- | --- | --- |
| $SiO_2$ | 71.70 | 74.60 | 70.10 |
| $A_2O_3$ | 6.61 | 5.56 | 3.41 |
| $B_2O_3$ | 11.50 | 10.90 | 12.40 |
| $Na_2O$ | 6.40 | 6.93 | 5.91 |
| $K_2O$ | 2.35 | 0.04 | 2.80 |
| MgO | 0.300 | 0.057 | 0.009 |
| CaO | 0.56 | 1.47 | 1.03 |
| SrO | 0.004 | 0.004 | 0.026 |
| BaO | 0.003 | 0.003 | 2.73 |
| ZnO | 0.000 | 0.000 | 0.97 |
| $Fe_2O_3$ | 0.092 | 0.046 | 0.049 |
| $TiO_2$ | 0.028 | 0.018 | 0.027 |
| $ZrO_2$ | 0.033 | 0.032 | 0.038 |
| $As_2O_5$ | 0.0003 | 0.0828 | 0.0003 |
| Cl | 0.0450 | 0.0020 | 0.0750 |

In some alternative embodiments, a glass container having a delamination factor of 10 or lower is achieved by forming the glass container such that the glass container has homogenous compositional characteristics which, in turn, reduces the susceptibility of the glass container to delamination, as described in copending U.S. patent application Ser. No. 13/912,457 filed Jun. 7, 2013 entitled "Delamination Resistant Glass Containers" and assigned to Corning Incorporated. Specifically, it is believed that delamination of the glass container may be due, at least in part, to heterogeneities in the glass composition in at least the interior of the glass container, as described above. Minimizing such compositional heterogeneities produces a glass container which has a delamination factor of 10 or lower.

Figure 6:
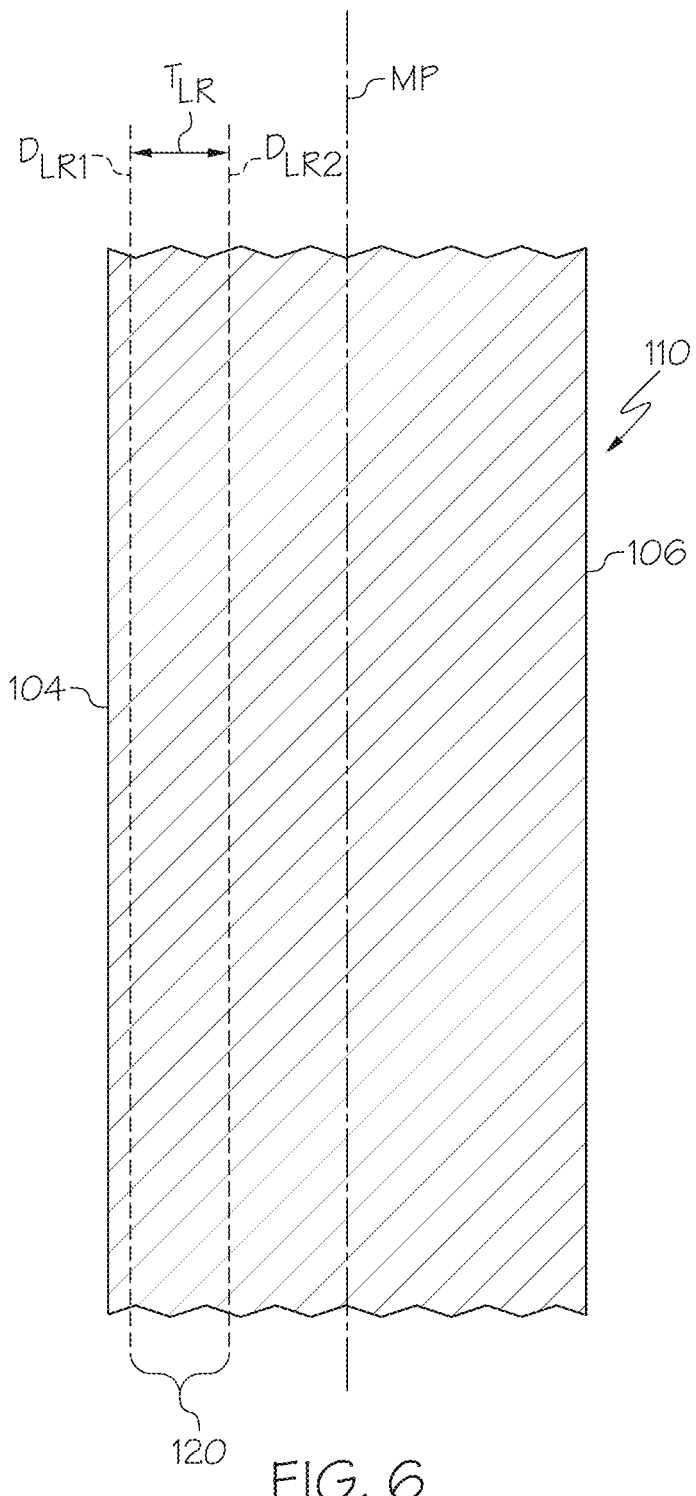
FIG. 6 schematically depicts a portion of a sidewall of a glass container having a persistent layer homogeneity.

Referring now to FIGS. 1 and 6, in some embodiments, the glass containers described herein have a homogenous composition through the thickness of the glass body 102 in each of the wall, heel, and floor portions such that at least the inner surface 104 of the body has a delamination factor of 10 or lower. Specifically, FIG. 6 schematically depicts a partial cross section of a wall portion 110 of the glass container 100. The glass body 102 of the glass container 100 has an interior region 120 which extends from about 10 nm below the inner surface 104 of the glass container 100 (indicated in FIG. 6 as $D_{LR1}$) into the thickness of the wall portion 110 to a depth $D_{LR2}$ from the inner surface 104 of the glass container. The interior region extending from about 10 nm below the inner surface 104 is differentiated from the composition in the initial 5-10 nm below the surface due to experimental artifacts. At the start of a dynamic secondary ion mass spectroscopy (DSIMS) analysis to determine the composition of the glass, the initial 5-10 nm is not included in the analysis because of three concerns: variable sputtering rate of ions from the surface as a result of adventitious carbon, establishment of a steady state charge in part due to the variable sputtering rate, and mixing of species while establishing a steady state sputtering condition. As a result, the first two data points of the analysis are excluded. Accordingly, it should be understood that the interior region 120 has a thickness $T_{LR}$ which is equal to $D_{LR2}$-$D_{LR1}$. The glass composition within the interior region has a persistent layer homogeneity which, in conjunction with the thickness $T_{LR}$ of the interior region, is sufficient to prevent delamination of the glass body following long term exposure to a solution contained in the interior volume of the glass container. In some embodiments, the thickness $T_{LR}$ is at least about 100 nm. In some embodiments, the thickness $T_{LR}$ is at least about 150 nm. In some other embodiments, the thickness $T_{LR}$ is at least about 200 nm or even about 250 nm. In some other embodiments, the thickness $T_{LR}$ is at least about 300 nm or even about 350 nm. In yet other embodiments, the thickness $T_{LR}$ is at least about 500 nm. In some embodiments, the interior region 120 may extend to a thickness $T_{LR}$ of at least about 1 µm or even at least about 2 µm.

While the interior region is described herein as extending from 10 nm below the inner surface 104 of the glass container 100 into the thickness of the wall portion 110 to a depth $D_{LR2}$ from the inner surface 104 of the glass container, it should be understood that other embodiments are possible. For example, it is hypothesized that, despite the experimental artifacts noted above, the interior region with the persistent layer homogeneity may actually extend from the inner surface 104 of the glass container 100 into the thickness of the wall portion. Accordingly, in some embodiments, the thickness $T_{LR}$ may extend from the inner surface 104 to the depth $D_{LR2}$. In these embodiments, the thickness $T_{LR}$ may be at least about 100 nm. In some embodiments, the thickness $T_{LR}$ is at least about 150 nm. In some other embodiments, the thickness $T_{LR}$ is at least about 200 nm or even about 250 nm. In some other embodiments, the thickness $T_{LR}$ is at least about 300 nm or even about 350 nm. In yet other embodiments, the thickness $T_{LR}$ is at least about 500 nm. In some embodiments, the interior region 120 may extend to a thickness $T_{LR}$ of at least about 1 µm or even at least about 2 µm.

In embodiments where the glass container is formed such that the glass container has a persistent layer homogeneity, the phrase "persistent layer homogeneity" means that the concentration of the constituent components (e.g., $SiO_2$, $Al_2O_3$, $Na_2O$, etc.) of the glass composition in the interior region do not vary from the concentration of the same constituent components at the midpoint of a thickness of the glass layer which contains the interior region by an amount which would result in delamination of the glass body upon long term exposure to a solution contained within the glass container. For example, in embodiments where the glass container is formed from a single glass composition, the glass body contains a single layer of glass and the concentration of constituent components in the interior region is compared to the concentration of the same components at a point along the midpoint line MP which evenly bisects the glass body between the inner surface 104 and the outer surface 106 to determine if a persistent layer homogeneity is present. However, in embodiments where the glass container is formed from a laminated glass in which a glass cladding layer of the laminated glass forms the interior surface of the glass container, the concentration of constituent components in the interior region is compared to the concentration of the same components at a point along the midpoint line which evenly bisects the glass cladding layer that forms the interior surface of the glass container. In the embodiments described herein, the persistent layer homogeneity in the interior region of the glass body is such that an extrema (i.e., the minimum or maximum) of a layer concentration of each of the constituent components of the glass composition in the interior region 120 is greater than or equal to about 80% and less than or equal to about 120% of the same constituent component at a midpoint of the glass layer which contains the interior region 120. The persistent layer homogeneity, as used herein, refers to the state of the glass container when the glass container is in as-formed condition or following one or more surface treatments applied to at least the interior surface of the glass container, such as etching or the like. In other embodiments, the persistent layer homogeneity in the interior region of the glass body is such that the extrema of the layer concentration of each of the constituent components of the glass composition in the interior region 120 is greater than or equal to about 90% and less than or equal to about 110% of the same constituent component at the midpoint of the thickness of the glass layer which contains the interior region 120. In still other embodiments, the persistent layer homogeneity in the interior region of the glass body is such that the extrema of the layer concentration of each of the constituent components of the glass composition in the interior region 120 is greater than or equal to about 92% and less than or equal to about 108% of the same constituent component at the midpoint of the thickness of the glass of the glass layer which contains the interior region 120. In some embodiments, the persistent layer homogeneity is exclusive of constituent components of the glass composition which are present in an amount less than about 2 mol. %.

The term "as-formed condition," as used herein, refers to the composition of the glass container 100 after the glass container has been formed from glass stock but prior to the container being exposed to any additional processing steps, such as ion-exchange strengthening, coating, ammonium sulfate treatment or the like. In some embodiments, the term "as-formed condition" includes the composition of the glass container 100 after the glass container has been formed and exposed to an etching treatment to selectively remove all or a portion of at least the interior surface of the glass container. In the embodiments described herein, the layer concentration of the constituent components in the glass composition is determined by collecting a composition sample through the thickness of the glass body in the area of interest using dynamic secondary ion mass spectroscopy (DSIMS). In the embodiments described herein, the composition profile is sampled from areas of the inner surface 104 of the glass body 102. The sampled areas have a maximum area of 1 mm$^2$. This technique yields a compositional profile of the species in the glass as a function of depth from the inner surface of the glass body for the sampled area.

Forming the glass container with a persistent layer homogeneity as described above, generally improves the resistance of the glass container to delamination. Specifically, providing an interior region which is homogenous in composition (i.e., the extrema of the concentration of the constituent components in the interior region is within +/−20% of the same constituent components at the midpoint of the thickness of the glass layer which contains the interior region) avoids the localized concentration of constituent components of the glass composition which may be susceptible to leaching which, in turn, mitigates the loss of glass particles from the inner surface of the glass container in the event that these constituent components are leached from the glass surface.

As noted herein, the container with the persistent layer homogeneity in as-formed condition is free from coatings, including inorganic and/or organic coatings applied to the inner surface of the glass body. Accordingly, it should be understood that the body of the glass container is formed from a substantially unitary composition which extends from the inner surface of the body to a depth of at least 250 nm or even at least 300 nm. The term "unitary composition" refers to the fact that the glass from which the portion of the body extending from the inner surface into the thickness of the body to a depth of at least 250 nm or even at least 300 nm is formed is a single composition of material as compared to a coating material applied to another material of either the same or different composition. For example, in some embodiments, the body of the container may be constructed from a single glass composition. In other embodiments, the body of the container may be constructed from a laminated glass such that the inner surface of the body has a unitary composition which extends from the inner surface to a depth of at least 250 nm or even at least 300 nm. The glass container may include an interior region which extends from either the inner surface or from 10 nm below the inner surface to a depth of at least 100 nm, as noted above. This interior region may have a persistent layer homogeneity.

Figure 7:
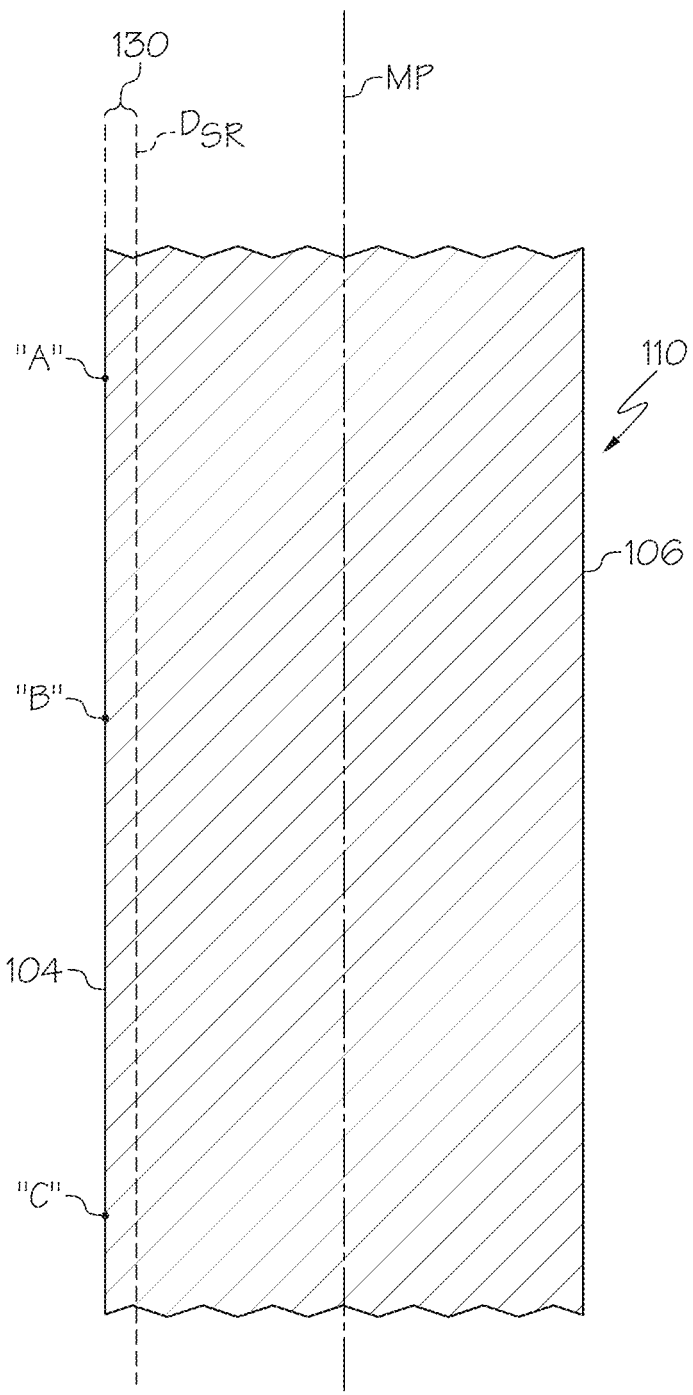
FIG. 7 schematically depicts a portion of a sidewall of a glass container having a persistent surface homogeneity.

Referring now to FIGS. 1 and 7, in some embodiments, the glass containers described herein may also have a homogenous surface composition over the inner surface 104 of the body 102 such that at least the inner surface 104 of the body 102, including in the wall, heel, and floor portions, has a delamination factor of 10 or less when the glass container is in as-formed condition. FIG. 7 schematically depicts a partial cross section of a wall portion 110 of the glass container 100. The glass container 100 has a surface region 130 which extends over the entire inner surface of the glass container. The surface region 130 has a depth $D_{SR}$ which extends from the inner surface 104 of the glass container 100 into a thickness of the glass body towards the exterior surface. Accordingly, it should be understood that the surface region 130 has a thickness $T_{SR}$ which is equal to the depth $D_{SR}$. In some embodiments, the surface region extends to a depth $D_{SR}$ of at least about 10 nm from the inner surface 104 of the glass container 100. In some other embodiments, the surface region 130 may extend to a depth $D_{SR}$ of at least about 50 nm. In some other embodiments, the surface region 130 may extend to a depth $D_{SR}$ from about 10 nm to about 50 nm. Accordingly, it should be understood that the surface region 130 extends to a shallower depth than the interior region 120. The glass composition of the surface region has a persistent surface homogeneity which, in conjunction with the depth $D_{SR}$ of the interior region, is sufficient to prevent delamination of the glass body following long term exposure to a solution contained in the interior volume of the glass container.

In the embodiments described herein, the phrase "persistent surface homogeneity" means that the concentration of the constituent components (e.g., $SiO_2$, $Al_2O_3$, $Na_2O$, etc.) of the glass composition at a discrete point in the surface region do not vary from the concentration of the same constituent components at any second discrete point in the surface region by an amount which would result in delamination of the glass body upon long term exposure to a solution contained within the glass container. In the embodiments described herein, the persistent surface homogeneity in the surface region is such that, for a discrete point on the inner surface 104 of the glass container, the extrema (i.e., the minimum or maximum) of the surface concentration of each of the constituent components in the surface region 130 at a discrete point is greater than or equal to about 70% and less than or equal to about 130% of the same constituent components in the surface region 130 at any second discrete point on the inner surface 104 of the glass container 100 when the glass container 100 is in as-formed condition. For example, FIG. 7 depicts three discrete points (A, B, and C) on the inner surface 104 of the wall portion 110. Each point is separated from an adjacent point by at least about 3 mm. The extrema of the surface concentration of each of the constituent components in the surface region 130 at point "A" is greater than or equal to about 70% and less than or equal to about 130% of the same constituent components in the surface region 130 at points "B" and "C". When referring to the heel portion of the container, the discrete points may be approximately centered at the apex of the heel with adjacent points located at least 3 mm from the apex of the heel along the floor portion of the container and along the wall portion of the container, the distance between the points being limited by the radius of the container and the height of the sidewall (i.e., the point where the sidewall transitions to the shoulder of the container).

In some embodiments, the persistent surface homogeneity in the surface region is such that the extrema of the surface concentration of each of the constituent components of the glass composition in the surface region 130 for any discrete point on the inner surface 104 of the glass container 100 is greater than or equal to about 75% and less than or equal to about 125% of the same constituent component in the surface region 130 at any second discrete point on the inner surface 104 of the glass container 100. In some other embodiments, the persistent surface homogeneity in the surface region is such that the extrema of the surface concentration of each of the constituent components of the glass composition in the surface region 130 for any discrete point on the inner surface 104 of the glass container 100 is greater than or equal to about 80% and less than or equal to about 120% of the same constituent component in the surface region 130 at any second discrete point on the inner surface 104 of the glass container 100. In still other embodiments, the persistent surface homogeneity in the surface region is such that the extrema of the surface concentration of each of the constituent components of the glass composition in the surface region 130 for any discrete point on the inner surface 104 of the glass container 100 is greater than or equal to about 85% and less than or equal to about 115% of the same constituent component in the surface region 130 at any second discrete point on the inner surface 104 of the glass container 100. In the embodiments described herein, the surface concentration of the constituent components of the glass composition in the surface region is measured by x-ray photoelectron spectroscopy. In some embodiments, the persistent surface homogeneity in the surface region is exclusive of constituent components of the glass composition which are present in an amount less than about 2 mol. %.

The homogeneity of the surface concentration of the glass constituent components in the surface region 130 is generally an indication of the propensity of the glass composition to delaminate and shed glass particles from the inner surface 104 of the glass container 100. When the glass composition has a persistent surface homogeneity in the surface region 130 (i.e., when the extrema of the surface concentration of the glass constituent components in the surface region 130 at a discrete point on the inner surface 104 are within +/−30% of the same constituent components in the surface region 130 at any second discrete point on the inner surface 104), the glass composition has improved resistance to delamination.

Glass containers having persistent layer homogeneity and/or persistent surface homogeneity may be achieved using various techniques. For example, in some embodiments, at least the inner surface 104 of the body 102 of the glass container is etched which produces a glass container having a persistent layer homogeneity and/or a persistent surface homogeneity such that at least the inner surface of the glass container has a delamination factor of 10 or less. Specifically, compositional variations in the glass due to volatilization of species from the glass and subsequent re-deposition of the volatized species during container formation, as described above, is believed to be one mechanism that leads to delamination. The thin skin of volatized and re-deposited species on the inner surface of the glass container is compositionally heterogeneous and hydrolytically weak such that alkali and boron species are quickly depleted from the skin during exposure to pharmaceutical compositions. This behavior leaves behind a silica rich layer with a high surface area. Exposure of this silica rich layer to a pharmaceutical composition causes the layer to swell and, ultimately, flake off (i.e., delaminate) from the inner surface of the body. However, etching the inner surface of the body of the glass container removes this thin skin layer and imparts a persistent layer homogeneity and/or persistent surface homogeneity to at least the inner surface of the body of the glass container.

In some embodiments described herein, the body of the glass container is etched to remove a layer of glass material from the inner surface of the glass body. The etch is sufficient to remove the thin skin layer of volatized and re-deposited species and thereby provide a persistent layer homogeneity and/or a persistent surface homogeneity to at least the inner surface of the body of the glass container such that at least the inner surface of the glass body has a delamination factor of 10 or less. For example, in some embodiments, the body of the glass container is etched to remove glass material from the inner surface of the glass body to a depth of 1 μm or even 1.5 μm. In some other embodiments, the body of the glass container may be etched to remove glass material to a depth greater than 1.5 μm, including, without limitation, 2 μm, 3 μm or even 5 μm. In these embodiments, at least the interior surface of the glass container may be formed from glass compositions which meet the criteria for Type I, Class A (Type IA) or Type I, Class B (Type IB) glasses under ASTM Standard E438-92 (2011) entitled "Standard Specification for Glasses in Laboratory Apparatus". Borosilicate glasses meet the Type I (A or B) criteria and are routinely used for pharmaceutical packaging. Examples of borosilicate glass include, without limitation, Corning® Pyrex® 7740, 7800, Wheaton 180, 200, and 400, Schott Duran®, Schott Fiolax®, KIMAX® N-51A, Gerresheimer GX-51 Flint and others.

In one embodiment, etching may be accomplished by exposing the inner surface of the glass container to an acid solution, or a combination of acid solutions. The acid solutions may include, without limitation, sulfuric acid, nitric acid, hydrochloric acid, hydrofluoric acid, hydrobromic acid, and phosphoric acid. For example, the acid solution may include a mixture of 1.5 M hydrofluoric acid with 0.9 M sulfuric acid. These acid solutions effectively remove the thin skin layer of volatized and re-deposited organic solution without leaving a depleted "leach layer" on the inner surface of the glass container. Alternatively, etching may be accomplished by exposing the inner surface of the glass container to a base solution or a combination of base solutions. Suitable base solutions include, for example, sodium hydroxide, potassium hydroxide, ammonium hydroxide, or combinations thereof. Alternatively, etching may be accomplished by sequentially acid solutions followed by base solutions or vice-versa.

While one specific etching treatment is described herein, it should be understood that other etching treatments may also be used. For example, the etching treatments disclosed in U.S. Pat. No. 2,106,744, U.S. Patent Publication No. 2011/0165393, U.S. Patent Publication No. 2013/0122306, and U.S. Patent Publication No. 2012/0282449 may also be used to etch at least the interior surface of the glass container.

In still other embodiments, glass containers may be provided with a persistent layer homogeneity and/or a persistent surface homogeneity by forming the glass containers from glass compositions in which the constituent components of the glass composition form species with relatively low vapor pressures (i.e., species with a low volatility) at the temperatures required to reform the glass containers from glass stock into the desired container shape. Because these constituent components form species with relatively low vapor pressures at the reforming temperatures, the constituent components are less likely to volatilize and evaporate from the surfaces of the glass, thereby forming a glass container with a compositionally homogenous surface over the inner surface of the glass container and through the thickness of the glass container.

Certain constituent components of the glass composition may be sufficiently volatile at the glass forming and reforming temperatures which, in turn, may lead to compositional heterogeneities and subsequent delamination. Forming and reforming temperatures of the glass composition generally correspond to the temperatures at which the glass composition has a viscosity in the range from about 200 poise to about 100 kilopoise. Accordingly, in some embodiments, the glass compositions from which the glass containers are formed are free from constituent components which form species that volatilize significantly (i.e., form gas phase species with equilibrium partial pressures greater than about $10^{-3}$ atm) at temperatures corresponding to a viscosity in the range from about 200 poise to about 100 kilopoise. In some embodiments, the glass compositions from which the glass containers are formed are free from constituent components which volatilize significantly at temperatures corresponding to a viscosity in the range from about 1 kilopoise to about 50 kilopoise. In some other embodiments, the glass compositions from which the glass containers are formed are free from constituent components which volatilize significantly at temperatures corresponding to a viscosity in the range from about 1 kilopoise to about 20 kilopoise. In some other embodiments, the glass compositions from which the glass containers are formed are free from constituent components which volatilize significantly at temperatures corresponding to a viscosity in the range from about 1 kilopoise to about 10 kilopoise. Without wishing to be bound by theory, compounds which volatilize significantly under these conditions include, without limitation, boron and compounds of boron, phosphorous and compounds of phosphorous, zinc and compounds of zinc, fluorine and compounds of fluorine, chlorine and compounds of chlorine, tin and compounds of tin, and sodium and compounds of sodium.

In some embodiments described herein, the glass containers are generally formed from aluminosilicate glass compositions, such as alkali aluminosilicate glass compositions or alkaline-earth aluminosilicate glass compositions, for example. As noted hereinabove, boron containing species in the glass are highly volatile at the elevated temperatures used for glass forming and reforming which leads to delamination of the resultant glass container. Moreover, glass compositions containing boron are also susceptible to phase separation. Accordingly, in the embodiments described herein, the boron concentration in the glass compositions from which the glass containers are formed is limited to mitigate both delamination and phase separation. In some embodiments, the glass compositions from which the glass containers are formed includes less than or equal to about 1.0 mol. % of oxides of boron and/or compounds containing boron, including, without limitation, $B_2O_3$. In some of these embodiments, the concentration of oxides of boron and/or compounds containing boron in the glass composition may be less than or equal to about 0.5 mol. %, less than or equal to about 0.4 mol. % or even less than or equal to about 0.3 mol. %. In some of these embodiments, the concentration of oxides of boron and/or compounds containing boron in the glass composition may be less than or equal to about 0.2 mol. % or even less than or equal to about 0.1 mol. %. In some other embodiments, the glass compositions are substantially free from boron and compounds containing boron.

Phosphorous, like boron, generally forms species in the glass composition which are highly volatile at the elevated temperatures used for glass forming and reforming. As such, phosphorous in the glass composition can lead to compositional heterogeneities in the finished glass container which, in turn, may lead to delamination. Accordingly, in the embodiments described herein, the concentration of phosphorous and compounds containing phosphorous (such as $P_2O_5$ or the like) in the glass compositions from which the glass containers are formed is limited to mitigate delamination. In some embodiments, the glass compositions from which the glass containers are made includes less than or equal to about 0.3 mol. % of oxides of phosphorous and/or compounds containing phosphorous. In some of these embodiments, the concentration of oxides of phosphorous and/or compounds containing phosphorous in the glass composition may be less than or equal to about 0.2 mol. % or even less than or equal to about 0.1 mol. %. In some other embodiments, the glass compositions are substantially free from phosphorous and compounds containing phosphorous.

Zinc, like boron and phosphorous, generally forms species in the glass composition which are highly volatile at the elevated temperatures used for glass forming and reforming. As such, zinc in the glass composition can lead to compositional heterogeneities in the finished glass container which, in turn, may lead to delamination. Accordingly, in the embodiments described herein, the concentration of zinc and compounds containing zinc (such as ZnO or the like) in the glass compositions from which the glass containers are formed is limited to mitigate delamination. In some embodiments, the glass compositions from which the glass containers are made includes less than or equal to about 0.5 mol. % of oxides of zinc and/or compounds containing zinc. In some other embodiments, the glass compositions from which the glass containers are made includes less than or equal to about 0.3 mol. % of oxides of zinc and/or compounds containing zinc. In some of these embodiments, the concentration of oxides of zinc or compounds containing zinc in the glass composition may be less than or equal to about 0.2 mol. % or even less than or equal to about 0.1 mol. %. In some other embodiments, the glass compositions are substantially free from zinc and compounds containing zinc.

Lead and bismuth also form species in the glass composition which are highly volatile at the elevated temperatures used for glass forming and reforming. Accordingly, in the embodiments described herein, the concentration of lead, bismuth, compounds containing lead, and compounds containing bismuth in the glass compositions from which the glass containers are formed is limited to mitigate delamination. In some embodiments, oxides of lead, oxides of bismuth, compounds containing lead and/or compounds containing bismuth, are each present in the glass compositions in concentrations of less than or equal to about 0.3 mol. %. In some of these embodiments, oxides of lead, oxides of bismuth, compounds containing lead and/or, compounds containing bismuth are each present in the glass compositions in concentrations of less than or equal to about 0.2 mol. % or even concentrations of less than about 0.1 mol. %. In some other embodiments, the glass compositions are substantially free from lead and/or bismuth and compounds containing lead and/or bismuth.

Species containing chlorine, fluorine, and oxides of tin, are also highly volatile at the elevated temperatures used for glass forming and reforming. Accordingly, in the embodiments described herein, chlorine, fluorine, and oxides of tin and compounds containing tin, chlorine, or fluorine, are present in the glass compositions in concentrations which do not affect the resistance to delamination of the resultant glass. Specifically, chlorine, fluorine, and oxides of tin and compounds containing tin, chlorine, or fluorine, are present in the glass compositions from which the glass containers are formed in concentrations less than or equal to about 0.5 mol. % or even less than or equal to about 0.3 mol. %. In some embodiments, the glass compositions are substantially free from tin, chlorine, and fluorine, and compounds containing tin, chlorine, or fluorine.

While some embodiments of the glass container may be free from readily volatized constituent components as described above, in certain other embodiments the glass containers may be formed from glass compositions which include these volatile constituents, such as when the glass container includes a barrier layer.

The glass compositions from which the containers are formed are not phase separated. The term "phase separated," as used herein, refers to the separation of the glass composition into separate phases with each phase having different compositional characteristics. For example, alkali borosilicate glasses are generally known to phase separate at elevated temperatures (such as the forming and reforming temperatures) into a boron-rich phase and a silica-rich phase. In some embodiments described herein, the concentration of oxides of boron in the glass compositions is sufficiently low (i.e., less than or equal to about 1.0 mol. %) such that the glass compositions do not undergo phase separation.

In one exemplary embodiment, the glass containers are formed from a delamination resistant glass composition such as the alkaline earth aluminosilicate glass compositions described in U.S. patent application Ser. No. 13/660,141 filed Oct. 25, 2012 and entitled "Alkaline Earth Alumino-Silicate Glass Compositions with Improved Chemical and Mechanical Durability", the entirety of which is incorporated herein by reference. This first exemplary glass composition generally includes a combination of $SiO_2$, $Al_2O_3$, at least one alkaline earth oxide, and alkali oxide including at least $Na_2O$ and $K_2O$. In some embodiments, the glass compositions may also be free from boron and compounds containing boron. The combination of these components enables a glass composition which is resistant to chemical degradation and is also suitable for chemical strengthening by ion exchange. In some embodiments, the glass compositions may further comprise minor amounts of one or more additional oxides such as, for example, $SnO_2$, $ZrO_2$, $ZnO$, or the like. These components may be added as fining agents and/or to further enhance the chemical durability of the glass composition.

In the embodiments of the first exemplary glass composition, the glass composition generally comprises $SiO_2$ in an amount greater than or equal to about 65 mol. % and less than or equal to about 75 mol. %. In some embodiments $SiO_2$ is present in the glass composition in an amount greater than or equal to about 67 mol. % and less than or equal to about 75 mol. %. In some other embodiments, $SiO_2$ is present in the glass composition in an amount greater than or equal to about 67 mol. % and less than or equal to about 73 mol. %. In each of these embodiments, the amount of $SiO_2$ present in the glass composition may be greater than or equal to about 70 mol. % or even greater than or equal to about 72 mol. %.

The first exemplary glass composition also includes $Al_2O_3$. $Al_2O_3$, in conjunction with alkali oxides present in the glass compositions such as $Na_2O$ or the like, improves the susceptibility of the glass to ion exchange strengthening. Moreover, additions of $Al_2O_3$ to the composition reduce the propensity of alkali constituents (such as Na and K) from leaching out of the glass and, as such, additions of $Al_2O_3$ increase the resistance of the composition to hydrolytic degradation. Moreover, additions of $Al_2O_3$ greater than about 12.5 mol. % may also increase the softening point of the glass thereby reducing the formability of the glass. Accordingly, the glass compositions described herein generally include $Al_2O_3$ in an amount greater than or equal to about 6 mol. % and less than or equal to about 12.5 mol. %. In some embodiments, the amount of $Al_2O_3$ in the glass composition is greater than or equal to about 6 mol. % and less than or equal to about 10 mol. %. In some other embodiments, the amount of $Al_2O_3$ in the glass composition is greater than or equal to about 7 mol. % and less than or equal to about 10 mol. %.

The first exemplary glass composition also includes at least two alkali oxides. The alkali oxides facilitate the ion exchangeability of the glass composition and, as such, facilitate chemically strengthening the glass. The alkali oxides also lower the softening point of the glass, thereby offsetting the increase in the softening point due to higher concentrations of $SiO_2$ in the glass composition. The alkali oxides also assist in improving the chemical durability of the glass composition. The alkali oxides are generally present in the glass composition in an amount greater than or equal to about 5 mol. % and less than or equal to about 12 mol. %. In some of these embodiments, the amount of alkali oxides may be greater than or equal to about 5 mol. % and less than or equal to about 10 mol. %. In some other embodiments, the amount of alkali oxide may be greater than or equal to about 5 mol. % and less than or equal to about 8 mol. %. In all the glass compositions described herein, the alkali oxides comprise at least $Na_2O$ and $K_2O$. In some embodiments, the alkali oxides further comprise $Li_2O$.

The ion exchangeability of the glass composition is primarily imparted to the glass composition by the amount of the alkali oxide $Na_2O$ initially present in the glass composition prior to ion exchange. Specifically, in order to achieve the desired compressive stress and depth of layer in the glass composition upon ion exchange strengthening, the glass compositions include $Na_2O$ in an amount greater than or equal to about 2.5 mol. % and less than or equal to about 10 mol. % based on the molecular weight of the glass composition. In some embodiments, the glass composition may include $Na_2O$ in an amount greater than or equal to about 3.5 mol. % and less than or equal to about 8 mol. %. In some of these embodiments, the glass composition may include $Na_2O$ in an amount greater than or equal to about 6 mol. % and less than or equal to about 8 mol. %.

As noted above, the alkali oxides in the glass composition also include $K_2O$. The amount of $K_2O$ present in the glass composition also relates to the ion exchangeability of the glass composition. Specifically, as the amount of $K_2O$ present in the glass composition increases, the compressive stress obtainable through ion exchange decreases. Accordingly, it is desirable to limit the amount of $K_2O$ present in the glass composition. In some embodiments, the amount of $K_2O$ is greater than 0 mol. % and less than or equal to about 2.5 mol. % by molecular weight of the glass composition. In some of these embodiments, the amount of $K_2O$ present in the glass composition is less than or equal to about 0.5 mol. % by molecular weight of the glass composition.

In some embodiments, the alkali oxide in the first exemplary glass composition further comprises $Li_2O$. Including $Li_2O$ in the glass composition further decreases the softening point of the glass. In embodiments where the alkali oxide includes $Li_2O$, the $Li_2O$ may be present in an amount greater than or equal to about 1 mol. % and less than or equal to about 3 mol. %. In some embodiments, $Li_2O$ may be present in the glass composition in an amount which is greater than about 2 mol. % and less than or equal to about 3 mol. %. However, in some other embodiments, the glass composition may be substantially free of lithium and compounds containing lithium.

Alkaline earth oxides in the first exemplary glass composition improve the meltability of the glass batch materials and increase the chemical durability of the glass composition. The presence of alkaline earth oxides in the glass composition also reduces the susceptibility of the glass to delamination. In the glass compositions described herein, the glass compositions generally include at least one alkaline earth oxide in a concentration greater than or equal to about 8 mol. % or even 8.5 mol. % and less than or equal to about 15 mol. %. In some embodiments, the glass composition may comprise from about 9 mol. % to about 15 mol. % of alkaline earth oxide. In some of these embodiments, the amount of alkaline earth oxide in the glass composition may be from about 10 mol. % to about 14 mol. %.

The alkaline earth oxide in the first exemplary glass composition may include MgO, CaO, SrO, BaO or combinations thereof. For example, in the embodiments described herein the alkaline earth oxide may include MgO. In some embodiments, MgO may be present in the glass composition in an amount which is greater than or equal to about 2 mol. % and less than or equal to about 7 mol. % by molecular weight of the glass composition, or even greater than or equal to about 3 mol. % and less than or equal to about 5 mol. % by molecular weight of the glass composition.

In some embodiments, the alkaline earth oxide in the first exemplary glass composition also includes CaO. In these embodiments, CaO is present in the glass composition in an amount from about 2 mol. % to less than or equal to 7 mol. % by molecular weight of the glass composition. In some embodiments, CaO is present in the glass composition in an amount from about 3 mol. % to less than or equal to 7 mol. % by molecular weight of the glass composition. In some of these embodiments, CaO may be present in the glass composition in an amount greater than or equal to about 4 mol. % and less than or equal to about 7 mol. %. In some other embodiments, CaO may be present in the glass composition in an amount greater than or equal to about 5 mol. % and less than or equal to about 6 mol. %, such as when CaO is substituted for MgO in the alkaline earth oxide to decrease the liquidus temperature and increase the liquidus viscosity. In still other embodiments, CaO may be present in the glass in an amount greater than or equal to about 2 mol. % and less than or equal to about 5 mol. %, such as when SrO is substituted for MgO in the alkaline earth oxide to decrease the liquidus temperature and increase the liquidus viscosity.

In some embodiments described herein, the alkaline earth oxide further comprises at least one of SrO or BaO. The inclusion of SrO reduces the liquidus temperature of the glass composition and, as a result, improves the formability of the glass composition. In some embodiments the glass composition may include SrO in an amount greater than 0 mol. % and less than or equal to about 6.0 mol. %. In some other embodiments, the glass composition may include SrO in an amount greater than about 0 mol. % and less than or equal to about 5 mol. %. In some of these embodiments, the glass composition may include greater than or equal to about 2 mol. % and less than or equal to about 4 mol. % SrO, such as when CaO is substituted for MgO in the alkaline earth oxide to decrease the liquidus temperature and increase the liquidus viscosity. In some other embodiments, the glass composition may include from about 1 mol. % to about 2 mol. % SrO. In still other embodiments, SrO may be present in the glass composition in an amount greater than or equal to about 3 mol. % and less than or equal to about 6 mol. %, such as when SrO is substituted for MgO in the alkaline earth oxide to decrease the liquidus temperature and increase the liquidus viscosity.

In embodiments where the glass composition includes BaO, the BaO may be present in an amount greater than about 0 mol. % and less than about 2 mol. %. In some of these embodiments, BaO may be present in the glass composition in an amount less than or equal to about 1.5 mol. % or even less than or equal to about 0.5 mol. %. However, in some other embodiments, the glass composition is substantially free from barium and compounds of barium.

In the embodiments of the glass compositions described herein, the glass compositions generally contain less than about 1 mol. % of boron or oxides of boron, such as $B_2O_3$. For example, in some embodiments the glass compositions may comprise greater than or equal to about 0 mol. % $B_2O_3$ and less than or equal to 1 mol. % $B_2O_3$. In some other embodiments, the glass compositions may comprise greater than or equal to about 0 mol. % $B_2O_3$ and less than or equal to 0.6 mol. % $B_2O_3$. In still other embodiments, the glass compositions are substantially free from boron and compounds of boron such as $B_2O_3$. Specifically, it has been determined that forming the glass composition with a relatively low amount of boron or compounds of boron (i.e., less than or equal to 1 mol. %) or without boron or compounds of boron significantly increases the chemical durability of the glass composition. In addition, it has also been determined that forming the glass composition with a relatively low amount of boron or compounds of boron or without boron or compounds of boron improves the ion exchangeability of the glass compositions by reducing the process time and/or temperature required to achieve a specific value of compressive stress and/or depth of layer.

In some embodiments of the glass compositions described herein, the glass compositions are substantially free from phosphorous and compounds containing phosphorous including, without limitation, $P_2O_5$. Specifically, it has been determined that formulating the glass composition without phosphorous or compounds of phosphorous increases the chemical durability of the glass composition.

In addition to the $SiO_2$, $Al_2O_3$, alkali oxides and alkaline earth oxides, the first exemplary glass compositions described herein may optionally further comprise one or more fining agents such as, for example, $SnO_2$, $As_2O_3$, and/or Cl⁻ (from NaCl or the like). When a fining agent is present in the glass composition, the fining agent may be present in an amount less than or equal to about 1 mol. % or even less than or equal to about 0.5 mol. %. For example, in some embodiments the glass composition may include $SnO_2$ as a fining agent. In these embodiments $SnO_2$ may be present in the glass composition in an amount greater than about 0 mol. % and less than or equal to about 0.30 mol. %.

Moreover, the glass compositions described herein may comprise one or more additional metal oxides to further improve the chemical durability of the glass composition. For example, the glass composition may further include ZnO or $ZrO_2$, each of which further improves the resistance of the glass composition to chemical attack. In these embodiments, the additional metal oxide may be present in an amount which is greater than or equal to about 0 mol. % and less than or equal to about 2.0 mol. %. For example, when the additional metal oxide is $ZrO_2$, the $ZrO_2$ may be present in an amount less than or equal to about 1.5 mol. %. Alternatively or additionally, the additional metal oxide may include ZnO in an amount less than or equal to about 2.0 mol. %. In some embodiments, ZnO may be included as a substitute for one or more of the alkaline earth oxides. For example, in embodiments where the glass composition includes the alkaline earth oxides MgO, CaO and SrO, the amount of MgO may be reduced to decrease the liquidus temperature and increase the liquidus viscosity, as described above. In these embodiments, ZnO may be added to the glass composition as a partial substitute for MgO, in addition to or in place of at least one of CaO or SrO.

Based on the foregoing, it should be understood that, in one embodiment, the first exemplary glass composition may include from about 65 mol. % to about 75 mol. % $SiO_2$; from about 6 mol. % to about 12.5 mol. % $Al_2O_3$; and from about 5 mol. % to about 12 mol. % alkali oxide, wherein the alkali oxide comprises $Na_2O$ and $K_2O$. The $K_2O$ may be present in an amount less than or equal to 0.5 mol. %. The glass composition may also include from about 8.0 mol. % to about 15 mol. % of alkaline earth oxide. The glass composition may be susceptible to strengthening by ion-exchange.

In another embodiment of the first exemplary glass composition, the glass composition includes from about 67 mol. % to about 75 mol. % $SiO_2$; from about 6 mol. % to about 10 mol. % $Al_2O_3$; from about 5 mol. % to about 12 mol. % alkali oxide; and from about 9 mol. % to about 15 mol. % of alkaline earth oxide. The alkali oxide comprises at least $Na_2O$ and $K_2O$. The glass composition is free from boron and compounds of boron and is susceptible to ion exchange thereby facilitating chemically strengthening the glass to improve the mechanical durability.

In yet another embodiment of the first exemplary glass composition, the glass composition may include from about 67 mol. % to about 75 mol. % $SiO_2$; from about 6 mol. % to about 10 mol. % $Al_2O_3$; from about 5 mol. % to about 12 mol. % alkali oxide; and from about 9 mol. % to about 15 mol. % of alkaline earth oxide. The alkaline earth oxide comprises at least one of SrO and BaO. The glass composition is free from boron and compounds of boron and is susceptible to ion exchange thereby facilitating chemically strengthening the glass to improve the mechanical durability.

Figure 16:
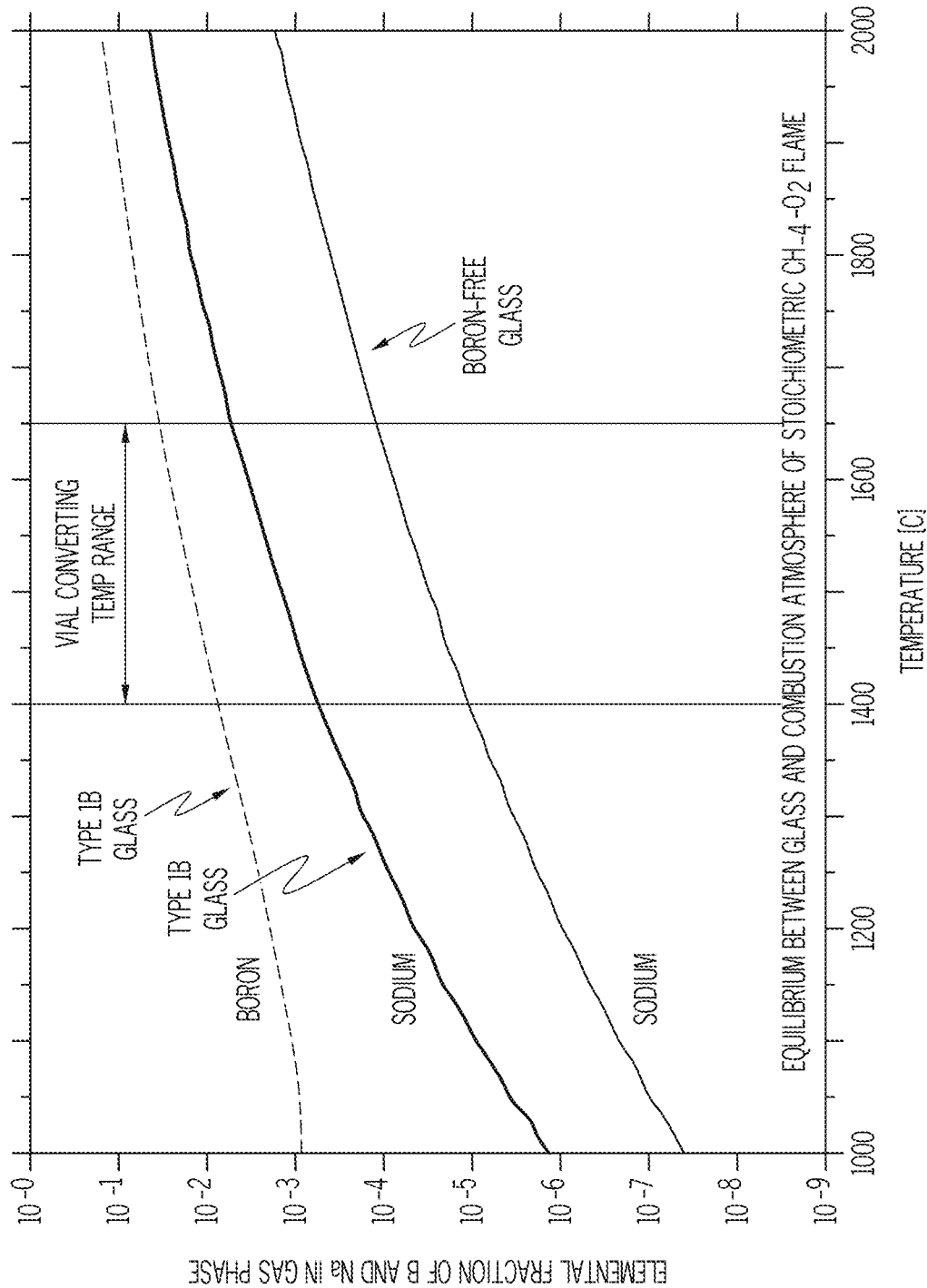
FIG. 16 graphically depicts the effect of composition and temperature on volatilization for a Type IB glass and a boron-free glass.

In some embodiments described herein, glass containers with persistent surface homogeneity and/or persistent layer homogeneity may be obtained utilizing forming processes which impart a uniform temperature history to at least the inner surface of the body of the glass container. For example, in one embodiment, the body of the glass container may be formed at forming temperatures and/or forming speeds which mitigate the volatilization of chemical species from the glass composition from which the body is formed. Specifically, forming a glass stream into a desired shape requires control of both the viscosity of the glass and the speed of formation. Higher viscosities require slower forming speeds, while lower viscosities enable faster forming speeds. The bulk composition of the glass and the temperature are the largest drivers for affecting viscosity. It is possible to use the same forming process for different glasses by matching viscosities at each stage in the forming process by adjusting temperature. Accordingly, one approach to reducing volatilization from a glass melt is to operate the process at a lower temperature (higher viscosity). This approach is disadvantageous because it also requires slowing the yield and capacity of the forming equipment, ultimately leading to increased cost. FIG. 16 shows that temperature is a large driver for volatilization in two exemplary compositions, and that in all cases reducing temperature (and therefore speed) reduces the driving force for volatilization loss. The viscosity associated with tube-to-vial conversion processes range from 200P (highest temperature, at cutting and hole-punch operations) to 20,000P (lowest temperature, at tube forming and finishing steps). For typical 51-expansion borosilicates, these viscosities are approximately 1100-1650° C. Since volatilization is reduced significantly at the lower temperatures, the primary temperature range of concern is between 1350-1650° C.

In another embodiment glass containers with persistent surface homogeneity and/or persistent layer homogeneity may be obtained by mold-forming the body. There are several methods for forming a glass melt into a container shape using molds. All rely on introduction of a uniformly hot 'gob' of molten glass to a forming machine. In blow-and-blow molding, the gob is first blown using pressurized air through an orifice (which shapes the lip/finish) to create a preform (smaller than the end product). The preform (or parison) is then placed into a second mold where it is further blown into contact with the mold surface and defines the final shape of the container. In press-and-blow molding, the gob is held by a ring which defines the lip/finish and a plunger is pressed through the gob to form the preform. The preform is then placed in the second mold and blown into contact with the mold surface, forming the final container shape. The mold forming process generally imparts a uniform temperature history to the body during forming which, in turn, may impart a persistent surface homogeneity and/or a persistent layer homogeneity to at least the inner surface of the glass body, thereby decreasing the susceptibility of the glass body to delamination. For example, the molten glass may be formed into the container shape and the temperature of the glass controlled during cooling such that the glass body is monotonically cooled from the glass melt. Monotonic cooling occurs when the temperature of the glass body is decreased from the melt to solidification without any intermediate increases in temperature. This results in less volatilization relative to processes which convert tubes into vials. This type of cooling may be facilitated using mold-forming processes such as blow molding, press-and-blow molding, blow-blow molding. In some embodiments, these techniques may be used to form a glass container with a delamination factor of 10 or less from Type I Class B glass compositions.

The glass compositions described herein are formed by mixing a batch of glass raw materials (e.g., powders of $SiO_2$, $Al_2O_3$, alkali oxides, alkaline earth oxides and the like) such that the batch of glass raw materials has the desired composition. Thereafter, the batch of glass raw materials is heated to form a molten glass composition which is subsequently cooled and solidified to form the glass composition. During solidification (i.e., when the glass composition is plastically deformable) the glass composition may be shaped using standard forming techniques to shape the glass composition into a desired final form. Alternatively, the glass composition may be shaped into a stock form, such as a sheet, tube or the like, and subsequently reheated and formed into the glass container 100.

The glass compositions described herein may be shaped into various forms such as, for example, sheets, tubes or the like. Chemically durable glass compositions are particularly well suited for use in the formation of pharmaceutical packages for containing a pharmaceutical formulation, such as liquids, powders and the like. For example, the glass compositions described herein may be used to form glass containers such as vials, ampoules, cartridges, syringe bodies and/or any other glass container for storing pharmaceutical formulations. Moreover, the ability to chemically strengthen the glass compositions through ion exchange can be utilized to improve the mechanical durability of such pharmaceutical packaging. Accordingly, it should be understood that, in at least one embodiment, the glass compositions are incorporated in a pharmaceutical package in order to improve the chemical durability and/or the mechanical durability of the pharmaceutical packaging.

Further, in some embodiments, the glass containers may be formed from glass compositions that are chemically durable and resistant to degradation as determined by the DIN 12116 standard, the ISO 695 standard, the ISO 719 standard, the ISO 720 standard, the USP <660> test and/or the European Pharmacopeia 3.2.1 test.

Specifically, the DIN 12116 standard is a measure of the resistance of the glass to decomposition when placed in an acidic solution. The DIN 12116 standard is broken into individual classes. Class S1 indicates weight losses of up to 0.7 mg/dm$^2$; Class S2 indicates weight losses from 0.7 mg/dm$^2$ up to 1.5 mg/dm$^2$; Class S3 indicates weight losses from 1.5 mg/dm$^2$ up to 15 mg/dm$^2$; and Class S4 indicates weight losses of more than 15 mg/dm$^2$. The glass compositions described herein have an acid resistance of class S3 or better according to DIN 12116 with some embodiments having an acid resistance of at least class S2 or better or even class S1. It should be understood that lower class rankings have improved acid resistance performance. Accordingly, a composition graded at S1 has better acid resistance than a composition graded at class S2.

The ISO 695 standard is a measure of the resistance of the glass to decomposition when placed in a basic solution. The ISO 695 standard is broken into individual classes. Class A1 indicates weight losses of up to 75 mg/dm$^2$; Class A2 indicates weight losses from 75 mg/dm$^2$ up to 175 mg/dm$^2$; and Class A3 indicates weight losses of more than 175 mg/dm$^2$. The glass compositions described herein have a base resistance according to ISO 695 of class A2 or better with some embodiments having a class A1 base resistance. Is should be understood that lower class rankings have improved base resistance performance. Accordingly, a composition graded at A1 has better base resistance than a composition graded at class A2.

The glass compositions from which the glass containers are formed are chemically durable and resistant to degradation as determined by the ISO 720 standard. The ISO 720 standard is a measure of the resistance of the glass to degradation in distilled water (i.e., the hydrolytic resistance of the glass). Non-ion exchanged samples of glass are assessed according to the ISO 720 protocol. Ion exchanged samples of glass are assessed with a modified ISO 720 protocol in which the glass is crushed to the grain size required in the ISO 720 standard, ion exchanged in a molten salt bath of 100% KNO$_3$ at a temperature of 450° C. for at least 5 hours to induce a compressive stress layer in the individual grains of glass, and then tested according to the ISO 720 standard. The ISO 720 standard is broken into individual types. Type HGA1 is indicative of up to 62 µg extracted equivalent of Na$_2$O; Type HGA2 is indicative of more than 62 µg and up to 527 µg extracted equivalent of Na$_2$O; and Type HGA3 is indicative of more than 527 µg and up to 930 µg extracted equivalent of Na$_2$O. The glass compositions described herein have an ISO 720 hydrolytic resistance of type HGA2 or better with some embodiments having a type HGA1 hydrolytic resistance or better. Is should be understood that lower class rankings have improved hydrolytic resistance performance. Accordingly, a composition graded at HGA1 has better hydrolytic resistance than a composition graded at HGA2.

The glass compositions from which the glass containers are formed are also chemically durable and resistant to degradation as determined by the ISO 719 standard. The ISO 719 standard is a measure of the resistance of the glass to degradation in distilled water (i.e., the hydrolytic resistance of the glass). Non-ion exchanged samples of glass are assessed according to the ISO 719 protocol. Ion exchanged samples of glass are assessed with a modified ISO 719 protocol in which the glass is crushed to the grain size required in the ISO 719 standard, ion exchanged in a molten salt bath of 100% KNO$_3$ at a temperature of 450° C. for at least 5 hours to induce a compressive stress layer in the individual grains of glass, and then tested according to the ISO 719 standard. The ISO 719 standard is broken into individual types. Type HGB1 is indicative of up to 31 µg extracted equivalent of Na$_2$O; Type HGB2 is indicative of more than 31 µg and up to 62 µg extracted equivalent of Na$_2$O; Type HGB3 is indicative of more than 62 µg and up to 264 µg extracted equivalent of Na$_2$O; Type HGB4 is indicative of more than 264 µg and up to 620 µg extracted equivalent of Na$_2$O; and Type HGB2 is indicative of more than 620 µg and up to 1085 µg extracted equivalent of Na$_2$O. The glass compositions described herein have an ISO 719 hydrolytic resistance of type HGB2 or better with some embodiments having a type HGB1 hydrolytic resistance. Is should be understood that lower class rankings have improved hydrolytic resistance performance. Accordingly, a composition graded at HGB1 has better hydrolytic resistance than a composition graded at HGB2.

With respect to the USP <660> test and/or the European Pharmacopeia 3.2.1 test, the glass containers described herein have a Type 1 chemical durability. As noted above, the USP <660> and European Pharmacopeia 3.2.1 tests are performed on intact glass containers rather than crushed grains of glass and, as such, the USP <660> and European Pharmacopeia 3.2.1 tests may be used to directly assess the chemical durability of the inner surface of the glass containers.

It should be understood that, when referring to the above referenced classifications according to ISO 719, ISO 720, ISO 695, and DIN 12116, a glass composition or glass article which has a specified classification "or better" means that the performance of the glass composition is as good as or better than the specified classification. For example, a glass article which has an ISO 719 hydrolytic resistance of "HGB2" or better may have an ISO 719 classification of either HGB2 or HGB1.

Damage Resistance

Figure 8:
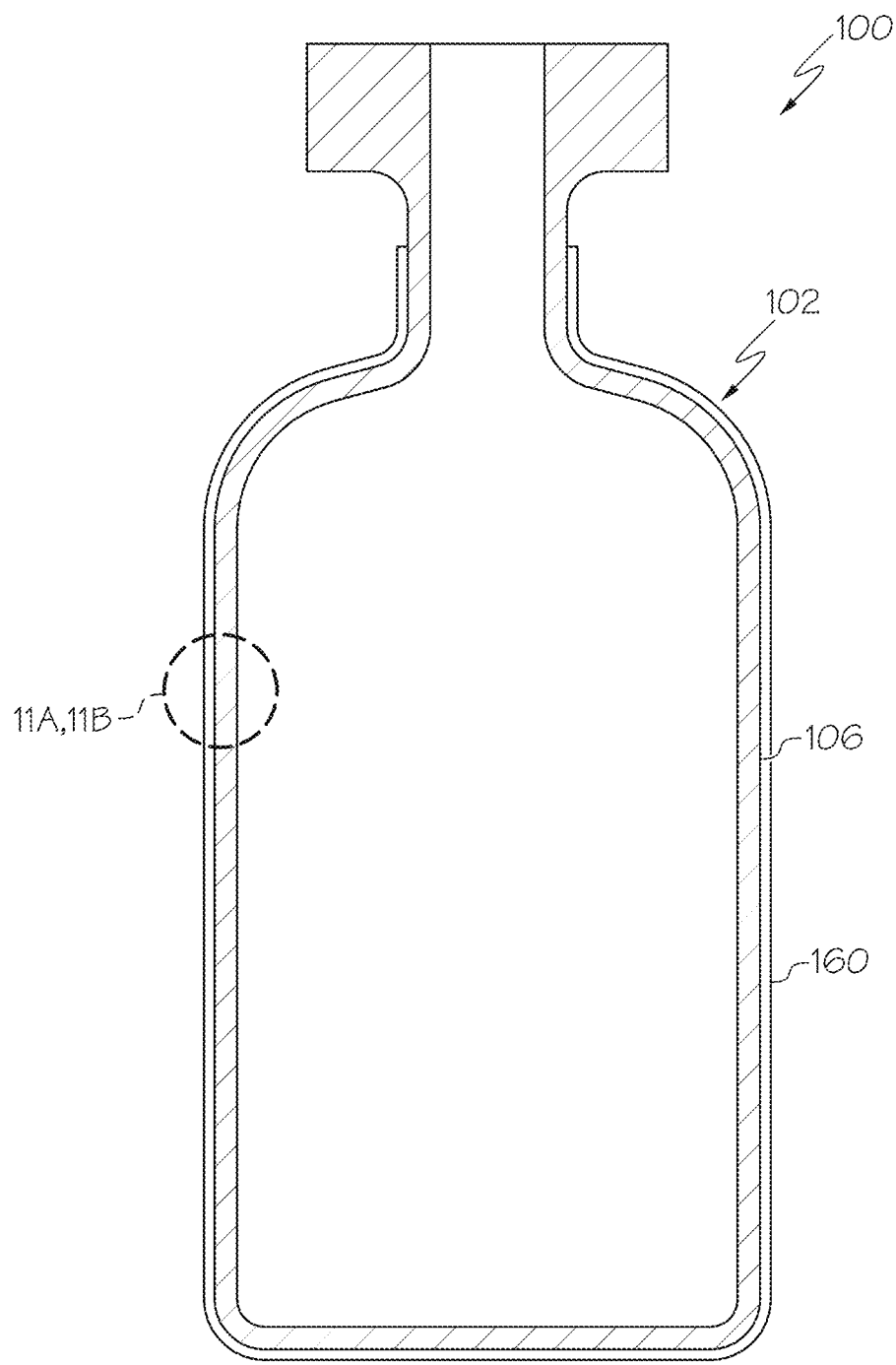
FIG. 8 schematically depicts a glass container with a lubricous coating positioned on the outer surface of the glass container.

As noted herein above, glass containers may be subject to damage, such as impact damage, scratches and/or abrasions, as the containers are processed and filled. Such damage is often caused by contact between individual glass containers or contact between the glass containers and manufacturing equipment. This damage generally decreases the mechanical strength of the container and may lead to through-cracks which can compromise the integrity of the contents of the container. Accordingly, in some embodiments described herein, the glass containers 100 further include a lubricous coating 160 positioned around at least a portion of the outer surface 106 of the body 102, as shown in FIG. 8. In some embodiments, the lubricous coating 160 may be positioned on at least the outer surface 106 of the body 102 of the glass container while, in other embodiments, one or more intermediate coatings may be positioned between the lubricous coating and the outer surface 106 of the body 102, such as when an inorganic coating is utilized to compressively stress the surface of the body 102. The lubricous coating decreases the coefficient of friction of the portion of the body 102 with the coating and, as such, decreases the occurrence of abrasions and surface damage on the outer surface 106 of the glass body 102. In essence, the coating allows the container to "slip" relative to another object (or container) thereby reducing the possibility of surface damage on the glass. Moreover, the lubricous coating 160 also cushions the body 102 of the glass container 100, thereby lessening the effect of blunt impact damage to the glass container.

The term lubricous, as used herein, means that the coating applied to the outer surface of the glass container has a lower coefficient of friction than the uncoated glass container thereby providing the glass container with an improved resistance to damage such as scuffs, abrasions or the like.

Various properties of the coated glass containers (i.e., coefficient of friction, horizontal compression strength, 4-point bend strength, transparency, colorlessness and the like) may be measured when the coated glass containers are in an as-coated condition (i.e., following application of the coating without any additional treatments) or following one or more processing treatments, such as those similar or identical to treatments performed on a pharmaceutical filling line, including, without limitation, washing, lyophilization, depyrogenation, autoclaving, or the like.

Depyrogenation is a process wherein pyrogens are removed from a substance. Depyrogenation of glass articles, such as pharmaceutical packages, can be performed by a thermal treatment applied to a sample in which the sample is heated to an elevated temperature for a period of time. For example, depyrogenation may include heating a glass container to a temperature of between about 250° C. and about 380° C. for a time period from about 30 seconds to about 72 hours, including, without limitation, 20 minutes, 30 minutes 40 minutes, 1 hour, 2 hours, 4 hours, 8 hours, 12 hours, 24 hours, 48 hours, and 72 hours. Following the thermal treatment, the glass container is cooled to room temperature. One conventional depyrogenation condition commonly employed in the pharmaceutical industry is thermal treatment at a temperature of about 250° C. for about 30 minutes. However, it is contemplated that the time of thermal treatment may be reduced if higher temperatures are utilized. The coated glass containers, as described herein, may be exposed to elevated temperatures for a period of time. The elevated temperatures and time periods of heating described herein may or may not be sufficient to depyrogenate a glass container. However, it should be understood that some of the temperatures and times of heating described herein are sufficient to dehydrogenate a coated glass container, such as the coated glass containers described herein. For example, as described herein, the coated glass containers may be exposed to temperatures of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

As used herein, lyophilization conditions (i.e., freeze drying) refer to a process in which a sample is filled with a liquid that contains protein and then frozen at −100° C., followed by water sublimation for 20 hours at −15° C. under vacuum.

As used herein, autoclave conditions refer to steam purging a sample for 10 minutes at 100° C., followed by a 20 minute dwelling period wherein the sample is exposed to a 121° C. environment, followed by 30 minutes of heat treatment at 121° C.

The coefficient of friction ($\mu$) of the portion of the coated glass container with the lubricous coating may have a lower coefficient of friction than a surface of an uncoated glass container formed from a same glass composition. A coefficient of friction ($\mu$) is a quantitative measurement of the friction between two surfaces and is a function of the mechanical and chemical properties of the first and second surfaces, including surface roughness, as well as environmental conditions such as, but not limited to, temperature and humidity. As used herein, a coefficient of friction measurement for a coated glass container 100 is reported as the coefficient of friction between the outer surface of a first glass container (having an outer diameter of between about 16.00 mm and about 17.00 mm) and the outer surface of second glass container which is identical to the first glass container, wherein the first and second glass containers have the same body and the same coating composition (when applied) and have been exposed to the same environments prior to fabrication, during fabrication, and after fabrication. Unless otherwise denoted herein, the coefficient of friction refers to the maximum coefficient of friction measured with a normal load of 30 N measured on a vial-on-vial testing jig, as described herein. However, it should be understood that a coated glass container which exhibits a maximum coefficient of friction at a specific applied load will also exhibit the same or better (i.e., lower) maximum coefficient of friction at a lesser load. For example, if a coated glass container exhibits a maximum coefficient of friction of 0.5 or lower under an applied load of 50 N, the coated glass container will also exhibit a maximum coefficient of friction of 0.5 or lower under an applied load of 25 N.

Figure 9:
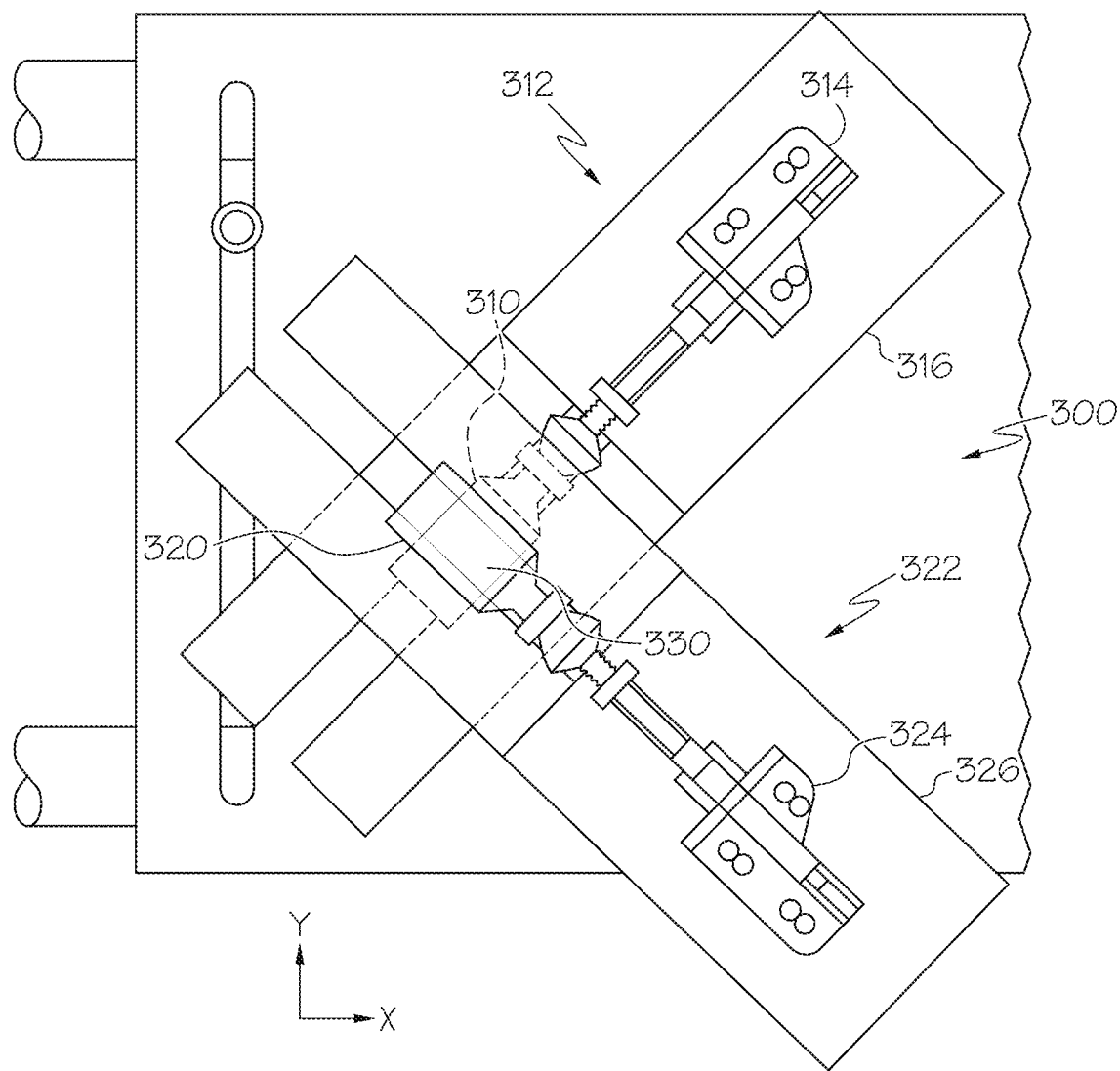
FIG. 9 schematically depicts a testing jig for determining the coefficient of friction between two glass containers.

In the embodiments described herein, the coefficient of friction of the glass containers (both coated and uncoated) is measured with a vial-on-vial testing jig. The testing jig 300 is schematically depicted in FIG. 9. The same apparatus may also be used to measure the frictive force between two glass containers positioned in the jig. The vial-on-vial testing jig 300 comprises a first clamp 312 and a second clamp 322 arranged in a cross configuration. The first clamp 312 comprises a first securing arm 314 attached to a first base 316. The first securing arm 314 attaches to the first glass container 310 and holds the first glass container 310 stationary relative to the first clamp 312. Similarly, the second clamp 322 comprises a second securing arm 324 attached to a second base 326. The second securing arm 324 attaches to the second glass container 320 and holds it stationary relative to the second clamp 322. The first glass container 310 is positioned on the first clamp 312 and the second glass container 320 is positioned of the second clamp 322 such that the long axis of the first glass container 310 and the long axis of the second glass container 320 are positioned at about a 90° angle relative to one another and on a horizontal plane defined by the x-y axis.

A first glass container 310 is positioned in contact with the second glass container 320 at a contact point 330. A normal force is applied in a direction orthogonal to the horizontal plane defined by the x-y axis. The normal force may be applied by a static weight or other force applied to the second clamp 322 upon a stationary first clamp 312. For example, a weight may be positioned on the second base 326 and the first base 316 may be placed on a stable surface, thus inducing a measurable force between the first glass container 310 and the second glass container 320 at the contact point 330. Alternatively, the force may be applied with a mechanical apparatus, such as a UMT (universal mechanical tester) machine.

The first clamp 312 or second clamp 322 may be moved relative to the other in a direction which is at a 45° angle with the long axis of the first glass container 310 and the second glass container 320. For example, the first clamp 312 may be held stationary and the second clamp 322 may be moved such that the second glass container 320 moves across the first glass container 310 in the direction of the x-axis. A similar setup is described by R. L. De Rosa et al., in "Scratch Resistant Polyimide Coatings for Alumino Silicate Glass surfaces" in The Journal of Adhesion, 78: 113-127, 2002. To measure the coefficient of friction, the force required to move the second clamp 322 and the normal force applied to first and second glass containers 310, 320 are measured with load cells and the coefficient of friction is calculated as the quotient of the frictive force and the normal force. The jig is operated in an environment of 25° C. and 50% relative humidity.

In the embodiments described herein, the portion of the coated glass container with the lubricous coating has a coefficient of friction of less than or equal to about 0.7 relative to a like-coated glass container, as determined with the vial-on-vial jig described above. In other embodiments, the coefficient of friction may be less than or equal to about 0.6, or even less than or equal to about 0.5. In some embodiments, the portion of the coated glass container with the lubricous coating has a coefficient of friction of less than or equal to about 0.4 or even less than or equal to about 0.3. Coated glass containers with coefficients of friction less than or equal to about 0.7 generally exhibit improved resistance to frictive damage and, as a result, have improved mechanical properties. For example, conventional glass containers (without a lubricous coating) may have a coefficient of friction of greater than 0.7.

In some embodiments described herein, the coefficient of friction of the portion of the coated glass container with the lubricous coating is at least 20% less than a coefficient of friction of a surface of an uncoated glass container formed from a same glass composition. For example, the coefficient of friction of the portion of the coated glass container with the lubricous coating may be at least 20% less, at least 25% less, at least 30% less, at least 40% less, or even at least 50% less than a coefficient of friction of a surface of an uncoated glass container formed from a same glass composition.

In some embodiments, the portion of the coated glass container with the lubricous coating may have a coefficient of friction of less than or equal to about 0.7 after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes (i.e., depyrogenation conditions). In other embodiments, the portion of the coated glass container with the lubricous coating may have a coefficient of friction of less than or equal to about 0.7, (i.e., less than or equal to about 0.6, less than or equal to about 0.5, less than or equal to about 0.4, or even less than or equal to about 0.3) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the lubricous coating may not increase by more than about 30% after exposure to a temperature of about 260° C. for 30 minutes. In other embodiments, coefficient of friction of the portion of the coated glass container with the lubricous coating may not increase by more than about 30% (i.e., about 25%, about 20%, about 15%, or event about 10%) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, coefficient of friction of the portion of the coated glass container with the lubricous coating may not increase by more than about 0.5 (i.e., about 0.45, about 0.04, about 0.35, about 0.3, about 0.25, about 0.2, about 0.15, about 0.1, or event about 0.5) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the lubricous coating may not increase at all after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

In some embodiments, the portion of the coated glass container with the lubricous coating may have a coefficient of friction of less than or equal to about 0.7 after being submerged in a water bath at a temperature of about 70° C. for 10 minutes. In other embodiments, the portion of the coated glass container with the lubricous coating may have a coefficient of friction of less than or equal to about 0.7, (i.e., less than or equal to about 0.6, less than or equal to about 0.5, less than or equal to about 0.4, or even less than or equal to about 0.3) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the lubricous coating may not increase by more than about 30% after being submerged in a water bath at a temperature of about 70° C. for 10 minutes. In other embodiments, coefficient of friction of the portion of the coated glass container with the lubricous coating may not increase by more than about 30% (i.e., about 25%, about 20%, about 15%, or event about 10%) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the lubricous coating may not increase at all after being submerged in a water bath at a temperature of about 70° C. for 5 minutes, 10 minutes, 20 minutes, 30 minutes, 40 minutes, 50 minutes, or even 1 hour.

In some embodiments, the portion of the coated glass container with the lubricous coating may have a coefficient of friction of less than or equal to about 0.7 after exposure to lyophilization conditions. In other embodiments, the portion of the coated glass container with the lubricous coating may have a coefficient of friction of less than or equal to about 0.7, (i.e., less than or equal to about 0.6, less than or equal to about 0.5, less than or equal to about 0.4, or even less than or equal to about 0.3) after exposure to lyophilization conditions. In some embodiments, the coefficient of friction of the portion of the coated glass container with the lubricous coating may not increase by more than about 30% after exposure to lyophilization conditions. In other embodiments, coefficient of friction of the portion of the coated glass container with the lubricous coating may not increase by more than about 30% (i.e., about 25%, about 20%, about 15%, or event about 10%) after exposure to lyophilization conditions. In some embodiments, the coefficient of friction of the portion of the coated glass container with the lubricous coating may not increase at all after exposure to lyophilization conditions.

In some embodiments, the portion of the coated glass container with the lubricous coating may have a coefficient of friction of less than or equal to about 0.7 after exposure to autoclave conditions. In other embodiments, the portion of the coated glass container with the lubricous coating may have a coefficient of friction of less than or equal to about 0.7, (i.e., less than or equal to about 0.6, less than or equal to about 0.5, less than or equal to about 0.4, or even less than or equal to about 0.3) after exposure to autoclave conditions. In some embodiments, the coefficient of friction of the portion of the coated glass container with the lubricous coating may not increase by more than about 30% after exposure to autoclave conditions. In other embodiments, coefficient of friction of the portion of the coated glass container with the lubricous coating may not increase by more than about 30% (i.e., about 25%, about 20%, about 15%, or event about 10%) after exposure to autoclave conditions. In some embodiments, the coefficient of friction of the portion of the coated glass container with the lubricous coating may not increase at all after exposure to autoclave conditions.

In some embodiments, after the glass container 100 with the lubricous coating 160 is abraded by an identical glass container with a 30 N normal force, the coefficient of friction of the abraded area of the glass container 100 does not increase by more than about 20% following another abrasion by an identical glass container with a 30 N normal force at the same spot. In other embodiments, after the glass container 100 with the lubricous coating 160 is abraded by an identical glass container with a 30 N normal force, the coefficient of friction of the abraded area of the glass container 100 does not increase by more than about 15% or even 10% following another abrasion by an identical glass container with a 30 N normal force at the same spot. However, it is not necessary that all embodiments of the glass container 100 with the lubricous coating 160 display such properties.

Figure 4:
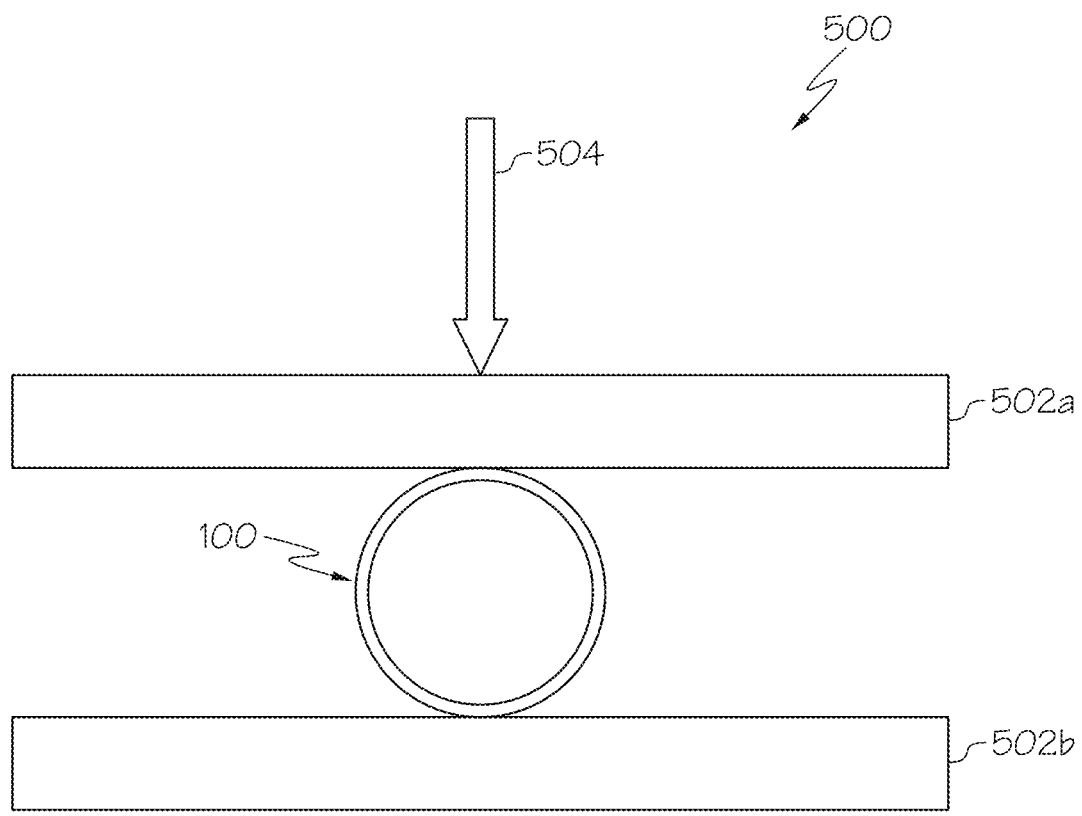
FIG. 4 schematically depicts a horizontal compression apparatus for testing the horizontal compression strength of a glass container.

The coated glass containers described herein have a horizontal compression strength. The horizontal compression strength, as described herein, is measured by a horizontal compression apparatus 500, which is schematically depicted in FIG. 4. The coated glass container 100 is tested by positioning the container horizontally between two platens 502a, 502b which are oriented in parallel to the long axis of the glass container, as shown in FIG. 4. A mechanical load 504 is then applied to the coated glass container 100 with the platens 502a, 502b in the direction perpendicular to the long axis of the glass container. The load rate for vial compression is 0.5 in/min, meaning that the platens move towards each other at a rate of 0.5 in/min. The horizontal compression strength is measured at 25° C. and 50% relative humidity. A measurement of the horizontal compression strength can be given as a failure probability at a selected normal compression load. As used herein, failure occurs when the glass container ruptures under a horizontal compression in least 50% of samples. In some embodiments, a coated glass container may have a horizontal compression strength at least 10%, 20%, or 30% greater than an uncoated vial.

Referring now to FIGS. 8 and 9, the horizontal compression strength measurement may also be performed on an abraded glass container. Specifically, operation of the testing jig 300 may create damage on the coated glass container outer surface, such as a surface scratch or abrasion that weakens the strength of the coated glass container 100. The glass container is then subjected to the horizontal compression procedure described above, wherein the container is placed between two platens with the scratch pointing outward parallel to the platens. The scratch can be characterized by the selected normal pressure applied by a vial-on-vial jig and the scratch length. Unless identified otherwise, scratches for abraded glass containers for the horizontal compression procedure are characterized by a scratch length of 20 mm created by a normal load of 30 N.

The coated glass containers can be evaluated for horizontal compression strength following a heat treatment. The heat treatment may be exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the horizontal compression strength of the coated glass container is not reduced by more than about 20%, 30%, or even 40% after being exposed to a heat treatment, such as those described above, and then being abraded, as described above. In one embodiment, the horizontal compression strength of the coated glass container is not reduced by more than about 20% after being exposed to a heat treatment of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, and then being abraded.

In some other embodiments, the glass container 100 with the lubricous coating 160 may be thermally stable at elevated temperatures. The phrase "thermally stable," as used herein, means that the lubricous coating 160 applied to the glass container remains substantially intact on the surface of the glass container after exposure to the elevated temperatures such that, after exposure, the mechanical properties of the coated glass container, specifically the coefficient of friction and the horizontal compression strength, are only minimally affected, if at all. This indicates that the lubricous coating remains adhered to the surface of the glass following elevated temperature exposure and continues to protect the glass container from mechanical insults such as abrasions, impacts and the like. The glass containers with lubricous coatings described herein may be thermally stable after heating to a temperature of at least about 250° C. or even about 260° C. for a time period of 30 minutes.

In the embodiments described herein, a glass container with a lubricous coating (i.e., the coated glass container) is considered to be thermally stable if the coated glass container meets both a coefficient of friction standard and a horizontal compression strength standard after heating to the specified temperature and remaining at that temperature for the specified time. To determine if the coefficient of friction standard is met, the coefficient of friction of a first coated glass container is determined in as-received condition (i.e., prior to any thermal exposure) using the testing jig depicted in FIG. 9 and a 30 N applied load. A second coated glass container (i.e., a glass container having the same glass composition and the same coating composition as the first coated glass container) is thermally exposed under the prescribed conditions and cooled to room temperature. Thereafter, the coefficient of friction of the second glass container is determined using the testing jig depicted in FIG. 9 to abrade the coated glass container with a 30 N applied load resulting in an abraded (i.e., a "scratch") having a length of approximately 20 mm. If the coefficient of friction of the second coated glass container is less than 0.7 and the surface of the glass of the second glass container in the abraded area does not have any observable damage, then the coefficient of friction standard is met for purposes of determining the thermal stability of the lubricous coating. The term "observable damage," as used herein means that the surface of the glass in the abraded area of the glass container has less than six glass checks per 0.5 cm of length of the abraded area when observed with a Nomarski or differential interference contrast (DIC) spectroscopy microscope at a magnification of 100× with LED or halogen light sources. A standard definition of a glass check or glass checking is described in G. D. Quinn, "NIST Recommended Practice Guide: Fractography of Ceramics and Glasses," NIST special publication 960-17 (2006).

To determine if the horizontal compression strength standard is met, a first coated glass container is abraded in the testing jig depicted in FIG. 9 under a 30 N load to form a 20 mm scratch. The first coated glass container is then subjected to a horizontal compression test, as described herein, and the retained strength of the first coated glass container is determined. A second coated glass container (i.e., a glass container having the same glass composition and the same coating composition as the first coated glass container) is thermally exposed under the prescribed conditions and cooled to room temperature. Thereafter, the second coated glass container is abraded in the testing jig depicted in FIG. 9 under a 30 N load. The second coated glass container is then subjected to a horizontal compression test, as described herein, and the retained strength of the second coated glass container is determined. If the retained strength of the second coated glass container does not decrease by more than about 20% relative to the first coated glass container then the horizontal compression strength standard is met for purposes of determining the thermal stability of the lubricous coating.

In the embodiments described herein, the coated glass containers are considered to be thermally stable if the coefficient of friction standard and the horizontal compression strength standard are met after exposing the coated glass containers to a temperature of at least about 250° C. or even about 260° C. for a time period of about 30 minutes (i.e., the coated glass containers are thermally stable at a temperature of at least about 250° C. or even about 260° C. for a time period of about 30 minutes). The thermal stability may also be assessed at temperatures from about 250° C. up to about 400° C. For example, in some embodiments, the coated glass containers will be considered to be thermally stable if the standards are met at a temperature of at least about 270° C. or even about 280° C. for a time period of about 30 minutes. In still other embodiments, the coated glass containers will be considered to be thermally stable if the standards are met at a temperature of at least about 290° C. or even about 300° C. for a time period of about 30 minutes. In further embodiments, the coated glass containers will be considered to be thermally stable if the standards are met at a temperature of at least about 310° C. or even about 320° C. for a time period of about 30 minutes. In still other embodiments, the coated glass containers will be considered to be thermally stable if the standards are met at a temperature of at least about 330° C. or even about 340° C. for a time period of about 30 minutes. In yet other embodiments, the coated glass containers will be considered to be thermally stable if the standards are met at a temperature of at least about 350° C. or even about 360° C. for a time period of about 30 minutes. In some embodiments, the coated glass containers will be considered to be thermally stable if the standards are met at a temperature of at least about 370° C. or even about 380° C. for a time period of about 30 minutes. In still other embodiments, the coated glass containers will be considered to be thermally stable if the standards are met at a temperature of at least about 390° C. or even about 400° C. for a time period of about 30 minutes.

The coated glass containers disclosed herein may also be thermally stable over a range of temperatures, meaning that the coated glass containers are thermally stable by meeting the coefficient of friction standard and horizontal compression strength standard at each temperature in the range. For example, in the embodiments described herein, the coated glass containers may be thermally stable from at least about 250° C. or even about 260° C. to a temperature of less than or equal to about 400° C. In some embodiments, the coated glass containers may be thermally stable in a range from at least about 250° C. or even about 260° C. to about 350° C. In some other embodiments, the coated glass containers may be thermally stable from at least about 280° C. to a temperature of less than or equal to about 350° C. In still other embodiments, the coated glass containers may be thermally stable from at least about 290° C. to about 340° C. In another embodiment, the coated glass container may be thermally stable at a range of temperatures of about 300° C. to about 380° C. In another embodiment, the coated glass container may be thermally stable at a range of temperatures from about 320° C. to about 360° C.

Mass loss refers to a measurable property of the coated glass container which relates to the amount of volatiles liberated from the coated glass container when the coated glass container is exposed to a selected elevated temperature for a selected period of time. Mass loss is generally indicative of the mechanical degradation of the coating due to thermal exposure. Since the glass body of the coated glass container does not exhibit measureable mass loss at the measured temperatures, the mass loss test, as described in detail herein, yields mass loss data for only the lubricous coating that is applied to the glass container. Multiple factors may affect mass loss. For example, the amount of organic material that can be removed from the coating may affect mass loss. The breakdown of carbon backbones and side chains in a polymer will result in a theoretical 100% removal of the coating. Organometallic polymer materials typically lose their entire organic component, but the inorganic component remains behind. Thus, mass loss results are normalized based upon how much of the coating is organic and inorganic (e.g., % silica of the coating) upon complete theoretical oxidation.

To determine the mass loss, a coated sample, such as a coated glass container, is initially heated to 150° C. and held at this temperature for 30 minutes to dry the coating, effectively driving off $H_2O$ from the coating. The sample is then heated from 150° C. to 350° C. at a ramp rate of 10° C./min in an oxidizing environment, such as air. For purposes of mass loss determination, only the data collected from 150° C. to 350° C. is considered. In some embodiments, the lubricous coating has a mass loss of less than about 5% of its mass when heated from a temperature of 150° C. to 350° C. at a ramp rate of about 10° C./minute. In other embodiments, the lubricous coating has a mass loss of less than about 3% or even less than about 2% when heated from a temperature of 150° C. to 350° C. at a ramp rate of about 10° C./minute. In some other embodiments, the lubricous coating has a mass loss of less than about 1.5% when heated from a temperature of 150° C. to 350° C. at a ramp rate of about 10° C./minute. In some other embodiments, the lubricous coating has a mass loss of less than about 0.75% when heated from a temperature of 150° C. to 350° C. at a ramp rate of about 10° C./minute. In some other embodiments, the lubricous coating loses substantially none of its mass when heated from a temperature of 150° C. to 350° C. at a ramp rate of about 10° C./minute.

Mass loss results are based on a procedure wherein the weight of a coated glass container is compared before and after a heat treatment, such as a ramping temperature of 10°/minute from 150° C. to 350° C., as described herein. The difference in weight between the pre-heat treatment and post-heat treatment vial is the weight loss of the coating, which can be standardized as a percent weight loss of the coating such that the pre-heat treatment weight of the coating (weight not including the glass body of the container and following the preliminary heating step) is known by comparing the weight on an uncoated glass container with a pre-treatment coated glass container. Alternatively, the total mass of coating may be determined by a total organic carbon test or other like means.

Figure 10:
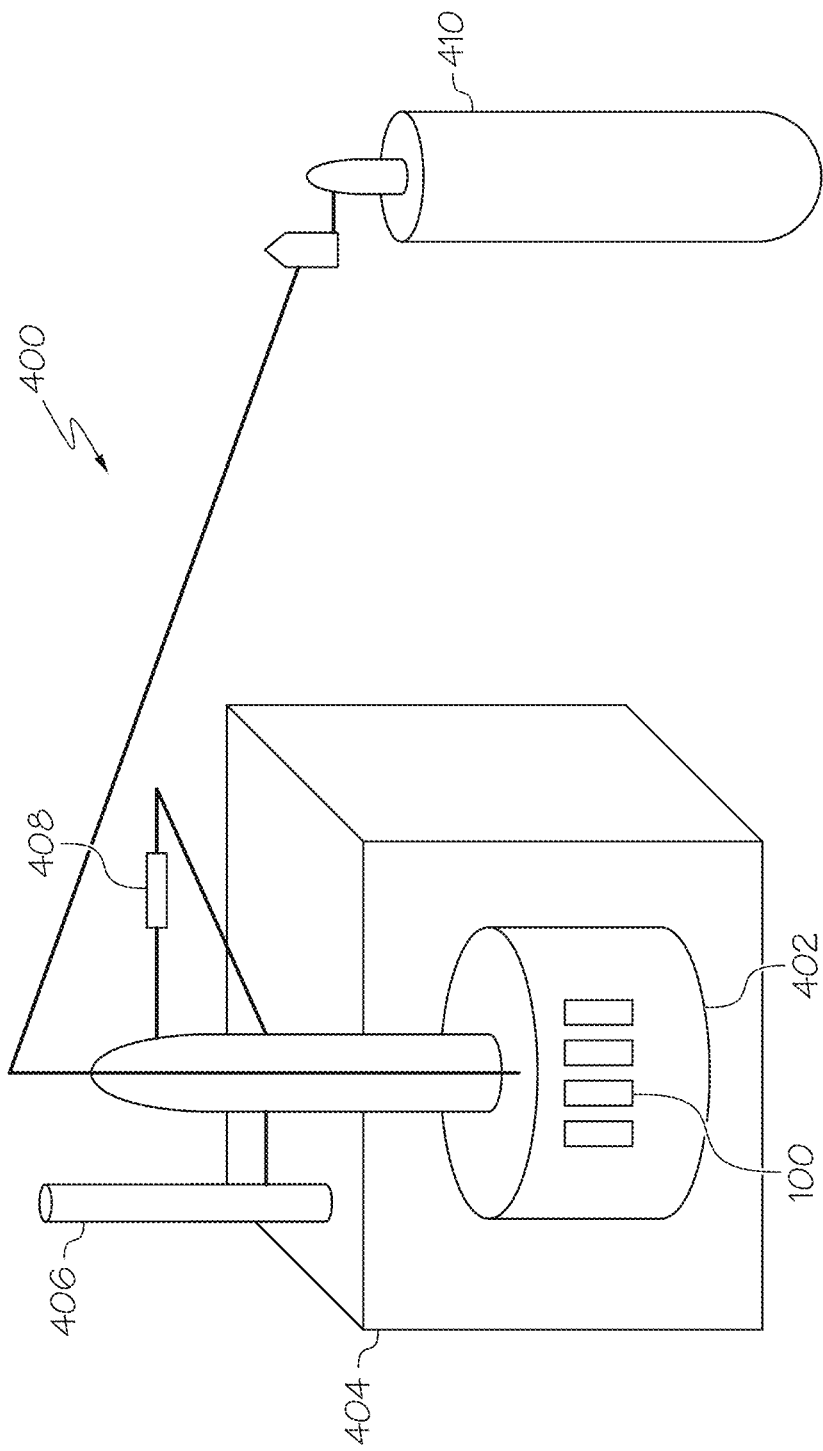
FIG. 10 schematically depicts an apparatus for assessing the thermal stability of a coating applied to a glass container.

Referring now to FIG. 10, outgassing refers to a measurable property of the coated glass container 100 which relates to the amount of volatiles liberated from the coated glass container 100 when the coated glass container is exposed to a selected elevated temperature for a selected period of time. Outgassing measurements are reported herein as an amount by weight of volatiles liberated per the surface area of the glass container having the coating during exposure to the elevated temperature for a time period. Since the glass body of the coated glass container does not exhibit measureable outgassing at the temperatures reported for outgassing, the outgassing test, as described in detail above, yields outgassing data for substantially only the lubricous coating that is applied to the glass container. Outgassing results are based on a procedure wherein a coated glass container 100 is placed in a glass sample chamber 402 of the apparatus 400 depicted in FIG. 10. A background sample of the empty sample chamber is collected prior to each sample run. The sample chamber is held under a constant 100 ml/min air purge as measured by rotometer 406 while the furnace 404 is heated to 350° C. and held at that temperature for 1 hour to collect the chamber background sample. Thereafter, the coated glass container 100 is positioned in the sample chamber 402 and the sample chamber is held under a constant 100 ml/min air purge and heated to an elevated temperature and held at temperature for a period of time to collect a sample from a coated glass container 100. The glass sample chamber 402 is made of Pyrex, limiting the maximum temperature of the analysis to 600° C. A Carbotrap 300 adsorbent trap 408 is assembled on the exhaust port of the sample chamber to adsorb the resulting volatile species as they are released from the sample and are swept over the absorbent resin by the air purge gas 410 where the volatile species are adsorbed. The absorbent resin is then placed directly into a Gerstel Thermal Desorption unit coupled directly to a Hewlett Packard 5890 Series II gas chromatograph/Hewlett Packard 5989 MS engine. Outgassing species are thermally desorbed at 350° C. from the adsorbent resin and cryogenically focused at the head of a non-polar gas chromatographic column (DB-5MS). The temperature within the gas chromatograph is increased at a rate of 10° C./min to a final temperature of 325° C., so as to provide for the separation and purification of volatile and semi-volatile organic species. The mechanism of separation has been demonstrated to be based on the heats of vaporization of different organic species resulting in, essentially, a boiling point or distillation chromatogram. Following separation, purified species are analyzed by traditional electron impact ionization mass spectrometric protocols. By operating under standardized conditions, the resulting mass spectra may be compared with existing mass spectral libraries.

In some embodiments, the coated glass containers described herein exhibit an outgassing of less than or equal to about 54.6 ng/cm$^2$, less than or equal to about 27.3 ng/cm$^2$, or even less than or equal to about 5.5 ng/cm$^2$ during exposure to elevated temperature of about, 250° C., about 275° C., about 300° C., about 320° C., about 360° C., or even about 400° C. for time periods of about 15 minutes, about 30 minutes, about 45 minutes, or about 1 hour. Furthermore, the coated glass containers may be thermally stable in a specified range of temperatures, meaning that the coated containers exhibit a certain outgassing, as described above, at every temperature within the specified range. Prior to outgassing measurements, the coated glass containers may be in as-coated condition (i.e., immediately following application of the lubricous coating) or following any one of depyrogenation, lyophilization, or autoclaving. In some embodiments, the coated glass container 100 may exhibit substantially no outgassing.

In some embodiments, outgassing data may be used to determine mass loss of the lubricous coating. A pre-heat treatment coating mass can be determined by the thickness of the coating (determined by SEM image or other manner), the density of the lubricous coating, and the surface area of the lubricous coating. Thereafter, the coated glass container can be subjected to the outgassing procedure, and mass loss can be determined by finding the ratio of the mass expelled in outgassing to the pre-heat treatment mass.

The coated glass containers described herein have a four point bend strength. To measure the four point bend strength of a glass container, a glass tube that is the precursor to the coated glass container 100 is utilized for the measurement. The glass tube has a diameter that is the same as the glass container but does not include a glass container base or a glass container mouth (i.e., prior to forming the tube into a glass container). The glass tube is then subjected to a four point bend stress test to induce mechanical failure. The test is performed at 50% relative humidity with outer contact members spaced apart by 9" and inner contact members spaced apart by 3" at a loading rate of 10 mm/min.

The four point bend stress measurement may also be performed on a coated and abraded tube. Operation of the testing jig 300 may create an abrasion on the tube surface such as a surface scratch that weakens the strength of the tube, as described in the measurement of the horizontal compression strength of an abraded vial. The glass tube is then subjected to a four point bend stress test to induce mechanical failure. The test is performed at 25° C. and at 50% relative humidity using outer probes spaced apart by 9" and inner contact members spaced apart by 3" at a loading rate of 10 mm/min, while the tube is positioned such that the scratch is put under tension during the test.

In some embodiments, the four point bend strength of a glass tube with a lubricous coating after abrasion shows on average at least 10%, 20%, or even 50% higher mechanical strength than that for an uncoated glass tube abraded under the same conditions.

Figure 11:
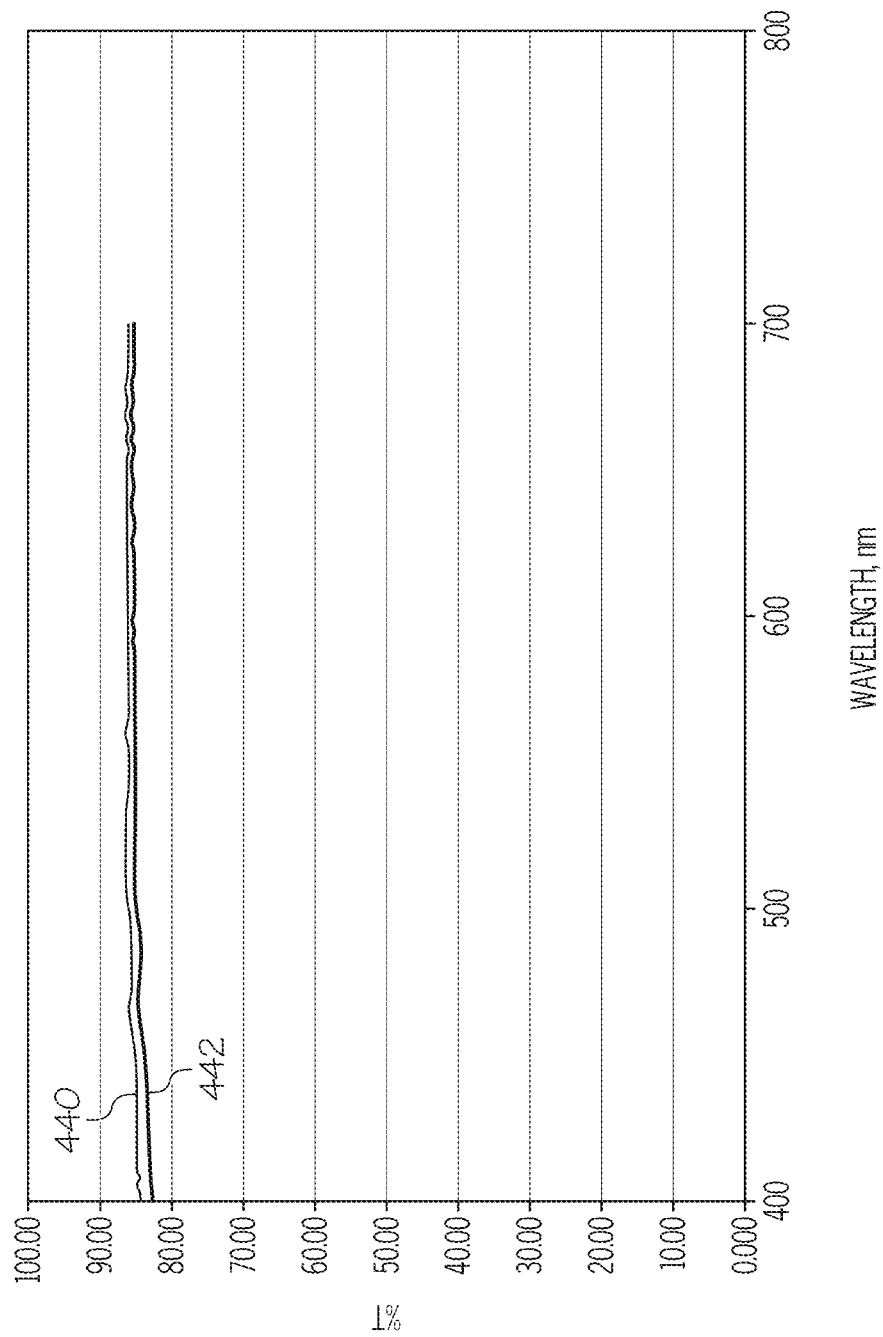
FIG. 11 graphically depicts the light transmittance data for coated and uncoated vials measured in the visible light spectrum from 400-700 nm, according to one or more embodiments shown and described herein.

Referring to FIG. 11 the transparency and color of the coated container may be assessed by measuring the light transmission of the container within a range of wavelengths between 400-700 nm using a spectrophotometer. The measurements are performed by directing a light beam onto the container normal to the container wall such that the beam passes through the lubricous coating twice, first when entering the container and then when exiting it. In some embodiments, the light transmission through the coated glass container may be greater than or equal to about 55% of a light transmission through an uncoated glass container for wavelengths from about 400 nm to about 700 nm. As described herein, a light transmission can be measured before a thermal treatment or after a thermal treatment, such as the heat treatments described herein. For example, for each wavelength of from about 400 nm to about 700 nm, the light transmission may be greater than or equal to about 55% of a light transmission through an uncoated glass container. In other embodiments, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

As described herein, a light transmission can be measured before an environmental treatment, such as a thermal treatment described herein, or after an environmental treatment. For example, following a heat treatment of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, or after exposure to lyophilization conditions, or after exposure to autoclave conditions, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm In some embodiments, the coated glass container 100 may be perceived as colorless and transparent to the naked human eye when viewed at any angle. In some other embodiments, the lubricous coating 160 may have a perceptible tint, such as when the lubricous coating 160 comprises a polyimide formed from poly(pyromellitic dianhydride-co-4,4'-oxydianiline) amic acid commercially available from Aldrich.

In some embodiments, the glass container 100 with the lubricous coating 160 may have an outer surface that is capable of receiving an adhesive label. That is, while the lubricous coating 160 has a low coefficient of friction, the coating is still able to receive an adhesive label such that the adhesive label is securely attached. However, the ability of attachment of an adhesive label is not a requirement for all embodiments of the glass container 100 with the lubricous coating 160 described herein.

Referring again to FIG. 8, in some embodiments, the lubricous coating 160 may be a transient coating. The phrase "transient coating," as used herein, means that the coating is not permanently adhered to the glass container 100 and may be removed from the glass container 100 such as by washing, heating (i.e., pyrolization) or the like. For example, in embodiments where the lubricous coating 160 is a transient coating which may be removed by pyrolysis, the coating may pyrolize at temperatures less than or equal to about 300° C. Alternatively, the lubricous coating 160 may be a transient coating that may be removed by washing the glass container with a solution of detergent and water.

In the embodiments described herein, the glass container may be coated with inorganic coatings, transient organic coatings, and/or tenacious organic coatings in order to achieve the desired low coefficient of friction and resistance to damage.

Inorganic Coating

Still referring to FIG. 8, in some embodiments described herein, the lubricous coating 160 is an inorganic coating. The inorganic coating may be a tenacious inorganic coating which is permanently adhered to the outer surface 106 of the body 102 of the glass container. The properties of the tenacious inorganic coating are not degraded by exposure to elevated temperatures and, as such, the coefficient of friction and horizontal compression strength of the glass container with the tenacious inorganic coating are substantially the same before and after exposure to elevated temperatures including, without limitation, temperatures in the range from about 250° C. to about 400° C. The tenacious inorganic coating is a continuous coating applied to at least a portion of the outer surface of the body and is generally insoluble in water and/or organic solvents. For example, in some embodiments, the tenacious inorganic coating may comprise a metal nitride coating, a metal sulfide coating, a metal oxide coating, $SiO_2$, diamond-like carbon, or a carbide coating. For example, the tenacious inorganic coating may include at least one of TiN, BN, hBN, $TiO_2$, $Ta_2O_5$, $HfO_2$, $Nb_2O_5$, $V_2O_5$, SnO, $SnO_2$, $ZrO_2$, $Al_2O_3$, $SiO_2$, ZnO, $MoS_2$, BC, SiC, or similar metal oxide, metal nitride and carbide coatings which exhibit a relatively low coefficient of friction relative to a like-coated glass container as well as having relatively high thermal stabilities. In these embodiments, the coatings may be applied to the outer surface of the glass container by physical vapor deposition methods such as evaporation, electron beam evaporation, dc magnetron sputtering, unbalanced dc magnetron sputtering, ac magnetron sputtering, and unbalanced ac magnetron sputtering. Alternatively, the coatings may be applied by powder coating. Chemical vapor deposition (CVD) techniques may also be used to apply the coatings including ultrahigh vacuum CVD, low pressure CVD, atmospheric pressure CVD, metal-organic CVD, laser CVD, photochemical CVD, aerosol assisted CVD, microwave plasma assisted CVD, plasma-enhanced CVD, direct liquid injection CVD, atomic layer CVD, combustion CVD, Hot wire CVD, rapid thermal CVD, chemical vapor infiltration, and chemical beam epitaxy.

In one particular embodiment, the tenacious inorganic coating is diamond-like carbon. Films or coatings formed from diamond-like carbon generally exhibit a low coefficient of friction and high hardness. Specifically, a significant amount of the carbon in DLC coatings is SP3 hybridized carbon. This material imparts some properties of a diamond to these coatings, as high hardness and superior wear resistance. The hardness of the DLC coatings is directly proportional to the content of SP3 hybridized content. The DLC coatings may be deposited on the outer surface of the glass container by ion beam deposition, cathodic arc spray, pulsed laser ablation, argon ion sputtering, and plasma-enhanced chemical vapor deposition. Depending on the thickness of the deposited DLC coating, the specific method of deposition, and the composition of the coating, the color of the deposited layer can vary from optically transparent yellow (i.e., a 0.1 μm thick film of DLC may be optically transparent with a slight yellow cast) to amber and black.

Alternatively, the lubricous coating 160 may be an inorganic coating which is temporarily affixed to the outer surface of the glass container, such as a transient coating. In these embodiments, the transient coating may include an inorganic salt such as $MgSO_4$, $CaSO_4$, $Ca_3(PO_4)_2$, $Mg_3(PO_4)_2$, $KNO_3$, $K_3PO_4$ or the like.

Organic Coatings

In some alternative embodiments, the lubricous coating 160 may be an organic coating, such as a transient coating temporarily affixed to the outer surface of the glass container or a tenacious organic coating which is permanently affixed to the outer surface of the glass container.

With respect to the organic transient coatings, it is desirable to protect the surfaces of glass articles (such as glass container or the like) from damage during manufacture in order to mitigate the reduction in the mechanical strength of the glass due to surface flaws caused by contact with the glass. This is generally achieved by applying a coating having a low coefficient of friction, as described above. However, because the glass container may be subject to further processing, the coating does not need to be permanently adhered to the outer surface of the glass container and, instead, may be removed in downstream processing steps after the coating has served its purpose of protecting the glass article. For example, the transient coating may be removed by pyrolysis. In the embodiments described herein, the transient coating may be pyrolyzed at temperatures less than or equal to 300° C. in a time period of less than or equal to 1 hour. Alternatively, the transient coating may be pyrolyzed at temperatures of 265° C. for 2.5 hours or even at 360° C. for 10 minutes or less.

Various organic materials may be utilized to form the transient coating. For example, in some embodiments, the transient coating may comprise, for example, a mixture of polyoxyethylene glycol, methacrylate resin, melamine formaldehyde resin, and polyvinyl alcohol as disclosed in U.S. Pat. No. 3,577,256. Such a coating may be applied to the outer surface of the glass container after formation and may be pyrolyzed from the glass surface in the annealing lehr.

In another embodiment, the transient organic coating may comprise one or more polysaccharides, as disclosed in U.S. Pat. No. 6,715,316B2 which describes removable protective coatings. Such coatings can be removed from the glass surface using a mild, water-based detergent, such as, for example 2% Semiclean KG in water.

In another embodiment, the transient organic coating may be a "cold-end" coating as described in U.S. Pat. No. 4,055,441 or similar coatings. Such coatings may be formed from at least one of poly(ethylene oxides), poly (propylene oxides), ethylene oxide-propylene oxide copolymers, polyvinyl-pyrolidinones, polyethyleneimines, poly(methyl vinyl ethers), polyacrylamides, polymethacrylamides, polyurethanes, poly(vinylacetates), polyvinyl formal, polyformaldehydes including polyacetals and acetal copolymers, poly (alkyl methacrylates), methyl celluloses, ethyl celluloses, hydroxyethyl celluloses, hydroxypropyl celluloses, sodium carboxymethyl celluloses, methyl hydroxypropyl celluloses, poly (acrylic acids) and salts thereof, poly(methacrylic acids) and salts thereof, ethylene-maleic anhydride copolymers, ethylene-vinyl alcohol copolymers, ethylene-acrylic acid copolymers, vinyl acetate-vinyl alcohol copolymers, methyl vinyl ether-maleic anhydride copolymers, emulsifiable polyurethanes, polyoxyethylene stearates, and polyolefins including polyethylenes, polypropylenes and copolymers thereof, starches and modified starches, hydrocolloids, polyacryloamide, vegetable and animal fats, wax, tallow, soap, stearine-paraffin emulsions, polysiloxanes of dimethyl or diphenyl or methyl/phenyl mixtures, perfluorinated siloxanes and other substituted siloxanes, alkylsilanes, aromatic silanes, and oxidized polyethylene, combinations thereof, or similar coatings.

The transient organic coatings may be applied by contacting such a coating directly with the glass container. For example, the coating may be applied by a submersion process, or alternatively, by a spray or other suitable means. The coating may then be dried, and, optionally, cured at high temperatures.

Figure 12A:
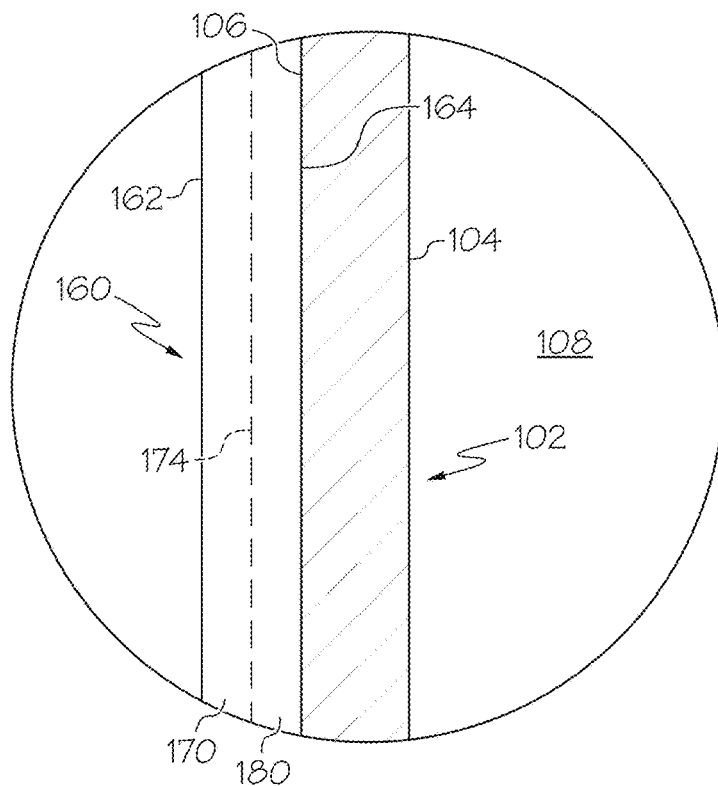
FIG. 12A schematically depicts a tenacious organic lubricous coating positioned on the outer surface of a glass container according to one or more embodiments shown and described herein.

Referring now to FIGS. 8 and 12A, in some embodiments, the lubricous coating 160 is a tenacious organic coating adhered to at least a portion of the outer surface 106 of the glass body 102. The tenacious organic coating has a low coefficient of friction and is also thermally stable at elevated temperatures, as described above. The lubricous coating 160 has an outer surface 162 and a glass contacting surface 164. In embodiments where the lubricous coating 160 is a tenacious organic coating, the lubricous coating 160 may comprise a coupling agent layer 180 that is in direct contact with the outer surface 106 of the glass body 102 and a polymer layer 170 that is in direct contact with the coupling agent layer 180. However, it should be understood that, in some embodiments, the lubricous coating 160 may not include a coupling agent layer 180 and the polymer layer 170 may be in direct contact with the outer surface 106 of the glass body 102. In some embodiments, the lubricous coating 160 is a coating layer as described in U.S. Provisional application Ser. No. 13/780,754 filed Feb. 28, 2013 and entitled "Glass Articles with Low Friction Coatings", the entirety of which is incorporated herein by reference.

Now referring to FIGS. 8 and 12A, in one embodiment, the lubricous coating 160 comprises a bi-layered structure. FIG. 12A shows a cross section of a portion of a coated glass container where the lubricous coating 160 comprises a polymer layer 170 and a coupling agent layer 180. A polymer chemical composition may be contained in polymer layer 170 and a coupling agent may be contained in a coupling agent layer 180. The coupling agent layer 180 may be in direct contact with the outer surface 106 of the glass body 102. The polymer layer 170 may be in direct contact with the coupling agent layer 180 and may form the outer surface 162 of the lubricous coating 160. In some embodiments the coupling agent layer 180 is bonded to the outer surface 106 of the glass body 102 and the polymer layer 170 is bonded to the coupling agent layer 180 at an interface 174. However, it should be understood that, in some embodiments, the lubricous coating 160 may not include a coupling agent, and the polymer chemical composition may be disposed in a polymer layer 170 in direct contact with the outer surface 106 of the of the glass body 102. In another embodiment, the polymer chemical composition and coupling agent may be substantially mixed in a single layer. In some other embodiments, the polymer layer 170 may be positioned over the coupling agent layer 180, meaning that the polymer layer 170 is in an outer layer relative to the coupling agent layer 180, and the outer surface 106 of the glass body 102. As used herein, a first layer positioned "over" a second layer means that the first layer could be in direct contact with the second layer or separated from the second layer, such as with a third layer disposed between the first and second layers.

Figure 12B:
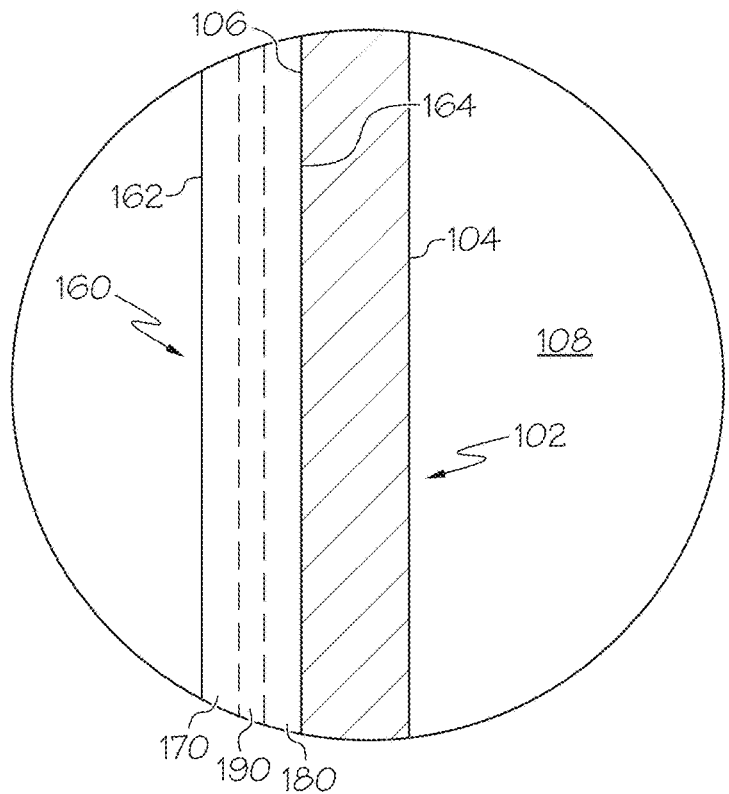
FIG. 12B schematically depicts a tenacious organic lubricous coating positioned on the outer surface of a glass container according to one or more embodiments shown and described herein.

Referring now to FIG. 12B, in one embodiment, the lubricous coating 160 may further comprise an interface layer 190 positioned between the coupling agent layer 180 and the polymer layer 170. The interface layer 190 may comprise one or more chemical compositions of the polymer layer 170 bound with one or more of the chemical compositions of the coupling agent layer 180. In this embodiment, the interface of the coupling agent layer 180 and polymer layer 170 forms an interface layer 190 where bonding occurs between the polymer chemical composition and the coupling agent. However, it should be understood that in some embodiments, there may be no appreciable layer at the interface of the coupling agent layer 180 and polymer layer 170 where the polymer and coupling agent are chemically bound to one another as described above with reference to FIG. 12A.

In another embodiment, the polymer chemical composition and coupling agent may be substantially mixed in a single layer, forming a homogenous layer of lubricous coating. Such a mixed single layer may be in direct contact with the outer surface 106 of the glass body 102. As described herein, the materials of the polymer layer 170 and coupling agent layer 180 (i.e., at least a polymer and at least a coupling agent, respectively) may be mixed to form at least one layer of a lubricous coating 160. The mixed-layer lubricous coating 160 may additionally comprise materials other than a polymer chemical composition and a coupling agent. To form the mixed layer lubricous coating 160, the various materials of such a layer may be mixed together in solution prior to the application of the lubricous coating 160 onto the glass container 100. In other embodiments, mixed layers may be over or under non-mixed layers, such as, for example, a mixed layer of polymer and coupling agent under a layer of substantially only polymer material. In other embodiments, the lubricous coating may comprise more than two layers, such as three or four layers.

The lubricous coating 160 applied to the outer surface 106 of the glass body 102 may have a thickness of less than about 100 μm or even less than or equal to about 1 μm. In some embodiments, the thickness of the lubricous coating 160 may be less than or equal to about 100 nm thick. In other embodiments, the lubricous coating 160 may be less than about 90 nm thick, less than about 80 nm thick, less than about 70 nm thick, less than about 60 nm thick, less than about 50 nm, or even less than about 25 nm thick. In some embodiments, the lubricous coating 160 may not be of uniform thickness over the entirety of the glass body 102. For example, the coated glass container 100 may have a thicker lubricous coating 160 in some areas, due to the process of contacting the outer surface 106 of the glass body 102 with one or more coating solutions that form the lubricous coating 160. In some embodiments, the lubricous coating 160 may have a non-uniform thickness. For example, the coating thickness may be varied over different regions of a coated glass container 100, which may promote protection in a selected region. In another embodiment, only selected portions of the outer surface 106 of the glass body are coated with a lubricous coating 160.

In embodiments which include at least two layers, such as a polymer layer 170, interface layer 190, and/or coupling agent layer 180, each layer may have a thickness of less than about 100 μm or even less than or equal to about 1 μm. In some embodiments, the thickness of each layer may be less than or equal to about 100 nm. In other embodiments, each layer may be less than about 90 nm thick, less than about 80 nm thick, less than about 70 nm thick, less than about 60 nm thick, less than about 50 nm, or even less than about 25 nm thick.

As noted herein, in some embodiments, the lubricous coating 160 comprises a coupling agent. The coupling agent may improve the adhesion or bonding of the polymer chemical composition to the outer surface 106 of the glass body 102, and is generally disposed between the glass body 102 and the polymer chemical composition in a polymer chemical composition layer 170, or mixed with the polymer chemical composition. Adhesion, as used herein, refers to the strength of adherence or bonding of the polymer layer prior to and following a treatment applied to the coated glass container, such as a thermal treatment. Thermal treatments include, without limitation, autoclaving, depyrogenation, lyophilization, or the like.

In one embodiment, the coupling agent may comprise at least one silane chemical composition. As used herein, a "silane" chemical composition is any chemical composition comprising a silane moiety, including functional organosilanes, as well as silanols formed from silanes in aqueous solutions. The silane chemical compositions of the coupling agent may be aromatic or aliphatic. In some embodiments, the at least one silane chemical composition may comprise an amine moiety, such as a primary amine moiety or a secondary amine moiety. Furthermore, the coupling agent may comprise hydrolysates and/or oligomers of such silanes, such as one or more silsesquioxane chemical compositions that are formed from the one or more silane chemical compositions. The silsesquioxane chemical compositions may comprise a full cage structure, partial cage structure, or no cage structure.

The coupling agent may comprise any number of different chemical compositions, such as one chemical composition, two different chemical compositions, or more than two different chemical compositions including oligomers formed from more than one monomeric chemical composition. In one embodiment, the coupling agent may comprise at least one of (1) a first silane chemical composition, hydrolysate thereof, or oligomer thereof, and (2) a chemical composition formed from the oligomerization of at least the first silane chemical composition and a second silane chemical composition. In another embodiment, the coupling agent comprises a first and second silane. As used herein, a "first" silane chemical composition and a "second" silane chemical composition are silanes having different chemical compositions. The first silane chemical composition may be an aromatic or an aliphatic chemical composition, may optionally comprise an amine moiety, and may optionally be an alkoxysilane. Similarly, the second silane chemical composition may be an aromatic or an aliphatic chemical composition, may optionally comprise an amine moiety, and may optionally be an alkoxysilane.

For example, in one embodiment, only one silane chemical composition is applied as the coupling agent. In such an embodiment, the coupling agent may comprise a silane chemical composition, hydrolysate thereof, or oligomer thereof.

In another embodiment, multiple silane chemical compositions may be applied as the coupling agent. In such an embodiment, the coupling agent may comprise at least one of (1) a mixture of the first silane chemical composition and a second silane chemical composition, and (2) a chemical composition formed from the oligomerization of at least the first silane chemical composition and the second silane chemical composition.

Referring to the embodiments described above, the first silane chemical composition, second silane chemical composition, or both, may be aromatic chemical compositions. As used herein, an aromatic chemical composition contains one or more six-carbon rings characteristic of the benzene series and related organic moieties. The aromatic silane chemical composition may be an alkoxysilane such as, but not limited to, a dialkoxysilane chemical composition, hydrolysate thereof, or oligomer thereof, or a trialkoxysilane chemical composition, hydrolysate thereof, or oligomer thereof. In some embodiments, the aromatic silane may comprise an amine moiety, and may be an alkoxysilane comprising an amine moiety. In another embodiment, the aromatic silane chemical composition may be an aromatic alkoxysilane chemical composition, an aromatic acyloxysilane chemical composition, an aromatic halogen silane chemical composition, or an aromatic aminosilane chemical composition. In another embodiment, the aromatic silane chemical composition may be selected from the group consisting of aminophenyl, 3-(m-aminophenoxy) propyl, N-phenylaminopropyl, or (chloromethy) phenyl substituted alkoxy, acyloxy, halogen, or amino silanes. For example, the aromatic alkoxysilane may be, but is not limited to, aminophenyltrimethoxy silane (sometimes referred to herein as "APhTMS"), aminophenyldimethoxy silane, aminophenyltriethoxy silane, aminophenyldiethoxy silane, 3-(m-aminophenoxy) propyltrimethoxy silane, 3-(m-aminophenoxy) propyldimethoxy silane, 3-(m-aminophenoxy) propyltriethoxy silane, 3-(m-aminophenoxy) propyldiethoxy silane, N-phenylaminopropyltrimethoxysilane, N-phenylaminopropyldimethoxysilane, N-phenylaminopropyltriethoxysilane, N-phenylaminopropyldiethoxysilane, hydrolysates thereof, or oligomerized chemical composition thereof. In an exemplary embodiment, the aromatic silane chemical composition may be aminophenyltrimethoxy silane.

Referring again to the embodiments described above, the first silane chemical composition, second silane chemical composition, or both, may be aliphatic chemical compositions. As used herein, an aliphatic chemical composition is non-aromatic, such as a chemical composition having an open chain structure, such as, but not limited to, alkanes, alkenes, and alkynes. For example, in some embodiments, the coupling agent may comprise a chemical composition that is an alkoxysilane and may be an aliphatic alkoxysilane such as, but not limited to, a dialkoxysilane chemical composition, a hydrolysate thereof, or an oligomer thereof, or a trialkoxysilane chemical composition, a hydrolysate thereof, or an oligomer thereof. In some embodiments, the aliphatic silane may comprise an amine moiety, and may be an alkoxysilane comprising an amine moiety, such as an aminoalkyltrialkoxysilane. In one embodiment, an aliphatic silane chemical composition may be selected from the group consisting of 3-aminopropyl, N-(2-aminoethyl)-3-aminopropyl, vinyl, methyl, N-phenylaminopropyl, (N-phenylamino)methyl, N-(2-vinylbenzylaminoethyl)-3-aminopropyl substituted alkoxy, acyloxy, halogen, or amino silanes, hydrolysates thereof, or oligomers thereof. Aminoalkyltrialkoxysilanes, include, but are not limited to, 3-aminopropyltrimethoxy silane (sometimes referred to herein as "GAPS"), 3-aminopropyldimethoxy silane, 3-aminopropyltriethoxy silane, 3-aminopropyldiethoxy silane, N-(2-aminoethyl)-3-aminopropyltrimethoxysilane, N-(2-aminoethyl)-3-aminopropyldimethoxysilane, N-(2-aminoethyl)-3-aminopropyltriethoxysilane, N-(2-aminoethyl)-3-aminopropyldiethoxysilane, hydrolysates thereof, and oligomerized chemical composition thereof. In other embodiments, the aliphatic alkoxysilane chemical composition may not contain an amine moiety, such as an alkyltrialkoxysilane or alkylbialkoxysilane. Such alkyltrialkoxysilanes or alkylbialkoxysilanes include, but are not limited to, vinyltrimethoxy silane, vinyldimethoxy silane, vinyltriethoxy silane, vinyldiethoxy silane, methyltrimethoxysilane, methyldimethoxysilane, methyltriethoxysilane, methyldiethoxysilane, hydrolysates thereof, or oligomerized chemical composition thereof including amino functional silsesquioxane oligomers such as, but not limited to, WSA-7011, WSA-9911, WSA-7021, WSAV-6511 manufactured by Gelest. In an exemplary embodiment, the aliphatic silane chemical composition is 3-aminopropyltrimethoxy silane.

In another embodiment, the coupling agent layer 180 may comprise chemical species that are hydrolyzed analogs of aminoalkoxysilanes such as, but not limited to, (3-aminopropyl)silanetriol, N-(2-aminoethyl)-3-aminopropyl-silanetriol and/or mixtures thereof.

In another embodiment, the coupling agent layer 180 may comprise a chemical species that is an aminoalkylsilsesquioxane. In one embodiment the coupling agent layer 180 comprises aminopropylsilsesquioxane (APS) oligomer (commercially available as an aqueous solution from Gelest).

In another embodiment, the coupling agent layer 180 may be an inorganic material, such as metal and/or ceramic film. Non-limiting examples of suitable inorganic materials used as the coupling agent layer 180 include tin, titanium, and/or oxides thereof.

It has been found that forming the coupling agent from combinations of different chemical compositions, particularly combinations of silane chemical compositions, may improve the thermal stability of the lubricous coating 160. For example, it has been found that combinations of aromatic silanes and aliphatic silanes, such as those described above, improve the thermal stability of the lubricous coating, thereby producing a coating which retains its the mechanical properties, such as coefficient of friction and adhesion performance following a heat treatment at elevated temperatures. Accordingly, in one embodiment the coupling agent comprises a combination of aromatic and aliphatic silanes. In these embodiments, the ratio of aliphatic silanes to aromatic silanes (aliphatic:aromatic) may be from about 1:3 to about 1:0.2. If the coupling agent comprises two or more chemical composition, such as at least an aliphatic silane and an aromatic silane, the ratio by weight of the two chemical compositions may be any ratio, such as a weight ratio of a first silane chemical composition to a second silane chemical composition (first silane:second silane) of about 0.1:1 to about 10:1. For example, in some embodiments the ration may be from 0.5:1 to about 2:1, such as 2:1, 1:1, 0.5:1. In some embodiments, the coupling agent may comprise combinations of multiple aliphatic silanes and/or multiple aromatic silanes, which could be applied to the glass container in one or multiple steps with or without organic or inorganic fillers. In some embodiments, the coupling agent comprises oligomers, such as silsesquioxanes, formed from both the aliphatic and aromatic silanes.

In an exemplary embodiment, the first silane chemical composition is an aromatic silane chemical composition and the second silane chemical composition is an aliphatic silane chemical composition. In one exemplary embodiment, the first silane chemical composition is an aromatic alkoxysilane chemical composition comprising at least one amine moiety and the second silane chemical composition is an aliphatic alkoxysilane chemical composition comprising at least one amine moiety. In another exemplary embodiment, the coupling agent comprises an oligomer of one or more silane chemical compositions, wherein the oligomer is a silsesquioxane chemical composition and at least one of the silane chemical compositions comprises at least one aromatic moiety and at least one amine moiety. In one particular exemplary embodiment, the first silane chemical composition is aminophenyltrimethoxy silane and the second silane chemical composition is 3-aminopropyltrimethoxy silane. The ratio of aromatic silane to aliphatic silane may be about 1:1. In another particular exemplary embodiment, the coupling agent comprises an oligomer formed from aminophenyltrimethoxy and 3-aminopropyltrimethoxy. In another embodiment, the coupling agent may comprise both a mixture of aminophenyltrimethoxy and 3-aminopropyltrimethoxy and oligomers formed from the two.

In one embodiment, the coupling agent is applied to the outer surface 106 of the glass body 102 by contacting the surface with the diluted coupling agent by a submersion process. The coupling agent may be mixed in a solvent when applied to the glass body 102. In another embodiment, the coupling agent may be applied to the glass body 102 by a spray or other suitable means. The glass body 102 with coupling agent may then be dried at around 120° C. for about 15 min, or any time and temperature sufficient to adequately liberate the water and/or other organic solvents present on the outer surface 106 of the wall portion 110.

Referring to FIG. 12A, in one embodiment, the coupling agent is positioned on the glass container as a coupling agent layer 180 and is applied as a solution comprising about 0.5 wt % of a first silane and about 0.5 wt % of a second silane (total 1 wt % silane) mixed with at least one of water and an organic solvent, such as, but not limited to, methanol. However, it should be understood that the total silane concentration in the solution may be more or less than about 1 wt %, such as from about 0.1 wt % to about 10 wt %, from about 0.3 wt % to about 5.0 wt %, or from about 0.5 wt % to about 2.0 wt %. For example, in one embodiment, the weight ratio of organic solvent to water (organic solvent:water) may be from about 90:10 to about 10:90, and, in one embodiment, may be about 75:25. The weight ratio of silane to solvent may affect the thickness of the coupling agent layer, where increased percentages of silane chemical composition in the coupling agent solution may increase the thickness of the coupling agent layer 180. However, it should be understood that other variables may affect the thickness of the coupling agent layer 180 such as, but not limited, the specifics of the dip coating process, such as the withdraw speed from the bath. For example, a faster withdraw speed may form a thicker coupling agent layer 180.

In one embodiment, the coupling agent layer 180 is applied as a solution comprising a first silane chemical species and a second silane chemical species, which may improve the thermal stability and/or the mechanical properties of the lubricous coating 160. For example, the first silane chemical species may be an aliphatic silane, such as GAPS, and the second silane chemical species may be an aromatic silane, such as APhTMS. In this example, the ratio of aliphatic silanes to aromatic silanes (aliphatic:aromatic) may be about 1:1. However, it should be understood that other ratios are possible, including from about 1:3 to about 1:0.2, as described above. The aromatic silane chemical species and the aliphatic silane chemical species may be mixed with at least one of water and an organic solvent, such as, but not limited to, methanol. This solution is then coated on the outer surface 106 of the glass body 102 and cured to form the coupling agent layer 180.

In another embodiment, the coupling agent layer 180 is applied as a solution comprising 0.1 vol. % of a commercially available aminopropylsilsesquioxane oligomer. Coupling agent layer solutions of other concentrations may be used, including but not limited to, 0.01-10.0 vol. % aminopropylsilsesquioxane oligomer solutions.

In some embodiments, the coupling agent layer 180 is sufficiently thermally stable such that the coupling agent layer 180 may, by itself, act as the lubricous coating 160 without any additional coatings, such as a polymer chemical composition layer 170 or the like. Accordingly, it should be understood that, in these embodiments, the lubricous coating 160 includes a single composition, specifically the coupling agent.

As noted herein, when the lubricous coating 160 is a tenacious organic coating, the coating may also include a polymer chemical composition as a polymer chemical composition layer 170. The polymer chemical composition may be a thermally stable polymer or mixture of polymers, such as but not limited to, polyimides, polybenzimidazoles, polysulfones, polyetheretherketones, polyetherimides, polyamides, polyphenyls, polybenzothiazoles, polybenzoxazoles, polybisthiazoles, and polyaromatic heterocyclic polymers with and without organic or inorganic fillers. The polymer chemical composition may be formed from other thermally stable polymers, such as polymers that do not degrade at temperatures in the range of from 200° C. to 400° C., including 250° C., 300° C., and 350° C. These polymers may be applied with or without a coupling agent.

In one embodiment, the polymer chemical composition is a polyimide chemical composition. If the lubricous coating 160 comprises a polyimide, the polyimide composition may be derived from a polyamic acid, which is formed in a solution by the polymerization of monomers. One such polyamic acid is Novastrat® 800 (commercially available from NeXolve). A curing step imidizes the polyamic acid to form the polyimide. The polyamic acid may be formed from the reaction of a diamine monomer, such as a diamine, and an anhydride monomer, such as a dianhydride. As used herein, polyimide monomers are described as diamine monomers and dianhydride monomers. However, it should be understood that while a diamine monomer comprises two amine moieties, in the description that follows, any monomer comprising at least two amine moieties may be suitable as a diamine monomer. Similarly, it should be understood that while a dianhydride monomer comprises two anhydride moieties, in the description that follows any monomer comprising at least two anhydride moieties may be suitable as a dianhydride monomer. The reaction between the anhydride moieties of the anhydride monomer and amine moieties of the diamine monomer forms the polyamic acid. Therefore, as used herein, a polyimide chemical composition that is formed from the polymerization of specified monomers refers to the polyimide that is formed following the imidization of a polyamic acid that is formed from those specified monomers. Generally, the molar ratio of the total anhydride monomers and diamine monomers may be about 1:1. While the polyimide may be formed from only two distinct chemical compositions (one anhydride monomer and one diamine monomer), at least one anhydride monomer may be polymerized and at least one diamine monomer may be polymerized to from the polyimide. For example, one anhydride monomer may be polymerized with two different diamine monomers. Any number of monomer specie combinations may be used. Furthermore, the ratio of one anhydride monomer to a different anhydride monomer, or one or more diamine monomer to a different diamine monomer may be any ratio, such as between about 1:0.1 to 0.1:1, such as about 1:9, 1:4, 3:7, 2:3, 1:1, 3:2, 7:3, 4:1 or 9:1.

The anhydride monomer from which, along with the diamine monomer, the polyimide is formed may comprise any anhydride monomer. In one embodiment, the anhydride monomer comprises a benzophenone structure. In an exemplary embodiment, benzophenone-3,3',4,4'-tetracarboxylic dianhydride may be at least one of the anhydride monomer from which the polyimide is formed. In other embodiments, the diamine monomer may have an anthracene structure, a phenanthrene structure, a pyrene structure, or a pentacene structure, including substituted versions of the above mentioned dianhydrides.

Figure 13:
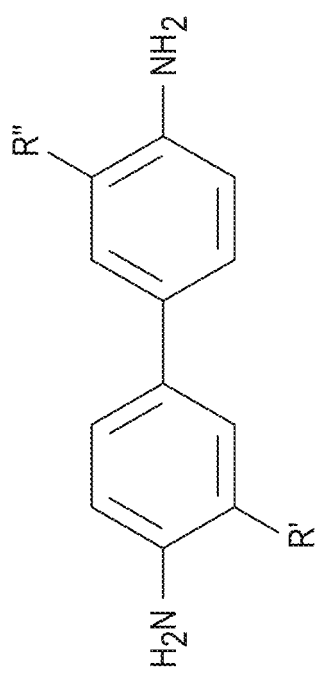
FIG. 13 schematically depicts the chemical structure of a diamine monomer which may be used to form a polyimide coating layer.
Figure 14:
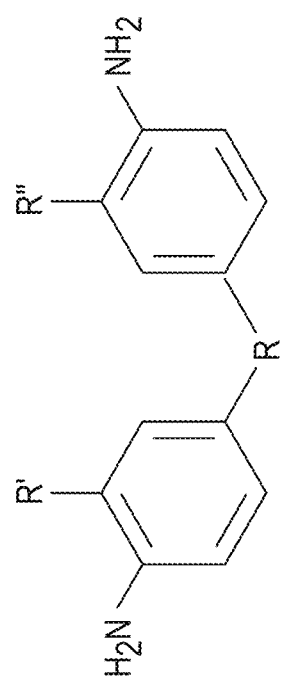
FIG. 14 schematically depicts the chemical structure of another diamine monomer which may be used to form a polyimide coating layer.

The diamine monomer from which, along with the anhydride monomer, the polyimide is formed may comprise any diamine monomer. In one embodiment, the diamine monomer comprises at least one aromatic ring moiety. FIGS. 13 and 14 show examples of diamine monomers that, along with one or more selected anhydride monomer, may form the polyimide comprising the polymer chemical composition. The diamine monomer may have one or more carbon molecules connecting two aromatic ring moieties together, as shown in FIG. 13, wherein R of FIG. 13 corresponds to an alkyl moiety comprising one or more carbon atoms. Alternatively, the diamine monomer may have two aromatic ring moieties that are directly connected and not separated by at least one carbon molecule, as shown in FIG. 14. The diamine monomer may have one or more alkyl moieties, as represented by R' and R" in FIGS. 13 and 14. For example, in FIGS. 13 and 14, R' and R" may represent an alkyl moiety such as methyl, ethyl, propyl, or butyl moieties, connected to one or more aromatic ring moieties. For example, the diamine monomer may have two aromatic ring moieties wherein each aromatic ring moiety has an alkyl moiety connected thereto and adjacent an amine moiety connected to the aromatic ring moiety. It should be understood that R' and R", in both FIGS. 13 and 14, may be the same chemical moiety or may be different chemical moieties. Alternatively, R' and/or R", in both FIGS. 13 and 14, may represent no atoms at all.

Two different chemical compositions of diamine monomers may form the polyimide. In one embodiment, a first diamine monomer comprises two aromatic ring moieties that are directly connected and not separated by a linking carbon molecule, and a second diamine monomer comprises two aromatic ring moieties that are connected with at least one carbon molecule connecting the two aromatic ring moieties. In one exemplary embodiment, the first diamine monomer, the second diamine monomer, and the anhydride monomer have a molar ratio (first diamine monomer:second diamine monomer:anhydride monomer) of about 0.465:0.035:0.5. However, the ratio of the first diamine monomer and the second diamine monomer may vary in a range of about 0.01:0.49 to about 0.40:0.10, while the anhydride monomer ratio remains at about 0.5.

In one embodiment, the polyimide composition is formed from the polymerization of at least a first diamine monomer, a second diamine monomer, and an anhydride monomer, wherein the first and second diamine monomers are different chemical compositions. In one embodiment, the anhydride monomer is a benzophenone, the first diamine monomer comprises two aromatic rings directly bonded together, and the second diamine monomer comprises two aromatic rings bonded together with at least one carbon molecule connecting the first and second aromatic rings. The first diamine monomer, the second diamine monomer, and the anhydride monomer may have a molar ratio (first diamine monomer: second diamine monomer:anhydride monomer) of about 0.465:0.035:0.5.

In an exemplary embodiment, the first diamine monomer is ortho-Tolidine, the second diamine monomer is 4,4'-methylene-bis(2-methylaniline), and the anhydride monomer is benzophenone-3,3',4,4'-tetracarboxylic dianhydride. The first diamine monomer, the second diamine monomer, and the anhydride monomer may have a molar ratio (first diamine monomer:second diamine monomer:anhydride monomer) of about 0.465:0.035:0.5.

Figure 15:
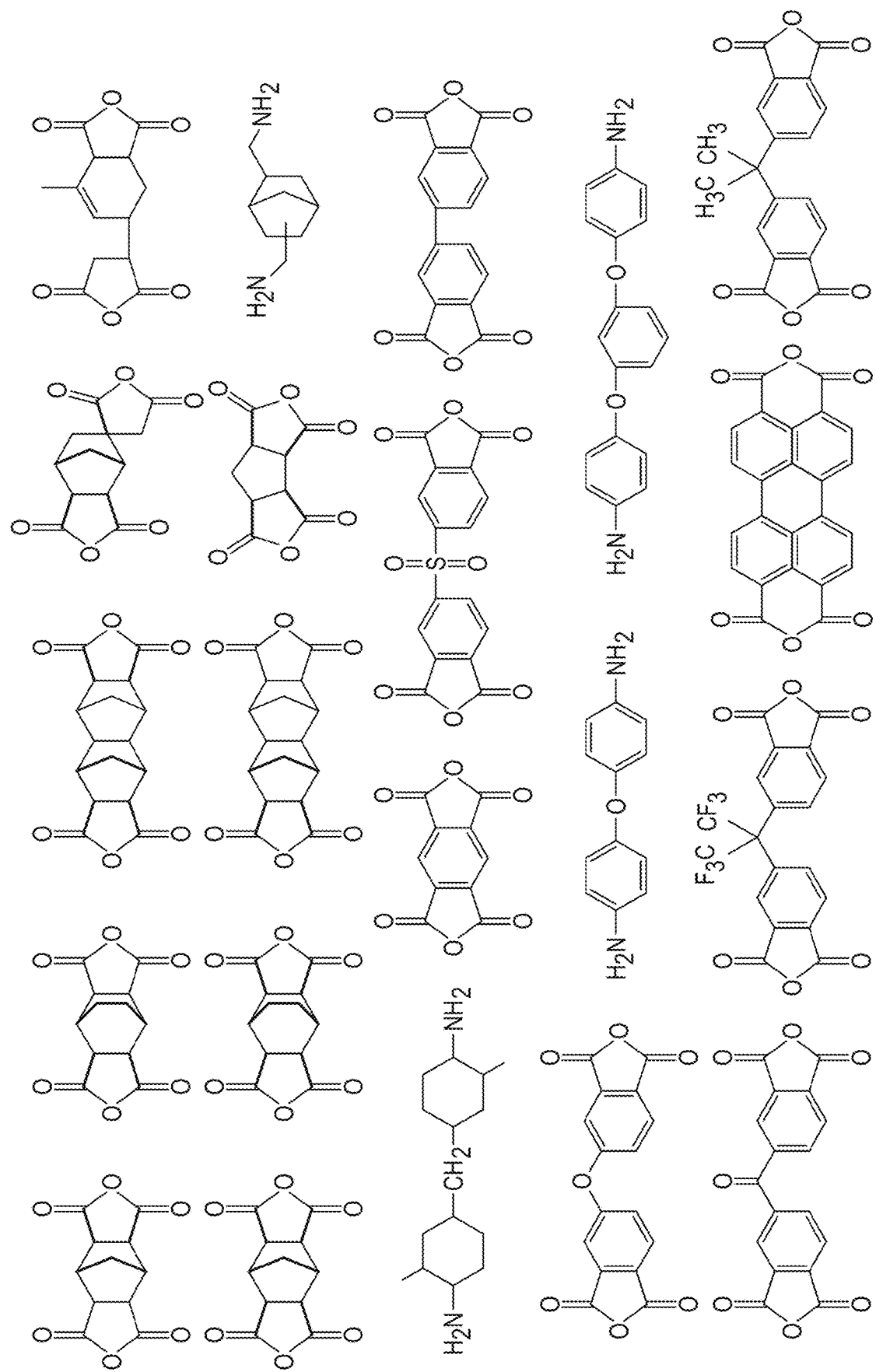
FIG. 15 schematically depicts the chemical structures of some monomers that may be used as polyimide coatings applied to glass containers.

In some embodiments, the polyimide may be formed from the polymerization of one or more of: bicyclo[2.2.1]heptane-2,3,5,6-tetracarboxylic dianhydride, cyclopentane-1,2,3,4-tetracarboxylic 1,2;3,4-dianhydride, bicyclo[2.2.2]octane-2,3,5,6-tetracarboxylic dianhydride, 4arH,8acH)-decahydro-1t,4t:5c,8c-dimethanonaphthalene-2t,3t,6c,7c-tetracarboxylic 2,3:6,7-dianhydride, 2c,3c,6c,7c-tetracarboxylic 2,3:6,7-dianhydride, 5-endo-carboxymethylbicyclo[2.2.1]-heptane-2-exo,3-exo,5-exo-tricarboxylic acid 2,3:5,5-dianhydride, 5-(2,5-dioxotetrahydro-3-furanyl)-3-methyl-3-cyclohexene-1,2-dicarboxylic anhydride, isomers of bis(aminomethyl) bicyclo[2.2.1]heptane, or 4,4'-methylenebis(2-methylcyclohexylamine), pyromellitic dianhydride (PMDA) 3,3',4,4'-biphenyl dianhydride (4,4'-BPDA), 3,3',4,4'-benzophenone dianhydride (4,4'-BTDA), 3,3',4,4'-oxydiphthalic anhydride (4,4'-ODPA), 1,4-bis(3,4-dicarboxylphenoxy)benzene dianhydride (4,4'-HQDPA), 1,3-bis(2,3-dicarboxyl-phenoxy)benzene dianhydride (3,3'-HQDPA), 4,4'-bis(3,4-dicarboxyl phenoxyphenyl)-isopropylidene dianhydride (4,4'-BPADA), 4,4'-(2,2,2-trifluoro-1-pentafluorophenylethylidene) diphthalic dianhydride (3FDA), 4,4'-oxydianiline (ODA), m-phenylenediamine (MPD), p-phenylenediamine (PPD), m-toluenediamine (TDA), 1,4-bis(4-aminophenoxy)benzene (1,4,4-APB), 3,3'-(m-phenylenebis(oxy))dianiline (APB), 4,4'-diamino-3,3'-dimethyldiphenylmethane (DMMDA), 2,2'-bis(4-(4-aminophenoxy)phenyl)propane (BAPP), 1,4-cyclohexanediamine 2,2'-bis[4-(4-amino-phenoxy) phenyl] hexafluoroisopropylidene (4-BDAF), 6-amino-1-(4'-aminophenyl)-1,3,3-trimethylindane (DAPI), maleic anhydride (MA), citraconic anhydride (CA), nadic anhydride (NA), 4-(phenylethynyl)-1,2-benzenedicarboxylic acid anhydride (PEPA), 4,4'-diaminobenzanilide (DABA), 4,4'-(hexafluoroisopropylidene)di-phthalicanhydride (6-FDA), pyromellitic dianhydride, benzophenone-3,3',4,4'-tetracarboxylic dianhydride, 3,3',4,4'-biphenyltetracarboxylic dianhydride, 4,4'-(hexafluoroisopropylidene)diphthalic anhydride, perylene-3,4,9,10-tetracarboxylic dianhydride, 4,4'-oxydiphthalic anhydride, 4,4'-(hexafluoroisopropylidene)diphthalic anhydride, 4,4'-(4,4'-isopropylidenediphenoxy)bis (phthalic anhydride), 1,4,5,8-naphthalenetetracarboxylic dianhydride, 2,3,6,7-naphthalenetetracarboxylic dianhydride, as well as those materials described in U.S. Pat. Nos. 7,619,042, 8,053,492, 4,880,895, 6,232,428, 4,595,548, WO Pub. No. 2007/016516, U.S. Pat. Pub. No. 2008/0214777, U.S. Pat. Nos. 6,444,783, 6,277,950, and 4,680,373. FIG. 15 depicts the chemical structure of some suitable monomers that may be used to form a polyimide coating applied to the glass body 102. In another embodiment, the polyamic acid solution from which the polyimide is formed may comprise poly (pyromellitic dianhydride-co-4,4'-oxydianiline) amic acid (commercially available from Aldrich).

In another embodiment, the polymer chemical composition may comprise a fluoropolymer. The fluoropolymer may be a copolymer wherein both monomers are highly fluorinated. Some of the monomers of the fluoropolymer may be fluoroethylene. In one embodiment, the polymer chemical composition comprises an amorphous fluoropolymer, such as, but not limited to, Teflon AF (commercially available from DuPont). In another embodiment, the polymer chemical composition comprises perfluoroalkoxy (PFA) resin particles, such as, but not limited to, Teflon PFA TE-7224 (commercially available from DuPont).

In another embodiment, the polymer chemical composition may comprise a silicone resin. The silicone resin may be a highly branched 3-dimensional polymer which is formed by branched, cage-like oligosiloxanes with the general formula of $R_nSi(X)_mO_y$, where R is a non reactive substituent, usually methyl or phenyl, and X is OH or H. While not wishing to be bound by theory, it is believed that curing of the resin occurs through a condensation reaction of Si—OH moieties with a formation of Si—O—Si bonds. The silicone resin may have at least one of four possible functional siloxane monomeric units, which include M-resins, D-resins, T-resins, and Q-resins, wherein M-resins refer to resins with the general formula $R_3SiO$, D-resins refer to resins with the general formula $R_2SiO_2$, T-resins refer to resins with the general formula $RSiO_3$, and Q-resins refer to resins with the general formula $SiO_4$ (a fused quartz). In some embodiments resins are made of D and T units (DT resins) or from M and Q units (MQ resins). In other embodiments, other combinations (MDT, MTQ, QDT) are also used.

In one embodiment, the polymer chemical composition comprises phenylmethyl silicone resins due to their higher thermal stability compared to methyl or phenyl silicone resins. The ratio of phenyl to methyl moieties in the silicone resins may be varied in the polymer chemical composition. In one embodiment, the ratio of phenyl to methyl is about 1.2. In another embodiment, the ratio of phenyl to methyl is about 0.84. In other embodiments, the ratio of phenyl to methyl moieties may be about 0.5, 0.6, 0.7, 0.8, 0.9, 1.0, 1.1, 1.3, 1.4, or 1.5. In one embodiment, the silicone resin is DC 255 (commercially available from Dow Corning). In another embodiment, the silicone resin is DC806A (commercially available from Dow Corning). In other embodiments, the polymer chemical composition may comprise any of the DC series resins (commercially available for Dow Corning), and/or Hardsil Series AP and AR resins (commercially available from Gelest). The silicone resins can be used without coupling agent or with coupling agent.

In another embodiment, the polymer chemical composition may comprise silsesquioxane-based polymers, such as but not limited to T-214 (commercially available from Honeywell), SST-3M01 (commercially available from Gelest), POSS Imiclear (commercially available from Hybrid Plastics), and FOX-25 (commercially available from Dow Corning). In one embodiment, the polymer chemical composition may comprise a silanol moiety.

Referring again to FIGS. 8 and 12A, the lubricous coating 160 may be applied in a multi stage process, wherein the glass body 102 is contacted with the coupling agent solution to form the coupling agent layer 180 (as described above), and dried, and then contacted with a polymer chemical composition solution, such as a polymer or polymer precursor solution, such as by a submersion process, or alternatively, the polymer layer 170 may be applied by a spray or other suitable means, and dried, and then cured at high temperatures. Alternatively, if a coupling agent layer 180 is not used, the polymer chemical composition of the polymer layer 170 may be directly applied to the outer surface 106 of the glass body 102. In another embodiment, the polymer chemical composition and the coupling agent may be mixed in the lubricous coating 160, and a solution comprising the polymer chemical composition and the coupling agent may be applied to the glass body 102 in a single coating step.

In one embodiment, the polymer chemical composition comprises a polyimide wherein a polyamic acid solution is applied over the coupling agent layer 180. In other embodiments, a polyamic acid derivative may be used, such as, for example, a polyamic acid salt, a polyamic acid ester, or the like. For example, suitable polyamic acid salts may include polyamic acid salt formed from triethylamine. Other suitable salts may include those salts formed by the deprotonation of the carboxylic acid groups of the polyamic acids by basic additives leading to an ionic interaction of the resultant carboxylate group with its conjugate acid. The basic additives may include organic, inorganic, or organometallic species or combinations thereof. The inorganic species may include moieties such as alkalis, alkaline earth, or metal bases. The organic bases (proton acceptors) may include aliphatic amines, aromatic amines, or other organic bases. Aliphatic amines include primary amines such as but not limited to ethylamine, secondary amines such as but not limited to diethylamines, and tertiary amines such as triethylamines. Aromatic amines include anilines, pyridines, and imidazoles. Organometallic bases could include 2,2 dimethylpropylmagnesium chlorides or others. In one embodiment, the polyamic acid solution may comprise a mixture of 1 vol. % polyamic acid and 99 vol % organic solvent. The organic solvent may comprise a mixture of toluene and at least one of N,N-Dimethylacetamide (DMAc), N,N-Dimethylformamide (DMF), and 1-Methyl-2-pyrrolidinone (NMP) solvents, or a mixture thereof. In one embodiment the organic solvent solution comprises about 85 vol % of at least one of DMAc, DMF, and NMP, and about 15 vol % toluene. However, other suitable organic solvents may be used. The coated glass container 100 may then be dried at around 150° C. for about 20 minutes, or any time and temperature sufficient to adequately liberate the organic solvent present in the lubricous coating 160.

In the layered transient organic lubricous coating embodiment, after the glass body 102 is contacted with the coupling agent to form the coupling agent layer 180 and polyamic acid solution to form the polymer layer 170, the coated glass container 100 may be cured at high temperatures. The coated glass container 100 may be cured at 300° C. for about 30 minutes or less, or may be cured at a temperature higher than 300° C., such as at least 320° C., 340° C., 360° C., 380° C., or 400° C. for a shorter time. It is believed, without being bound by theory, that the curing step imidizes the polyamic acid in the polymer layer 170 by reaction of carboxylic acid moieties and amide moieties to create a polymer layer 170 comprising a polyimide. The curing may also promote bonds between the polyimide and the coupling agent. The coated glass container 100 is then cooled to room temperature.

Furthermore, without being bound by limitation, it is believed that the curing of the coupling agent, polymer chemical composition, or both, drives off volatile materials, such as water and other organic molecules. As such, these volatile materials that are liberated during curing are not present when the article, if used as a container, is thermally treated (such as for depyrogenation) or contacted by the material in which it is a package for, such as a pharmaceutical. It should be understood that the curing processes described herein are separate heating treatments than other heating treatments described herein, such as those heating treatments similar or identical to processes in the pharmaceutical packaging industry, such as depyrogenation or the heating treatments used to define thermal stability, as described herein.

In one embodiment, the coupling agent comprises a silane chemical composition, such as an alkoxysilane, which may improve the adhesion of the polymer chemical composition to the glass body. Without being bound by theory, it is believed that alkoxysilane molecules hydrolyze rapidly in water forming isolated monomers, cyclic oligomers, and large intramolecular cyclics. In various embodiments, the control over which species predominates may be determined by silane type, concentration, pH, temperature, storage condition, and time. For example, at low concentrations in aqueous solution, aminopropyltrialkoxysilane (APS) may be stable and form trisilanol monomers and very low molecular weight oligomeric cyclics.

It is believed, still without being bound by theory, that the reaction of one or more silanes chemical compositions to the glass body may involve several steps. As shown in FIG. 17, in some embodiments, following hydrolysis of the silane chemical composition, a reactive silanol moiety may be formed, which can condense with other silanol moieties, for example, those on the surface of a substrate, such as a glass body. After the first and second hydrolysable moieties are hydrolyzed, a condensation reaction may be initiated. In some embodiments, the tendency toward self condensation can be controlled by using fresh solutions, alcoholic solvents, dilution, and by careful selection of pH ranges. For example, silanetriols are most stable at pH 3-6, but condense rapidly at pH 7-9.3, and partial condensation of silanol monomers may produce silsesquioxanes. As shown in FIG. 17, the silanol moieties of the formed species may form hydrogen bonds with silanol moieties on the substrate, and during drying or curing a covalent bond may be formed with the substrate with elimination of water. For example, a moderate cure cycle (110° C. for 15 min) may leave silanol moieties remaining in free form and, along with any silane organofunctionality, may bond with the subsequent topcoat, providing improved adhesion.

In some embodiments, the one or more silane chemical compositions of the coupling agent may comprise an amine moiety. Still without being bound by theory, it is believed that this amine moiety may act as a base catalyst in the hydrolysis and co-condensation polymerization and enhance the adsorption rate of the silanes having an amine moiety on a glass surface. It may also create a high pH (9.0-10.0) in aqueous solution that conditions the glass surface and increases density of surface silanol moieties. Strong interaction with water and protic solvents maintains solubility and stability of a silane having an amine moiety chemical composition, such as APS.

In an exemplary embodiment, the glass body 102 may comprise ion-exchanged glass and the coupling agent may be a silane. In some embodiments, adhesion of the lubricous coating to an ion-exchanged glass body may stronger than adhesion of the lubricous coating to a non-ion-exchanged glass body. It is believed, without being bound by theory, that any of several aspects of ion-exchanged glass may promote bonding and/or adhesion, as compared with non-ion-exchanged glass. First, ion-exchanged glass may have enhanced chemical/hydrolytic stability that may affect stability of the coupling agent and/or its adhesion to glass surface. Non-ion-exchanged glass typically has inferior hydrolytic stability and under humid and/or elevated temperature conditions, alkali metals could migrate out of the glass body to the interface of the glass surface and coupling agent layer (if present), or even migrate into the coupling agent layer, if present. If alkali metals migrate, as described above, and there is a change in pH, hydrolysis of Si—O—Si bonds at the glass/coupling agent layer interface or in the coupling agent layer itself may weaken either the coupling agent mechanical properties or its adhesion to the glass. Second, when ion-exchanged glasses are exposed to strong oxidant baths, such as potassium nitrite baths, at elevated temperatures, such as 400° C. to 450° C., and removed, organic chemical compositions on the surface of the glass are removed, making it particularly well suited for silane coupling agents without further cleaning. For example, a non-ion-exchanged glass may have to be exposed to an additional surface cleaning treatment, adding time and expense to the process.

Figure 18:
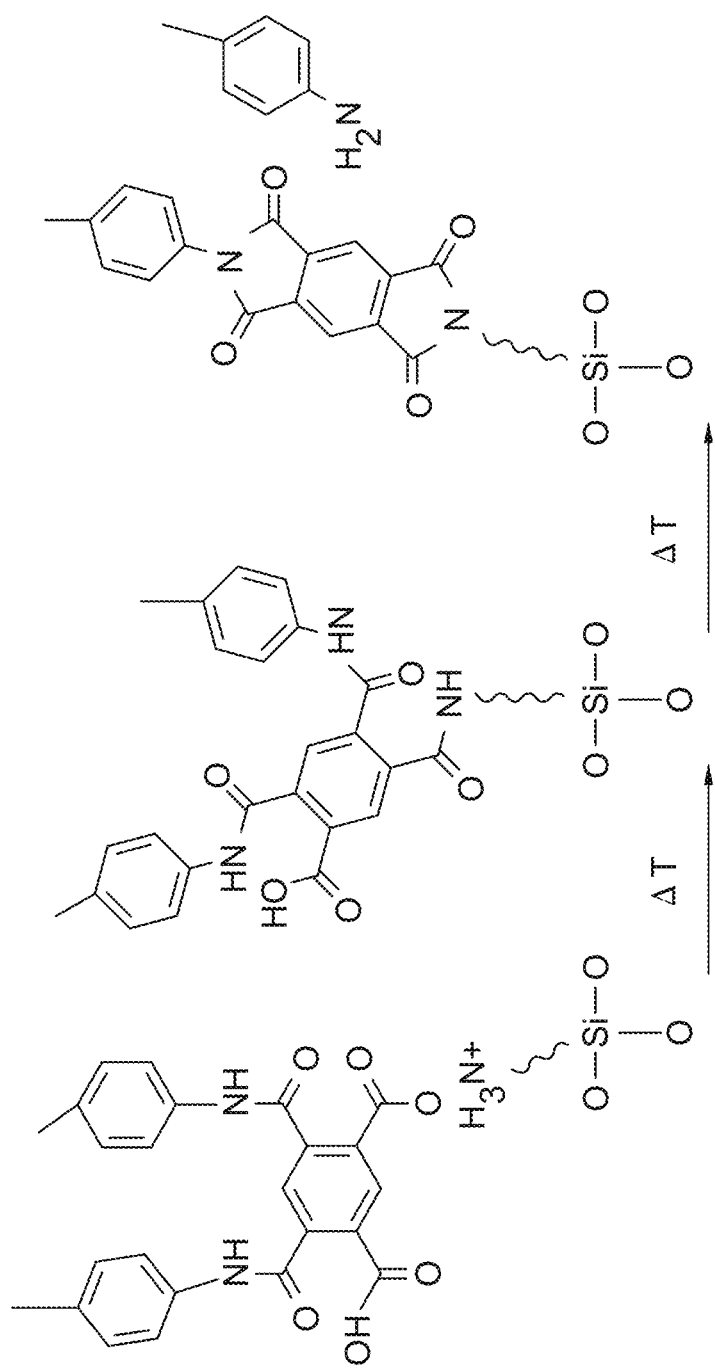
FIG. 18 schematically depicts the reaction steps of a polyimide bonding to a silane, according to one or more embodiments shown and described herein.

In one exemplary embodiment, the coupling agent may comprise at least one silane comprising an amine moiety and the polymer chemical composition may comprise a polyimide chemical composition. Now referring to FIG. 18, without being bound by theory, it is believed that the interaction between this amine moiety interaction and the polyamic acid precursor of the polyimide follows a stepwise process. As shown in FIG. 18, the first step is formation of a polyamic acid salt between a carboxyl moiety of the polyamic acid and the amine moiety. The second step is thermal conversion of the salt into an amide moiety. The thirds step is further conversion of the amide moiety into an imide moiety with scission of the polymer amide bonds. The result is a covalent imide attachment of a shortened polymer chain (polyimide chain) to an amine moiety of the coupling agent, as shown in FIG. 18.

EXAMPLES

The various embodiments of glass containers with improved attributes will be further clarified by the following examples. The examples are illustrative in nature, and should not be understood to limit the subject matter of the present disclosure.

Example 1

Glass vials were formed from Type IB glass having the same composition as Example 2 of Table 2 above and the glass composition identified as "Example E" of Table 1 of U.S. patent application Ser. No. 13/660,394 filed Oct. 25, 2012 and entitled "Glass Compositions with Improved Chemical and Mechanical Durability" assigned to Corning, Incorporated (hereinafter "the Reference Glass Composition"). The vials were washed with deionized water, blown dry with nitrogen, and dip coated with a 0.1% solution of APS (aminopropylsilsesquioxane). The APS coating was dried at 100° C. in a convection oven for 15 minutes. The vials were then dipped into a 0.1% solution of Novastrat® 800 polyamic acid in a 15/85 toluene/DMF (dimethylformamide) solution or in a 0.1% to 1% poly(pyromellitic dianhydride-co-4,4'-oxydianiline) amic acid solution PMDA-ODA (poly(4,4'-oxydiphenylene-pyromellitimide) in N-methyl-2-pyrrolidone (NMP). The coated vials were heated to 150° C. and held for 20 minutes to evaporate the solvents. Thereafter, the coatings were cured by placing the coated vials into a preheated furnace at 300° C. for 30 minutes. After curing, the vials coated with the 0.1% solution of Novastrat® 800 had no visible color. However, the vials coated with the solution of poly(pyromellitic dianhydride-co-4,4'oxydianiline) were visibly yellow in color due to the thickness of the coating. Both coatings exhibited a low coefficient of friction in vial-to-vial contact tests.

Example 2

Glass vials formed from Type IB glass vials formed from the same composition as Example 2 of Table 2 above (in as received/uncoated) and vials coated with a lubricous coating were compared to assess the loss of mechanical strength due to abrasion. The coated vials were produced by first ion exchange strengthening glass vials produced from the Reference Glass Composition. The ion exchange strengthening was performed in a 100% KNO$_3$ bath at 450° C. for 8 hours. Thereafter, the vials were washed with deionized water, blown dry with nitrogen, and dip coated with a 0.1% solution of APS (aminopropylsilsesquioxane) in water. The APS coating was dried at 100° C. in a convection oven for 15 minutes. The vials were then dipped into a 0.1% solution of Novastrat® 800 polyamic acid in a 15/85 toluene/DMF solution. The coated vials were heated to 150° C. and held for 20 minutes to evaporate the solvents. Thereafter, the coatings were cured by placing the coated vials into a preheated furnace at 300° C. for 30 minutes. The coated vials were then soaked in 70° C. de-ionized water for 1 hour and heated in air at 320° C. for 2 hours to simulate actual processing conditions.

Figure 19:
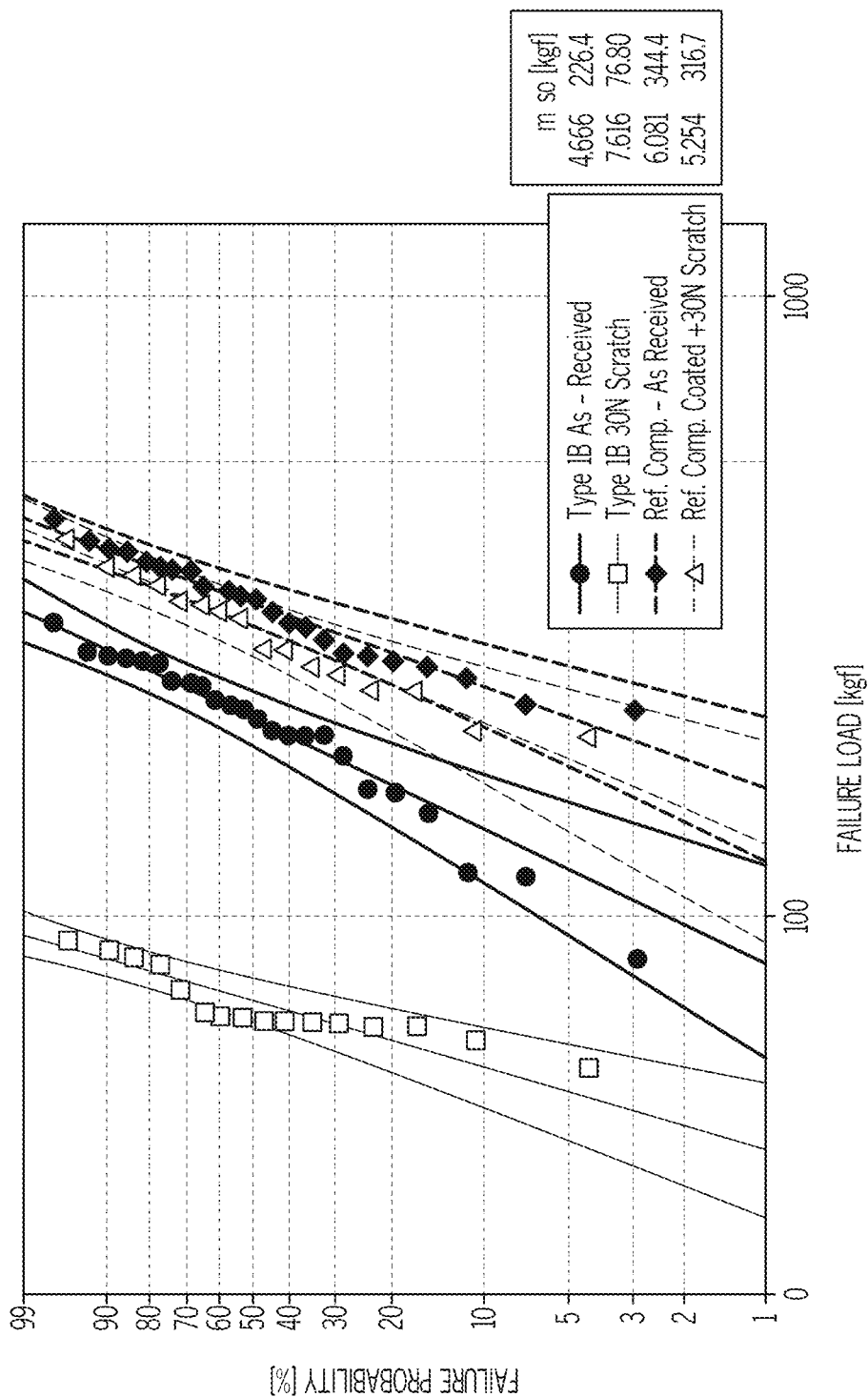
FIG. 19 graphically depicts the failure probability as a function of applied load in a horizontal compression test for vials, according to one or more embodiments shown and described herein.

Unabraded vials formed from the Type IB glass formed from the same composition as Example 2 of Table 2 above and unabraded vials formed from the ion-exchange strengthened and coated Reference Glass Composition were tested to failure in a horizontal compression test (i.e., a plate was placed over the top of the vial and a plate was placed under the bottom of the vial and the plates were pressed together and the applied load at failure was determined with a load cell). FIG. 19 graphically depicts the failure probability as a function of applied load in a horizontal compression test for vials formed from a Reference Glass Composition, vials formed from a Reference Glass Composition in a coated and abraded condition, vials formed from the Type IB glass, and vials formed from the Type IB glass in an abraded condition. The failure loads of the unabraded vials are graphically depicted in the Weibull plots. Sample vials formed from the Type IB glass and unabraded vials formed from the ion-exchange strengthened and coated glass were then placed in the vial-on-vial jig of FIG. 9 to abrade the vials and determine the coefficient of friction between the vials as they were rubbed together. The load on the vials during the test was applied with a UMT machine and was varied between 24 N and 44 N. The applied loads and the corresponding maximum coefficient of friction are reported in the Table contained in FIG. 20. For the uncoated vials, the maximum coefficient of friction varied from 0.54 to 0.71 (shown in FIG. 20 as vial samples "3&4" and "7&8", respectively) and while for the coated vials the maximum coefficient of friction varied from 0.19 to 0.41 (shown in FIG. 20 as vial samples "15&16" and "12&14", respectively). Thereafter, the scratched vials were tested in the horizontal compression test to assess the loss of mechanical strength relative to the unabraded vials. The failure loads applied to the unabraded vials are graphically depicted in the Weibull plots of FIG. 19.

As shown in FIG. 19, the uncoated vials had a significant decrease in strength after abrasion whereas the coated vials had a relatively minor decrease in strength after abrasion. Based on these results, it is believed that the coefficient of friction between the vials should be less than 0.7 or 0.5, or even less than 0.45 in order to mitigate the loss of strength following vial-on-vial abrasion.

Example 3

In this example, multiple sets of glass tubes were tested in four point bending to assess their respective strengths. A first set of tubes formed from the Reference Glass Composition was tested in four point bending in as received condition (uncoated, non-ion exchange strengthened). A second set of tubes formed from the Reference Glass Composition was tested in four point bending after being ion exchange strengthened in a 100% $KNO_3$ bath at 450° C. for 8 hours. A third set of tubes formed from the Reference Glass Composition was tested in four point bending after being ion exchange strengthened in a 100% $KNO_3$ bath at 450° C. for 8 hours and coated with 0.1% APS/0.1% Novastrat® 800 as described in Example 2. The coated tubes were also soaked in 70° C. de-ionized water for 1 hour and heated in air at 320° C. for 2 hours to simulate actual processing conditions. These coated tubes were also abraded in the vial-on-vial jig shown in FIG. 9 under a 30 N load prior to bend testing. A fourth set of tubes formed from the Reference Glass Composition was tested in four point bending after being ion exchange strengthened in a 100% $KNO_3$ bath at 450° C. for 1 hour. These uncoated, ion exchange strengthened tubes were also abraded in the vial-on-vial jig shown in FIG. 9 under a 30 N load prior to bend testing. A fifth set of tubes formed from the Type IB glass was tested in four point bending in as received condition (uncoated, non-ion exchange strengthened). A sixth set of tubes formed from the Type IB glass was tested in four point bending after being ion exchange strengthened in a 100% $KNO_3$ bath at 450° C. for 1 hour. The results of testing are graphically depicted in the Weibull plots displayed in FIG. 21.

Figure 21:
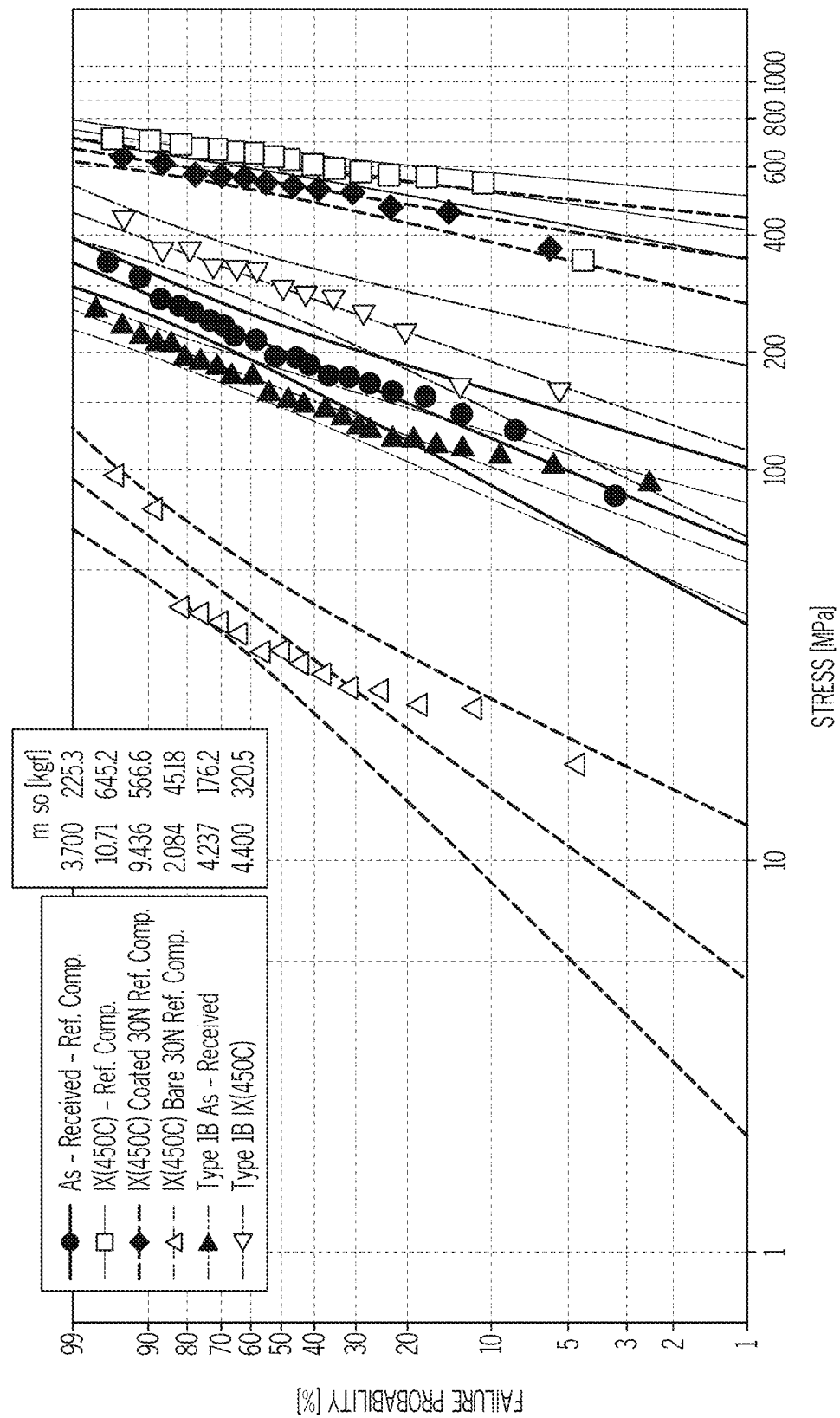
FIG. 21 graphically depicts the failure probability as a function of applied stress in four point bending for tubes formed from a Reference Glass Composition in as received condition, in ion exchanged condition (uncoated), in ion exchanged condition (coated and abraded), in ion exchanged condition (uncoated and abraded) and for tubes formed from Type IB glass in as received condition and in ion exchanged condition, according to one or more embodiments shown and described herein.

Referring to FIG. 21, the second set of tubes which were non-abraded and formed from the Reference Glass Composition and ion exchange strengthened withstood the highest stress before breaking. The third set of tubes which were coated with the 0.1% APS/0.1% Novastrat® 800 prior to abrading showed a slight reduction in strength relative to their uncoated, non-abraded equivalents (i.e., the second set of tubes). However, the reduction in strength was relatively minor despite being subjected to abrading after coating.

Example 4

Two sets of vials were prepared and run through a pharmaceutical filling line. A pressure sensitive tape (commercially available from Fujifilm) was inserted in between the vials to measure contact/impact forces between the vials and between the vials and the equipment. The first set of vials was formed from Type 1B glass and was not coated. The second set of vials was formed from the Reference Glass Composition and was coated with a low-friction polyimide based coating having a coefficient of friction of about 0.25, as described above. The pressure sensitive tapes were analyzed after the vials were run through the pharmaceutical filling line and demonstrated that the coated vials of the second set exhibited a 2-3 times reduction in stress compared to the un-coated vials of the first set.

Example 5

Figure 22:
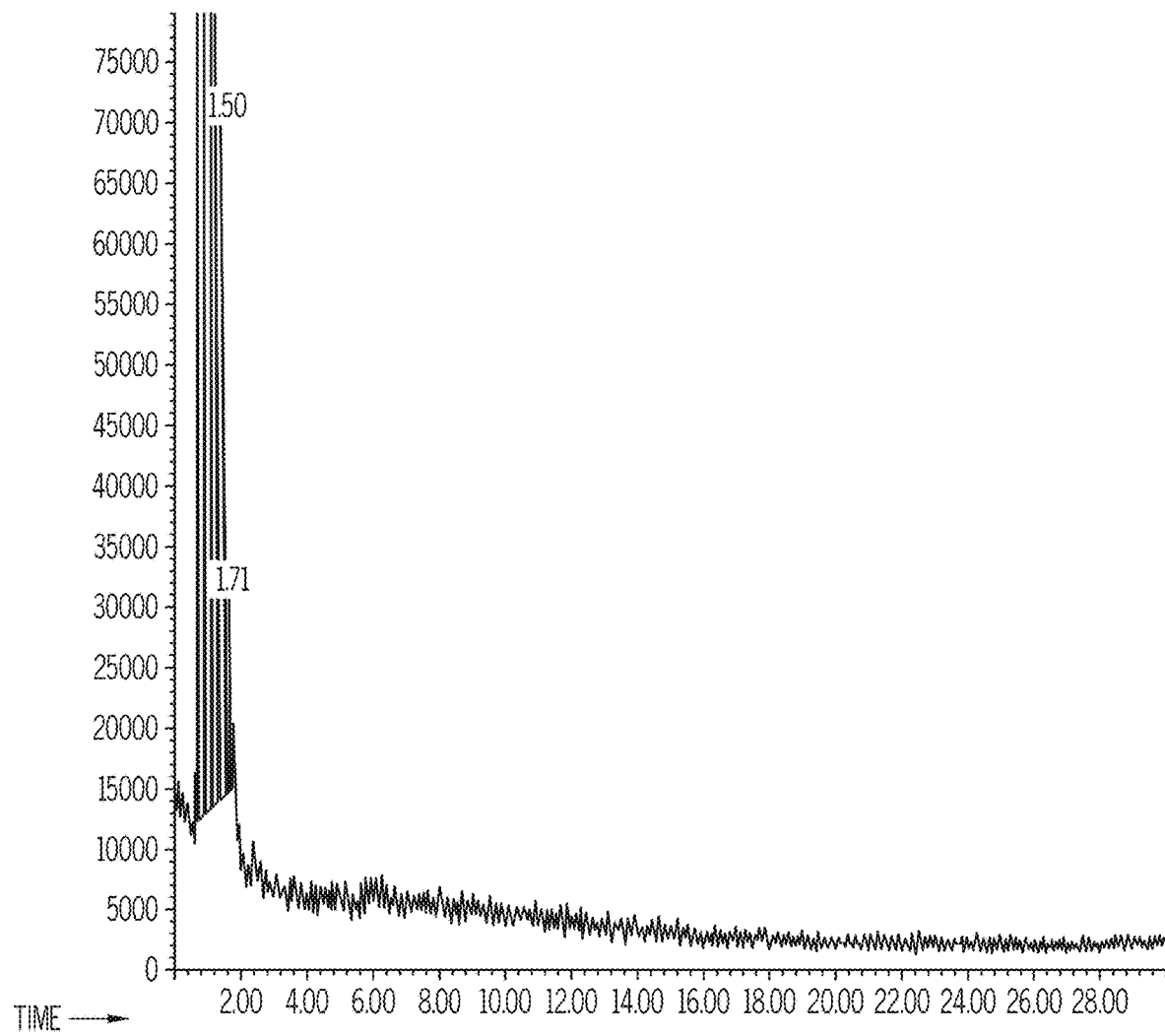
FIG. 22 schematically depicts gas chromatograph-mass spectrometer output data for a APS/Novastrat® 800 coating, according to one or more embodiments shown and described herein.
Figure 23:
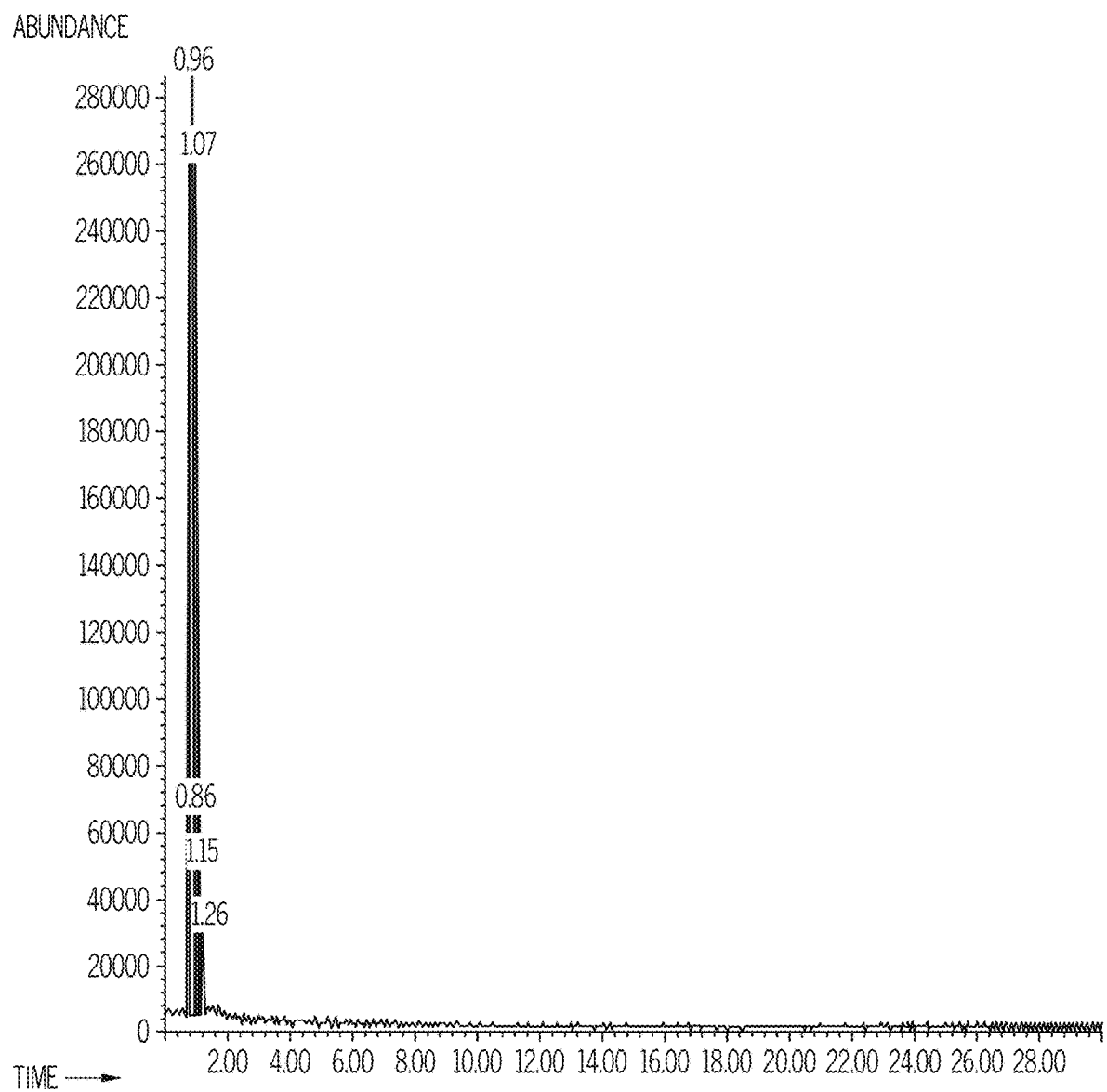
FIG. 23 graphically depicts gas chromatography-mass spectrometer output data for a DC806A coating, according to one or more embodiments shown and described herein.

Three sets of four vials each were prepared. All the vials were formed from the Reference Glass Composition. The first set of vials was coated with the APS/Novastrat® 800 coating as described in Example 2. The second set of vials was dip coated with 0.1% DC806A in toluene. The solvent was evaporated at 50° C. and the coating was cured at 300° C. for 30 min. Each set of vials was placed in a tube and heated to 320° C. for 2.5 hours under an air purge to remove trace contaminants adsorbed into the vials in the lab environment. Each set of samples was then heated in the tube for another 30 minutes and the outgassed volatiles were captured on an activated carbon sorbent trap. The trap was heated to 350° C. over 30 minutes to desorb any captured material which was fed into a gas chromatograph-mass spectrometer. FIG. 22 depicts gas chromatograph-mass spectrometer output data for the APS/Novastrat® 800 coating. FIG. 23 depicts gas chromatography-mass spectrometer output data for the DC806A coating. No outgassing was detected from the 0.1% APS/0.1% Novastrat® 800 coating or the DC806A coating.

A set of four vials was coated with a tie-layer using 0.5%/0.5% GAPS/APhTMS (3-aminopropyltrimethoxysilane/aminophenyltrimethoxysilane) solution in methanol/water mixture. Each vial had a coated surface area of about 18.3 $cm^2$. Solvent was allowed to evaporate at 120° C. for 15 min from the coated vials. Then a 0.5% Novastrat® 800 solution in dimethylacetamide was applied onto the samples. The solvent was evaporated at 150° C. for 20 min. These uncured vials were subjected to an outgassing test described above. The vials were heated to 320° C. in a stream of air (100 mL/min) and upon reaching 320° C. the outgassed volatiles were captured on an activated carbon sorbent traps every 15 min. The traps then were heated to 350° C. over 30 minutes to desorb any captured material which was fed into a gas chromatograph-mass spectrometer. Table 3 shows the amount of captured materials over the segments of time that the samples were held at 320° C. Time zero corresponds with the time that the sample first reached a temperature of 320° C. As seen in Table 3, after 30 min of heating the amount of volatiles decreases below the instrument detection limit of 100 ng. Table 3 also reports the volatiles lost per square cm of coated surface.

TABLE 3

Volatiles per vial and per coated area.

| Time Period at 320° C. | Amount, ng/vial | Amount ng/cm$^2$ |
| --- | --- | --- |
| 25° C. to 320° C. ramp (t = 0) | 60404 | 3301 |
| t = 0 to 15 min | 9371 | 512 |
| t = 15 to 30 min | 321 | 18 |
| t = 30 to 45 min | <100 | <5 |
| t = 45 to 60 min | <100 | <5 |
| t = 60 to 90 min | <100 | <5 |

Example 6

A plurality of vials was prepared with various coatings based on silicon resin or polyimides with and without coupling agents. When coupling agents were used, the coupling agents included APS and GAPS, which is a precursor for APS. The outer coating layer was prepared from Novastrat® 800, the poly(pyromellitic dianhydride-co-4,4'oxydianiline) described above, or silicone resins such as DC806A and DC255. The APS/poly(4,4'-oxydiphenylene-pyromellitimide) coatings were prepared using a 0.1% solution of APS (aminopropylsilsesquioxane) and 0.1% solution, 0.5% solution or 1.0% solutions of poly(pyromellitic dianhydride-co-4,4'-oxydianiline) amic acid PMDA-ODA poly (4,4'-oxydiphenylene-pyromellitimide)) in N-methyl-2-pyrrolidone (NMP). The poly(4,4'-oxydiphenylene-pyromellitimide) coatings were also applied without a coupling agent using a 1.0% solution of the poly(pyromellitic dianhydride-co-4,4'oxydianiline) in NMP. The APS/Novastrat® 800 coatings were prepared using a 0.1% solution of APS and a 0.1% solution of Novastrat® 800 polyamic acid in a 15/85 toluene/DMF solution. The DC255 coatings were applied directly to the glass without a coupling agent using a 1.0% solution of DC255 in Toluene. The APS/DC806A coatings were prepared by first applying a 0.1% solution of APS in water and then a 0.1% solution or a 0.5% solution of DC806A in toluene. The GAPS/DC806A coatings were applied using a 1.0% solution of GAPS in 95 wt. % ethanol in water as a coupling agent and then a 1.0% solution of DC806A in toluene. The coupling agents and coatings were applied using dip coating methods as described herein with the coupling agents being heat treated after application and the silicon resin and polyimide coatings being dried and cured after application. The coating thicknesses were estimated based on the concentrations of the solutions used. The Table contained in FIG. 24 lists the various coating compositions, estimated coating thicknesses and testing conditions.

Thereafter, some of the vials were tumbled to simulate coating damage and others were subjected to abrasion under 30 N and 50 N loads in the vial-on-vial jig depicted in FIG. 9. Thereafter, all the vials were subjected to a lyophilization (freeze drying process) in which the vials were filled with 0.5 mL of sodium chloride solution and then frozen at −100° C. Lyophilization was then performed for 20 hours at −15° C. under vacuum. The vials were inspected with optical quality assurance equipment and under microscope. No damage to the coatings was observed due to lyophilization.

Example 7

Figure 25:
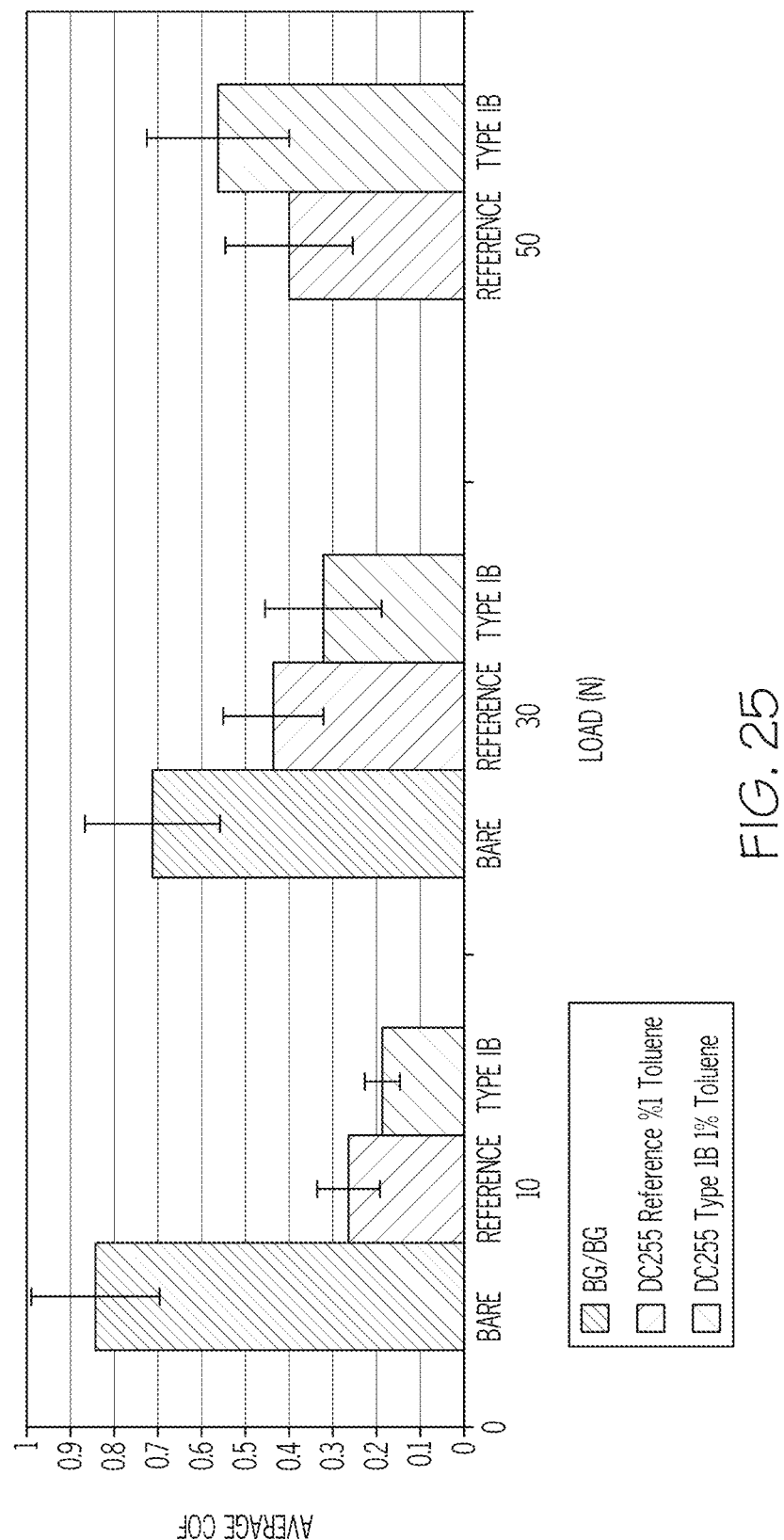
FIG. 25 is a chart reporting the coefficient of friction for bare glass vials and vials having a silicone resin coating tested in a vial-on-vial jig, according to one or more embodiments shown and described herein.

Three sets of six vials were prepared to assess the effect of increasing load on the coefficient of friction for uncoated vials and vials coated with Dow Corning DC 255 silicone resin. A first set of vials was formed from Type IB glass and left uncoated. The second set of vials was formed from the Reference Glass Composition and coated with a 1% solution of DC255 in Toluene and cured at 300° C. for 30 min. The third set of vials was formed from the Type IB glass and coated with a 1% solution of DC255 in Toluene. The vials of each set were placed in the vial-on-vial jig depicted in FIG. 9 and the coefficient of friction relative to a similarly coated vial was measured during abrasion under static loads of 10 N, 30 N, and 50 N. The results are graphically reported in FIG. 25. As shown in FIG. 25, coated vials showed appreciably lower coefficients of friction compared to uncoated vials when abraded under the same conditions irrespective of the glass composition.

Example 8

Three sets of two glass vials were prepared with an APS/poly(4,4'-oxydiphenylene-pyromellitimide) coating. First, each of the vials was dip coated in a 0.1% solution of APS (aminopropylsilsesquioxane). The APS coating was dried at 100° C. in a convection oven for 15 minutes. The vials were then dipped into a 0.1% poly(pyromellitic dianhydride-co-4,4'-oxydianiline) amic acid solution (PMDA-ODA (poly(4,4'-oxydiphenylene-pyromellitimide)) in N-methyl-2-pyrrolidone (NMP). Thereafter, the coatings were cured by placing the coated vials into a preheated furnace at 300° C. for 30 minutes.

Figure 26:
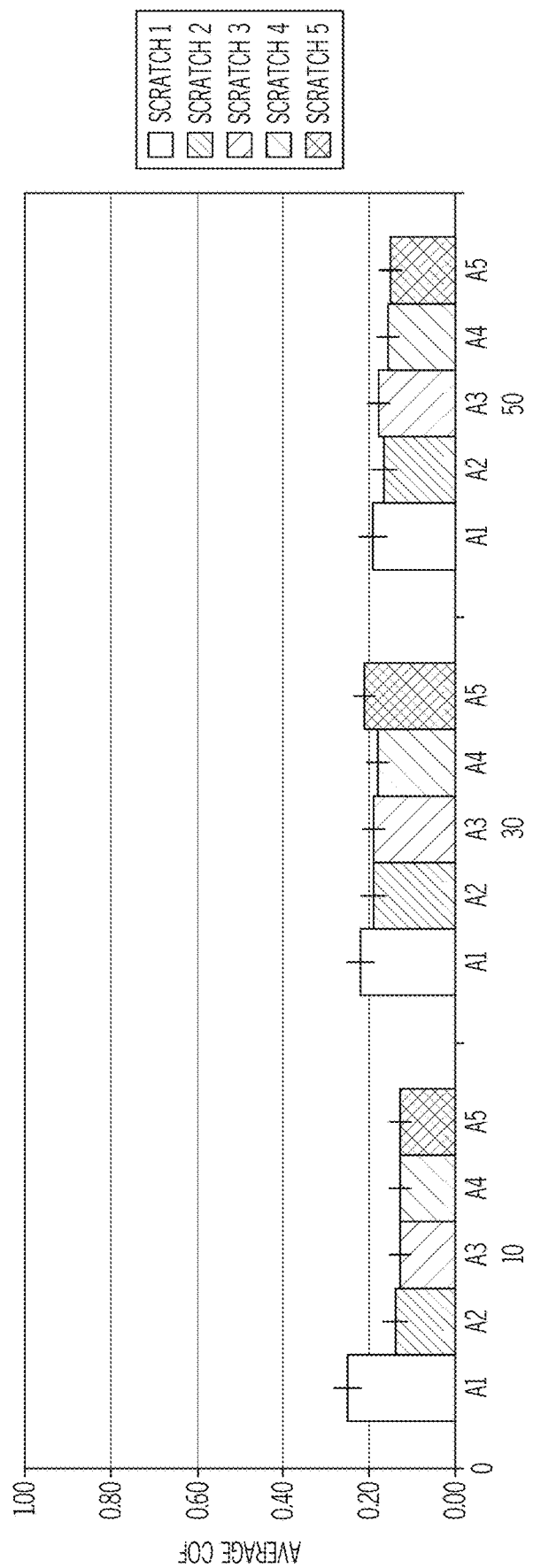
FIG. 26 is a chart reporting the coefficient of friction for vials coated with an APS/PMDA-ODA (poly(4,4'-oxydiphenylene-pyromellitimide) polyimide coating and abraded multiple times under different applied loads in a vial-on-vial jig, according to one or more embodiments shown and described herein.

Two vials were placed in the vial-on-vial jig depicted in FIG. 9 and abraded under a 10 N load. The abrasion procedure was repeated 4 more times over the same area and the coefficient of friction was determined for each abrasion. The vials were wiped between abrasions and the starting point of each abrasion was positioned on a previously non-abraded area. However, each abrasion traveled over the same "track". The same procedure was repeated for loads of 30 N and 50 N. The coefficients of friction of each abrasion (i.e., A1-A5) are graphically depicted in FIG. 26 for each load. As shown in FIG. 26, the coefficient of friction of the APS/poly(4,4'-oxydiphenylene-pyromellitimide) coated vials was generally less than 0.30 for all abrasions at all loads. The examples demonstrate improved resistance to abrasion for polyimide coating when applied over a glass surface treated with a coupling agent.

Example 9

Figure 27:
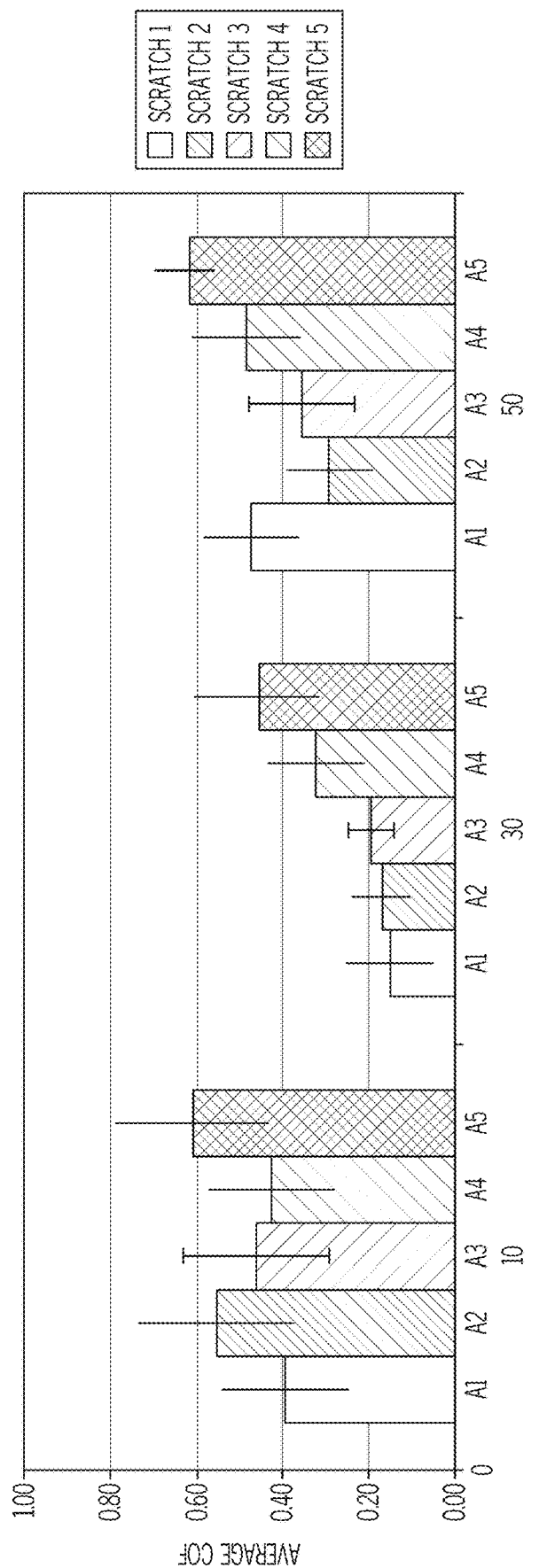
FIG. 27 is a chart reporting the coefficient of friction for vials coated with an APS coating and abraded multiple times under different applied loads in a vial-on-vial jig, according to one or more embodiments shown and described herein.

Three sets of two glass vials were prepared with an APS coating. Each of the vials were dip coated in a 0.1% solution of APS (aminopropylsilsesquioxane) and heated at 100° C. in a convection oven for 15 minutes. Two vials were placed in the vial-on-vial jig depicted in FIG. 9 and abraded under a 10 N load. The abrasion procedure was repeated 4 more times over the same area and the coefficient of friction was determined for each abrasion. The vials were wiped between abrasions and the starting point of each abrasion was positioned on a previously non-abraded area. However, each abrasion traveled over the same "track". The same procedure was repeated for loads of 30 N and 50 N. The coefficients of friction of each abrasion (i.e., A1-A5) are graphically depicted in FIG. 27 for each load. As shown in FIG. 27, the coefficient of friction of the APS only coated vials is generally higher than 0.3 and often reached 0.6 or even higher.

Example 10

Three sets of two glass vials were prepared with an APS/poly(4,4'-oxydiphenylene-pyromellitimide) coating. Each of the vials was dip coated in a 0.1% solution of APS (aminopropylsilsesquioxane). The APS coating was heated at 100° C. in a convection oven for 15 minutes. The vials were then dipped into a 0.1% poly(pyromellitic dianhydride-co-4,4'-oxydianiline) amic acid solution (PMDA-ODA (poly (4,4'-oxydiphenylene-pyromellitimide)) in N-methyl-2-pyrrolidone (NMP). Thereafter, the coatings were cured by placing the coated vials into a preheated furnace at 300° C. for 30 minutes. The coated vials were then depyrogenated (heated) at 300° C. for 12 hours.

Figure 28:
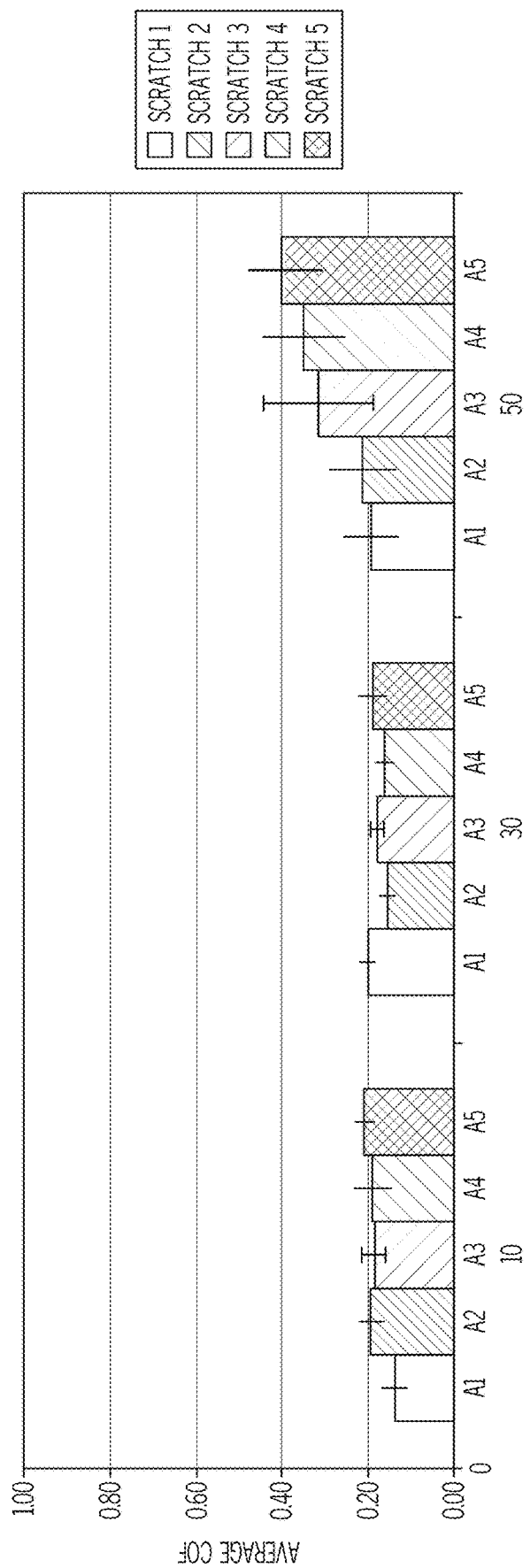
FIG. 28 is a chart reporting the coefficient of friction for vials coated with an APS/PMDA-ODA (poly(4,4'-oxydiphenylene-pyromellitimide) polyimide coating and abraded multiple times under different applied loads in a vial-on-vial jig after the vials were exposed to 300° C. for 12 hours, according to one or more embodiments shown and described herein.

Two vials were placed in the vial-on-vial jig depicted in FIG. 9 and abraded under a 10 N load. The abrasion procedure was repeated 4 more times over the same area and the coefficient of friction was determined for each abrasion. The vials were wiped between abrasions and the starting point of each abrasion was positioned on a previously abraded area and each abrasion was performed over the same "track". The same procedure was repeated for loads of 30 N and 50 N. The coefficients of friction of each abrasion (i.e., A1-A5) are graphically depicted in FIG. 28 for each load. As shown in FIG. 28, the coefficients of friction of the APS/poly(4,4'-oxydiphenylene-pyromellitimide) coated vials were generally uniform and approximately 0.20 or less for the abrasions introduced at loads of 10 N and 30 N. However, when the applied load was increased to 50 N, the coefficient of friction increased for each successive abrasion, with the fifth abrasion having a coefficient of friction slightly less than 0.40.

Example 11

Figure 29:
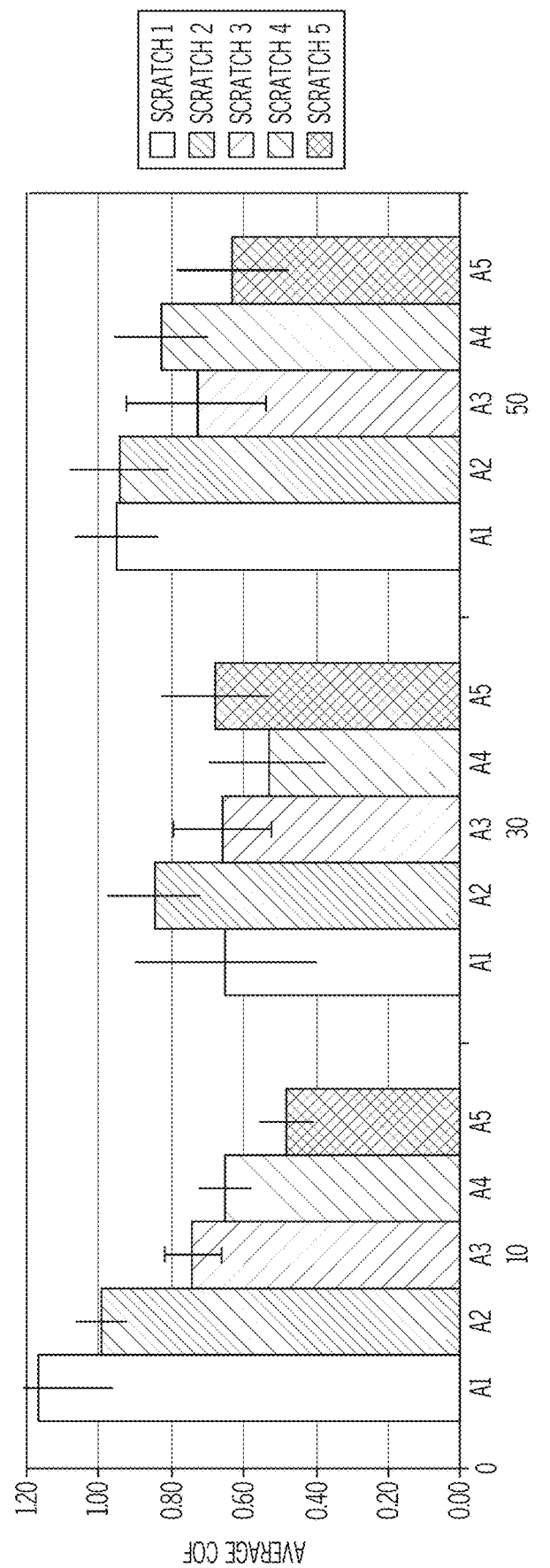
FIG. 29 is a chart reporting the coefficient of friction for vials coated with an APS coating and abraded multiple times under different applied loads in a vial-on-vial jig after the vials were exposed to 300° C. for 12 hours, according to one or more embodiments shown and described herein.

Three sets of two glass vials were prepared with an APS (aminopropylsilsesquioxane) coating. Each of the vials was dip coated in a 0.1% solution of APS and heated at 100° C. in a convection oven for 15 minutes. The coated vials were then depyrogenated (heated) at 300° C. for 12 hours. Two vials were placed in the vial-on-vial jig depicted in FIG. 9 and abraded under a 10 N loaded. The abrasion procedure was repeated 4 more times over the same area and the coefficient of friction was determined for each abrasion. The vials were wiped between abrasions and the starting point of each abrasion was positioned on a previously abraded area and each abrasion traveled over the same "track". The same procedure was repeated for loads of 30 N and 50 N. The coefficients of friction of each abrasion (i.e., A1-A5) are graphically depicted in FIG. 29 for each load. As shown in FIG. 29, the coefficients of friction of the APS coated vials depyrogenated for 12 hours were significantly higher than the APS coated vials shown in FIG. 27 and were similar to coefficients of friction exhibited by uncoated glass vials, indicating that the vials may have experienced a significant loss of mechanical strength due to the abrasions.

Example 12

Three sets of two glass vials formed from the Type IB glass were prepared with a poly(4,4'-oxydiphenylene-pyromellitimide) coating. The vials were dipped into a 0.1% poly(pyromellitic dianhydride-co-4,4'-oxydianiline) amic acid solution (PMDA-ODA (poly(4,4'-oxydiphenylene-pyromellitimide)) in N-Methyl-2-pyrrolidone (NMP). Thereafter, the coatings were dried at 150° C. for 20 min and then cured by placing the coated vials in into a preheated furnace at 300° C. for 30 minutes.

Figure 30:
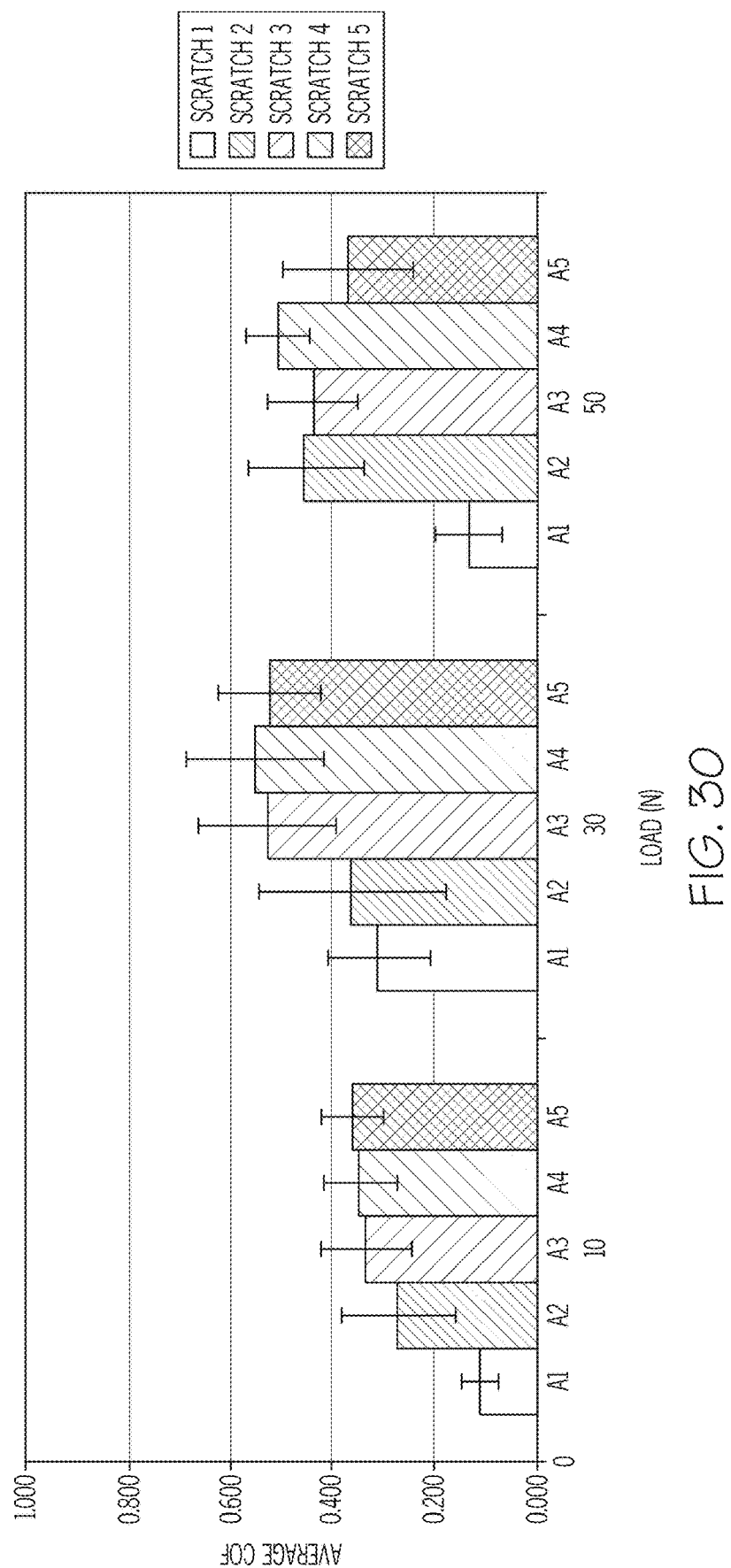
FIG. 30 is a chart reporting the coefficient of friction for Type IB vials coated with a PMDA-ODA (poly(4,4'-oxydiphenylene-pyromellitimide) polyimide coating and abraded multiple times under different applied loads in a vial-on-vial jig, according to one or more embodiments shown and described herein.

Two vials were placed in the vial-on-vial jig depicted in FIG. 9 and abraded under a 10 N loaded. The abrasion procedure was repeated 4 more times over the same area and the coefficient of friction was determined for each abrasion. The vials were wiped between abrasions and the starting point of each abrasion was positioned on a previously non-abraded area. However, each abrasion traveled over the same "track". The same procedure was repeated for loads of 30 N and 50 N. The coefficients of friction of each abrasion (i.e., A1-A5) are graphically depicted in FIG. 30 for each load. As shown in FIG. 30, the coefficients of friction of the poly(4,4'-oxydiphenylene-pyromellitimide) coated vials generally increased after the first abrasion demonstrating poor abrasion resistance of a polyimide coating applied onto a glass without a coupling agent.

Example 13

The APS/Novastrat® 800 coated vials of Example 6 were tested for their coefficient of friction after lyophilization using a vial-on-vial jig shown in FIG. 9 with a 30 N load. No increase in coefficient of friction was detected after lyophilization. FIG. 31 contains Tables showing the coefficient of friction for the APS/Novastrat® 800 coated vials before and after lyophilization.

Example 14

The Reference Glass Composition vials were ion exchanged and coated as described in Example 2. The coated vials were autoclaved using the following protocol: 10 minute steam purge at 100° C., followed by a 20 minute dwelling period wherein the coated glass container 100 is exposed to a 121° C. environment, followed by 30 minutes of treatment at 121° C. The coefficient of friction for autoclaved and non-autoclaved vials was measured using a vial-on-vial jig shown in FIG. 9 with 30 N load. FIG. 32 shows the coefficient of friction for APS/Novastrat® 800 coated vials before and after autoclaving. No increase in coefficient of friction was detected after autoclaving.

Example 15

Figure 33:
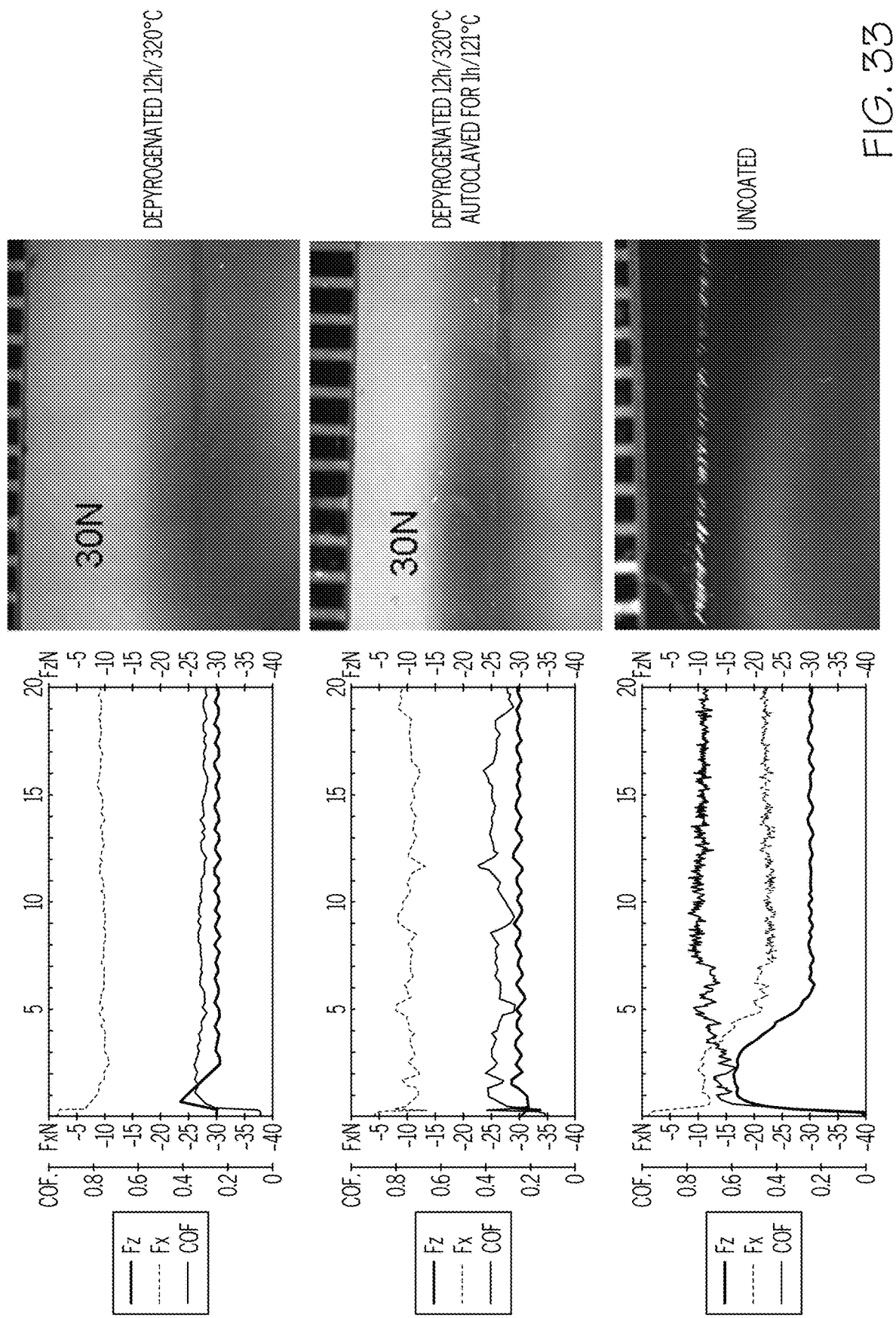
FIG. 33 graphically depicts the coefficient of friction for coated glass containers exposed to different temperature conditions and for an uncoated glass container.

Three sets of vials were coated with a APS/APhTMS (1:8 ratio) tie-layer and the outer layer consisting of the Novastrat® 800 polyimide applied as a solution of polyamic acid in dimethylacetamide and imidized at 300° C. One set was depyrogenated for 12 hours at 320° C. The second set was depyrogenated for 12 hours at 320° C. and then autoclaved for 1 hour at 121° C. A third set of vials was left uncoated. Each set of vials was then subjected to a vial-on-vial test under a 30 N load. The coefficient of friction for each set of vials is reported in FIG. 33. Photographs of the vial surface showing damage (or the lack of damage) experienced by each vial is also depicted in FIG. 33. As shown in FIG. 33, the uncoated vials generally had a coefficient of friction greater than about 0.7. The uncoated vials also incurred visually perceptible damage as a result of the testing. However, the coated vials had a coefficient of friction of less than 0.45 without any visually perceptible surface damage.

Figure 34:
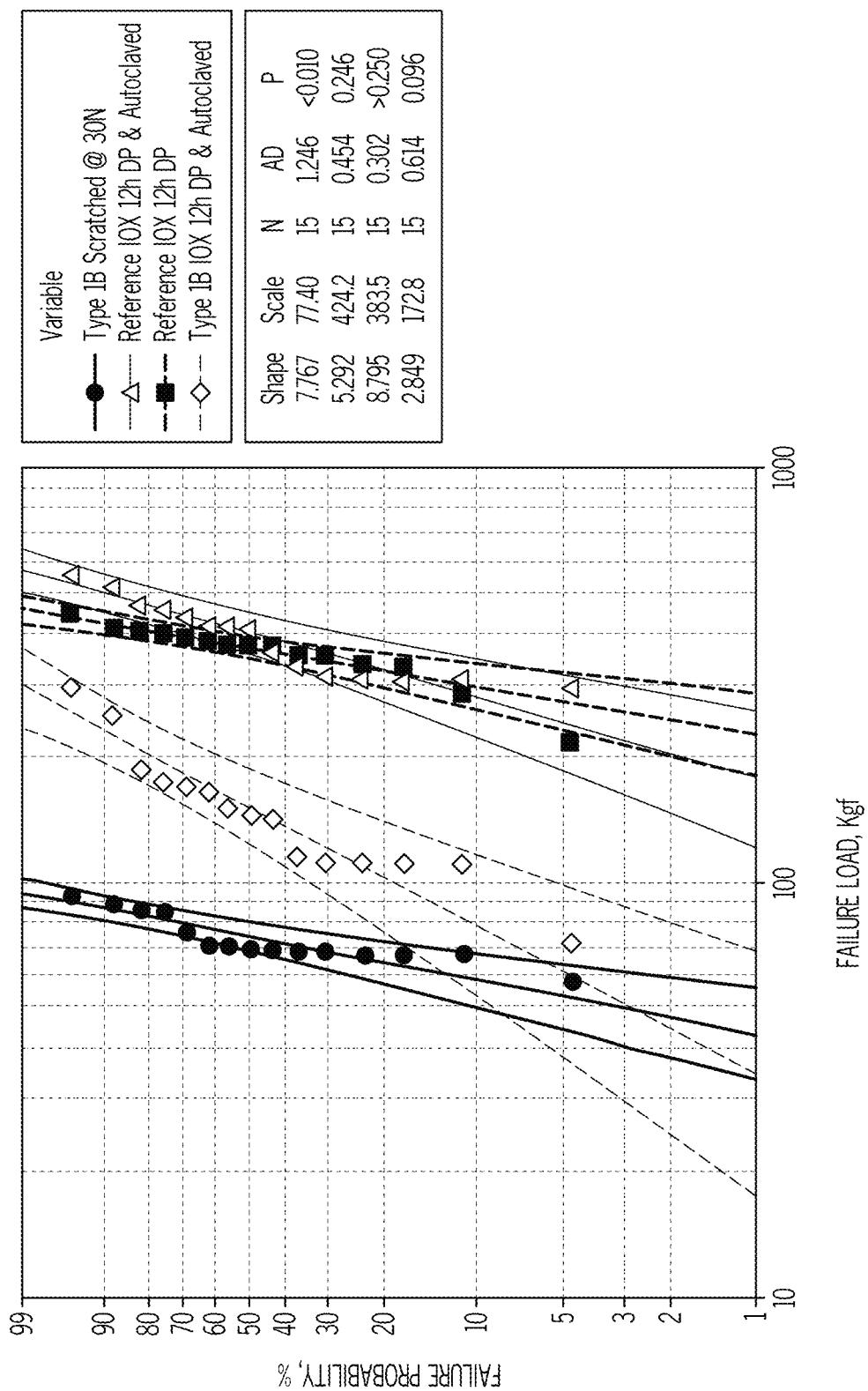
FIG. 34 graphically depicts the failure probability as a function of applied load in a horizontal compression test for vials, according to one or more embodiments shown and described herein.

The coated vials were also subjected to depyrogenation, as described above, autoclave conditions, or both. FIG. 34 graphically depicts the failure probability as a function of applied load in a horizontal compression test for the vials. There was no statistical difference between depyrogenated vials and depyrogenated and autoclaved vials.

Example 16

Vials formed from Type IB ion-exchanged glass were prepared with lubricous coatings have varying ratios of silanes. Referring now to FIG. 35, the vials were prepared with three different coating compositions to assess the effect of different ratios of silanes on the coefficient of friction of the applied coating. The first coating composition included a coupling agent layer having a 1:1 ratio of GAPS to aminophenyltrimethyloxysilane (APhTMS) and an outer coating layer which consisted of 1.0% Novastrat® 800 polyimide. The second coating composition included a coupling agent layer having a 1:0.5 ratio of GAPS to APhTMS and an outer coating layer which consisted of 1.0% Novastrat® 800 polyimide. The third coating composition included a coupling agent layer having a 1:0.2 ratio of GAPS to APhTMS and an outer coating layer which consisted of 1.0% Novastrat® 800 polyimide. All the vials were depyrogenated for 12 hours at 320° C. Thereafter, the vials were subjected to a vial-on-vial frictive test under loads of 20 N and 30 N. The average applied normal force, coefficient of friction, and maximum frictive force (Fx) for each vial is reported in FIG. 35. As shown in FIG. 35, decreasing the amount of aromatic silane (i.e., the aminophenytrimethyloxysilane) increases the coefficient of friction between the vials as well as the frictive force experienced by the vials.

Example 17

Vials formed from Type IB ion-exchanged glass were prepared with lubricous coatings have varying ratios of silanes.

Figure 36:
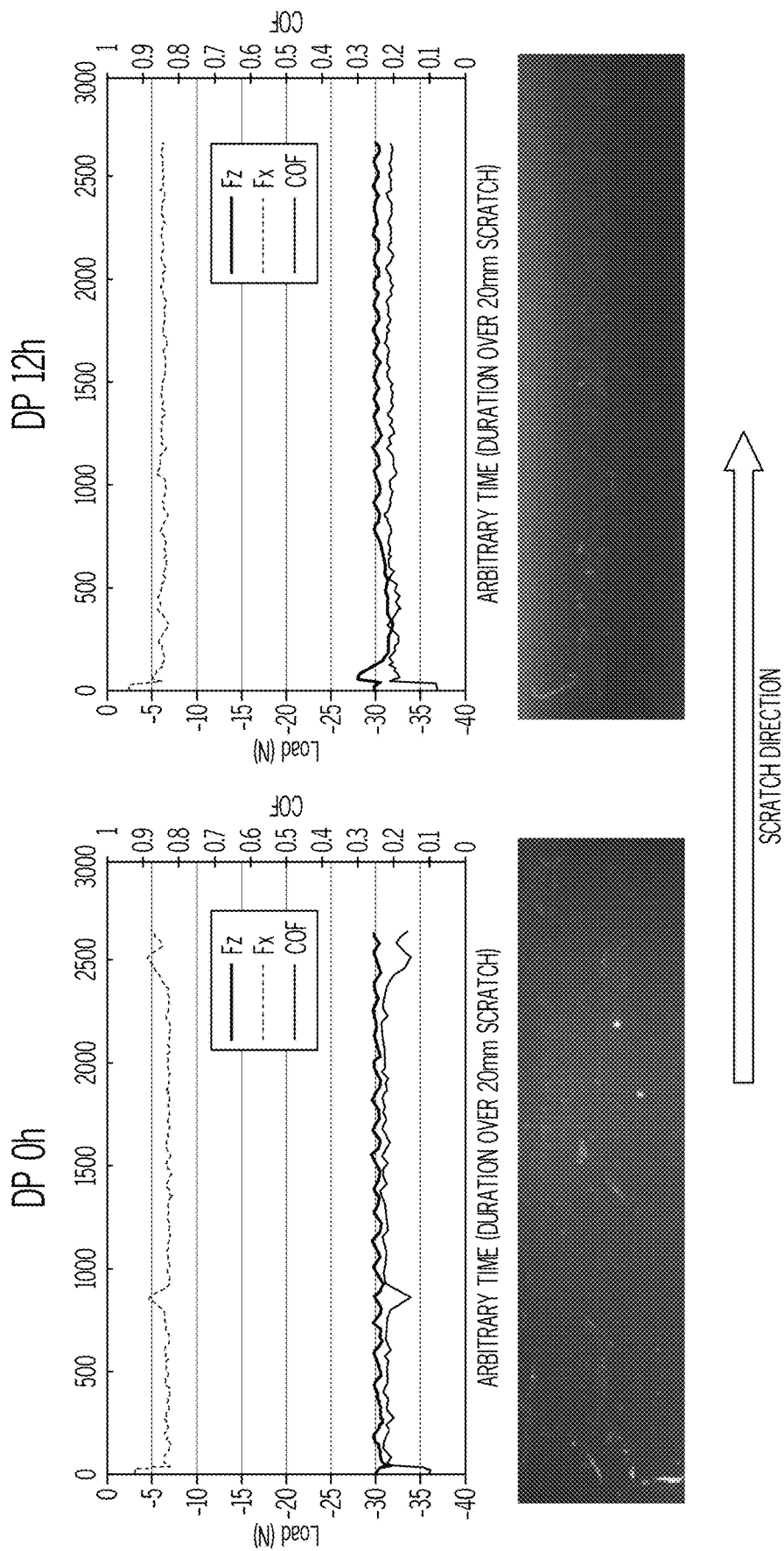
FIG. 36 graphically depicts the coefficient of friction, applied force and frictive force for coated glass containers before and after depyrogenation.

Samples were prepared with a composition which included a coupling agent layer formed from 0.125% APS and 1.0% aminophenyltrimethyloxysilane (APhTMS), having an APS/APhTMS ratio of 1:8, and an outer coating layer formed from 0.1% Novastrat® 800 polyimide. The thermal stability of the applied coating was evaluated by determining the coefficient of friction and frictive force of vials before and after depyrogenation. Specifically, coated vials were subjected to a vial-on-vial frictive test under a load of 30 N. The coefficient of friction and frictive force were measured and are plotted in FIG. 36 as a function of time. A second set of vials was depyrogenated for 12 hours at 320° C. and subjected to the same vial-on-vial frictive test under a load of 30 N. The coefficient of friction remained the same both before and after depyrogenation indicating that the coatings were thermally stable and protected the glass surface from frictive damage. A photograph of the contacted area of the glass is also shown.

Figure 37:
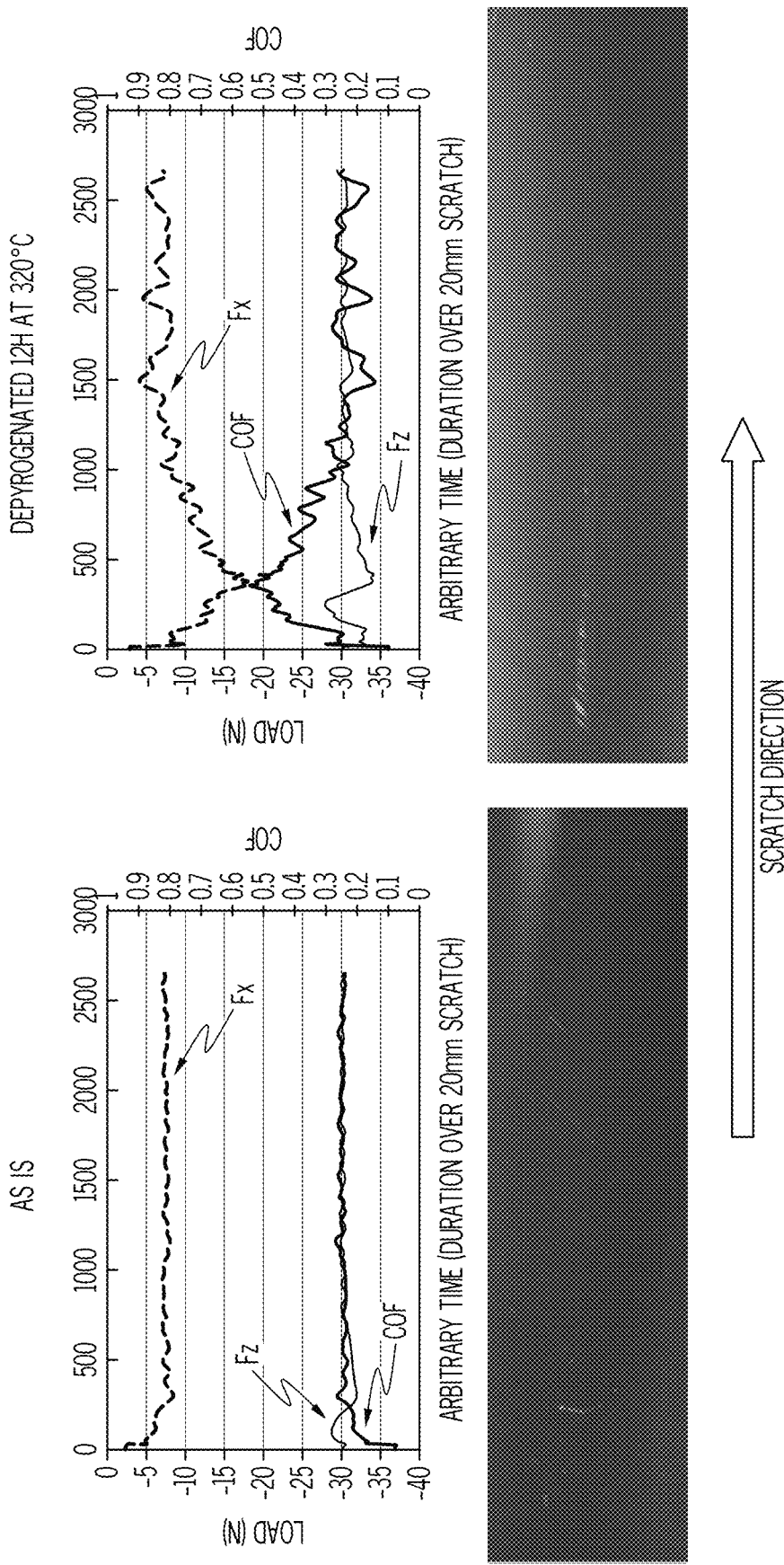
FIG. 37 graphically depicts the coefficient of friction, applied force and frictive force for coated glass containers before and after depyrogenation, according to one or more embodiments shown and described herein.

Samples were prepared with a composition which included a coupling agent layer formed from 0.0625% APS and 0.5% APhTMS, having an APS/APhTMS ratio of 1:8, and an outer coating layer formed from 0.05% Novastrat® 800 polyimide. The thermal stability of the applied coating was evaluated by determining the coefficient of friction and frictive force of vials before and after depyrogenation. Specifically, coated vials were subjected to a vial-on-vial frictive test under a load of 30 N. The coefficient of friction and frictive force were measured and are plotted in FIG. 37 as a function of time/distance. A second set of vials were depyrogenated for 12 hours at 320° C. and subjected to the same vial-on-vial frictive test under a load of 30 N. The coefficient of friction remained the same both before and after depyrogenation indicating that the coatings were thermally stable. A photograph of the contacted area of the glass is also shown.

Figure 38:
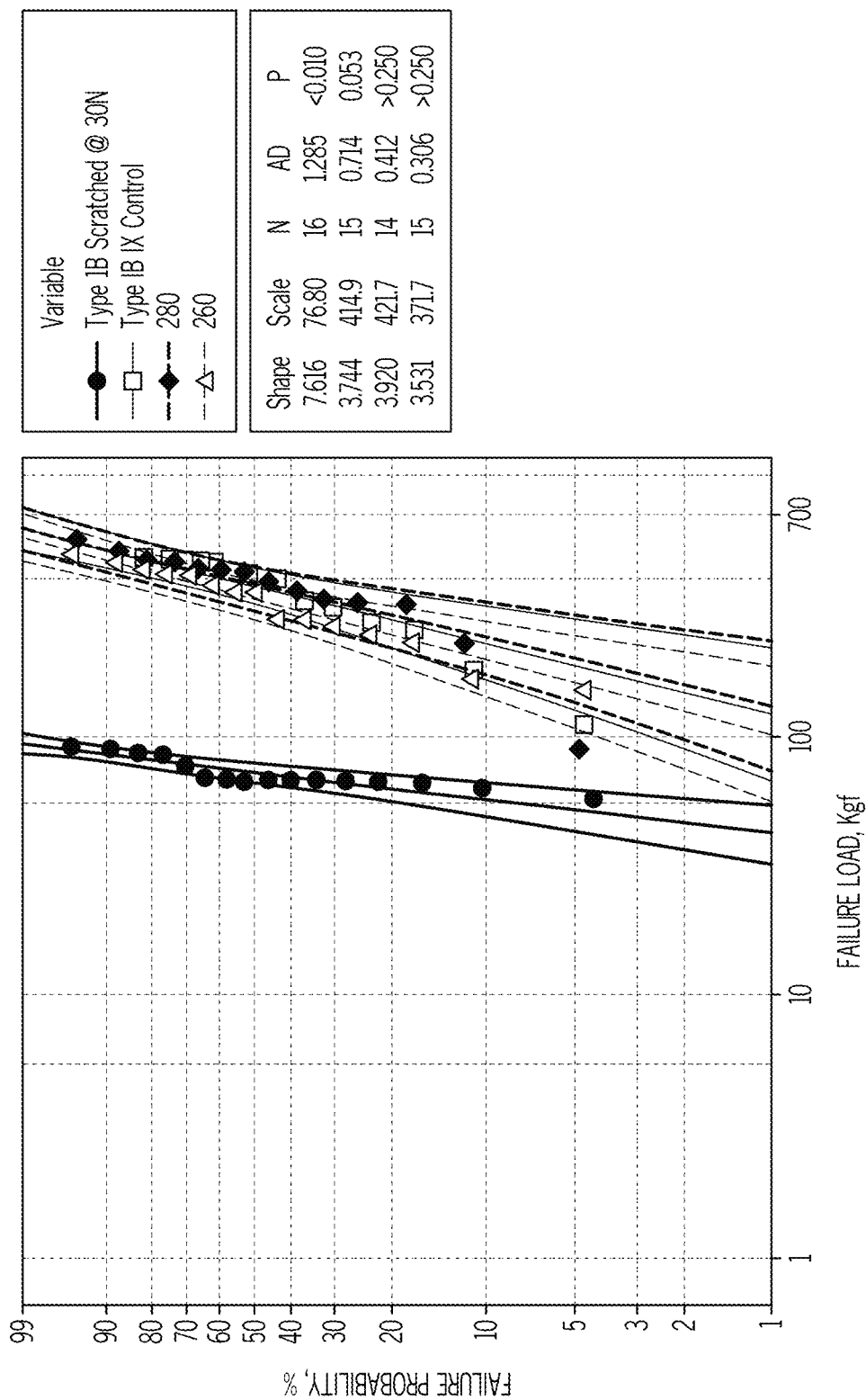
FIG. 38 graphically depicts the failure probability as a function of applied load in a horizontal compression test for vials, according to one or more embodiments shown and described herein.

FIG. 38 graphically depicts the failure probability as a function of applied load in a horizontal compression test for the vials with lubricous coatings formed from 0.125% APS and 1.0% APhTMS, and an outer coating layer formed from 0.1% Novastrat® 800 polyimide (Shown as "260" on FIG. 38), and formed from 0.0625% APS and 0.5% APhTMS and an outer coating layer formed from 0.05% Novastrat® 800 polyimide (Shown as "280" on FIG. 38). The data shows that failure load remains unchanged from uncoated unscratched samples for coated, depyrogenated, and scratched samples demonstrating glass protection from damage by the coating.

Figure 39:
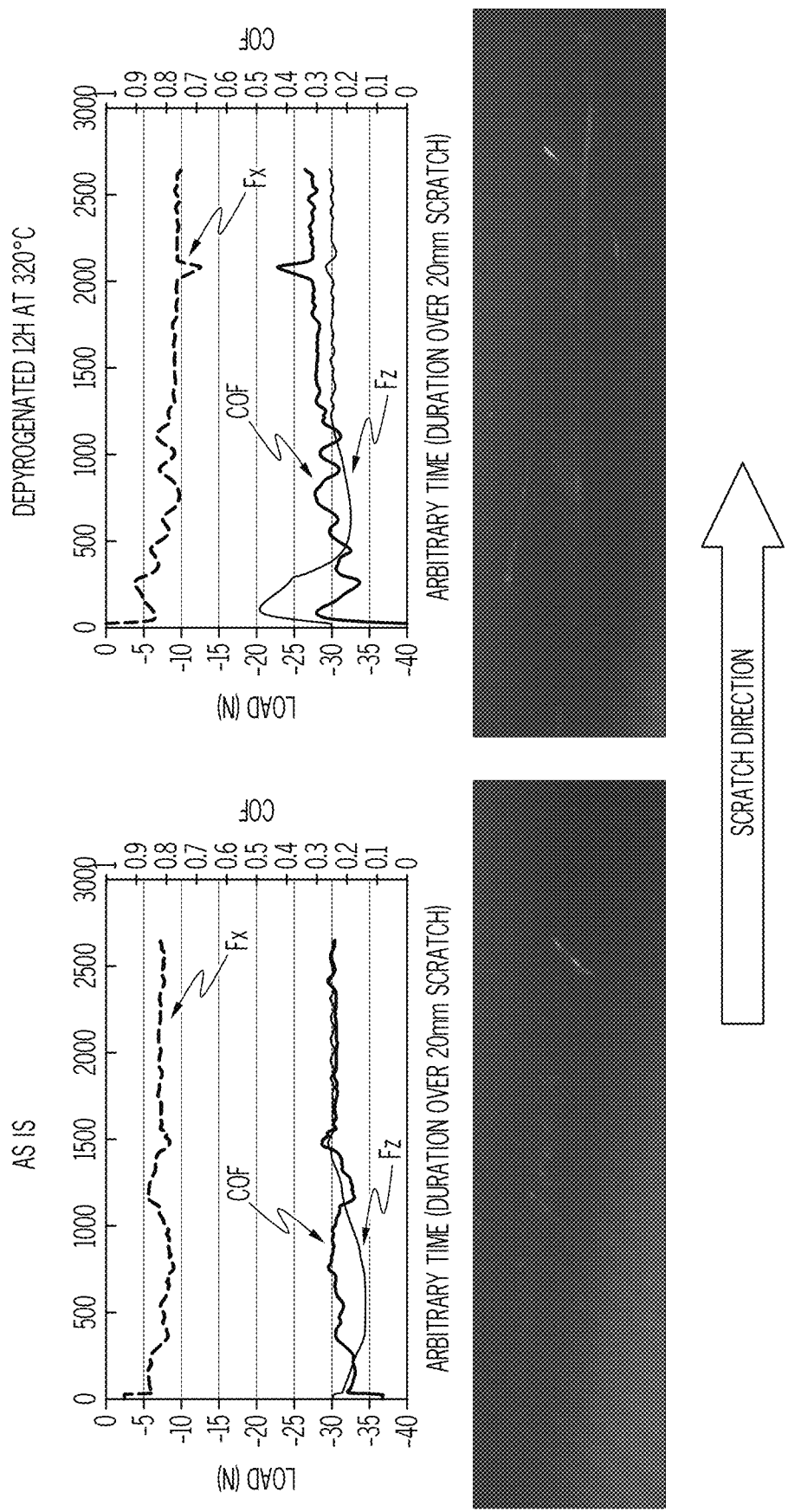
FIG. 39 graphically depicts the coefficient of friction, applied force and frictive force for coated glass containers before and after depyrogenation, according to one or more embodiments shown and described herein.

Vials were prepared with lubricous coatings using GAPS hydrolysate. Samples were prepared with a composition which included a coupling agent layer formed from 0.5% Dynasylan® Hydrosil 1151 (3-aminopropylsilane hydrolysate) and 0.5% aminophenyltrimethyloxysilane (APhTMS), having a ratio of 1:1, and an outer coating layer formed from 0.05% Novastrat® 800 polyimide. The coating performance was evaluated by determining the coefficient of friction and frictive force of vials before and after depyrogenation. Specifically, Type 1B vials that were ion exchange strengthened (100% KNO$_3$ at 450° C., 8 h) were subjected to a vial-on-vial frictive test under a load of 30 N. The coefficient of friction and frictive force were measured and are plotted in FIG. 39 as a function of time/distance. A second set of vials were depyrogenated for 12 hours at 320° C. and subjected to the same vial-on-vial frictive test under a load of 30 N. The coefficient of friction remained the same both before and after depyrogenation indicating that the coatings were thermally stable. A photograph of the contacted area of the glass is also shown. This suggests that hydrolysates of aminosilanes are useful in the coating formulations as well.

Figure 41:
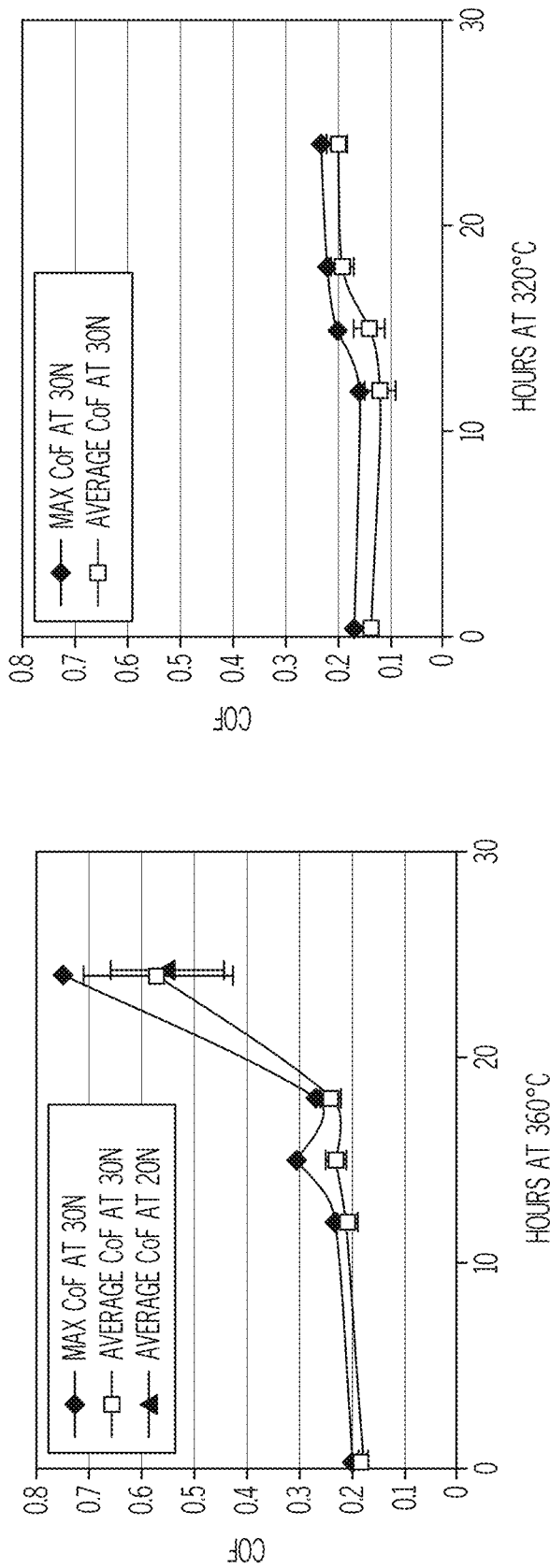
FIG. 41 graphically depicts the coefficient of friction after varying heat treatment times, according to one or more embodiments shown and described herein.

The thermal stability of the applied coating was also evaluated for a series of depyrogenation conditions. Specifically, Type IB ion-exchanged glass vials were prepared with a composition which included a coupling agent layer having a 1:1 ratio of GAPS (0.5%) to aminophenyltrimethyloxysilane (APhTMS) (0.5%) and an outer coating layer which consisted of 0.5% Novastrat® 800 polyimide. The vials were dip coated in the solution using an automated dip coater with a pull-out rate of 2 mm/s. Sample vials were subjected to one of the following depyrogenation cycles: 12 hours at 320° C.; 24 hours at 320° C.; 12 hours at 360° C.; or 24 hours at 360° C. The coefficient of friction and frictive force were then measured using a vial-on-vial frictive test and plotted as a function of time for each depyrogenation condition, as shown in FIG. 40. As shown in FIG. 40, the coefficient of friction of the vials did not vary with the depyrogenation conditions indicating that the coating was thermally stable. FIG. 41 graphically depicts the coefficient of friction after varying heat treatment times at 360° C. and 320° C.

Example 18

Vials were coated as described in Example 2 with an APS/Novastrat 800 coating. The light transmission of coated vials, as well as uncoated vials, was measured within a range of wavelengths between 400-700 nm using a spectrophotometer. The measurements are performed such that a light beam is directed normal to the container wall such that the beam passes through the lubricous coating twice, first when entering the container and then when exiting it. FIG. 11 graphically depicts the light transmittance data for coated and uncoated vials measured in the visible light spectrum from 400-700 nm. Line 440 shows an uncoated glass container and line 442 shows a coated glass container.

Example 19

Figure 42:
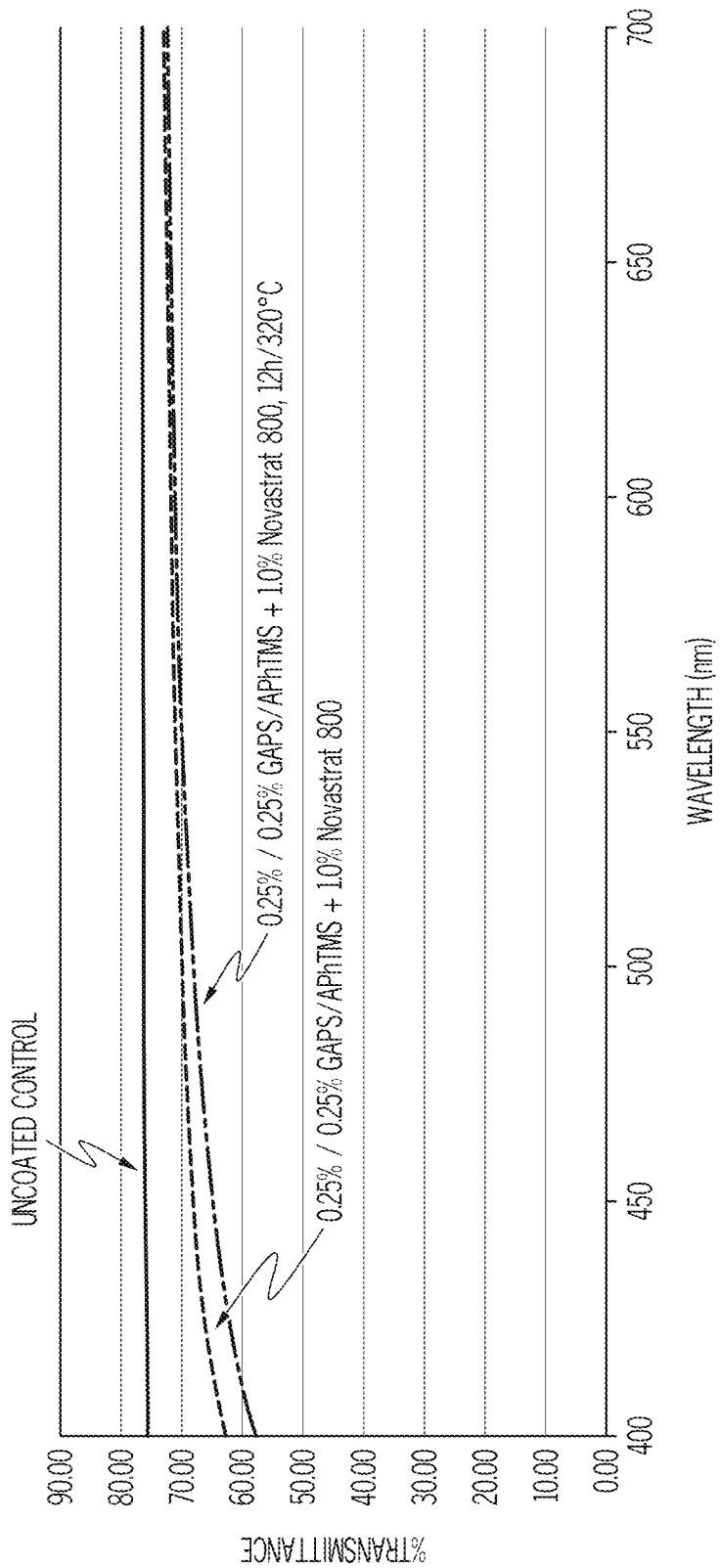
FIG. 42 graphically depicts the light transmittance data for coated and uncoated vials measured in the visible light spectrum from 400-700 nm, according to one or more embodiments shown and described herein.

Vials were coated with a 0.25% GAPS/0.25% APhTMS coupling agent and 1.0% Novastrat® 800 polyimide and were tested for light transmission before and after depyrogenation at 320° C. for 12 hours. An uncoated vial was also tested. Results are shown in FIG. 42.

Example 20

To improve polyimide coating uniformity, the Novastrat® 800 polyamic acid was converted into polyamic acid salt and dissolved in methanol, significantly faster evaporating solvent compard to dimethylacetamide, by adding 4 g of triethylamine to 1L of methanol and then adding Novastrat® 800 polyamic acid to form 0.1% solution. Methanol soluble salt of poly(pyromellitic dianhydride-co-4,4'-oxydianiline) amic acid could be produced.

Figure 43:
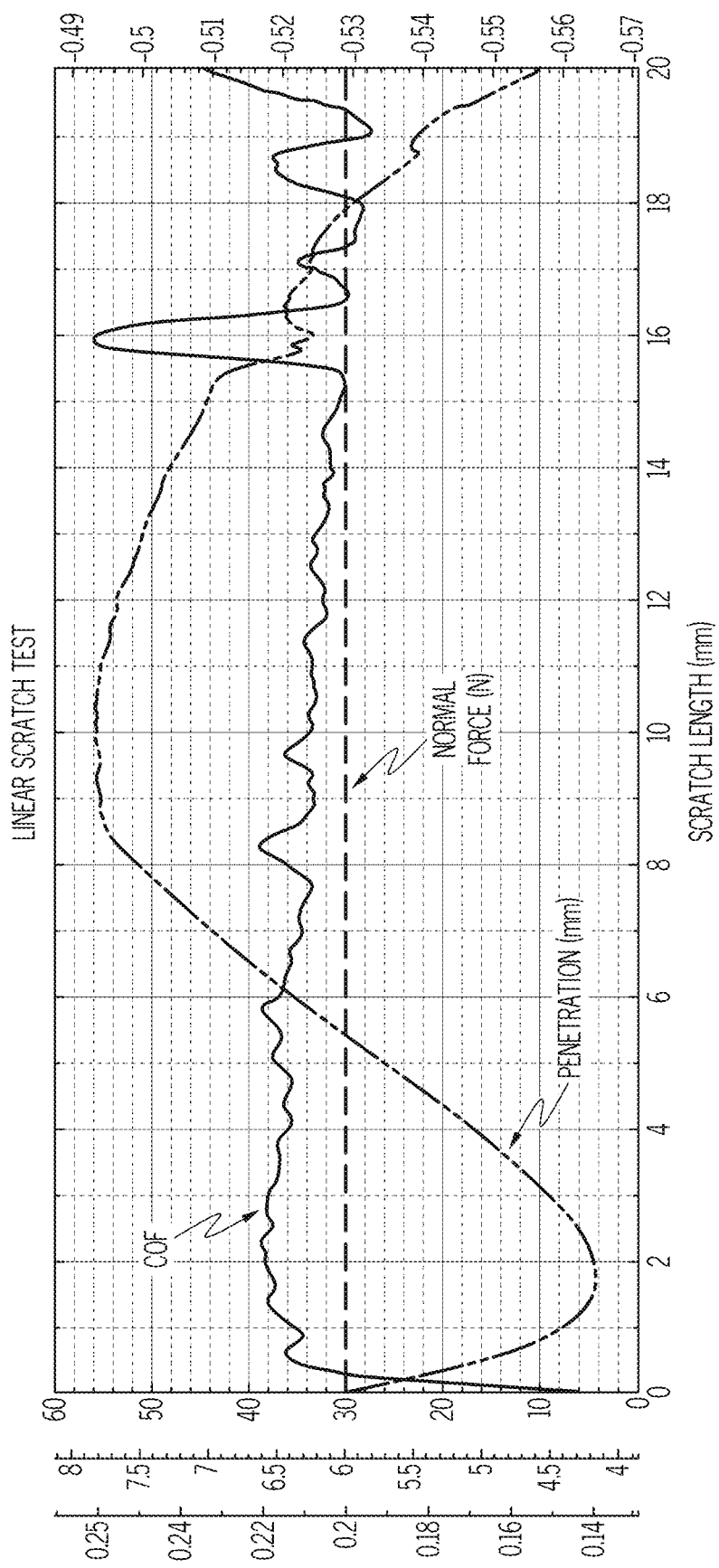
FIG. 43 graphically depicts the coefficient of friction, applied force and frictive force for coated glass containers before and after depyrogenation, according to one or more embodiments shown and described herein.
Figure 44:
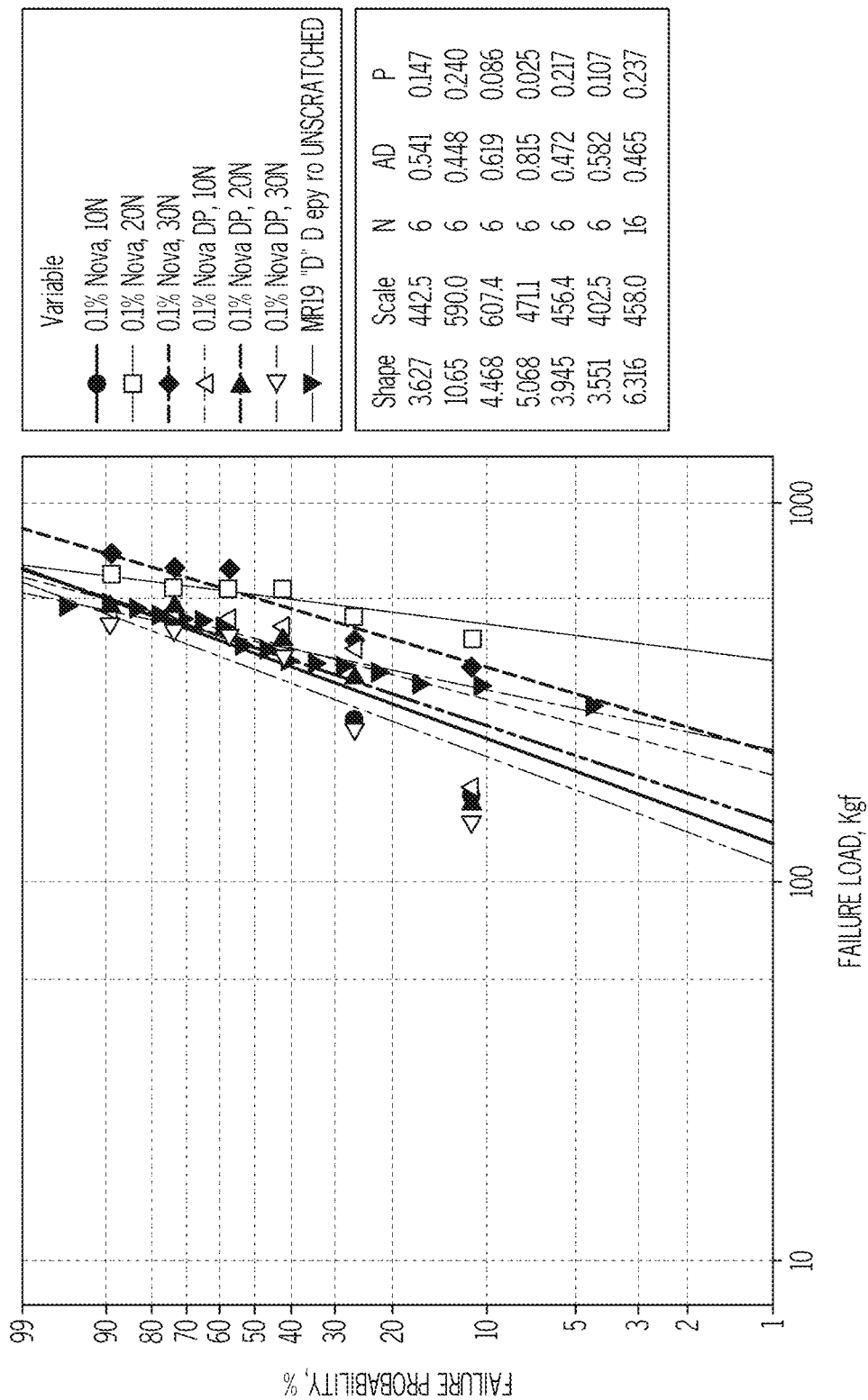
FIG. 44 graphically depicts the failure probability as a function of applied load in a horizontal compression test for vials, according to one or more embodiments shown and described herein.

Coating on Type IB ion-exchanged vials formed from 1.0% GAPS/1.0% APhTMS in methanol/water mixture and 0.1% Novastrat® 800 polyamic acid salt in methanol. The coated vials were depyrogenated for 12 h at 360° C. and as-coated and depyrogenated samples were abraded in vial-on-vial jig at 10 N, 20 N, and 30 N normal loads. No glass damage was observed at normal forces of 10 N, 20 N, and 30 N. FIG. 43 shows the coefficient of friction, applied force and frictive force for the samples after a heat treatment at 360° C. for 12 hours. FIG. 44 graphically depicts the failure probability as a function of applied load in a horizontal compression test for the samples. Statistically the sample series at 10 N, 20 N, and 30 N were indistinguishable from each other. The low load failure samples broke from origins located away from the scratch.

Thickness of the coaing layers was estimated using ellipsometry and scanning electron microscopy (SEM) is, shown in FIGS. 45-47, respectively. The samples for coating thickness measurements were produced using silicon wafer (ellipsometry) and glass slides (SEM). The methods show thicknesses varying from 55 to 180 nm for the tie-layer and 35 nm for Novastrat® 800 polyamic acid salt.

Example 21

Plasma cleaned Si wafer pieces were dip coated using 0.5% GAPS/0.5% APhTMS solution in 75/25 methanol/water vol/vol mixture. The coating was exposed to 120° C. for 15 minutes. The coating thickness was determined using ellipsometry. Three samples were prepared, and had thicknesses of 92.1 nm, 151.7 nm, and 110.2 nm, respectively, with a standard deviation of 30.6 nm.

Glass slides were dip coated and examined with a scanning electron microscope. FIG. 45 shows an SEM image of a glass slide dip coated in a coating solution of 1.0% GAPS, 1.0% APhTMS, and 0.3% NMP in 75/25 methanol/water mixture with an 8 mm/s pull-out followed by curing at 150° C. for 15 minutes. The coating appears to be about 93 nm thick. FIG. 46 shows an SEM image of a glass slide dip coated in a coating solution of 1.0% GAPS, 1.0% APhTMS, and 0.3 NMP in a 75/25 methanol/water mixture with a 4 mm/s pull-out rate followed by curing at 150° C. for 15 minutes. The coating appears to be about 55 nm thick. FIG. 47 shows an SEM image of a glass slide dip coated in a coating solution of 0.5% Novastrat® 800 solution with a 2 mm/s pull-out rate followed by curing at 150° C. for 15 min and heat treatment at 320° C. for 30 minutes. The coating appears to be about 35 nm thick.

Comparative Example A

Glass vials formed from a Type IB glass were coated with a diluted coating of Bayer Silicone aqueous emulsion of Baysilone M with a solids content of about 1-2%. The vials were treated at 150° C. for 2 hours to drive away water from the surface leaving a polydimethylsiloxane coating on the exterior surface of the glass. The nominal thickness of the coating was about 200 nm. A first set of vials were maintained in untreated condition (i.e., the "as-coated vials"). A second set of vials were treated at 280° C. for 30 minutes (i.e., the "treated vials"). Some of the vials from each set were first mechanically tested by applying a scratch with a linearly increasing load from 0-48N and a length of approximately 20 mm using a UMT-2 tribometer and a vial-on-vial test jig. The scratches were evaluated for coefficient of friction and morphology to determine if the scratching procedure damaged the glass or if the coating protected the glass from damage due to scratching.

Figure 48:
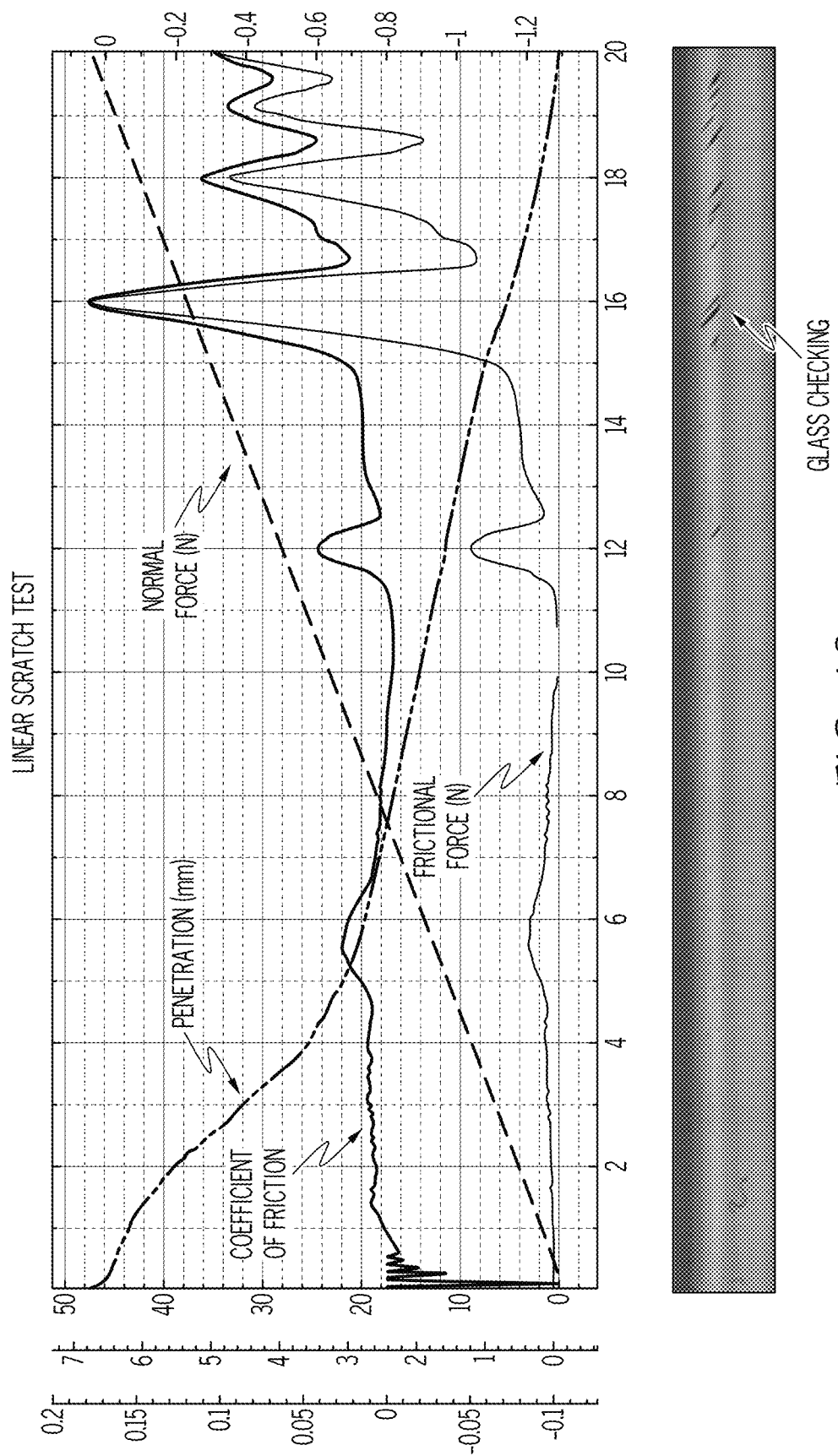
FIG. 48 graphically depicts the coefficient of friction, scratch penetration, applied normal force, and frictional force (y-ordinates) as a function of the length of the applied scratch (x-ordinate) for the as-coated vials of a Comparative Example.

FIG. 48 is a plot showing the coefficient of friction, scratch penetration, applied normal force, and frictional force (y-ordinates) as a function of the length of the applied scratch (x-ordinate) for the as-coated vials. As graphically depicted in FIG. 48, the as-coated vials exhibited a coefficient of friction of approximately 0.03 up to loads of about 30 N. The data shows that below approximately 30 N the COF is always below 0.1. However, at normal forces greater than 30 N, the coating began to fail, as indicated by the presence of glass checking along the length of scratch. Glass checking is indicative of glass surface damage and an increased propensity of the glass to fail as a result of the damage.

Figure 49:
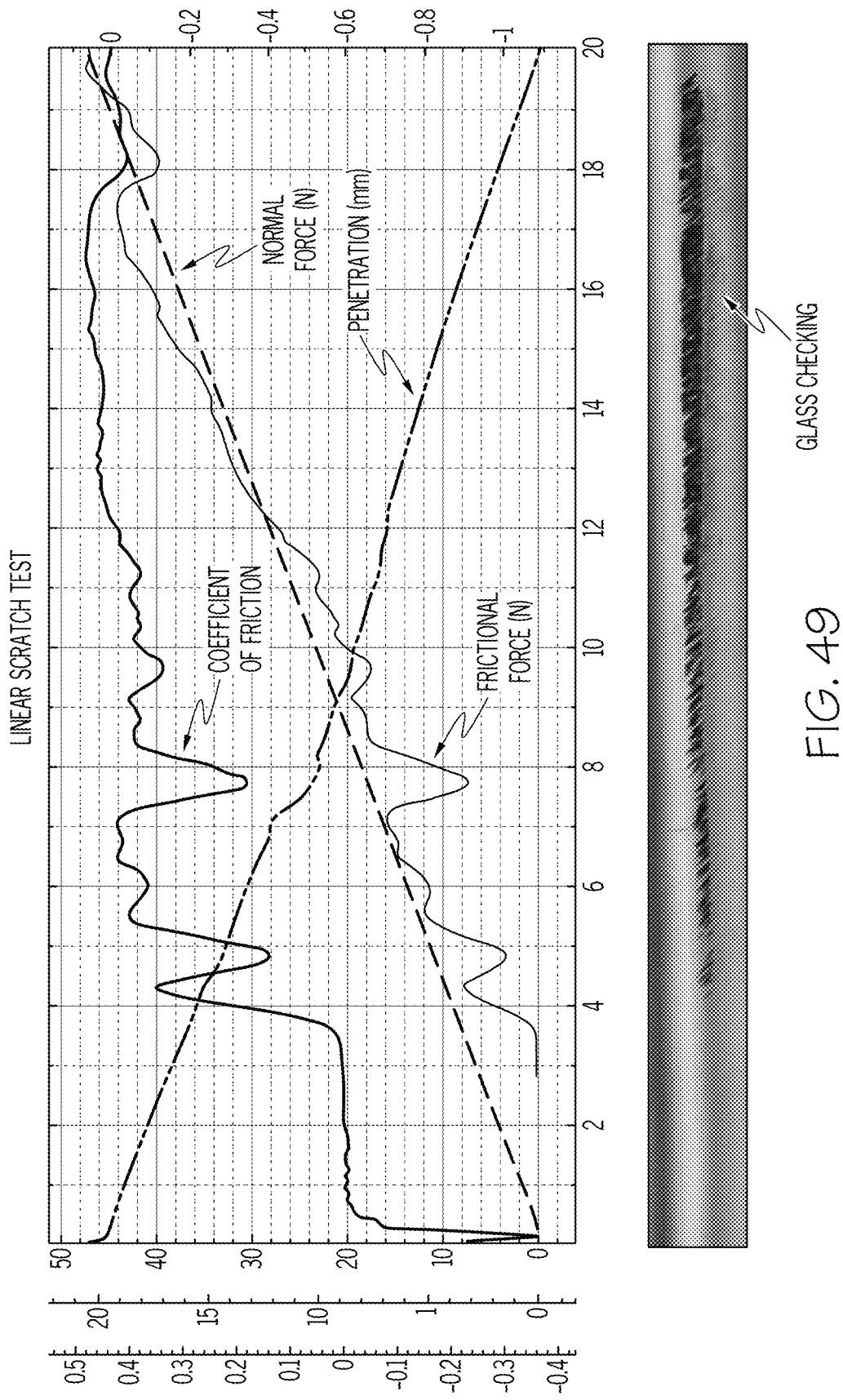
FIG. 49 graphically depicts the coefficient of friction, scratch penetration, applied normal force, and frictional force (y-ordinates) as a function of the length of the applied scratch (x-ordinate) for the thermally treated vials of a Comparative Example.

FIG. 49 is a plot showing the coefficient of friction, scratch penetration, applied normal force, and frictional force (y-ordinates) as a function of the length of the applied scratch (x-ordinate) for the treated vials. For the treated vials, the coefficient of friction remained low until the applied load reached a value of approximately 5 N. At that point the coating began to fail and the glass surface was severely damaged as evident from the increased amount of glass checking which occurred with increasing load. The coefficient of friction of the treated vials increased to about 0.5. However, the coating failed to protect the surface of the glass at loads of 30 N following thermal exposure, indicating that the coating was not thermally stable.

The vials were then tested by applying 30 N static loads across the entire length of the 20 mm scratch. Ten samples of as-coated vials and ten samples of treated vials were tested in horizontal compression by applying a 30 N static load across the entire length of the 20 mm scratch. None of the as-coated samples failed at the scratch while 6 of the 10 treated vials failed at the scratch indicating that the treated vials had lower retained strength.

Comparative Example B

A solution of Wacker Silres MP50 (part #60078465 lot #EB21192) was diluted to 2% and was applied to vials formed from the Reference Glass Composition. The vials were first cleaned by applying plasma for 10 seconds prior to coating. The vials were dried at 315° C. for 15 minutes to drive off water from the coating. A first set of vials was maintained in "as-coated" condition. A second set of vials was treated for 30 minutes at temperatures ranging from 250° C. to 320° C. (i.e., "treated vials"). Some of the vials from each set were first mechanically tested by applying a scratch with a linearly increasing load from 0-48N and a length of approximately 20 mm using a UMT-2 tribometer. The scratches were evaluated for coefficient of friction and morphology to determine if the scratching procedure damaged the glass or if the coating protected the glass from damage due to scratching.

Figure 50:
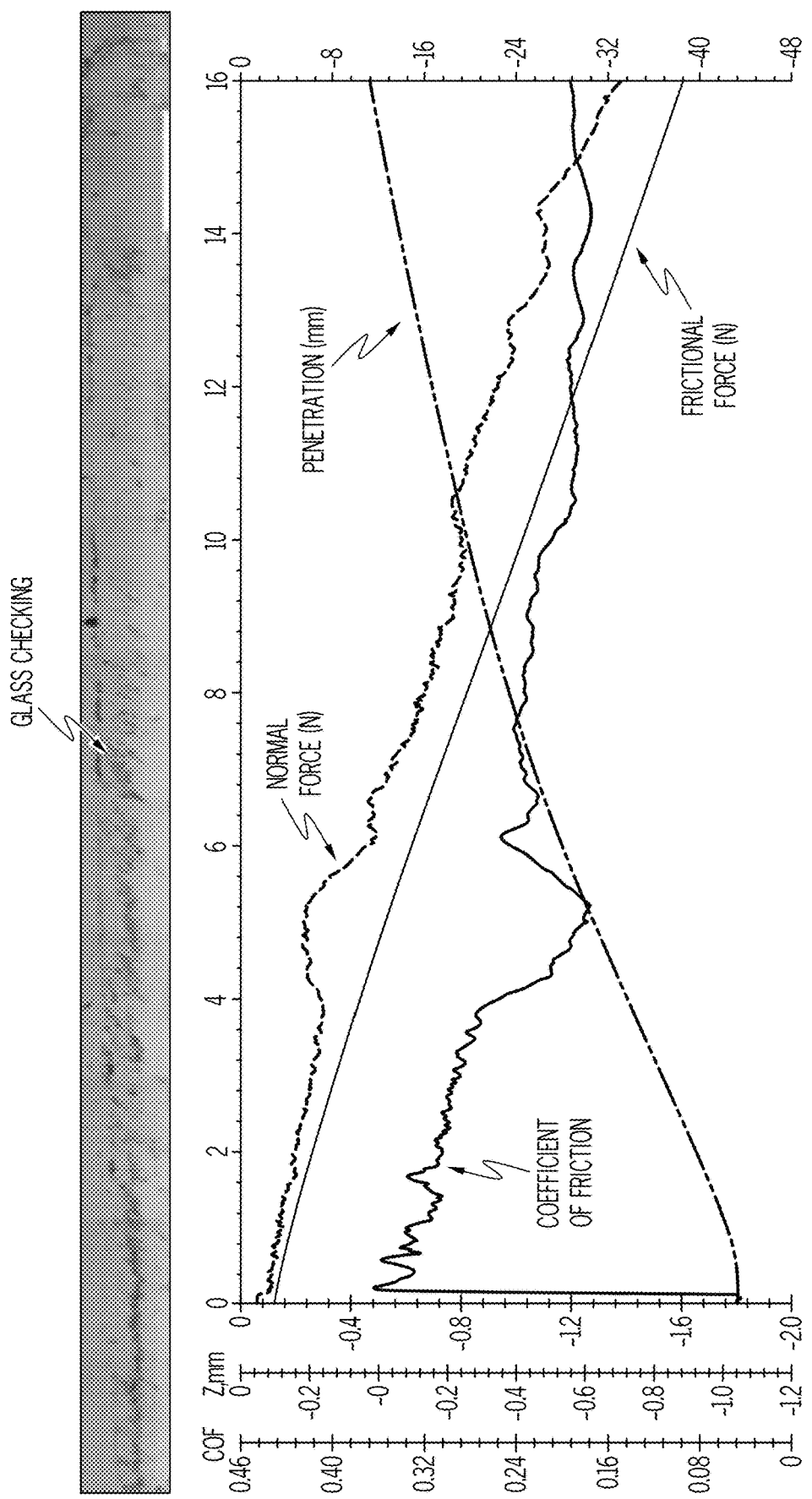
FIG. 50 graphically depicts the coefficient of friction, scratch penetration, applied normal force, and frictional force (y-ordinates) as a function of the length of the applied scratch (x-ordinate) for the as-coated vials of a Comparative Example.

FIG. 50 is a plot showing the coefficient of friction, scratch penetration, applied normal force, and frictional force (y-ordinates) as a function of the length of the applied scratch (x-ordinate) for the as-coated vials.

Figure 51:
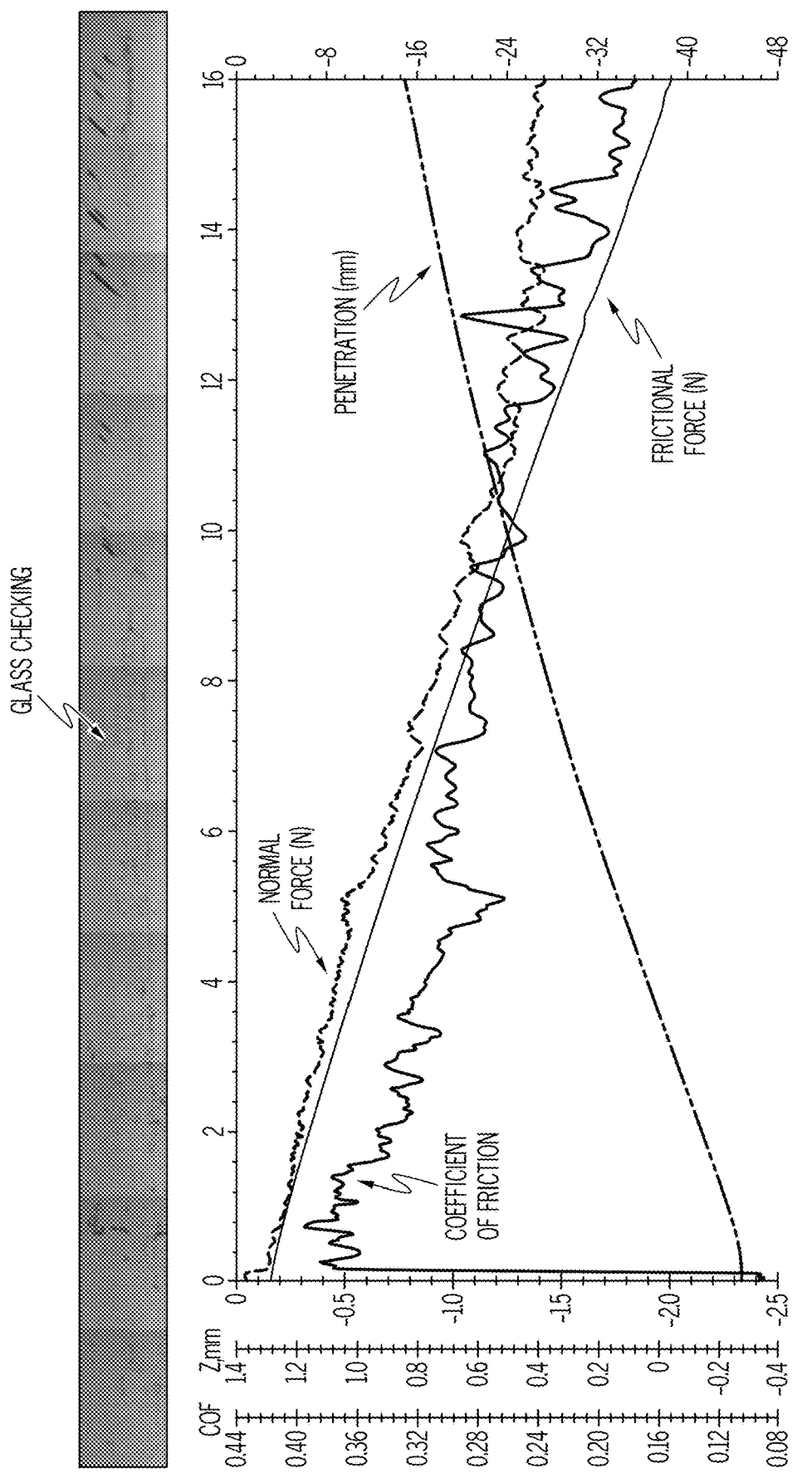
FIG. 51 graphically depicts the coefficient of friction, scratch penetration, applied normal force, and frictional force (y-ordinates) as a function of the length of the applied scratch (x-ordinate) for the thermally treated vials of a Comparative Example.

FIG. 51 is a plot showing the coefficient of friction, scratch penetration, applied normal force, and frictional force (y-ordinates) as a function of the length of the applied scratch (x-ordinate) for the treated vials treated at 280° C. The treated vials exhibited significant glass surface damage at applied loads greater than about 20N. It was also determined that the load threshold to glass damage decreased with increasing thermal exposure temperatures, indicating that the coatings degraded with increasing temperature (i.e., the coating is not thermally stable). Samples treated at temperatures lower than 280° C. showed glass damage at loads above 30N.

Comparative Example C

Vials formed from the Reference Glass Composition were treated with Evonik Silikophen P 40/W diluted to 2% solids in water. The samples were then dried at 150° C. for 15 minutes and subsequently cured at 315° C. for 15 minutes. A first set of vials was maintained in "as-coated" condition. A second set of vials was treated for 30 minutes at a temperature of 260° C. (i.e., "the 260° C. treated vials"). A third set of vials was treated for 30 minutes at a temperature of 280° C. (i.e., "the 280° C. treated vials"). The vials were scratched with a static load of 30 N using the testing jig depicted in FIG. 9. The vials were then tested in horizontal compression. The 260° C. treated vials and the 280° C. treated vials failed in compression while 2 of 16 of the as-coated vials failed at the scratch. This indicates that the coating degraded upon exposure to elevated temperatures and, as a result, the coating did not adequately protect the surface from the 30 N load.

Example 22

Vials formed from the Reference Glass Composition were coated with a solution of 1.0%/1.0% GAPS/m-APhTMS solution in methanol/water with a 75/25 concentration. The vials were dip coated in the solution with a pull-out rate of 2 mm/s. The coating was cured at 150° C. for 15 minutes. A first set of vials was maintained in untreated condition (i.e., the "as-coated vials"). A second set of vials was depyrogenated at 300° C. for 12 hours (i.e., the "treated vials"). Some of the vials from each set were mechanically tested by applying a scratch with a 10N load from the shoulder of the vial to the heel of the vial using a UMT-2 tribometer and a vial-on-vial test jig. Additional vials from each set were mechanically tested by applying a scratch with a 30N load from the shoulder of the vial to the heel of the vial using a UMT-2 tribometer and a vial-on-vial test jig. The scratches were evaluated for coefficient of friction and morphology to determine if the scratching procedure damaged the glass or if the coating protected the glass from damage due to scratching.

Figure 52:
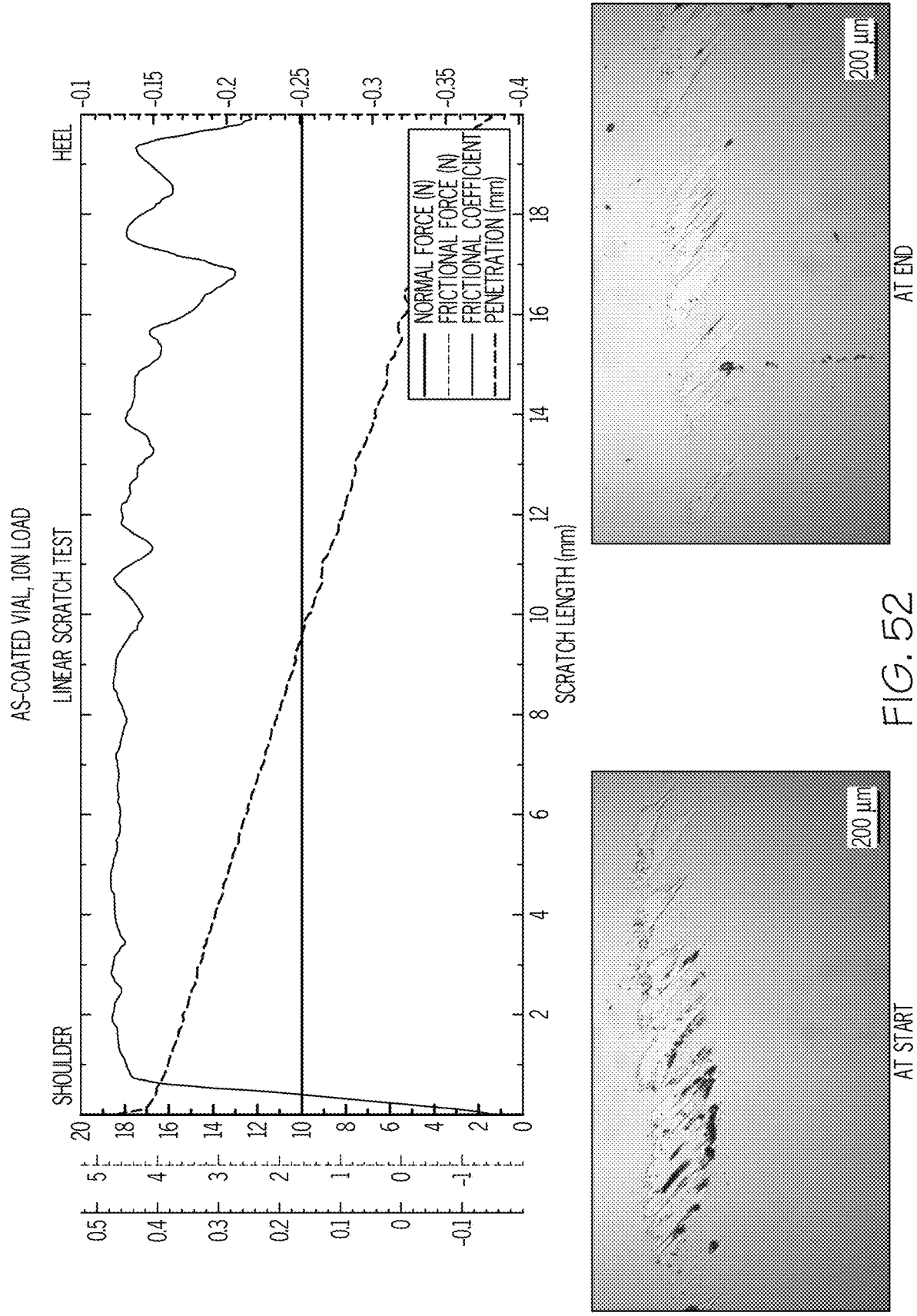
FIG. 52 graphically depicts the coefficient of friction, scratch penetration, applied normal force, and frictional force (y-ordinates) as a function of the length of the applied scratch (x-ordinate) for vials with an adhesion promoter layer in as-coated condition.
Figure 54:
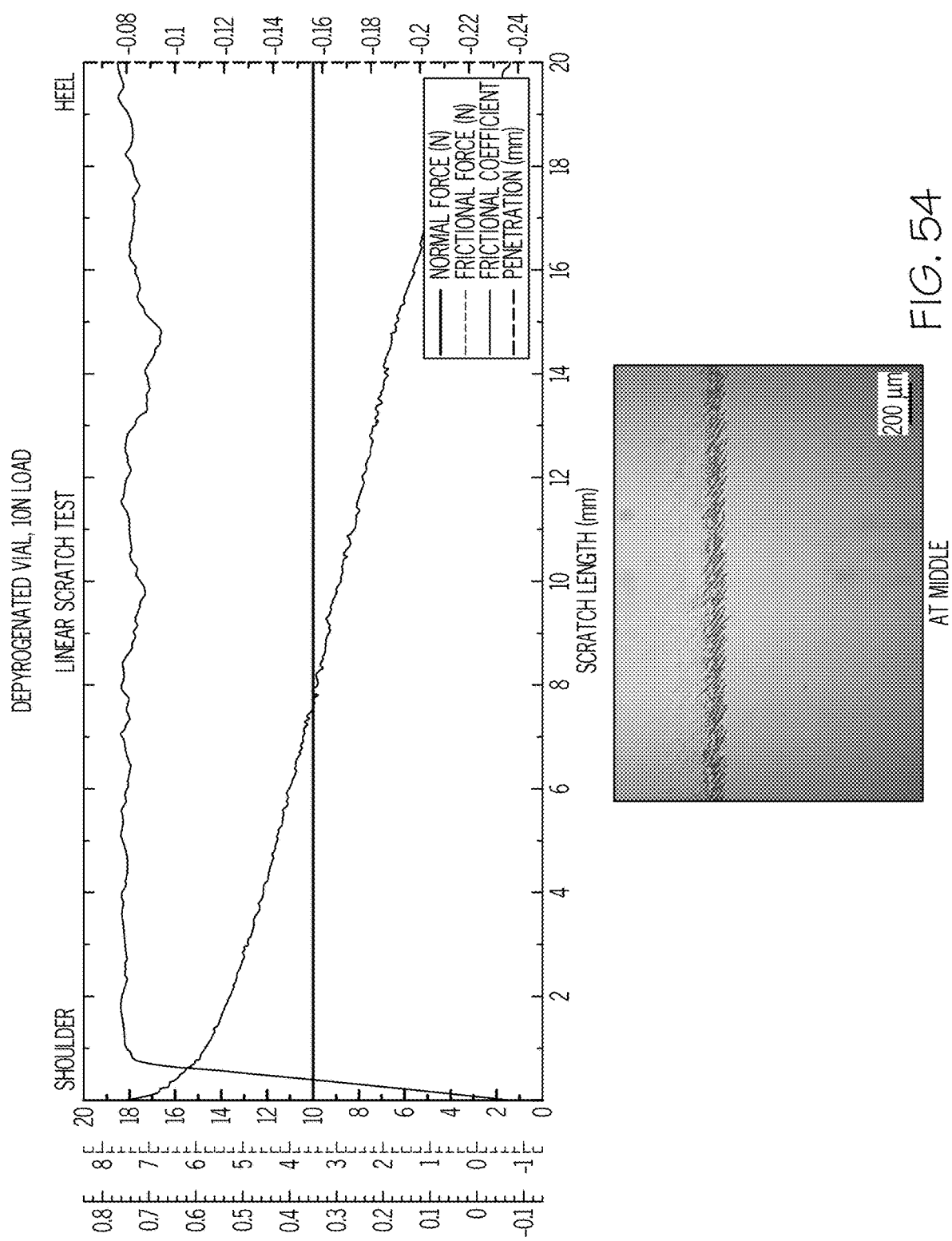
FIG. 54 graphically depicts the coefficient of friction, scratch penetration, applied normal force, and frictional force (y-ordinates) as a function of the length of the applied scratch (x-ordinate) for vials with an adhesion promoter layer after depyrogenation.
Figure 55:
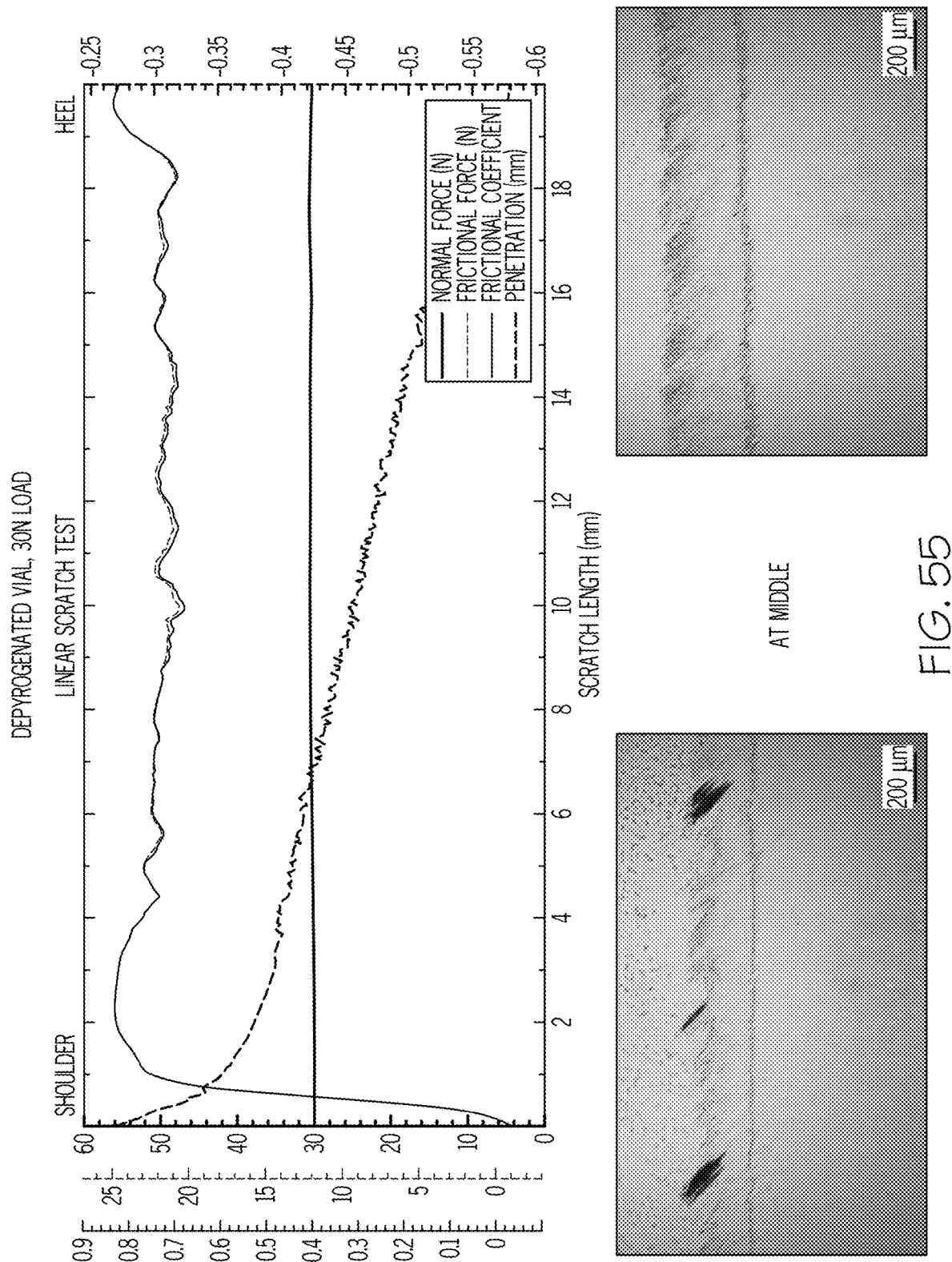
FIG. 55 graphically depicts the coefficient of friction, scratch penetration, applied normal force, and frictional force (y-ordinates) as a function of the length of the applied scratch (x-ordinate) for vials with an adhesion promoter layer after depyrogenation.

FIGS. 52 and 53 are plots showing the coefficient of friction, scratch penetration, applied normal force, and frictional force (y-ordinates) as a function of the length of the applied scratch (x-ordinate) for the as-coated vials. As graphically depicted in FIGS. 52 and 53, the as the as-coated vials exhibited some scuffing and glass damage following testing. However, the coefficient of friction was approximately 0.4-0.5 during testing. FIGS. 54 and 55 depict the results of similar testing performed on the treated vials. Following testing, the treated vials exhibited some abrasion of the surface of the coating as well as some damage to the glass. The coefficient of friction was approximately 0.7-0.8 during testing.

Example 23

Figure 56:
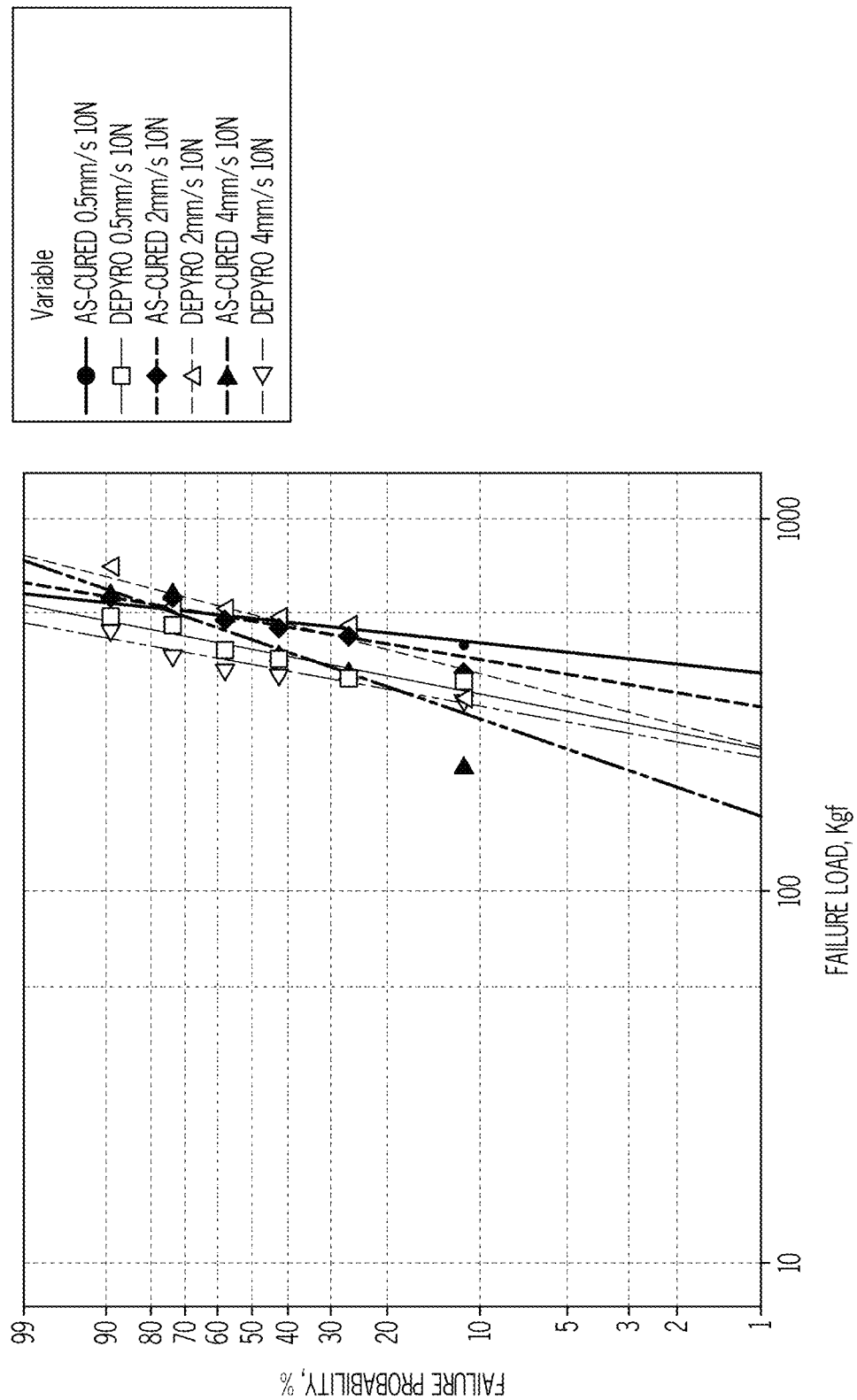
FIG. 56 graphically depicts the failure probability as a function of applied load in a horizontal compression test for vials with an adhesion promoter layer, according to one or more embodiments shown and described herein.
Figure 57:
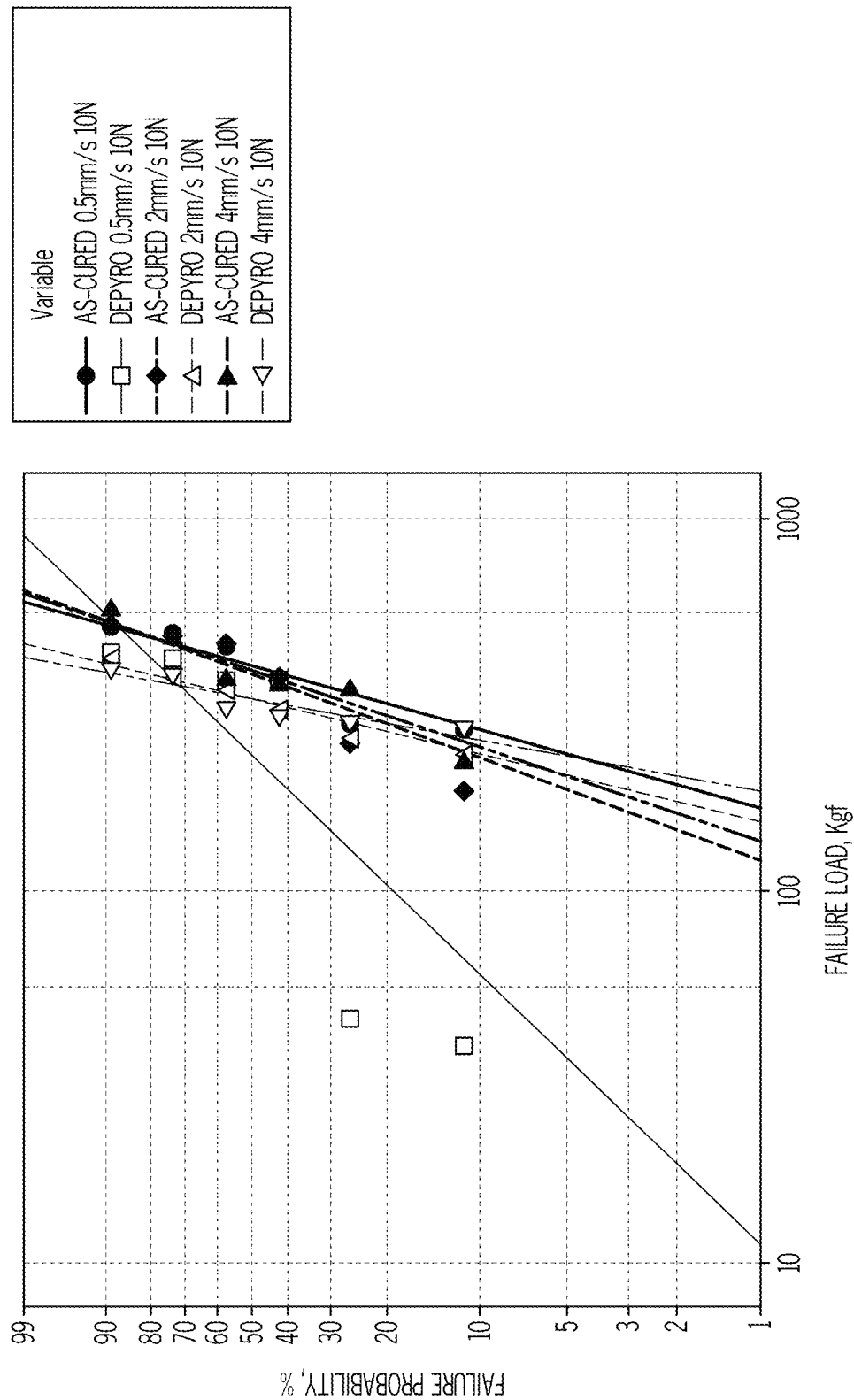
FIG. 57 graphically depicts the failure probability as a function of applied load in a horizontal compression test for vials with an adhesion promoter layer, according to one or more embodiments shown and described herein.

Vials formed from the Reference Glass Composition were coated with a solution of 1.0%/1.0% GAPS/m-APhTMS solution in methanol/water with a 75/25 concentration. The vials were dip coated in the solution and pulled out at pull-out rates ranging from 0.5 mm/s to 4 mm/s to vary the thickness of the coating on respective vials. The coating was cured at 150° C. for 15 minutes. A first set of vials were maintained in untreated condition (i.e., the "as-coated vials"). A second set of vials were depyrogenated at 300° C. for 12 hours (i.e., the "treated vials"). Some of the vials from each set were mechanically tested by applying a scratch with a 10N load from the shoulder of the vial to the heel of the vial using a UMT-2 tribometer. Additional vials from each set were mechanically tested by applying a scratch with a 30N load from the shoulder of the vial to the heel of the vial using a UMT-2 tribometer. The vials were then tested in horizontal compression. The results of the horizontal compression tests are reported in FIGS. 56 and 57. The vials scratched under a 10N load showed only minimal difference in mechanical strength despite the variation in coating thickness. The vials scratched under a 30N and having a thinner coating (i.e., a coating corresponding to a 0.5 mm/s pull-out rate) exhibited a greater propensity for failure in horizontal compression relative to vials having a relatively thicker coating.

It should now be understood that the glass containers described herein have at least two performance attributes selected from resistance to delamination, improved strength, and increased damage resistance. For example, the glass containers may have a combination of resistance to delamination and improved strength; improved strength and increased damage resistance; or resistance to delamination and increased damage resistance. The glass containers described herein may be understood in terms of various aspects.

In a first aspect, a glass container may include a body having an inner surface, an outer surface and a wall thickness extending between the outer surface and the inner surface. At least the inner surface of the body may have a delamination factor less than or equal to 10. A tenacious inorganic coating may be positioned around at least a portion of the outer surface of the body. The outer surface of the body with the tenacious inorganic coating may have a coefficient of friction less than or equal to 0.7.

In a second aspect, a glass container may include a body having an inner surface, an outer surface and a wall thickness extending between the outer surface and the inner surface. At least the inner surface of the body may have a delamination factor less than or equal to 10. A transient coating may be positioned around at least a portion of the outer surface of the body. The outer surface of the body with the transient coating may have a coefficient of friction less than or equal to 0.7.

In a third aspect, a glass container may include a body having an inner surface, an outer surface and a wall thickness extending between the outer surface and the inner surface. At least the inner surface of the body has a delamination factor less than or equal to 10. A tenacious organic coating may be positioned around at least a portion of the outer surface of the body. The outer surface of the body with the tenacious organic coating may have a coefficient of friction less than or equal to 0.7.

In a fourth aspect, a glass container may include a body having an inner surface, an outer surface and a wall thickness extending between the outer surface and the inner surface. The body may be formed from a Type I, Class B glass according to ASTM Standard E438-92. A barrier coating may be positioned on the inner surface of the body such that a composition contained in the glass container does not contact the inner surface of the body. A lubricous coating may be positioned around at least a portion of the outer surface of the body. The outer surface of the body with the lubricous coating may have a coefficient of friction less than or equal to 0.7.

In a fifth aspect, a glass container may include a body having an inner surface, an outer surface and a wall thickness extending from the outer surface to the inner surface. The body may have a hydrolytic resistance of at least HGB2 or better according to the ISO 719 standard. The body may be formed from a glass composition which is free from constituent components which form species that volatilize significantly at temperatures corresponding to a viscosity in a range from about 200 poise to about 100 kilopoise. A lubricous coating may be positioned around at least a portion of the outer surface of the body. The outer surface of the body with the lubricous coating may have a coefficient of friction less than or equal to 0.7.

In a sixth aspect, a glass container may include a body having an inner surface, an outer surface and a wall thickness extending between the outer surface and the inner surface. The body may be formed from a Type I, Class B glass according to ASTM Standard E438-92. The body may be formed under processing conditions which mitigate the vaporization of volatile species in the glass composition. A lubricous coating may be positioned around at least a portion of the outer surface of the body. The outer surface of the body with the lubricous coating may have a coefficient of friction less than or equal to 0.7.

A seventh aspect includes the glass container of any of the first and third through sixth aspects, wherein the coating is thermally stable at a temperature of at least about 250° C. for 30 minutes.

An eighth aspect includes the glass container of any of the first and third through seventh aspects, wherein the tenacious inorganic coating is thermally stable at a temperature of at least about 280° C. for 30 minutes.

A ninth aspect includes the glass container of the first aspect, wherein the tenacious inorganic coating is a metal nitride coating, a metal oxide coating, a metal sulfide coating, $SiO_2$, diamond-like carbon, graphenes, or a carbide coating.

A tenth aspect includes the glass container of the first aspect, wherein the tenacious inorganic coating comprises at least one of TiN, BN, HBN, $TiO_2$, $Ta_2O_5$, $HfO_2$, $Nb_2O_5$, $V_2O_5$, $SiO_2$, $MoS_2$, SiC, SnO, $SnO_2$, $ZrO_2$, $Al_2O_3$, BN, ZnO, and BC.

An eleventh aspect includes the glass container of any of the first through tenth aspects, wherein the body has an interior region extending between the inner surface of the body and the outer surface of the body, the interior region having a persistent layer homogeneity.

A twelfth aspect includes the glass container of the eleventh aspect, wherein the interior region has a thickness of at least 100 nm.

A thirteenth aspect includes the glass container of any of the first through twelfth aspects, wherein the inner surface of the body has a persistent surface homogeneity.

A fourteenth aspect includes the glass container of the thirteenth aspect, wherein the persistent surface homogeneity extends into the wall thickness of the body to a depth $D_{SR}$ of at least 10 nm from the inner surface of the body.

A fifteenth aspect includes the glass container of any of the first through fourteenth aspects, wherein the inner surface of the body is etched.

A sixteenth aspect includes the glass container of any of the first through fifteenth aspects, wherein the inner surface of the body is acid etched.

A seventeenth aspect includes the glass container of any of the first through sixteenth aspects, wherein the inner surface of the glass body is a barrier coating and the barrier coating has a delamination factor less than or equal to 10.

A eighteenth aspect includes the glass container of the seventeenth aspect, wherein the barrier coating is an inorganic coating is a metal nitride coating, a metal oxide coating, a metal sulfide coating, $SiO_2$, diamond-like carbon, graphenes, or a carbide coating.

A nineteenth aspect includes the glass container of the seventeenth aspect, wherein the barrier coating comprises at least one of $Al_2O_3$, $TiO_2$, $ZrO_2$, SnO, $SnO_2$, $SiO_2$, $Ta_2O_5$, $Nb_2O_5$, $Cr_2O_3$, $V_2O_5$, ZnO or $HfO_2$, or combinations thereof.

A twentieth aspect includes the glass container of the seventeenth aspect, wherein the barrier coating comprises at least one of a polybenzimidazoles, polybisoxazoles, polybisthiazoles, polyetherimides, polyquinolines, polythiophenes, phenylene sulfides, polysulfones, polycyanurates, parylenes, fluorinated polyolefins including polytetrafluoroethylenes and other fluoro-substituted polyolefins, perfluoroalkoxy polymers, polyether ether ketones (PEEK), polyamides, epoxies, polyphenolics, polyurethane acrylates, cyclic olefin copolymer and cyclic olefin polymers, polyolefins including polyethylenes, oxidized polyethylenes, polypropylenes, polyethylene/propylene copolymers, polyethylene/vinyl acetate copolymers, polyvinylchloride, polyacrylates, polymethacrylates, polystyrenes, polyterpenes, polyanhydrides, polymaleicanhydrides, polyformaldehydes, polyacetals and copolymers of polyacetals, polysiloxanes of dimethyl or diphenyl or methyl/phenyl mixtures, perfluorinated siloxanes and other substituted siloxanes, polyimides, polycarbonates, polyesters, parafins and waxes, or various combinations thereof.

A twenty-first aspect includes the glass container of any of the first through twentieth aspects, wherein the body has at least a class S3 acid resistance or better according to DIN 12116.

A twenty-second aspect includes the glass container of any of the first through twenty-first aspects, wherein the body has at least a class A2 base resistance or better according to ISO 695.

A twenty-third aspect includes the glass container of any of the first through twenty-second aspects, wherein the body has at least a type HgB2 hydrolytic resistance or better according to ISO 719.

A twenty-fourth aspect includes the glass container of any of the first through twenty-third aspects, wherein the body has at least a type HgA2 hydrolytic resistance or better according to ISO 720.

A twenty-fifth aspect includes the glass container of any of the first through twenty-fourth aspects, wherein the body has a Type 1 chemical durability according to USP <660>.

A twenty-sixth aspect includes the glass container of any of the first through twenty-fifth aspects, wherein the body is a mold-formed body.

A twenty-seventh aspect includes the glass container of any of the first through twenty-sixth aspects, wherein the body is formed with a glass forming process in which the body is monotonically cooled from a glass melt.

A twenty-eighth aspect includes the glass container of any of the first through twenty-seventh aspects, wherein the body is formed from an aluminosilicate glass composition.

A twenty-ninth aspect includes the glass container of any of the first through twenty-eighth aspects, wherein the body is formed from an alkali-aluminosilicate glass composition.

A thirtieth aspect includes the glass container of the twenty-ninth aspect, wherein the alkali-aluminosilicate glass composition is substantially free from boron and compounds containing boron.

A thirty-first aspect includes the glass container of any of the twenty-ninth and thirtieth aspects, wherein the alkali-aluminosilicate glass composition is substantially free from zinc and compounds containing zinc.

A thirty-second aspect includes the glass container of any of the twenty-ninth through thirty-first aspects, wherein the alkali-aluminosilicate glass composition is substantially free from phosphorous and compounds containing phosphorous.

A thirty-third aspect includes the glass container of any of the first through thirty-second aspects, wherein the body is formed from a glass composition comprising: from about 67 mol. % to about 75 mol. % $SiO_2$; from about 6 mol. % to about 10 mol. % $Al_2O_3$; from about 5 mol. % to about 12 mol. % alkali oxide, wherein the alkali oxide comprises from about 2.5 mol. % to about 10 mol % $Na_2O$ and greater than about 0 mol. % to about 2.5 mol. % $K_2O$; from about 9 mol. % to about 15 mol. % alkaline earth oxide; and from about 0 mol. % to about 0.5 mol. % $SnO_2$.

A thirty-fourth aspect includes the glass container of the thirty-third aspect, wherein the glass composition is substantially free from boron and compounds containing boron.

A thirty-fifth aspect includes the glass container of the thirty-third and thirty-fourth aspects, wherein the glass composition is substantially free from zinc and compounds containing zinc.

A thirty-sixth aspect includes the glass container of the thirty-third through thirty fourth aspects, wherein the glass composition is substantially free from phosphorous and compounds containing phosphorous.

A thirty-seventh aspect includes the glass container of the first through third and fifth aspects, wherein the body is formed from a Type I, Class B glass according to ASTM Standard E438-92.

A thirty-eighth aspect includes the glass container of the thirty-seventh aspect, wherein the Type I, Class B glass according to ASTM Standard E438-92 is substantially free from zinc and compounds containing zinc.

A thirty-ninth aspect includes the glass container of the second aspect, wherein the transient coating pyrolizes at temperatures less than or equal to 300° C. in less than or equal to 1 hour.

A fortieth aspect includes the glass container of any of the second and thirty-ninth aspects, wherein the transient coating comprises a mixture of polyoxyethylene glycol, methacrylate resin, melamine formaldehyde resin, and polyvinyl alcohol.

A forty-first aspect includes the glass container of any of the second and thirty-ninth through fortieth aspects, wherein the transient coating comprises one or more polysaccharides.

A forty-second aspect includes the glass container of any of the second and thirty-ninth through forty-first aspects, wherein the transient coating comprises polyacrylic acid or a derivative of polyacrylic acid.

A forty-third aspect includes the glass container of any of the second and thirty-ninth through forty-second aspects, wherein the transient coating comprises an inorganic salt.

A forty-fourth aspect includes the glass container of any of the second and thirty-ninth through forty-fourth aspects, wherein the transient coating comprises at least one of: poly(ethylene oxides), poly (propylene oxides), ethylene oxide-propylene oxide copolymers, polyvinyl-pyrrolidinones, polyethyleneimines, poly(methyl vinyl ethers), polyacrylamides, polymethacrylamides, polyurethanes, poly(vinylacetates), polyvinyl formal, polyformaldehydes including polyacetals and acetal copolymers, poly(alkyl methacrylates), methyl celluloses, ethyl celluloses, hydroxyethyl celluloses, hydroxypropyl celluloses, sodium carboxymethyl celluloses, methyl hydroxypropyl celluloses, poly (acrylic acids) and salts thereof, poly(methacrylic acids) and salts thereof, ethylene-maleic anhydride copolymers, ethylene-vinyl alcohol copolymers, ethylene-acrylic acid copolymers, vinyl acetate-vinyl alcohol copolymers, methyl vinyl ether-maleic anhydride copolymers, emulsifiable polyurethanes, polyoxyethylene stearates, and polyolefins including polyethylenes, polypropylenes and copolymers thereof, starches and modified starches, hydrocolloids, polyacryloamide, vegetable and animal fats, wax, tallow, soap, stearine-paraffin emulsions, polysiloxanes of dimethyl or diphenyl or methyl/phenyl mixtures, perfluorinated siloxanes and other substituted siloxanes, alkylsilanes, aromatic silanes, and oxidized polyethylene.

A forty-fifth aspect includes the glass container of any of the first through forty-fourth aspects, wherein the glass container is formed from a glass composition which comprises greater than about 75 mol. % $SiO_2$ and is substantially free from boron, alkali oxides, and alkaline oxides.

A forty-sixth aspect includes the glass container of any of the third through sixth aspects, wherein the coating has a mass loss of less than about 5% of its mass when heated from a temperature of 150° C. to 350° C. at a ramp rate of about 10° C./minute.

A forty-seventh aspect includes the glass container of any of the third through sixth aspects, wherein the tenacious organic coating comprises a polymer chemical composition.

A forty-eighth aspect includes the glass container of any of the third through sixth and forty-seventh aspects, wherein the tenacious organic coating further comprises a coupling agent.

A forty-ninth aspect includes the glass container of any of the fifth or sixth aspects, wherein at least the inner surface of the body has a delamination factor less than or equal to 10.

A fiftieth aspect includes the glass container of any of the first through forty-ninth aspects, wherein a light transmission through the glass container is greater than or equal to about 55% of a light transmission through an uncoated glass article for wavelengths from about 400 nm to about 700 nm.

A fifty-first aspect includes the glass container of any of the first through fiftieth aspects, wherein the glass container is a pharmaceutical package.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of making a glass container for storing a pharmaceutical formulation, the method comprising:
   heating a Type 1 glass composition according to ASTM Standard E438-92(2011) to form a glass melt, wherein the glass composition is a borosilicate;
   forming the glass melt into a glass tube;
   re-forming the glass tube into the glass container comprising a glass body having a wall portion with an interior surface and an exterior surface, a heel portion, and a floor portion, wherein the interior surface of the glass container is formed by the interior surface of the glass body such that the interior surface of the glass container consists of the Type 1 glass composition, and wherein the glass container does not comprise a boron-rich layer on the interior surface of the glass body, the glass container comprising at least a class A2 base resistance or better according to ISO 695, at least a type HGB2 hydrolytic resistance or better according to ISO 719 and Type 1 chemical durability according to USP <660>.

2. The method of claim 1, further comprising applying a coating having a thickness of less than 100 microns to the exterior surface such that the glass container with the coating has a coefficient of friction less than or equal to 0.7.

3. The method of claim 2, further comprising subjecting the glass container to a depyrogenation cycle, whereby the coefficient of friction does not increase by more than 30% after the depyrogenation cycle.

4. The method of claim 3, wherein the depyrogenation cycle comprises heating the glass container to a temperature of at least 250° C. for at least 30 minutes.

5. The method of claim 3, wherein the depyrogenation cycle comprises heating the glass container to a temperature of at least 250° C. for up to 72 hours.

6. The method of claim 3, wherein the depyrogenation cycle comprises subjecting the glass container to a thermal treatment at a temperature of from 250° C. to 400° C. for a time period of from 30 minutes to 72 hours.

7. The method of claim 2, wherein the applying the coating comprises:
   applying a coupling agent layer to the exterior surface; and
   applying a polymer layer to the coupling agent layer.

8. The method of claim 2, further comprising subjecting the glass container to a lyophilization cycle, whereby the coefficient of friction does not increase by more than 30% after the lyophilization cycle.

9. The method of claim 8, wherein the lyophilization cycle comprises filling the glass container with a liquid that contains protein and then freezing at a temperature of −100° C., followed by water sublimation for 20 hours at −15° C. under vacuum.

10. The method of claim 1, wherein the re-forming the glass tube into the glass container comprises heating the glass tube to a temperature greater than or equal to 1100° C. and less than or equal to 1650° C.

11. The method of claim 1, wherein the re-forming the glass tube into the glass container comprises processing the glass tube with processing conditions which mitigate vaporization of species from the glass composition compared with processing conditions comprising higher temperatures or faster forming speeds.

12. A method for storing a pharmaceutical formulation, the method comprising:
   providing a batch of raw materials comprising one or more of $SiO_2$, $B_2O_3$, $Al_2O_3$, alkali oxides, alkaline earth oxides and fining agents;
   heating the batch of raw materials to form a glass melt;
   forming the glass melt into a glass tube having a Type 1 glass composition according to ASTM Standard E438-92(2011), wherein the glass composition is a borosilicate;
   re-forming the glass tube into a plurality of glass containers, each of the plurality of glass containers comprising a glass body having a wall portion with an interior surface and an exterior surface, a heel portion, and a floor portion, wherein the interior surface of each of the plurality of glass containers is formed by the interior surface of the glass body such that the interior surface of each glass container consists of the Type 1 glass composition, and wherein each of the plurality of glass containers does not comprise a boron-rich layer on the interior surface of the glass body, each of the plurality of glass containers comprising at least a class A2 base resistance or better according to ISO 695, at least a type HGB2 hydrolytic resistance or better according to ISO 719 and Type 1 chemical durability according to USP <660>
   placing the plurality of glass containers on a pharmaceutical filling line; and
   filling each of the plurality of glass containers with a pharmaceutical formulation.

13. The method of claim 12, further comprising applying a coating having a thickness of less than 100 microns to the exterior surface to at least one of the plurality of glass containers such that the at least one glass container with the coating has a coefficient of friction less than or equal to 0.7.

14. The method of claim 12, wherein the step of placing the plurality of glass containers on a pharmaceutical filling line comprises one or more of washing, lyophilizing, depyrogenating, autoclaving, capping or packaging the plurality of glass containers.

15. A method of making a glass container for storing a pharmaceutical formulation, the method comprising:
   heating a Type 1 glass composition according to ASTM Standard E438-92(2011) to form a glass melt;
   forming the glass melt into a glass tube;
   re-forming the glass tube into the glass container comprising a glass body having a wall portion with an interior surface and an exterior surface, a heel portion, and a floor portion, wherein the interior surface of the glass container is formed by the interior surface of the glass body such that the interior surface of the glass container consists of the Type 1 glass composition, and wherein the glass container does not comprise a boron-rich layer on the interior surface of the glass body, the glass container comprising at least a class A2 base resistance or better according to ISO 695, at least a type HGB2 hydrolytic resistance or better according to ISO 719 and Type 1 chemical durability according to USP <660>; and applying a coating having a thickness of less than 100 microns to the exterior surface such that the glass container with the coating has a coefficient of friction less than or equal to 0.7.

16. The method of claim 15, further comprising subjecting the glass container to a depyrogenation cycle, whereby the coefficient of friction does not increase by more than 30% after the depyrogenation cycle.

17. The method of claim 16, wherein the depyrogenation cycle comprises heating the glass container to a temperature of at least 250° C. for at least 30 minutes.

18. The method of claim 16, wherein the depyrogenation cycle comprises heating the glass container to a temperature of at least 250° C. for up to 72 hours.

19. The method of claim 16, wherein the depyrogenation cycle comprises subjecting the glass container to a thermal treatment at a temperature of from 250° C. to 400° C. for a time period of from 30 minutes to 72 hours.

20. The method of claim 15, wherein the applying the coating comprises:
applying a coupling agent layer to the exterior surface; and
applying a polymer layer to the coupling agent layer.

21. The method of claim 15, further comprising subjecting the glass container to a lyophilization cycle, whereby the coefficient of friction does not increase by more than 30% after the lyophilization cycle.

22. The method of claim 21, wherein the lyophilization cycle comprises filling the glass container with a liquid that contains protein and then freezing at a temperature of −100° C., followed by water sublimation for 20 hours at −15° C. under vacuum.

23. The method of claim 15, wherein the re-forming the glass tube into the glass container comprises heating the glass tube to a temperature greater than or equal to 1100° C. and less than or equal to 1650° C.

24. The method of claim 15, wherein the re-forming the glass tube into the glass container comprises processing the glass tube with processing conditions which mitigate vaporization of species from the glass composition compared with processing conditions comprising higher temperatures or faster forming speeds.

25. The method of claim 15, wherein the Type 1 glass composition is a borosilicate glass composition.

26. A method for storing a pharmaceutical formulation, the method comprising:
providing a batch of raw materials comprising one or more of $SiO_2$, $B_2O_3$, $Al_2O_3$, alkali oxides, alkaline earth oxides and fining agents;

heating the batch of raw materials to form a glass melt;

forming the glass melt into a glass tube having a Type 1 glass composition according to ASTM Standard E438-92(2011);

re-forming the glass tube into a plurality of glass containers, each of the plurality of glass containers comprising a glass body having a wall portion with an interior surface and an exterior surface, a heel portion, and a floor portion, wherein the interior surface of each of the plurality of glass containers is formed by the interior surface of the glass body such that the interior surface of each glass container consists of the Type 1 glass composition, and wherein each of the plurality of glass containers does not comprise a boron-rich layer on the interior surface of the glass body, each of the plurality of glass containers comprising at least a class A2 base resistance or better according to ISO 695, at least a type HGB2 hydrolytic resistance or better according to ISO 719 and Type 1 chemical durability according to USP <660>;

applying a coating having a thickness of less than 100 microns to the exterior surface to at least one of the plurality of glass containers such that the at least one glass container with the coating has a coefficient of friction less than or equal to 0.7;

placing the plurality of glass containers on a pharmaceutical filling line; and filling each of the plurality of glass containers with a pharmaceutical formulation.

27. The method of claim 26, wherein the step of placing the plurality of glass containers on a pharmaceutical filling line comprises one or more of washing, lyophilizing, depyrogenating, autoclaving, capping or packaging the plurality of glass containers.

28. The method of claim 26, wherein the glass tube is borosilicate.

* * * * *